(12) United States Patent
Mandella et al.

(10) Patent No.: US 9,229,540 B2
(45) Date of Patent: Jan. 5, 2016

(54) DERIVING INPUT FROM SIX DEGREES OF FREEDOM INTERFACES

(75) Inventors: Michael J. Mandella, Palo Alto, CA (US); Hector H. Gonzalez-Banos, Mountain View, CA (US); Marek Alboszta, Montara, CA (US)

(73) Assignee: Electronic Scripting Products, Inc., Palo Alto, CA (US)

(*) Notice: Subject to any disclaimer, the term of this patent is extended or adjusted under 35 U.S.C. 154(b) by 346 days.

(21) Appl. No.: 13/199,239

(22) Filed: Aug. 22, 2011

(65) Prior Publication Data

US 2012/0038549 A1 Feb. 16, 2012

Related U.S. Application Data

(63) Continuation-in-part of application No. 10/769,484, filed on Jan. 30, 2004.

(51) Int. Cl.
| | |
|---|---|
| *G06F 3/033* | (2013.01) |
| *G09G 5/08* | (2006.01) |
| *G06F 3/0354* | (2013.01) |
| *G06F 3/01* | (2006.01) |

(52) U.S. Cl.
CPC ............ *G06F 3/03545* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 3,028,500 A | 4/1962 | Wallmark | |
| 3,209,201 A | 9/1965 | Anger | |
| 3,918,814 A | 11/1975 | Weiser | |
| 4,070,649 A | 1/1978 | Wright, Jr. et al. | |
| 4,471,162 A | 9/1984 | Aono et al. | |
| 4,749,849 A | 6/1988 | Hoeberechts et al. | |
| 4,777,329 A | 10/1988 | Mallicoat | |
| 4,877,951 A | 10/1989 | Muro | |
| 4,885,433 A | 12/1989 | Schier | |
| 5,005,979 A | 4/1991 | Sontag et al. | |

(Continued)

FOREIGN PATENT DOCUMENTS

| | | |
|---|---|---|
| EP | 0649549 B1 | 2/1997 |
| EP | 1 128 319 A1 | 8/2001 |

(Continued)

OTHER PUBLICATIONS

Frey et al., "Off-the-Shelf, Real-Time, Human Body Motion Capture for Synthetic Environments", Environments, 1996, 1-26.

(Continued)

*Primary Examiner* — Seokyun Moon
(74) *Attorney, Agent, or Firm* — Christopher P. Maiorana, PC

(57) ABSTRACT

The present invention relates to interfaces and methods for producing input for software applications based on the absolute pose of an item manipulated or worn by a user in a three-dimensional environment. Absolute pose in the sense of the present invention means both the position and the orientation of the item as described in a stable frame defined in that three-dimensional environment. The invention describes how to recover the absolute pose with optical hardware and methods, and how to map at least one of the recovered absolute pose parameters to the three translational and three rotational degrees of freedom available to the item to generate useful input. The applications that can most benefit from the interfaces and methods of the invention involve 3D virtual spaces including augmented reality and mixed reality environments.

62 Claims, 39 Drawing Sheets

(56) References Cited

U.S. PATENT DOCUMENTS

| | | |
|---|---|---|
| 5,059,789 A | 10/1991 | Salcudean |
| 5,103,486 A | 4/1992 | Grippi |
| 5,166,668 A | 11/1992 | Aoyagi |
| 5,215,397 A | 6/1993 | Taguchi et al. |
| 5,226,091 A | 7/1993 | Howell |
| 5,237,647 A | 8/1993 | Roberts et al. |
| 5,294,792 A | 3/1994 | Lewis et al. |
| 5,333,209 A | 7/1994 | Sniden et al. |
| 5,388,059 A | 2/1995 | DeMenthon |
| 5,434,371 A | 7/1995 | Brooks |
| 5,477,012 A | 12/1995 | Sekendur |
| 5,484,966 A | 1/1996 | Segen |
| 5,517,579 A | 5/1996 | Baron |
| 5,533,141 A | 7/1996 | Futatsugi et al. |
| 5,544,255 A | 8/1996 | Smithies et al. |
| 5,548,092 A | 8/1996 | Shriver |
| 5,577,135 A | 11/1996 | Grajski et al. |
| 5,581,276 A | 12/1996 | Cipolla et al. |
| 5,587,558 A | 12/1996 | Matsushima |
| 5,592,401 A | 1/1997 | Kramer |
| 5,615,132 A | 3/1997 | Horton et al. |
| 5,640,589 A | 6/1997 | Takayama et al. |
| 5,645,077 A | 7/1997 | Foxlin |
| 5,647,017 A | 7/1997 | Smithies et al. |
| 5,652,412 A | 7/1997 | Lazzouni et al. |
| 5,661,506 A | 8/1997 | Lazzouni et al. |
| 5,694,153 A | 12/1997 | Aoyagi et al. |
| 5,717,168 A | 2/1998 | LeBuisser et al. |
| 5,737,740 A | 4/1998 | Henderson et al. |
| 5,748,808 A | 5/1998 | Taguchi et al. |
| 5,750,939 A | 5/1998 | Makinwa et al. |
| 5,768,417 A | 6/1998 | Errico et al. |
| 5,774,602 A | 6/1998 | Taguchi et al. |
| 5,781,661 A | 7/1998 | Hiraiwa et al. |
| 5,812,269 A | 9/1998 | Svetkoff et al. |
| 5,818,955 A | 10/1998 | Smithies et al. |
| 5,850,058 A | 12/1998 | Tano et al. |
| 5,852,434 A | 12/1998 | Sekendur |
| 5,856,844 A | 1/1999 | Batterman et al. |
| 5,869,834 A | 2/1999 | Wipemnyr |
| 5,870,492 A | 2/1999 | Shimizu et al. |
| 5,889,505 A | 3/1999 | Toyama et al. |
| 5,902,968 A | 5/1999 | Sato et al. |
| 5,923,318 A | 7/1999 | Zhai et al. |
| 5,930,380 A | 7/1999 | Kashi et al. |
| 5,939,702 A | 8/1999 | Knighton et al. |
| 5,945,981 A | 8/1999 | Paull et al. |
| 5,959,617 A | 9/1999 | Bird et al. |
| 5,960,124 A | 9/1999 | Taguchi et al. |
| 5,977,958 A | 11/1999 | Baron et al. |
| 5,981,884 A | 11/1999 | Sato et al. |
| 6,023,275 A | 2/2000 | Horvitz et al. |
| 6,031,936 A | 2/2000 | Nakamura |
| 6,044,165 A | 3/2000 | Perona et al. |
| 6,050,490 A | 4/2000 | Leichner et al. |
| 6,064,751 A | 5/2000 | Smithies et al. |
| 6,081,261 A | 6/2000 | Wolff et al. |
| 6,084,985 A | 7/2000 | Dolfing et al. |
| 6,091,835 A | 7/2000 | Smithies et al. |
| 6,100,877 A | 8/2000 | Chery et al. |
| 6,104,387 A | 8/2000 | Chery et al. |
| 6,104,388 A | 8/2000 | Nagai et al. |
| 6,108,444 A | 8/2000 | Syeda-Mahmood |
| 6,111,565 A | 8/2000 | Chery et al. |
| 6,124,847 A | 9/2000 | Chery et al. |
| 6,130,666 A | 10/2000 | Persidsky |
| 6,147,681 A | 11/2000 | Chery et al. |
| 6,153,836 A | 11/2000 | Goszyk |
| 6,167,376 A | 12/2000 | Ditzik |
| 6,176,837 B1 | 1/2001 | Foxlin |
| 6,177,927 B1 | 1/2001 | Chery et al. |
| 6,181,329 B1 | 1/2001 | Stork et al. |
| 6,184,873 B1 | 2/2001 | Ward et al. |
| 6,188,392 B1 | 2/2001 | O'Connor et al. |
| 6,208,330 B1 | 3/2001 | Hasegawa et al. |
| 6,212,296 B1 | 4/2001 | Stork et al. |
| 6,213,398 B1 | 4/2001 | Southworth et al. |
| 6,243,503 B1 | 6/2001 | Teufel et al. |
| 6,249,274 B1 | 6/2001 | Svancarak et al. |
| 6,262,719 B1 | 7/2001 | Bi et al. |
| 6,292,177 B1 | 9/2001 | Holtzman et al. |
| 6,324,296 B1 | 11/2001 | McSheery et al. |
| 6,330,359 B1 | 12/2001 | Kawabata |
| 6,334,003 B1 | 12/2001 | Yokota |
| 6,335,723 B1 | 1/2002 | Wood et al. |
| 6,335,724 B1 | 1/2002 | Takekawa et al. |
| 6,335,727 B1 | 1/2002 | Morishita et al. |
| 6,348,914 B1 | 2/2002 | Tuli |
| 6,366,697 B1 | 4/2002 | Goldberg et al. |
| 6,373,047 B1 | 4/2002 | Adan et al. |
| 6,375,572 B1 | 4/2002 | Masuyama et al. |
| 6,396,481 B1 | 5/2002 | Challa et al. |
| 6,414,673 B1 | 7/2002 | Wood et al. |
| 6,415,256 B1 | 7/2002 | Ditzik |
| 6,417,836 B1 | 7/2002 | Kumar et al. |
| 6,421,042 B1 | 7/2002 | Omura et al. |
| 6,422,775 B1 | 7/2002 | Bramlett et al. |
| 6,424,340 B1 | 7/2002 | Holtzman et al. |
| 6,429,856 B1 | 8/2002 | Omura et al. |
| 6,437,314 B1 | 8/2002 | Usuda et al. |
| 6,454,482 B1 | 9/2002 | Silverbrook et al. |
| 6,456,749 B1 | 9/2002 | Kasabach et al. |
| 6,474,159 B1 | 11/2002 | Foxlin et al. |
| 6,474,888 B1 | 11/2002 | Lapstun et al. |
| 6,492,981 B1 | 12/2002 | Stork et al. |
| 6,493,736 B1 | 12/2002 | Forcier |
| 6,502,114 B1 | 12/2002 | Forcier |
| 6,556,190 B2 | 4/2003 | Fleck et al. |
| 6,565,611 B1 | 5/2003 | Wilcox et al. |
| 6,573,887 B1 | 6/2003 | O'Donnell, Jr. |
| 6,577,299 B1 | 6/2003 | Schiller et al. |
| 6,587,809 B2 | 7/2003 | Majoe |
| 6,592,039 B1 | 7/2003 | Smith et al. |
| 6,625,296 B2 | 9/2003 | Price et al. |
| 6,627,870 B1 | 9/2003 | Lapstun et al. |
| 6,628,847 B1 | 9/2003 | Kasabach et al. |
| 6,641,482 B2 | 11/2003 | Masuyama et al. |
| 6,650,320 B1 | 11/2003 | Zimmerman |
| 6,661,920 B1 | 12/2003 | Skinner |
| 6,681,629 B2 | 1/2004 | Foxlin et al. |
| 6,686,579 B2 | 2/2004 | Fagin et al. |
| 6,686,910 B2 | 2/2004 | O'Donnell, Jr. |
| 6,687,876 B1 | 2/2004 | Schilt et al. |
| 6,689,966 B2 | 2/2004 | Wiebe |
| 6,720,949 B1 | 4/2004 | Pryor et al. |
| 6,724,930 B1 | 4/2004 | Kosaka et al. |
| 6,727,885 B1 | 4/2004 | Ishino et al. |
| 6,747,690 B2 | 6/2004 | Molgaard |
| 6,781,133 B2 | 8/2004 | Karplus et al. |
| 6,798,403 B2 | 9/2004 | Kitada et al. |
| 6,811,489 B1 | 11/2004 | Shimizu et al. |
| 6,844,871 B1 | 1/2005 | Hinckley et al. |
| 6,852,032 B2 | 2/2005 | Ishino |
| 6,922,632 B2 | 7/2005 | Foxlin |
| 6,952,003 B2 | 10/2005 | Skurnik et al. |
| 6,952,026 B2 | 10/2005 | Lindholm |
| 6,982,697 B2 | 1/2006 | Wilson |
| 6,993,206 B2 | 1/2006 | Ishino et al. |
| 6,995,445 B2 | 2/2006 | Forrest et al. |
| 7,000,469 B2 | 2/2006 | Foxlin et al. |
| 7,022,966 B2 | 4/2006 | Gonzo et al. |
| 7,061,429 B2 | 6/2006 | Fager et al. |
| 7,088,440 B2 | 8/2006 | Buermann et al. |
| 7,102,616 B1 | 9/2006 | Sleator |
| 7,110,100 B2 | 9/2006 | Buermann et al. |
| 7,139,983 B2 | 11/2006 | Kelts |
| 7,158,118 B2 | 1/2007 | Liberty |
| 7,203,384 B2 | 4/2007 | Carl |
| 7,215,322 B2 | 5/2007 | Genc et al. |
| 7,236,156 B2 | 6/2007 | Liberty et al. |
| 7,268,774 B2 | 9/2007 | Pittel et al. |
| 7,279,646 B2 | 10/2007 | Xu |
| 7,379,841 B2 | 5/2008 | Ohta |
| 7,414,611 B2 | 8/2008 | Liberty |

(56) References Cited

U.S. PATENT DOCUMENTS

| | | |
|---|---|---|
| 7,424,388 B2 | 9/2008 | Sato |
| 7,445,550 B2 | 11/2008 | Barney et al. |
| 7,474,809 B2 | 1/2009 | Carl et al. |
| 7,500,917 B2 | 3/2009 | Barney et al. |
| 7,566,858 B2 * | 7/2009 | Hotelling et al. ......... 250/208.2 |
| 7,567,701 B2 | 7/2009 | Fontius |
| 7,596,466 B2 | 9/2009 | Ohta |
| 7,596,767 B2 | 9/2009 | Wilson |
| 7,629,974 B2 | 12/2009 | Ohta |
| 7,655,937 B2 | 2/2010 | Hotelling et al. |
| 7,690,994 B2 | 4/2010 | Dohta |
| 7,716,008 B2 * | 5/2010 | Ohta ........................... 702/152 |
| 7,760,194 B2 | 7/2010 | Sakurai |
| 7,768,498 B2 | 8/2010 | Wey |
| 7,775,439 B2 | 8/2010 | Kimber |
| 7,831,064 B2 | 11/2010 | Ohta |
| 7,833,100 B2 | 11/2010 | Dohta |
| 7,834,848 B2 | 11/2010 | Ohta |
| 7,872,638 B2 | 1/2011 | Sato |
| 7,880,726 B2 | 2/2011 | Nakadaira et al. |
| 7,896,733 B2 | 3/2011 | Tanabe |
| 7,927,216 B2 | 4/2011 | Ikeda et al. |
| 7,931,535 B2 | 4/2011 | Ikeda et al. |
| 7,942,745 B2 | 5/2011 | Ikeda et al. |
| 7,999,812 B2 | 8/2011 | Bassett et al. |
| 8,041,536 B2 | 10/2011 | Ohta |
| 8,102,365 B2 | 1/2012 | Alten |
| 8,106,884 B2 * | 1/2012 | Nam et al. ................... 345/158 |
| 8,384,665 B1 * | 2/2013 | Powers et al. ............... 345/156 |
| 2001/0020936 A1 | 9/2001 | Tsuji |
| 2001/0043737 A1 | 11/2001 | Rogina et al. |
| 2002/0001029 A1 | 1/2002 | Abe |
| 2002/0028017 A1 | 3/2002 | Munich et al. |
| 2002/0048404 A1 * | 4/2002 | Fahraeus et al. ............. 382/188 |
| 2002/0049530 A1 | 4/2002 | Poropat |
| 2002/0118181 A1 | 8/2002 | Sekendur |
| 2002/0145587 A1 | 10/2002 | Watanabe |
| 2002/0148655 A1 | 10/2002 | Cho et al. |
| 2002/0158848 A1 | 10/2002 | Sekendur |
| 2002/0163511 A1 | 11/2002 | Sekendur |
| 2002/0180714 A1 | 12/2002 | Duret |
| 2003/0006973 A1 | 1/2003 | Omura et al. |
| 2003/0006975 A1 | 1/2003 | Moriya et al. |
| 2003/0025713 A1 | 2/2003 | Wang et al. |
| 2003/0025951 A1 | 2/2003 | Pollard et al. |
| 2003/0029919 A1 | 2/2003 | Lynggaard et al. |
| 2003/0034961 A1 | 2/2003 | Kao |
| 2003/0038790 A1 | 2/2003 | Koyama et al. |
| 2003/0061188 A1 | 3/2003 | Wiebe et al. |
| 2003/0106985 A1 * | 6/2003 | Fagin et al. ................. 250/208.1 |
| 2003/0107558 A1 | 6/2003 | Bryborn et al. |
| 2003/0146906 A1 | 8/2003 | Lin |
| 2003/0156145 A1 | 8/2003 | Hullender et al. |
| 2003/0163525 A1 | 8/2003 | Hendriks et al. |
| 2003/0195820 A1 | 10/2003 | Silverbrook et al. |
| 2004/0032970 A1 | 2/2004 | Kiraly |
| 2004/0207597 A1 | 10/2004 | Marks |
| 2005/0059488 A1 | 3/2005 | Larsen et al. |
| 2005/0073508 A1 | 4/2005 | Pittel et al. |
| 2005/0107979 A1 | 5/2005 | Buermann et al. |
| 2005/0168437 A1 | 8/2005 | Carl et al. |
| 2005/0195387 A1 | 9/2005 | Zhang et al. |
| 2005/0280804 A1 | 12/2005 | Buermann et al. |
| 2006/0028457 A1 | 2/2006 | Burns et al. |
| 2006/0082546 A1 | 4/2006 | Wey |
| 2006/0109245 A1 | 5/2006 | Wilson |
| 2006/0152487 A1 | 7/2006 | Grunnet-Jepsen et al. |
| 2006/0152489 A1 | 7/2006 | Sweetser et al. |
| 2006/0173268 A1 | 8/2006 | Mullick et al. |
| 2006/0176287 A1 | 8/2006 | Pittel et al. |
| 2006/0176288 A1 | 8/2006 | Pittel et al. |
| 2006/0267940 A1 | 11/2006 | Groom et al. |
| 2006/0284841 A1 * | 12/2006 | Hong et al. .................. 345/157 |
| 2007/0049374 A1 | 3/2007 | Ikeda et al. |
| 2007/0050597 A1 | 3/2007 | Ikeda |
| 2007/0060228 A1 | 3/2007 | Akasaka |
| 2007/0060383 A1 | 3/2007 | Dohta |
| 2007/0060384 A1 | 3/2007 | Dohta |
| 2007/0060385 A1 | 3/2007 | Dohta |
| 2007/0072674 A1 | 3/2007 | Ohta |
| 2007/0081695 A1 | 4/2007 | Foxlin et al. |
| 2007/0189737 A1 | 8/2007 | Chaudhri et al. |
| 2007/0211027 A1 | 9/2007 | Ohta |
| 2007/0213109 A1 | 9/2007 | Sato |
| 2007/0222750 A1 | 9/2007 | Ohta |
| 2007/0256546 A1 | 11/2007 | Hikino |
| 2007/0259717 A1 | 11/2007 | Mattice |
| 2007/0270217 A1 | 11/2007 | Rabin |
| 2008/0096654 A1 | 4/2008 | Mondesir |
| 2008/0100825 A1 | 5/2008 | Zalewski et al. |
| 2008/0106517 A1 | 5/2008 | Kerr et al. |
| 2008/0167818 A1 | 7/2008 | Kimber et al. |
| 2008/0192007 A1 | 8/2008 | Wilson |
| 2008/0192070 A1 | 8/2008 | Wilson |
| 2008/0204411 A1 | 8/2008 | Wilson |
| 2008/0309511 A1 | 12/2008 | Kerr et al. |
| 2009/0066647 A1 | 3/2009 | Kerr et al. |
| 2009/0066648 A1 | 3/2009 | Kerr et al. |
| 2009/0122146 A1 | 5/2009 | Zalewski et al. |
| 2009/0153389 A1 | 6/2009 | Kerr et al. |
| 2009/0153475 A1 | 6/2009 | Kerr et al. |
| 2009/0153478 A1 | 6/2009 | Kerr et al. |
| 2009/0158203 A1 | 6/2009 | Kerr et al. |
| 2009/0158222 A1 | 6/2009 | Kerr et al. |
| 2009/0164952 A1 | 6/2009 | Wilson |
| 2009/0203445 A1 | 8/2009 | Dohta et al. |
| 2009/0326850 A1 | 12/2009 | Ohta |

FOREIGN PATENT DOCUMENTS

| | | |
|---|---|---|
| WO | WO 97/05542 A | 2/1997 |
| WO | WO 02/17222 A2 | 2/2002 |
| WO | WO 02/058029 A2 | 7/2002 |
| WO | WO 02/064380 A1 | 8/2002 |
| WO | WO 02/069247 A1 | 9/2002 |
| WO | WO 02/084634 A1 | 10/2002 |

OTHER PUBLICATIONS

Haralick and Shapiro, "Computer and Robot Vision v.2", Addison-Wesley Publishing Company, 1993, pp. 66-68.

Kotake et al., "A Hybrid and Linear Registration Method Utilizing Inclination Constraint", Fourth IEEE and ACM, ISMAR 2005, 140-149.

Van Liere et al., "Optical Tracking Using Projective Invariant Marker Pattern . . . ", IEEE Virtual Reality 2003 Proceedings 2003, 191-198.

Satoh et al., "A Head Tracking Method Using Bird's-Eye View Camera and Gyroscope", Third IEEE and ACM, ISMAR, 2004, 202-211.

Schroering et al., "A New Input Device for 3D Sketching", Scanning, 2003, 311-318.

Dorfmuller-Ulhaas, "Optical Tracking From User Motion to 3D Interaction", Dissertation, Vienna University of Technology, 2002, Vienna.

Ait-Aider, O. et al., "Adaptation of Lowe's Camera Pose Recovery Algorithm to Mobile Robot Self-Localisation", Robotica 2002.

Alkeryd, Martin, "Evaluation of Position Sensing Techniques for an Unmanned Aerial Vehicle", Dissertation at the Dept. of EE, Linkoping University 2006, Chapters 4-8.

Ansar et al., "Linear Pose Estimation from Points or Lines". ECCV 2002, LNCS 2353, pp. 282-296, Springer-Verlag Berlin Heidelberg 2002.

Batista et al., "Pose View Stability Analysis for Camera Look Angles Computation", Institute of Systems and Robotics. Dep. of Elec. Engineering, Univ. of Coimbra, Portugal.

Corradini et al., "A Map-based System Using Speech and 3D Gestures for Pervasive Computing", Center for Human-Computer Communciation, Oregon Health & Science Univ.

Fish et al., "An Adaptive Center of Mass Detection System Employing a 2-D Dynamic Element Matching Algorithm for Object Tracking" (2003), IEEE, pp. 778-781.

(56) References Cited

OTHER PUBLICATIONS

G. Gordon et al., "Silicon Optical Navigation", Agilent Technical Bulletin 2004, pp. 1-7.

Goldstein et al., Classical Mechanics, 3rd Edition, Addison Wesley 2002, Chapter 4 and Appendices A&B.

Joguet et al.. "'Pen-like' Natural Graphic Gesture Capture Disposal. Based on a Micro-System". Dept. of Systems for Information and Health, CEA-Leti Grenoble, France.

Kanatani, Kenichi, "Geometric Computation for Machine Vision", (1993) Oxford Engineering Science Series 37, Chapters 2-3.

Larsson and Pettersson, Development and evaluation of a 6DOF Interface to be used in medical application, Linkpings University, Sweden, Jun. 5, 2002.

Poyner, LCS/Telegraphics, "Wintab Interface Specification: 16 bit and 32-bit API Reference", Revised May 9, 1996.

PSD Position Sensitive Detector, Selection Guide of Hamamatsu, Solid State Division, 2003.

Richard Halloway, "Virtual Enviornments: A Survey of the Technology", University of North Carolina at Chapel Hill, Sep. 1993 (TR93-033).

Schroering et al., "A New Input Device for 3D Sketching". Washington University in St. Louis.

Ude, Ales, "Nonlinear Least Squares Optimisation of Unit Quaternion Functions for Pose Estimation from Corresponding Features", In. Proc. 14th Int. Conf.: Pattern Recognition, Brisbane, Australia, pp. 425-427, Aug. 1998.

Universal Serial Bus (USB), Device Class Definition for Human Interface Devices (HID), Firmware Specification, USB Implementers' Forum, Jun. 27, 2001.

Bergmann, Kristian, "User Interfaces based on a hand-held projection screen", PhD Thesis, Technical University of Berlin, Computer Graphics Department, Dec. 1, 2008.

Bowman, et al., "3D User Interfaces: New Directions and Perspectives", Survey Published by the IEEE Society, #0272-1716/08, Nov./Dec. 2008, pp. 20-36.

Crisipin, D. Lovell-Smith, "A Prototype Optical Tracking System: Investigation and Development", University of Canterbury, Christchurch, New Zealand, Jun. 2009.

Chow, Yang-Wai, "Low-Cost Multiple Degrees-of-Freedom Optical Tracking for 3D Interaction in Head-Mounted Display Virtual Reality", Int. J. of Recent Trends in Eng, 01/01, May 2009, pp. 52-56.

Foxlin, et al., "VIS-Tracker: A Wearable Vision-Inertial Self-Tracker", IEEE VR2003, Mar. 22-26, Los Angeles, CA, U.S.

Foxlin, et al., "Miniature 6-DOF inertial system for tracking HMDs", SPIE, vol. 3362, AeroSense 98, Orlando, FL, Apr. 13-14, 1998, pp. 1-15.

Greff-Buaes, Alexandre, "A Low Cost One-camera Optical Tracking System for Indoor Wide-area Augmented and Virtual Reality Environments", PhD Thesis, Univeristy of Rio Grande do Sul, EE Dept., Porto Alegre, Feb. 2006.

Hand, Chris, "A Survey of 3D Interaction Techniques", Dept. of Computer Science, De Montfort University, The Gateway, Leicastor, UK, vol. 016, No. 005, 1997, pp. 269-281.

Heo, et al., "Motion and Structure Estimation Using Fusion of Inertial and Vision Data for Helmet Tracker", Int'l J. of Aeronautical &Space Sciences, vol. 11, No. 1, Mar. 2010, pp. 31-40.

Hinckley, et al., "The VideoMouse: A Camera-Based Multi-Degree-of-Freedom Input Device", Microsoft Research, CHI Letters, vol. 1, 1, UIST '99 Asheville NC, pp. 103-112.

LaViola, Joseph J., "Bringing VR and Spatial 3D Interaction to the Masses through Video Games", IEEE Computer Graphics and Applications, #0272-1716/08, Sep.-Oct. 2008, pp. 10.

Mak, et al., "A 6 DoF Visual Tracking System for a Miniature Helicopter", 2nd Int'l Conf. on Sensing Technology, Palmerston North, New Zealand, Nov. 26-28, 2007, pp. 32-37.

Mathieu, Herve, "The Cyclope: A 6 DOF Optical Tracker Based on a Single Camera", 2nd Intuition International Workshop "VR/VE & Industry: Challenge and Opportunities", 2005.

Mehling, Michael, "Implementation of a Low Cost Marker Based Infrared Optical Tracking System", PhD Thesis, Fachhochschule Stuttgart—Hochschule der Medien, Feb. 26, 2006.

Roetenberg, Daniel, "Inertial and Magnetic Sensing of Human Motion", Daniel Roetenberg, 2006 (ISBN-10: 90-9020620-5/ISBN-13: 978-90-9020620-2).

Welch, et al., "Motion Tracking: No Silver Bullet, but a Respectable Arsenal", IEEE Computer Graphics and Applications, Motion Tracking Survey, Nov.-Dec. 2002, pp. 24-38.

Zhai, Shumin, "User Performance in Relation to 3D Input Device Design", IBM Almaden Research Center, Computer Graphics, Nov. 1998, pp. 50-55.

\* cited by examiner

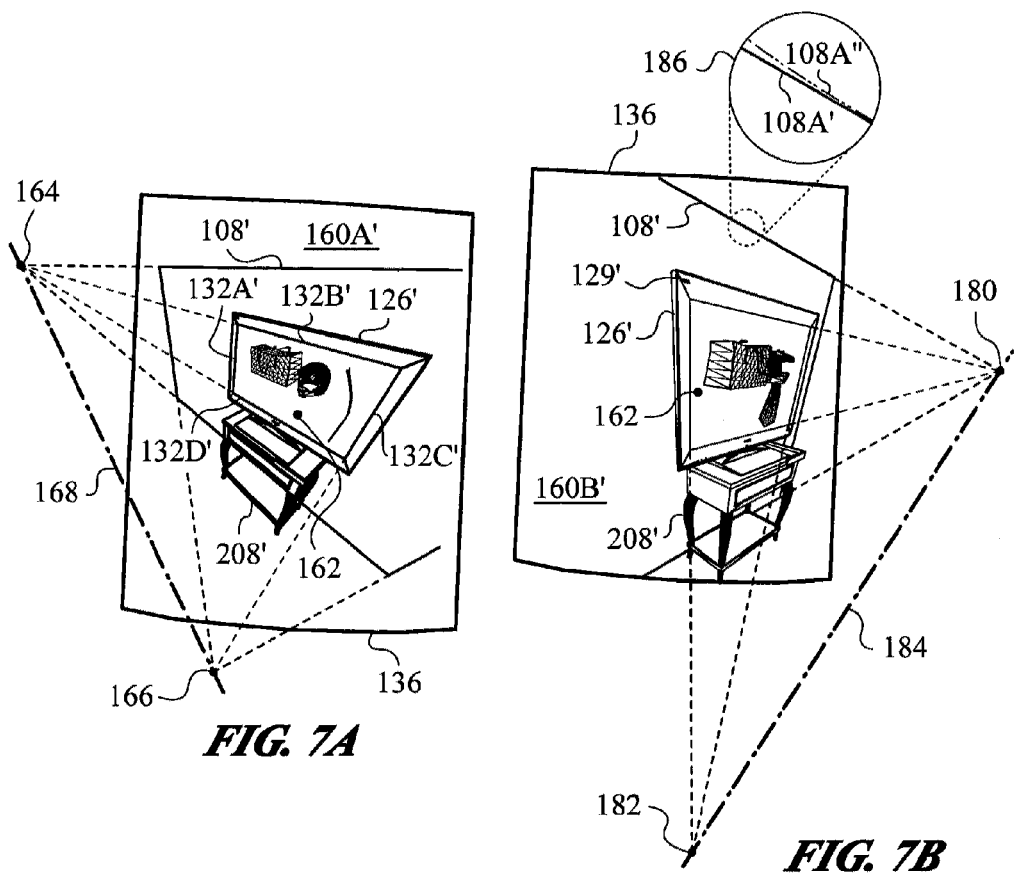
FIG. 7A
FIG. 7B
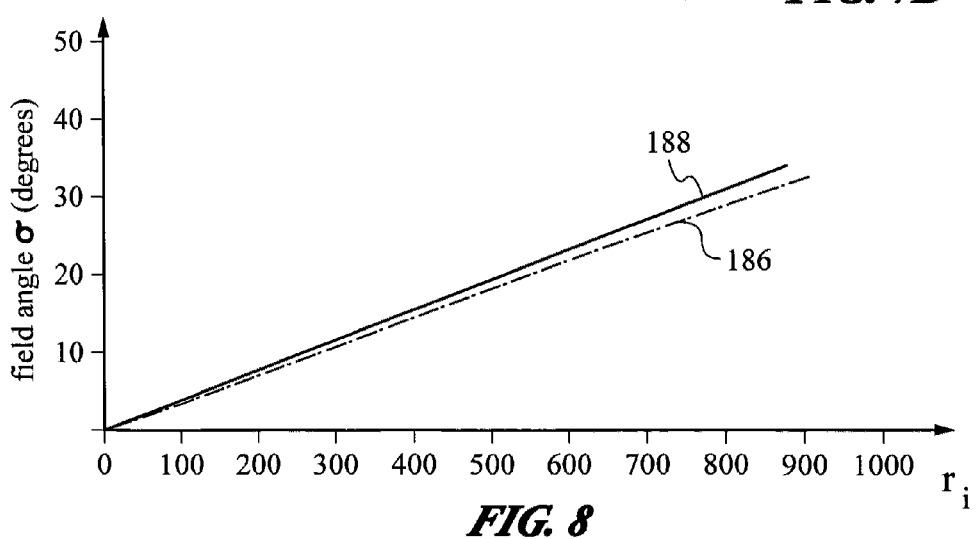
FIG. 8

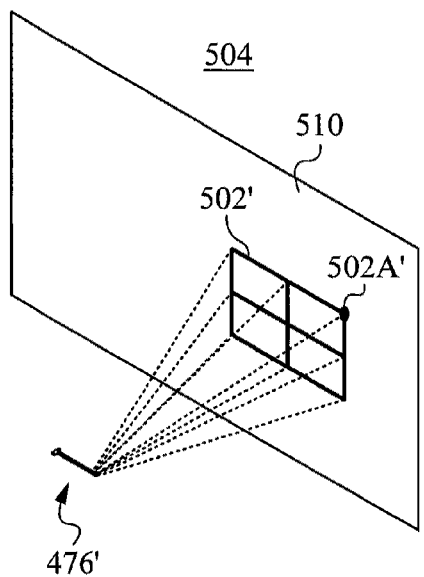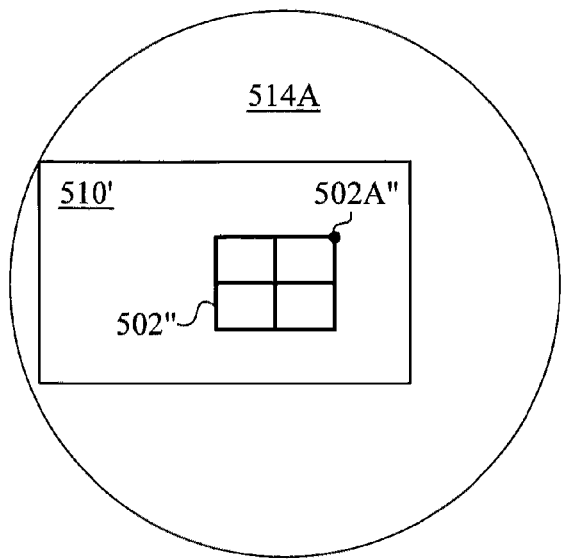
*FIG. 29A*  *FIG. 30A*
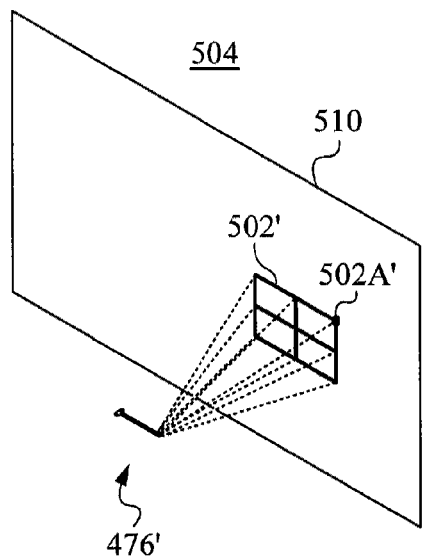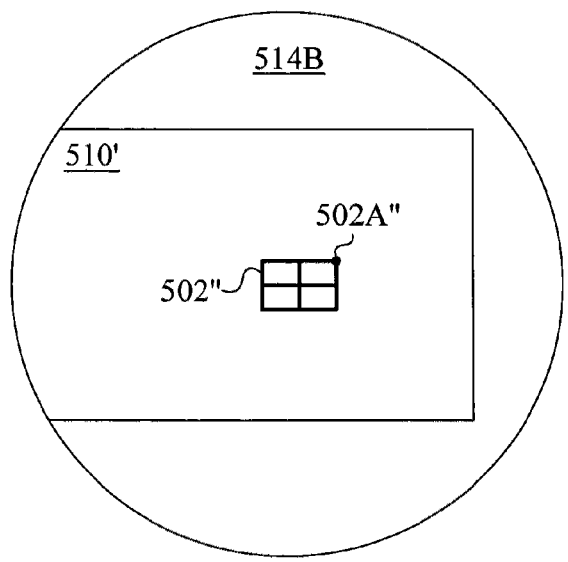
*FIG. 29B*  *FIG. 30B*

DERIVING INPUT FROM SIX DEGREES OF FREEDOM INTERFACES

RELATED APPLICATIONS

This application is a continuation-in-part application of U.S. patent application Ser. No. 10/769,484 filed on Jan. 30, 2004 and incorporated herein in its entirety. This application is related to U.S. patent application Ser. No. 13/134,006 filed on May 25, 2011 which is a Divisional of patent application Ser. No. 12/586,226, now U.S. Pat. No. 7,961,909, which is a continuation-in-part application of U.S. patent application Ser. No. 12/584,402, now U.S. Pat. No. 7,826,641, and of U.S. patent application Ser. No. 11/591,403, now U.S. Pat. No. 7,729,515 which claims priority from U.S. Provisional Patent Application No. 60/780,937 filed on Mar. 8, 2006.

FIELD OF THE INVENTION

The present invention relates generally to determining an absolute pose (6 degrees of freedom or 6 D.O.F.) of an item in a stable frame that is ascertained from on-board the item by optical means that look for a sufficient number of non-collinear optical inputs derived from stationary objects to parameterize the stable frame, and further to employing at least a portion of the item's absolute pose thus determined in the stable frame for deriving user input.

BACKGROUND OF THE INVENTION

When an item moves without constraints in a three-dimensional environment with respect to stationary objects, knowledge of the item's distance from and inclination to these objects can be used to derive a variety of the item's parameters of motion as well as its pose. Particularly useful stationary objects for pose recovery purposes include a ground plane, fixed points, lines, reference surfaces and other known features.

Over time, many useful coordinate systems and methods have been developed to parameterize stable reference frames defined by stationary objects. The pose of the item, as recovered and expressed in such stable frames with parameters obtained from the corresponding coordinate description of the frame, is frequently referred to as the item's absolute pose. Based on the most up-to-date science, we know that no absolute or stationary frame is available for defining truly absolute parameters. A stable frame is thus not to be construed to imply a stationary frame. More precisely stated, the stable frame in which the absolute pose is parameterized is typically not a stationary or even an inertial frame (for example, a reference frame defined on the Earth's surface is certainly stable, but not stationary and non-inertial due to gravity and Earth's rotation). Nevertheless, we shall refer to poses defined in stable frames as "absolute" in adherence to convention.

Many conventions have also been devised to track temporal changes in absolute pose of the item as it undergoes motion in the three-dimensional environment. Certain types of motion in three dimensions can be fully described by corresponding equations of motion (e.g., orbital motion, simple harmonic motion, parabolic motion, curvilinear motion, etc.). These equations of motion are typically expressed in the stable frame defined by the stationary objects.

The parameterization of stable frames is usually dictated by the symmetry of the situation and overall type of motion. For example, motion exhibiting spherical symmetry is usually described in spherical coordinates, motion exhibiting cylindrical symmetry in cylindrical coordinates and generally linear motion in Cartesian coordinates. More advanced situations may even be expressed in coordinates using other types of parameterizations, e.g., sets of linearly independent axes.

Unconstrained motion of items in many three-dimensional environments, however, may not lend itself to a simple description in terms of equations of motion. Instead, the best approach is to recover a time sequence of the item's absolute poses and reconstruct the motion from them. For a theoretical background, the reader is referred to textbooks on classical mechanics and, more specifically, to chapters addressing various types of rigid body motion. An excellent overall review is found in H. Goldstein et al., *Classical Mechanics*, 3rd Edition, Addison Wesley Publishing, 2002.

Items associated with human users, e.g., items that are manipulated or worn by such users, generally do not move in ways that can be described by simple equations of motion. That is because human users exercise their own will in moving such items in whatever real three-dimensional environment they find themselves. It is, however, precisely the three-dimensional motion of such items that is very useful to capture and describe. That is because such motion may communicate the desires and intentions of the human user. These desires and intentions, as expressed by corresponding movements of the item (e.g., gestures performed with the item), can form the basis for user input and interactions with the digital domain (e.g., data input or control input).

In one specific field, it is important to know the absolute pose of an item associated with a human user to derive the position of its tip while it contacts a plane surface. Such position represents a subset of the absolute pose information. Various types of items, such as elongate objects, can benefit from knowledge of their pose, which includes the position of their tip. More precisely, such items would benefit from knowing the absolute position (in world coordinates parameterizing the stable frame) of their tip while it is in contact with a plane surface embedded in the three-dimensional environment. These items include walking canes when in touch with the ground, pointers when in touch with a display or projection surface, writing devices when in touch with a writing surface, and styluses when in touch with an input screen.

The need to determine the absolute position of the tip or nib is deeply felt in the field of input devices such as pens and styluses. Here, the absolute position of the tip has to be known in order to analyze the information written or traced by the user on the writing surface. Numerous teachings of pens and related input devices providing relative tip position and absolute tip position are discussed in the prior art. Some of these teachings rely on inertial navigation devices including gyroscopes and accelerometers as described in U.S. Pat. Nos. 6,492,981; 6,212,296; 6,181,329; 5,981,884; 5,902,968. Others combine inertial navigation with force sensing as described in U.S. Pat. Nos. 6,081,261; 5,434,371. Still other techniques rely on triangulation using signal receivers and auxiliary devices on or adjacent to the writing surface as found in U.S. Pat. Nos. 6,177,927; 6,124,847; 6,104,387; 6,100,877; 5,977,958 and 5,484,966. Furthermore, various forms of radiation including short radio-frequency (RF) pulses, infra-red (IR) pulses, and even sound waves in the form of ultrasound pulses have been taught for triangulation and related techniques. A few examples of yet another set of solutions employing digitizers or tablets are discussed in U.S. Pat. Nos. 6,050,490; 5,750,939; 4,471,162.

The prior art also addresses the use of optical systems to provide relative, and in some cases, absolute position of the tip of a pen or stylus on a surface. For example, U.S. Pat. No.

6,153,836 teaches emitting two light beams from the stylus to two receivers that determine angles with respect to a two-dimensional coordinate system defined within the surface. The tip position of the stylus is found with the aid of these angles and knowledge of the location of the receivers. U.S. Pat. No. 6,044,165 teaches integration of force sensing at the tip of the pen with an optical imaging system having a camera positioned in the world coordinates and looking at the pen and paper. Still other teachings use optical systems observing the tip of the pen and its vicinity. These teachings include, among others, U.S. Pat. Nos. 6,031,936; 5,960,124; 5,850,058. According to another approach, the disclosure in U.S. Pat. No. 5,103,486 proposes using an optical ballpoint in the pen. More recently, optical systems using a light source directing light at paper have been taught, e.g., as described in U.S. Pat. Nos. 6,650,320; 6,592,039 as well as WO 00217222 and U.S. Pat. Appl. Nos. 2003-0106985; 2002-0048404.

In some prior art approaches the writing surface is provided with special markings that the optical system can recognize. Some early examples of pens using special markings on the writing surface include U.S. Pat. Nos. 5,661,506; 5,652,412. More recently, such approach has been taught in U.S. Pat. Appl. 2003-0107558 and related literature. For still further references, the reader is referred to U.S. patent application Ser. Nos. 10/640,942 and 10/745,371 and the references cited therein.

Most of the prior art approaches listed above are limited in that they yield relative position of the tip on the writing surface. Tablets and digitizers obtain absolute position but they are bulky and inconvenient. Of the approaches that provide absolute position of the tip without tablets by using optical systems, most rely on observing the relationship of markings provided on the writing surface to the tip of the pen. This approach is limiting in that it requires a specially-marked writing surface, which acts as a quasi-tablet.

In addition to being cumbersome, state-of-the-art pens and styluses employing optical systems usually generate a limited data set. In fact, most only recover and provide data corresponding to the trace traversed on the writing surface. Meanwhile, there are many applications that could benefit from a rich stream of data from the pen or stylus afforded by the full absolute pose parameterized in coordinates describing the stable frame. Furthermore, the absolute pose of such items when not in touch with a surface, as described in the prior application Ser. No. 10/769,848, also provides useful information. Indeed, there exists a much larger set of items, including pointers, absolute 3D mice, wands, remote controls, gaming objects and many others that would greatly expand their input capabilities if their full absolute pose parameters were made available.

The rich stream of information expressing an item's absolute pose combines its three linear or translational degrees of freedom with its three rotational degrees of freedom. Typically, translations are measured along linearly independent axes such as the X, Y, and Z-axes. The translation or displacement along these axes is usually measured by the position (x, y, z) of a reference point on the item (e.g., the center of mass of the item). The three-dimensional orientation of the item is typically expressed by rotations taken around three linearly independent axes. The latter are typically expressed with three rotation angles, such as the Euler angles ($\phi$, $\theta$, $\psi$).

Conveniently, absolute pose can be expressed with all six absolute pose parameters (x, y, z, $\phi$, $\theta$, $\psi$) in the world coordinates laid down in the stable frame. In some cases, alternative expressions for the rotation angles such as the three Tait-Bryan angles, the pitch yaw and roll angles, the four Cayley-Klein angles or quaternions are more appropriate. One can also use direction cosines or other alternatives for expressing the three rotational degrees of freedom of the item.

Optical methods for recovering the absolute pose of items endowed with on-board camera units are particularly simple and precise. These approaches are used in computer vision and robotics. They rely on algorithms that recover the camera's pose (optical pose estimation and recovery) in the three-dimensional environment from various optical inputs. Since the camera is affixed to the item, recovery of camera pose is tantamount to the recovery of the item's pose.

The optical approach to pose recovery is also intuitive, since our own human vision system computes locations and motion trajectories of items in real three-dimensional environments in that manner. This includes recovery of our own pose and movement in a three-dimensional environment based on images provided by our eyes. In other words, our own senses implement pose recovery algorithms from images. These abilities develop as part of our natural proprioception in early childhood.

The high accuracy and precision of optical navigation is due in large part to the very short wavelength of electromagnetic radiation in comparison with typical dimensions of objects and items of interest. Furthermore, radiation incurs negligible latency in short distance measurements due to the extremely large speed of light as well as its relative immunity to interference. Thus, it is well known that the problem of determining an absolute pose or a motion trajectory of an item in almost any real three-dimensional environment may be effectively addressed by the application of optical apparatus and methods.

A particularly acute need for efficient, accurate and low-cost determination of the absolute pose of an item in a real three-dimensional environment is found in the field of items associated with a human user. Such items may be held and manipulated by the user. Alternatively, they may be worn by the user. In either case, the items are intended to help the user interact with the digital world. Such items encompass myriads of manipulated objects such as pointers, wands, remote controls, gaming objects, jotting implements, surgical implements, three-dimensional digitizers and various types of human utensils whose motion in real space is to be processed to derive a digital input for an application. In some realms, such application involves interactions that would greatly benefit from a rapid, low-cost method and apparatus for motion mapping between real space and a cyberspace.

Specific examples of cyberspace games played in three-dimensions (3D) and requiring high-accuracy tracking of control items involve scenarios where the item is transported into or even mimicked in cyberspace. Exemplary gaming objects of this variety include a gun, a golf club, a racket, a guitar, a ball, a steering wheel, a flying control or any other accoutrement that the player wishes to transport into and utilize in a cyberspace application. A very thorough summary of such 3D interface needs for graphics are found in U.S. Pat. No. 6,811,489 to Shimizu, et al.

A major problem encountered by state-of-the-art manipulated items such as wands and gaming implements is that they do not possess a sufficiently robust and rapid absolute pose recovery system. In fact, many do not even provide for absolute pose determination. Rather, they function much like quasi-3D mice. These solutions use motion detection components that rely on optical flow sensors, inertial sensing devices or other relative motion capture systems to derive the signals for interfacing with cyberspace. In particular, many of such interface devices try to solve just a subset of the motion changes, e.g., inclination. An example of an inclination calculation apparatus is found in U.S. Pat. No. 7,379,841 to Ohta while a broader attempt at determining relative motion is taught in U.S. Pat. No. 7,424,388 to Sato and U.S. Application 2007/0049374 to Ikeda, et al.

Unfortunately, motion mapping between space and cyberspace is not possible without the ability to digitize the absolute pose of the item in a well-defined and stable reference frame. All prior art approaches that do not solve the full motion problem, i.e., all devices and methods that do not capture successive absolute poses of the item with a method that accounts for all six degrees of freedom (namely, three translational and the three rotational degrees of freedom inherently available to rigid bodies in three-dimensional space) encounter limitations. Among many others, these limitations include information loss, appearance of an offset, position aliasing, gradual drift and accumulating position and orientation error.

In general, the prior art has recognized the need for tracking all six degrees of freedom of items moving in three-dimensions. Thus, optical navigation solutions typically employ several stationary cameras to determine the position or trajectory of an object in an environment by studying images of the object in that environment. Such optical capturing or tracking systems are commonly referred to as optical motion capture (MC) systems.

This approach to motion capture tends to be computationally expensive because of significant image pre- and post-processing requirements, as well as additional computation associated with segmentation and implementation of algorithms. One particular system taught by McSheery et al. in U.S. Pat. No. 6,324,296 discloses a distributed-processing motion capture system that employs a number of light point devices as markers, e.g., infrared LEDs, attached to the item or object whose motion is to be determined. The markers use unique sequences of light pulses to represent their unique identities and thus enable filtering out of information not belonging to the markers (i.e., background noise) by the imaging cameras located in the environment. Since McSheery's system permits a great deal of irrelevant information from the imaging sensors (e.g., CCDs) to be discarded before image processing, the system is less computationally expensive than more traditional motion capture systems.

Another three-dimensional position and orientation sensing system that employs markers on the item is taught by Kosaka et al. in U.S. Pat. No. 6,724,930. In this case the markers are uniquely identified based on color or a geometric characteristic of the markers in the extracted regions. The system uses an image acquisition unit or camera positioned in the environment and relies on image processing functions to remove texture and noise. Segmentation algorithms are used to extract markers from images and to determine the three-dimensional position and orientation of the item with respect to the image acquisition apparatus.

Still another way of employing markers in position and orientation detection is taught in U.S. Pat. No. 6,587,809 by Majoe. The item or object is tracked by providing it with markers that are activated one at a time and sensed by a number of individual sensors positioned in the environment. The position of the energized or active marker is determined by a control unit based on energy levels received by the individual sensors from that marker.

The above approaches using markers on objects and cameras in the environment to recover object position, orientation or trajectory are still too resource-intensive for low-cost and low-bandwidth interfaces and applications. This is due to the large bandwidth needed to transmit image data captured by cameras, the computational cost to the host computer associated with processing image data, and the data network complexity due to the spatially complicated distribution of equipment (i.e., placement and coordination of several cameras in the environment with the central processing unit and overall system synchronization).

Despite the above-mentioned limitations of general motion tracking systems, some aspects of these systems have been adapted in the field of manipulated items used for interfacing with computers. Such objects are moved by users in three-dimensional environments to produce input for computer applications. Hence, they need to be tracked in all six degrees of freedom. Therefore, recent three-dimensional wands and controls do teach solving for all six degrees of freedom.

For example, U.S. Patent Application 2008/0167818 to Kimber et al. has a passive wand with no on-board devices or LEDs. The wand is viewed from multiple cameras. Finding the full 6 degrees of freedom to provide for more precise estimation of wand pose is expressly taught in this reference. Similarly, U.S. Pat. No. 6,982,697 to Wilson et al. teaches the use of external calibrated cameras to decode the orientation of the pointer used for control actions. U.S. Patent Application 2006/0109245 to Wilson, et al. further teaches how intelligent computing environments can take advantage of a device that provides orientation data in relative motion mode and absolute mode. Further teachings on systems that use external or not-on-board cameras to determine the pose and motion of a wand or control and use it as input into various types of applications can be found in U.S. Patent Applications: 2008/0192007, 2008/0192070, 2008/0204411, 2009/0164952 all by Wilson.

Still other notable teachings show as few as a single off-board camera for detecting three-dimensional motion of a controller employed for game control purposes. Such cameras may be depth sensing. Examples of corresponding teachings are found in U.S. Patent Application 2008/0096654 by Mondesir, et al., as well as U.S. Patent Applications 2008/0100825, 2009/0122146 both by Zalewski, et al.

Unfortunately, approaches in which multiple cameras are set up at different locations in the three-dimensional environment to enable stereo vision defy low-cost implementation. These solutions also require extensive calibration and synchronization of the cameras. Meanwhile, the use of expensive single cameras with depth sensing does not provide for robust systems. The resolution of such systems tends to be lower than desired, especially when the user is executing rapid and intricate movements with the item in a confined or close-range environment.

Another approach involves determining the position or attitude of a three-dimensional item in the absolute sense and using this position or attitude data for driving a graphical user interface. One example of this approach is taught in U.S. Pat. No. 6,727,885 to Ishino, et al. Here the sensor is on-board the manipulated object. A projected image viewed by the sensor and generated by a separate mechanism, i.e., a projection apparatus that imbues the projected image with characteristic image points, is employed to perform the computation. Additional information about such apparatus and its application for games is found in U.S. Pat. Nos. 6,852,032; 6,993,206 both to Ishino, et al.

The solution proposed by Ishino et al. is more versatile than the prior art solutions relying on hard-to-calibrate and synchronize multi-camera off-board systems or expensive cameras with depth sensing capabilities. Unfortunately, the complexity of additional hardware for projecting images with characteristic image points is nontrivial. The same is true of consequent calibration and interaction problems, including knowledge of the exact location of the image in three-dimensional space. This problem translates directly to the difficulty of establishing stable frames in the three-dimensional environment and parameterizing them. Furthermore, the solution is not applicable to close-range and/or confined environments, and especially environments with typical obstructions that interfere with line-of-sight conditions.

There are still other teachings attempting to improve on both the apparatus and method aspects of generating computer input with manipulated items or objects such as wands, pointers, remote controls (e.g., TV controls). A very illuminating overall review of state of the art technologies that can be used for interacting with virtual environments and their limitations are discussed by Richard Halloway in "Virtual Environments: A Survey of the Technology", University of North Carolina at Chapel Hill, September 1993 (TR93-033). Still more recent teachings focusing on how absolute pose data can be used in specific contexts and for remote control applications is discussed in the following U.S. Patent Applications: 2007/0189737; 2008/0106517; 2008/0121782; 2008/0272272; 2008/0309511; 2009/0066647; 2009/0066648; 2009/0153389; 2009/0153475; 2009/0153478; 2009/0158203 and 2009/0158222.

The challenges for 3D user interfaces with the digital world do not end with their ability to recover absolute pose in an efficient and accurate manner. Many additional issues need to be addressed and resolved, over and above those that we have discussed above. In fact, it may be in a large part due to the fact that some of the more basic challenges are still being investigated, that the questions about how to use the recovered poses are still unanswered.

In particular, the prior art does not address the mapping between absolute poses recovered in a stable reference frame and the digital world to obtain a meaningful interface and user experience. Even the parent U.S. patent application Ser. No. 10/769,484 (Published Appl. 2005-0168437, now allowed), although it teaches the use of various subsets of absolute pose data as well as processing data in those subsets, does not teach or suggest to a person skilled in the art, how to map absolute pose data from the real three-dimensional environment into the digital world of a software application.

OBJECTS AND ADVANTAGES

In view of the shortcomings of the prior art, it is the object of the present invention to provide interfaces and methods that purposefully map absolute pose data from real three-dimensional environments to the digital world. More precisely, it is an object of the invention to define appropriate mappings between at least one absolute pose parameter used in an application to the six degrees of freedom available to items employed by the user. The mappings are to properly reflect the user's intuitions and expectations of what effects the motion of the item they are moving in real space should produce in the application.

It is a further object of the invention to provide for intuitive interactions with applications that involve a cyberspace, a virtual space, an augmented reality space and a mixed space.

It is still another object of the invention to provide intuitive methods for controlling objects either in cyberspace or in a real space based on the full parameterization (six degrees of freedom or 6 D.O.F.) of the absolute poses of items moved or manipulated by a user. Specifically, such items are construed to include hand-held tools.

The numerous objects and advantages of the interfaces and methods of invention will become apparent upon reading the ensuing description in conjunction with the appended drawing figures.

SUMMARY

The objects and advantages of the present invention are secured by an interface that derives or produces input to an application based on an absolute pose of an item in a three-dimensional environment. Absolute pose in the sense of the present invention means both the position and the orientation of the item described in a stable frame defined in that three-dimensional environment.

The item and the user with whom the item is physically associated are found in the three-dimensional environment. Such environment has a spatial extent that can be described with three dimensions or directions such as length, width and height or the X, Y and Z axes. The absolute pose of the item in the three-dimensional environment includes its position and its orientation. The position can change along any of the three directions. In other words, position has at least three translational degrees of freedom (i.e., translation along X, Y and Z, or, in general, any three linearly independent axes). In addition, the absolute pose of the item also includes its orientation. The orientation exhibits at least three rotational degrees of freedom (i.e., rotation around axes defined by X, Y or Z or, in general, rotation around any three linearly independent axes). Therefore, the item has available to it at least six (6) degrees of freedom in the three-dimensional environment.

The interface further calls for at least one stationary object that has at least one feature that is detectable via an electromagnetic radiation in the optical range (e.g., from ultra-violet to infra-red). This feature has to present a sufficient number of non-collinear optical inputs to enable one to establish a stable reference frame in the three-dimensional environment. In other words, the number and type of non-collinear optical inputs are sufficient to allow one to establish stable world coordinates. Such world coordinates $(X_w, Y_w, Z_w)$ are used to describe or parameterize the stable frame in the three-dimensional environment.

In rare cases, world coordinates $(X_w, Y_w, Z_w)$ may describe an actual inertial frame of reference in which the user resides (e.g., on a spacecraft in outer space). Normally, world coordinates $(X_w, Y_w, Z_w)$ describe a non-inertial frame in which the user, the item and the stationary object all reside. The simplest non-inertial frame is on the surface of the Earth (due to gravity and our planet's motion, such as rotation around its axis). More complex non-inertial frames are encountered aboard planes, trains, cars or other aircraft or terrestrial vehicles that undergo linear acceleration or some curvilinear motion.

The interface has a unit on-board the item for receiving the electromagnetic radiation. Based on the electromagnetic radiation received, the unit generates a signal that is related to at least one absolute pose parameter of the item as defined in the stable frame. For example, in the simplest case, the signal amplitude, frequency or phase may be directly proportional to the at least one absolute pose parameter.

The interface communicates with an application (e.g., a software program) via any suitable communication link. The application employs the signal related to the one or more absolute pose parameters of the item in the input. For example, the signal may constitute the complete input to the application. Alternatively, the signal may be used intermittently or present merely a subset of a continuous input stream.

As remarked above, in the three-dimensional environment, as dictated by the fundamental geometrical rules of 3D space, the absolute pose of a rigid body exhibits at least three translational and at least three rotational degrees of freedom. Thus, in the most basic embodiment of the invention, the signal is related to at least one absolute pose parameter which, in turn, is related to one or more from among the at least three translational and at least three rotational degrees of freedom by a mapping.

A mapping, as understood in general and herein, is any rule or set of rules for establishing correspondence between the one absolute pose parameter and the at least three translational and the at least three rotational degrees of freedom. For example, the mapping may associate the at least one absolute pose parameter to any portion of each of the at least six degrees of freedom (the at least 3 translational and the at least 3 rotational degrees of freedom). Alternatively, the mapping may associate the at least one absolute pose parameter to only some predetermined portions of the at least six degrees of freedom. In fact, any mapping supported by the geometrical limits imposed on translations and rotations of rigid bodies in three-dimensional environments is a mapping permitted under the present invention. (Although it should be noted that in a cyberspace, a virtual space, an augmented reality space and a mixed space in which new effect are desired, the rules of real space geometry may sometimes be disregarded, as briefly addressed in the detailed description.)

In a preferred embodiment of the interface, the mapping is a one-to-one mapping. In other words, there is a one-to-one mapping between the six degrees of freedom and the at least one absolute pose parameter. Thus, when the item executes two translations (e.g., along X and Y axes) and a rotation (e.g., around the Z axis), then these translations and the rotation are mapped one-to-one to the at least one absolute pose parameter. Specifically, in this case the mapping produces three absolute pose parameters corresponding to two translations (along X and along Y) and one rotation (around Z).

In other embodiments, the mapping includes a scaling in at least one of the six or more degrees of freedom. In particular, when the item executes two translations (e.g., in X and Y) and a rotation (e.g., around Z), the translations may be scaled 1:2 in the mapping. Such scaling will produce three absolute pose parameters corresponding to ½ the translation along X axis, ½ the translation along Y axis, and the full (unscaled) rotation around Z axis. Of course, one can instead scale the rotation and not the translations.

It is important for computational reasons to make a wise choice when defining the degrees of freedom given the application(s). For example, in many embodiments it is convenient to choose two translational degrees of freedom that define a plane in the three-dimensional environment; e.g., degrees of freedom in X and in Y can be used to define an X-Y plane. When the application involves the use of a display, it is convenient to set up the three-dimensional environment in such manner that the X-Y plane is plane-parallel with the display, or, more precisely, the screen of the display. In some such embodiments, the display is integrated into one of the stationary objects. For example, in these embodiments the stationary object is a television, a computer, an electronic picture frame, a game console, an electronic device, a tool comprising the display, an appliance comprising the display and the like.

In some embodiments, it is useful to choose three translational degrees of freedom that define a volume in the three-dimensional environment. For example, the three degrees of freedom in X, Y and Z can be used to define a cubic volume X-Y-Z. This volume can correspond to a virtual display volume when the display is a three-dimensional (3D) display, e.g., as in a 3D television (3D TV). Qualifying 3D displays also include holographic 3D displays and volumetric 3D displays.

In the same or still other embodiments, it is convenient to choose a rotational degree of freedom to define an axis in the three-dimensional environment. In these cases, the absolute pose parameter may be mapped just to the rotation around the chosen axis. For example, if the axis chosen corresponds to a mechanical axis of the item, then rotation about or around that axis may be the only absolute pose parameter that is mapped from among all possible translations and rotations. Such input may be appropriate for applications where rotation of the item around its mechanical axis corresponds to a very important input for the application (e.g., volume adjustment in an audio application).

In most embodiments, it is convenient to choose the at least three translational and at least three rotational degrees of freedom in such manner that they be not just linearly independent but mutually orthogonal. In other words, they represent three mutually orthogonal translational degrees of freedom (e.g., X, Y and Z) and three mutually orthogonal rotational degrees of freedom. These can be described by (pitch, yaw and roll) or their mathematical equivalents. Other options include but are not limited to: (heading, elevation and bank) and their mathematical equivalents, Euler angles ($\phi$, $\theta$, $\psi$) or Tait-Bryan angles and their mathematical equivalents, Cayley-Klein parameters (related to Euler angles) and their mathematical equivalents.

Of course, it is also possible to choose other orthogonal and non-orthogonal descriptions to keep track of the rotational and translational degrees of freedom. Some of these involve convolutions of displacements and/or angles (e.g., the pan angle concept), direction cosines and/or descriptions involving homogeneous coordinate system and quaternions and all corresponding mathematical equivalents.

A person skilled in the art will realize that mathematically the many options for keeping track of all three rotations can be reduced to Euler angles and their equivalents. A person skilled in the art will also understand that the choice should be made based on the nature of the application and the range of absolute poses that the item is expected to assume as well as the method in which the unit on-board the item receives the electromagnetic radiation (e.g., in the case of using an on-board camera, the camera rotation matrices and corresponding machine vision conventions may dictate the most useful choice). Also, even though from the mathematical standpoint, choosing orthogonal coordinate systems guarantees efficiency, the actual application may not require, or may be better served, by adopting a description involving merely linearly independent axes.

In most cases, however, the choice of mutually orthogonal translational degrees of freedom to correspond to the three orthogonal Cartesian axes will be most appropriate and useful. In these cases the orthogonal Cartesian axes are preferably used as world coordinates ($X_w$, $Y_w$, $Z_w$) to describe or parameterize the stable frame. Furthermore, a certain reference location or designated point on the item is expressed in these world coordinates ($X_w$, $Y_w$, $Z_w$) to define a position of the item in world coordinates and thereby in the stable frame. (Note that in some conventions, the point chosen on the item to indicate its position is abstract, e.g., a point such as the center of mass (C.O.M.) or some other point associated with the object but not physically a part of it—also note that depending on the item's geometry, the C.O.M. is not always within the physical volume defined by the item.)

Indeed, in many embodiments, the interface is conveniently parameterized in six degrees of freedom (6 D.O.F. interface). In other words, the at least one absolute pose parameter includes six absolute pose parameters that map to three of the at least three translational degrees of freedom and to three of the at least three rotational degrees of freedom. This provides for a full parameterization of the absolute pose of the item in the three-dimensional environment. The application may use such full parameterization of the item's absolute pose in the input to the application. Moreover, a person skilled in the art will realize that choosing orthogonal translational degrees of freedom (e.g., X, Y and Z axes) and orthogonal rotational degrees of freedom (e.g., Euler angles ($\phi$, $\theta$, $\psi$)) is particularly convenient for such full parameterization.

In some embodiments the application has a feedback unit for providing feedback to the user in response to at least one portion of the full parameterization. For example, the feedback unit has a display with a screen associated with the application to show visual information, some or all of which may represent the feedback. For example, the visual information may be an image, a portion of an image, an icon, a series of images (e.g., a video) or other visual information rendered from a point of view of the item in the three-dimensional environment. The point of view of the item is derived from the at least one portion, and preferably from the full parameterization of the item's pose, i.e., from the six absolute pose parameters (x, y, z, $\phi$, $\theta$, $\psi$) or a subset of these. When employing an on-board photo-detector such as a camera or a position-sensing device (PSD), it may also be convenient to work with alternative but mathematically equivalent parameterizations employing concepts such as surface normals (e.g., normal to the X-Y plane discussed above), pan angles (e.g., convolutions of two rotation angles), horizon lines, vanishing points and other optics and imaging concepts from projective geometry.

In some embodiments the feedback unit is a tactile feedback unit. It is associated with the application and provides tactile information also sometimes referred to as haptic feedback to the user. In particular, the tactile or haptic information may consist of vibration, force, pressure or thermal feedback to at least one body part of the user, where the vibration, force, pressure or thermal feedback is derived from at least a portion of the full parameterization of the item. Audio feedback may also be used to indicate various states of the item as it moves in the three-dimensional environment.

In many embodiments of the invention, the one or more stationary objects will include a display that may be integrated into the object. In some of these embodiments it is advantageous to use the full parameterization of the item in the application to compute an intersection of a mechanical axis of the item with the display, or more precisely, with the area spanned by the display or its screen. When the unit on-board the item has an optic (e.g., a refractive or a catadioptric element (catadioptric meaning reflective and refractive)) that defines an optical axis, the optical axis can be chosen as the mechanical axis of the item. For example, the optical axis may be aligned with the major mechanical axis of an elongate item (or an elongate object). Thus, a user holding the item will presume that the pointing or indicating direction of the item is along the mechanical axis that coincides with the optical axis. This choice is particularly useful when one of the intended uses of the item in the context of the application is to point and click and/or to point and control/move or the like (absolute pointer or absolute 3D mouse).

In embodiments where a display is provided and pointing is available, it is also convenient to introduce a place-holder entity and place it at the intersection of the mechanical axis of the item with the display or its screen. Thus, the user will get visual feedback via the place-holder entity of where the item is pointing. The place-holder entity can contain additional information apparent from its character. For example, the place-holder entity may by an insertion cursor, a feedback cursor, a control icon, a display icon or any other visual feedback entity whose appearance communicates information to the user.

Depending on the three-dimensional environment and modes of operation, the interface may also be equipped with a relative motion sensor. Relative motion sensors are to be understood as sensors that are not capable of recovering absolute pose in the stable frame established in the three-dimensional environment. Suitable relative motion sensors include accelerometers, gyros, magnetometers, optical flow meters, acoustic devices and the like. Any such sensor (or combination of them) can be placed on-board the item for producing data indicative of a change in at least one among the at least three translational and the at least three rotational degrees of freedom. This relative data can be used to supplement (e.g., interpolate) the signal that is related to the at least one absolute pose parameter.

Of course, there are a great variety of specific interfaces and applications that can take advantage of units mounted on-board items to generate signals related to at least one absolute pose parameter of the item in the stable frame. Indeed, such absolute navigation of items by users for the purpose of generating input opens up many new possibilities and also addresses some old needs. Thus, depending on application the stationary object can be a game console, a television, a stereo, an electronic picture frame, a computer, a tablet, an RF transmitter unit, a set-top box, a base station, a portable user device with a display, a non-portable user device with a display or an appliance, including home appliances such as smart refrigerators and the like.

The choice of non-collinear optical inputs is also very broad and can include point-like inputs (e.g., point sources of electromagnetic radiation such as emitting fiber tips, lasers, LEDs, IR LEDs, etc.), line-like inputs (e.g., individual rows or columns of a display screen, the edges of a screen, linear illumination sources, etc.), area like inputs (e.g., the entire area of a display screen, a planar illumination source, etc.), and volume-like inputs (e.g., large three-dimensional bulbs, volumetric light sources, etc.). It should be noted that the electromagnetic radiation as defined herein includes the visible portion of the electromagnetic spectrum as well as portions beyond the visible portion, such as the UV and IR portions of the electromagnetic spectrum. In fact, any portion of ambient electromagnetic radiation (e.g., from the sun) is an appropriate choice for an emitter in the sense of the present invention. In the most general case, the non-collinear optical inputs can incorporate emitters of the electromagnetic radiation or reflectors of electromagnetic radiation (e.g., mirrors, retro-reflectors and other optical elements that reflect, scatter or otherwise redirect electromagnetic radiation).

One group of embodiments employs emitters for emitting the electromagnetic radiation into the three-dimensional environment so that this electromagnetic radiation can be received by the unit on-board the item. On its way to the unit, the electromagnetic radiation may undergo reflection from reflecting non-collinear optical inputs. There are no limitations on where such emitters are placed, as will be discussed in the detailed description of the embodiments. Indeed, an emitter can be placed anywhere in the three-dimensional environment; even on-board the item itself. In the latter case, the non-collinear optical inputs must include reflectors and/or retro-reflectors and the electromagnetic radiation received by the unit on-board the item is thus reflected radiation. Furthermore, the emitter, independent of where it is located, may emit a pattern of radiation into the three-dimensional environment. The pattern can be used by the unit on-board the item for deriving information about the at least one absolute pose parameter as well as the stable frame.

The interface of the invention can support many three-dimensional environments. The three-dimensional environment can be the real space in which the user physically lives and in which the item is actually associated with the user. However, the three-dimensional environment is not limited to real space and can also be a cyberspace, a virtual space an augmented reality space or some other type of mixed space.

The item itself falls into two broad categories. It is either a manipulated item, i.e., it is moved or operated directly by the user (e.g., by hand), or the item is a wearable item, which is carried or worn by the user. The item may be attached to a mechanical linkage having up to six degrees of freedom that allow total freedom of motion or a constrained freedom of motion. The item may further be wireless or attached by a flexible tether (with or without stress relief or torque relief).

The category of manipulated items generally includes wands, remote controls, portable phones, portable electronic devices, medical implements, digitizers, hand-held tools, gaming controls, gaming items, digital inking devices, pointers, remote touch devices, TV remotes and magic wands. For example, the manipulated item is a portable phone that is used to control a user device that is a game console, a television, a stereo, an electronic picture frame, a computer, a tablet, an RF transmitter unit, a set-top box, a base station, a portable user device having a display, a non-portable user device having a display, an appliance or the like.

The category of wearable items generally includes items affixed on headgear, on glasses, on gloves, on rings, on watches, on articles of clothing, on accessories, on jewelry, on accoutrements and the like. Any of such wearable items can be used to control a user device that is a game console, a television, a stereo, an electronic picture frame, a computer, a tablet, an RF transmitter unit, a set-top box, a base station, a portable user device having a display, a non-portable user device having a display, an appliance or the like.

The scope of the invention further extends to methods for producing an input from an absolute pose of an item that is associated with a user in a three-dimensional environment. The method is practiced by placing in the three-dimensional environment at least one stationary object presenting at least one feature that has a sufficient number of non-collinear optical inputs detectable via an electromagnetic radiation to establish a stable frame within the three-dimensional environment. Further, a unit on-board the item is provided for receiving the electromagnetic radiation. Processing electronics, either on-board or off-board the item, recover the absolute pose of the item from the non-collinear optical inputs and express it in terms of absolute pose parameters in the stable frame. The same electronics or some other mechanism then generates a signal that is related to at least one absolute pose parameter of the item in the stable frame. The signal is communicated to an application via a link for use in the input (i.e., as the full input or a subset of the input).

According to the present invention, the absolute pose comprises at least three translational degrees of freedom and at least three rotational degrees of freedom and the at least one absolute pose parameter is related to at least one among the at least three translational and at least three rotational degrees of freedom by a mapping. The mapping can be a one-to-one mapping between the one or more absolute pose parameters and the degrees of freedom. The mapping can also include scaling and/or other types of mappings, as generally known in the art.

In some embodiments of the method, a subspace is constructed from the at least three translational and at least three rotational degrees of freedom. The at least one absolute pose parameter is projected into the subspace to obtain a projected portion of the absolute pose parameter. It is this projected portion that is communicated to the application for use in the input. The subspace can be any suitable subspace that includes points, axes, planes and/or volumes and various combinations thereof. A person skilled in the art will appreciate that many projection possibilities are available for unconstrained motion in 3D space.

The method can be practiced when the three-dimensional environment is located in real space, a cyberspace, a virtual space, an augmented reality space or still other mixed space.

In accordance with the method, the signal can be processed to compute a position of the item in the application. This computation is based on the position of the item in the three-dimensional environment as parameterized with the aid of the at least six degrees of freedom. Optionally, feedback to the user may be provided depending on or as a function of the position.

In addition or separately, the signal can be processed to compute an orientation of the item in the application. Again, this computation is based on the orientation of the item in the three-dimensional environment as parameterized with the aid of the at least six degrees of freedom. Optionally, feedback to the user may be provided depending on or as a function of the item's orientation.

In some embodiments of the method, a relative motion sensor is provided for producing data indicative of a change in at least one among the at least three translational and the at least three rotational degrees of freedom. This relative motion data may be used for interpolation purposes to increase resolution or to improve the temporal response of the interface.

The electromagnetic radiation used by the unit on-board the item for generating the signal related to the at least one absolute pose parameter of the item in the stable frame can be provided from any suitable source and location. For example, the electromagnetic radiation can be emitted from on-board the item. In such embodiments, the non-collinear optical inputs are selected such that they reflect the electromagnetic radiation (e.g., they are mirrors or reflectors).

In other embodiments the electromagnetic radiation is emitted from an emitter located at a known location in the three-dimensional environment. Again, the non-collinear optical inputs may be reflecting. Also, whether emitted from on-board or from an emitter at a known location in the three-dimensional environment, the electromagnetic radiation can be emitted in a pattern (structured light) to provide additional helpful information to the unit on-board the item.

Of course, the non-collinear optical inputs themselves may emit the electromagnetic radiation. For example, the non-collinear optical inputs may be emitters (e.g., point sources or other non-point type sources, including sources of invisible light, such as IR light). For example, the non-collinear optical inputs may be the edges of an illuminated display such as an LCD screen. The electromagnetic radiation emitted by the non-collinear optical inputs can be received by the unit on-board the item directly (line-of-sight) or after reflection from known objects in the three-dimensional environment. Once again, a pattern may be imposed on the electromagnetic radiation before it is received by the on-board unit.

In addition to the interfaces and methods according to the invention, the scope further extends to methods for controlling objects, referred to as controlled objects. The methods of controlling a controlled object are based on an absolute pose of an item that is associated with a user in a three-dimensional environment. The method calls for placing in this three-dimensional environment at least one stationary object that presents at least one feature that comprises a sufficient number of non-collinear optical inputs detectable via an electromagnetic radiation. The method also calls for establishing a stable frame of reference in the three-dimensional environment from the set of non-collinear optical inputs. A unit is provided on-board the item for receiving the electromagnetic radiation. Processing electronics are also provided for recovering the absolute pose of the item from the non-collinear optical inputs in terms of absolute pose parameters expressed in the stable frame. The processing electronics, or some other mechanism, generate a signal expressing at least one absolute pose parameter of the item in the stable frame as determined in the above step.

The signal is communicated to a control of the controlled object. In accordance with the invention, the absolute pose has at least three translational and at least three rotational degrees of freedom. The at least one absolute pose parameter is related to at least one among the at least six degrees of freedom by a mapping. Suitable mappings include one-to-one mappings as well as scalings, projections, reflections, translations, rotations, other known symmetry operations and any combinations thereof. In addition, many-to-one mappings may be used if the precision of the degrees of freedom is much larger than desired or required for the absolute pose parameters by the application. Such "lossy" mapping reduces the precision while preserving the number of dimensions, yet it is not one-to-one.

In some embodiments of the method, a subspace is constructed from the at least three translational and at least three rotational degrees of freedom. The at least one absolute pose parameter is projected into the subspace to obtain a projected portion of the absolute pose parameter. It is this projected portion that is communicated to the control of the controlled object. The subspace can be any suitable subspace that includes points, axes, planes and/or volumes and various combinations thereof. A person skilled in the art will appreciate that many projection possibilities are available for controlled object undergoing unconstrained motion in 3D space.

The method can be practiced when the controlled object resides in real space, a cyberspace, a virtual reality, an augmented reality space or a mixed space. Furthermore, feedback to the control can be provided depending on the value or as a function of the at least one absolute pose parameter of the controlled object.

The specifics of the invention and enabling details are described below with reference to the appended drawing figures.

DESCRIPTION OF THE DRAWING FIGURES

FIGS. 1A-B are isometric views of a three-dimensional environment in which the absolute pose of an item associated with a human user is employed for deriving input.

FIG. 2 is an isometric view of the three-dimensional environment of FIGS. 1A-B that illustrates in more detail the parameterization employed by an interface according to the invention.

FIGS. 3A-D are isometric views of a gimbal-type mechanism that aids in the visualization of the 3D rotation convention employed in describing the absolute orientation of the item associated with the human user in the three-dimensional environment of FIGS. 1A-B.

FIGS. 4A-B are three-dimensional front and back views of the item associated with the human user in the three-dimensional environment of FIGS. 1A-B.

FIG. 5 is a three-dimensional schematic view of the on-board unit of the item shown in FIGS. 4A-B.

FIGS. 6A-C are images of the three-dimensional environment of FIGS. 1A-B acquired using three different types of lenses.

FIGS. 7A-B are images of the environment as captured from the two vantage points corresponding to the first and second absolute poses shown in FIGS. 1A and 1B respectively, as displayed on the screen of the item held by the user.

FIG. 8 is a graph of a few typical lens distortion curves.

Figure 25:
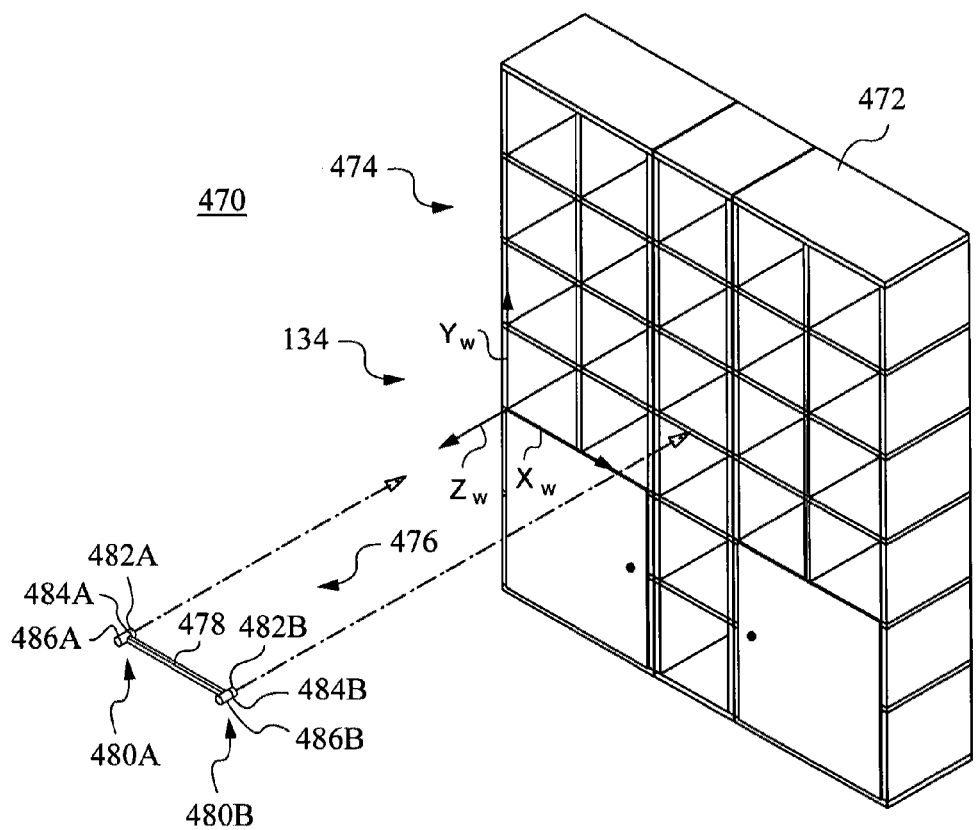
FIG. 25 is an isometric view of an object with features that can be efficiently used as non-collinear optical inputs by an item employing stereo vision.

FIGS. 26A-D are perspective views illustrating the differences in perspective distortions between the images of the object of FIG. 25 obtained from the two points of view afforded by the item employing stereo vision.

Figure 27:
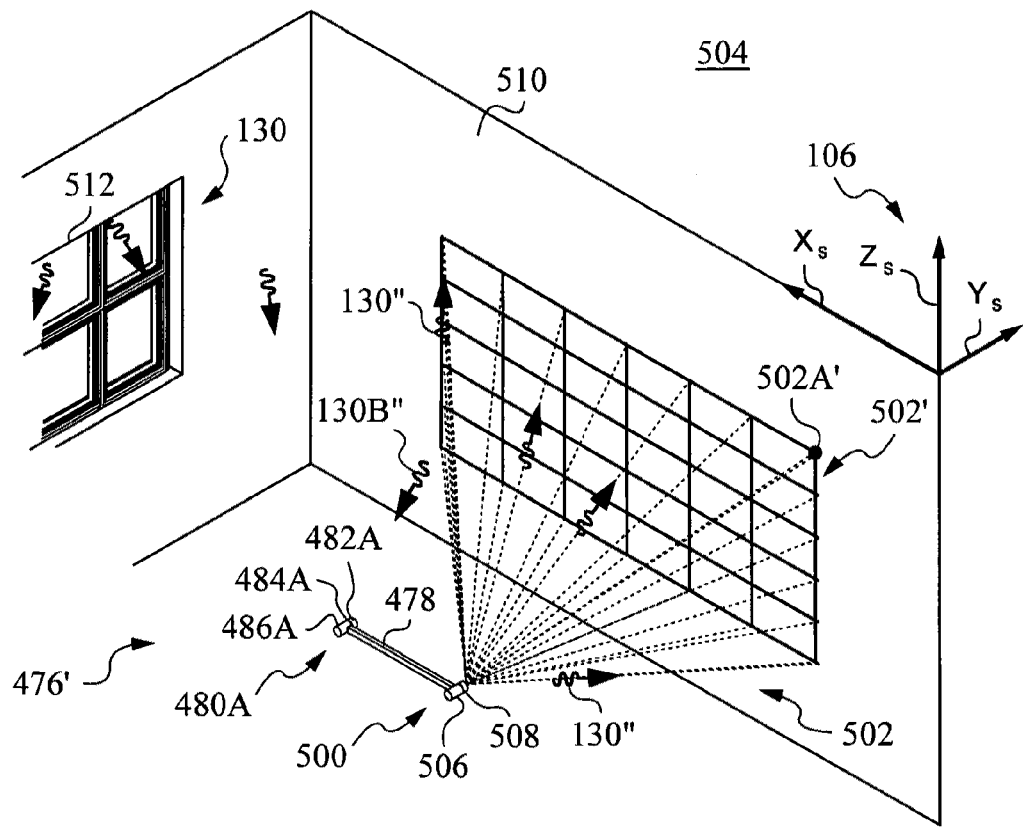

FIG. 27 is an isometric view illustrating an embodiment in which the item projects a pattern of electromagnetic radiation from a first point-of-view and observes the deformation in a reflection of that pattern from a known surface in the three-dimensional environment from a second point-of-view.

Figure 28:
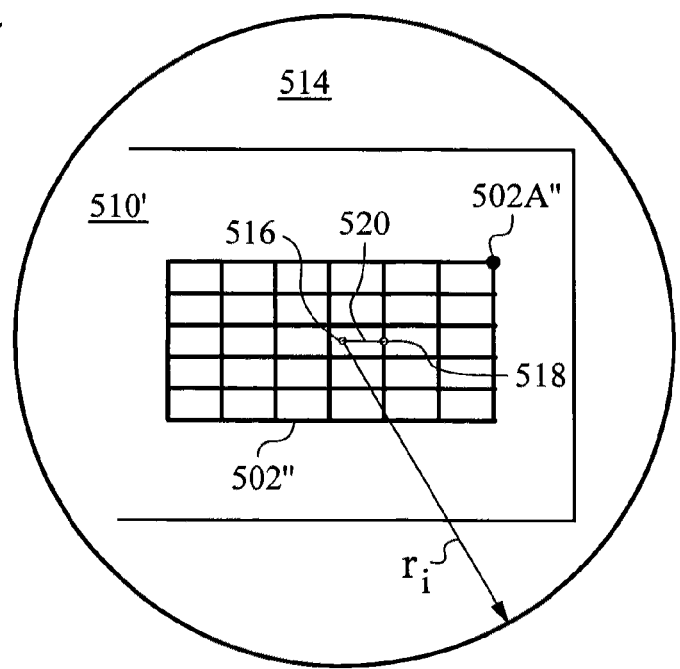

FIG. 28 is a full field image of the deformed pattern (originally projected in accordance with FIG. 27) as seen from the second point-of-view.

FIGS. 29A-E are isometric views illustrating the pose assumed by the item introduced in FIG. 27 in the three-dimensional environment and the corresponding deformation of the pattern projected from the first point-of-view.

FIGS. 30A-E are full field images as seen from the second point-of-view of the deformed pattern produced on the wall in the three-dimensional environment when the item is in the corresponding poses shown in FIGS. 29A-E.

Figure 31:
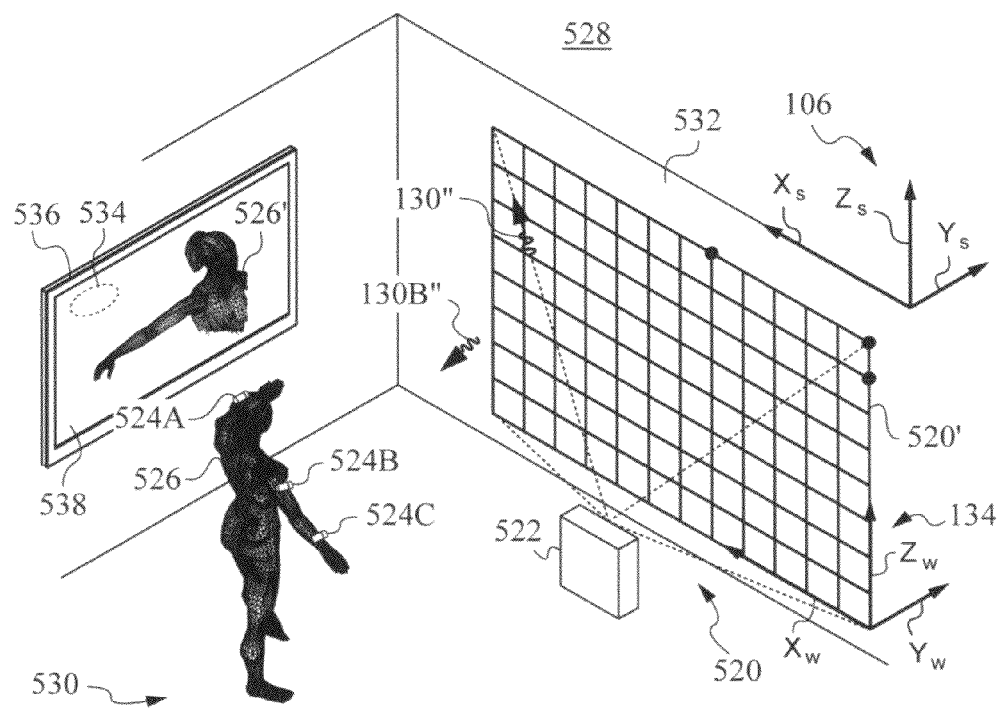

FIG. 31 is an isometric view illustrating an embodiment in which a stationary emitter in a known pose projects a pattern of electromagnetic radiation onto a known feature in a three-dimensional environment to enable absolute pose recovery by items associated with a user.

Figure 32:
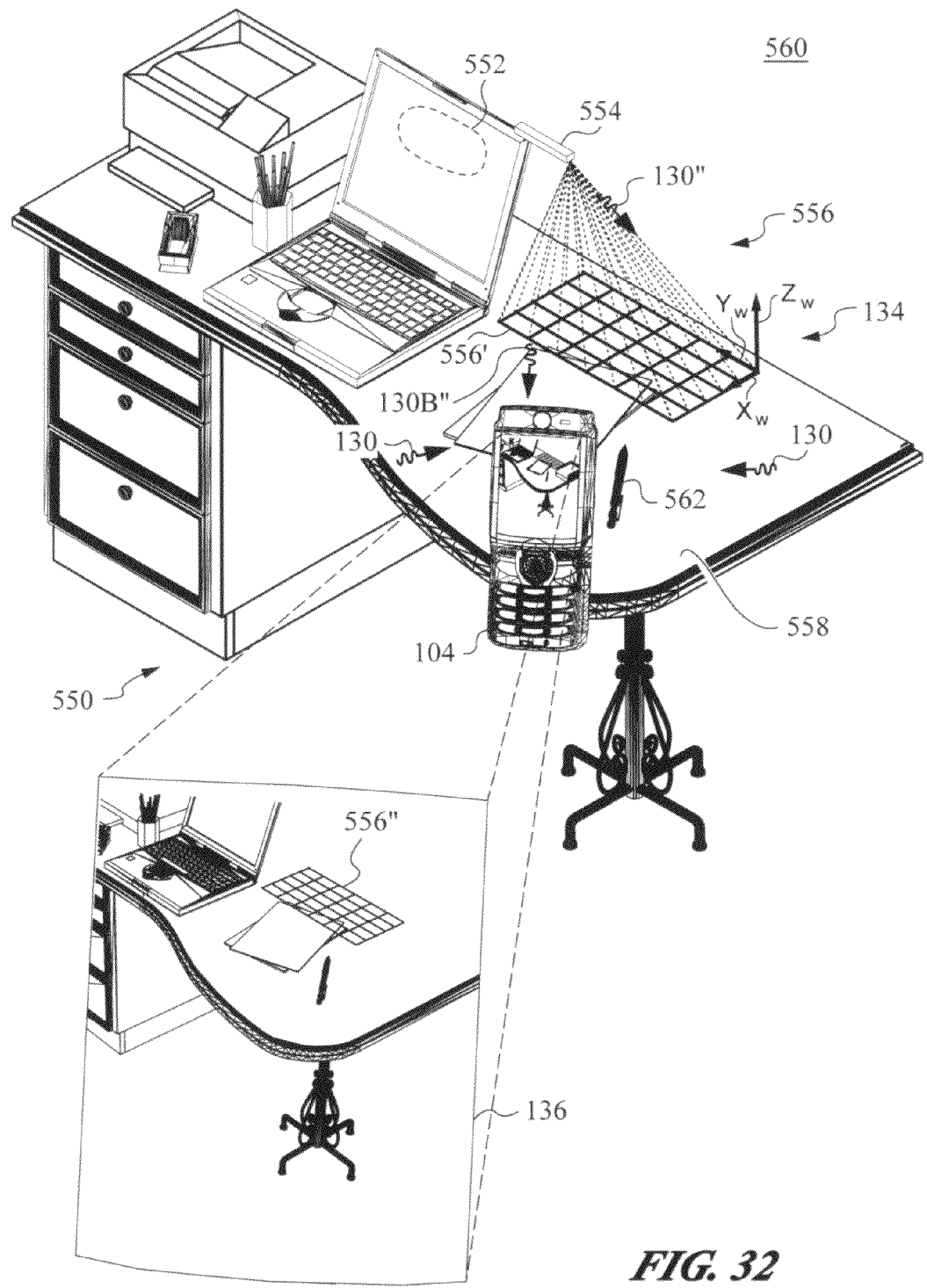

FIG. 32 is an isometric view of another embodiment in which the item is a cell phone and the interface employs a projected pattern of radiation, which is imaged from on-board the cell phone and shown in a perspective projection on its display screen.

Figure 33A:
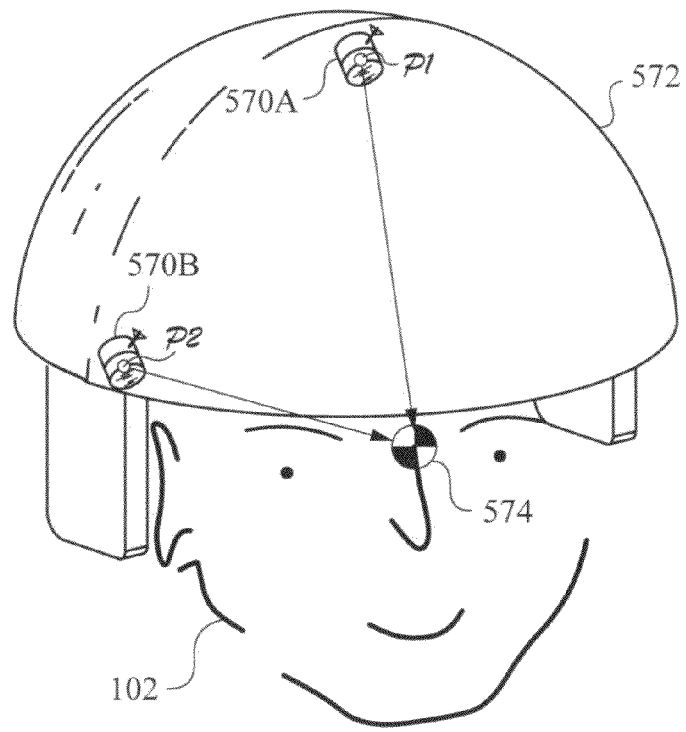

FIG. 33A is a three dimensional view of an item that is associated with the user being a part of a wearable item, namely a piece of headgear.

Figure 33B:
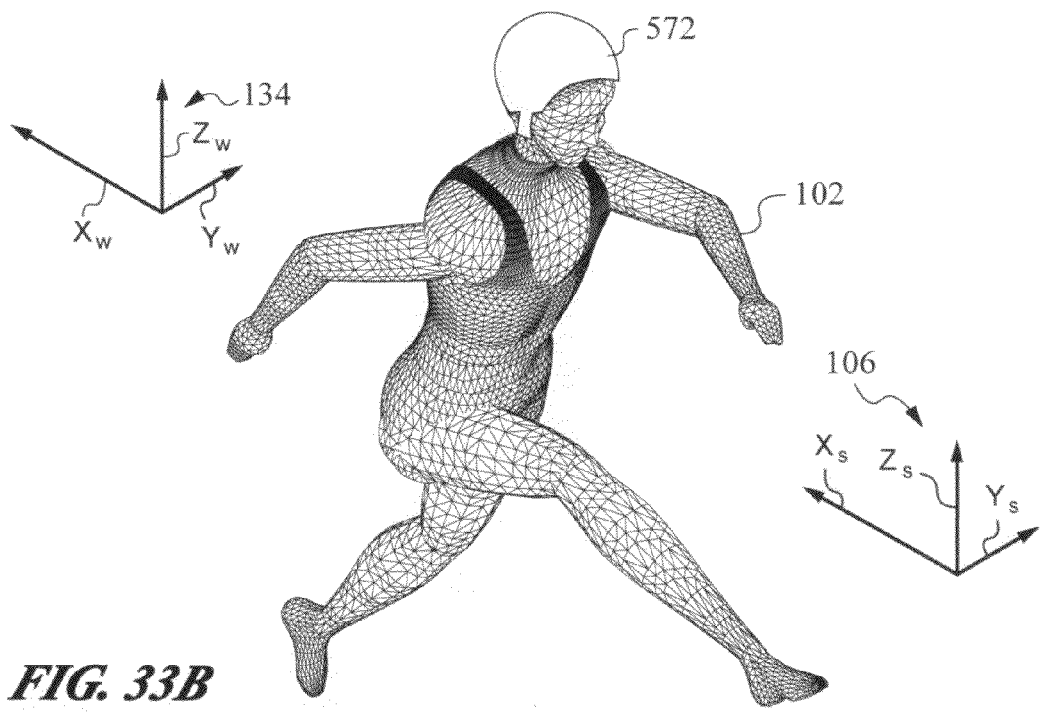

FIG. 33B is a three dimensional view of an application employing the headgear equipped with the item introduced in FIG. 33A.

Figure 34A:
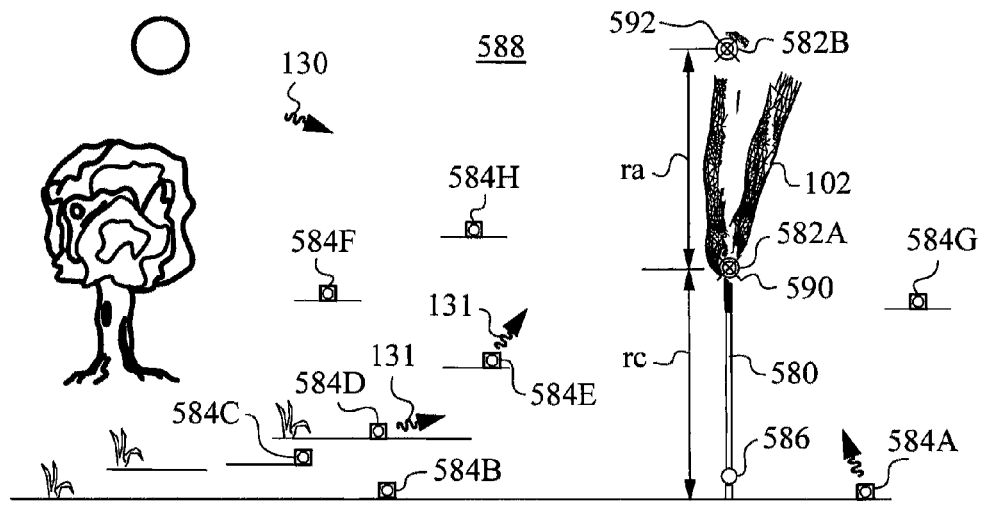

FIG. 34A is a diagram showing an application of the present interface in golf.

Figure 34B:
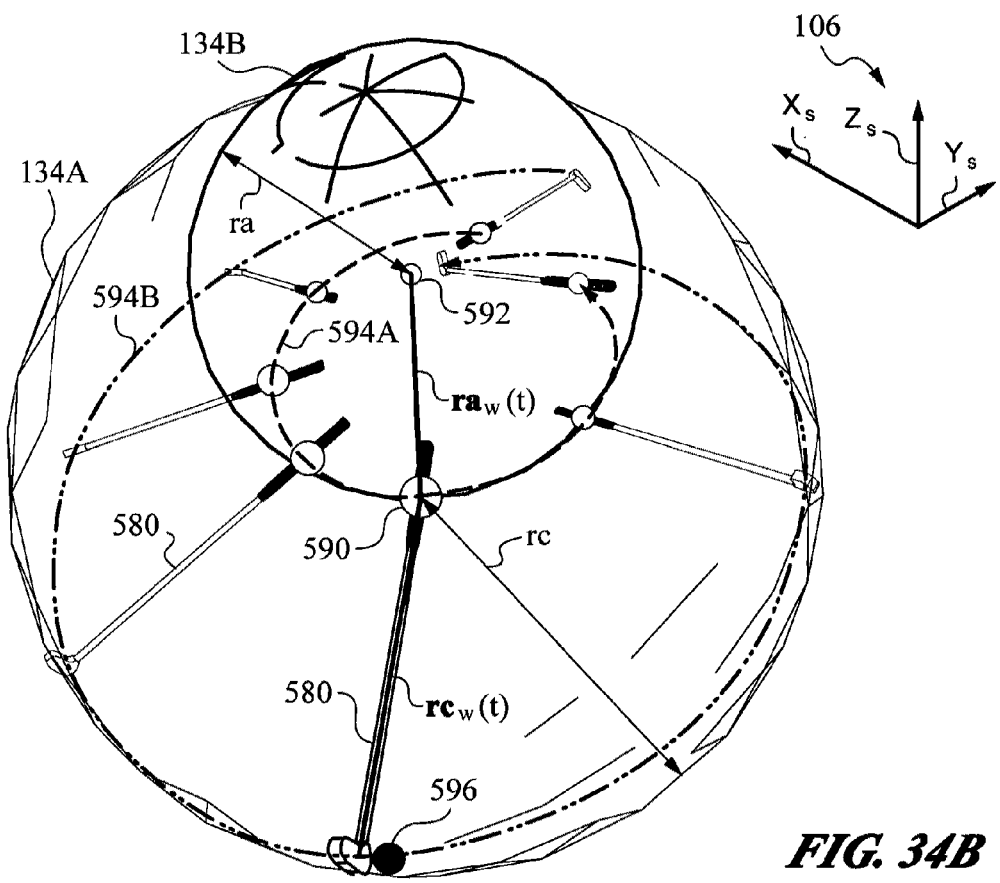

FIG. 34B is a three-dimensional perspective view diagram illustrating the parameterization of a golf swing as employed in the golf interface.

Figure 35:
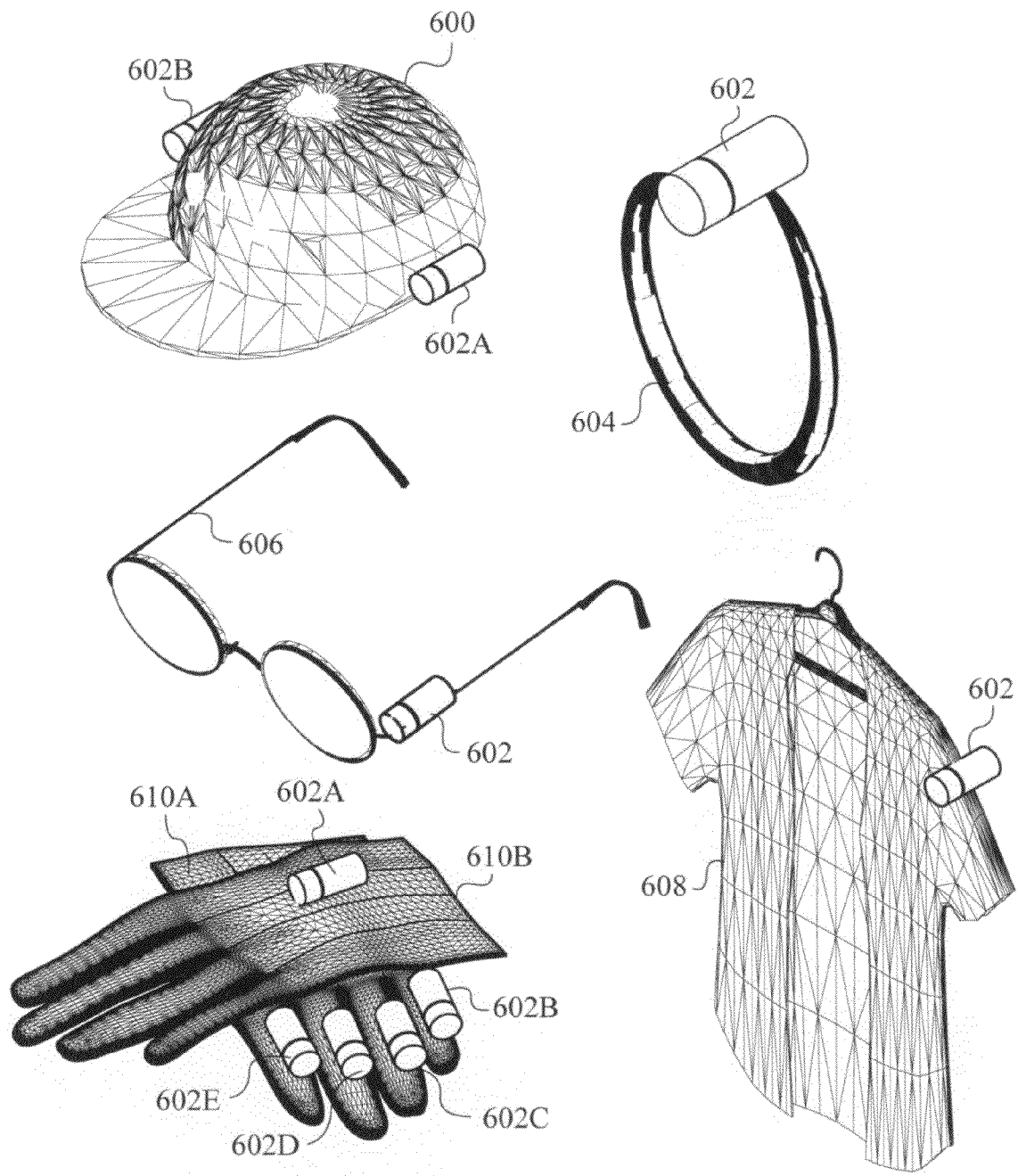

FIG. 35 illustrates a number of exemplary wearable items.

Figure 36:
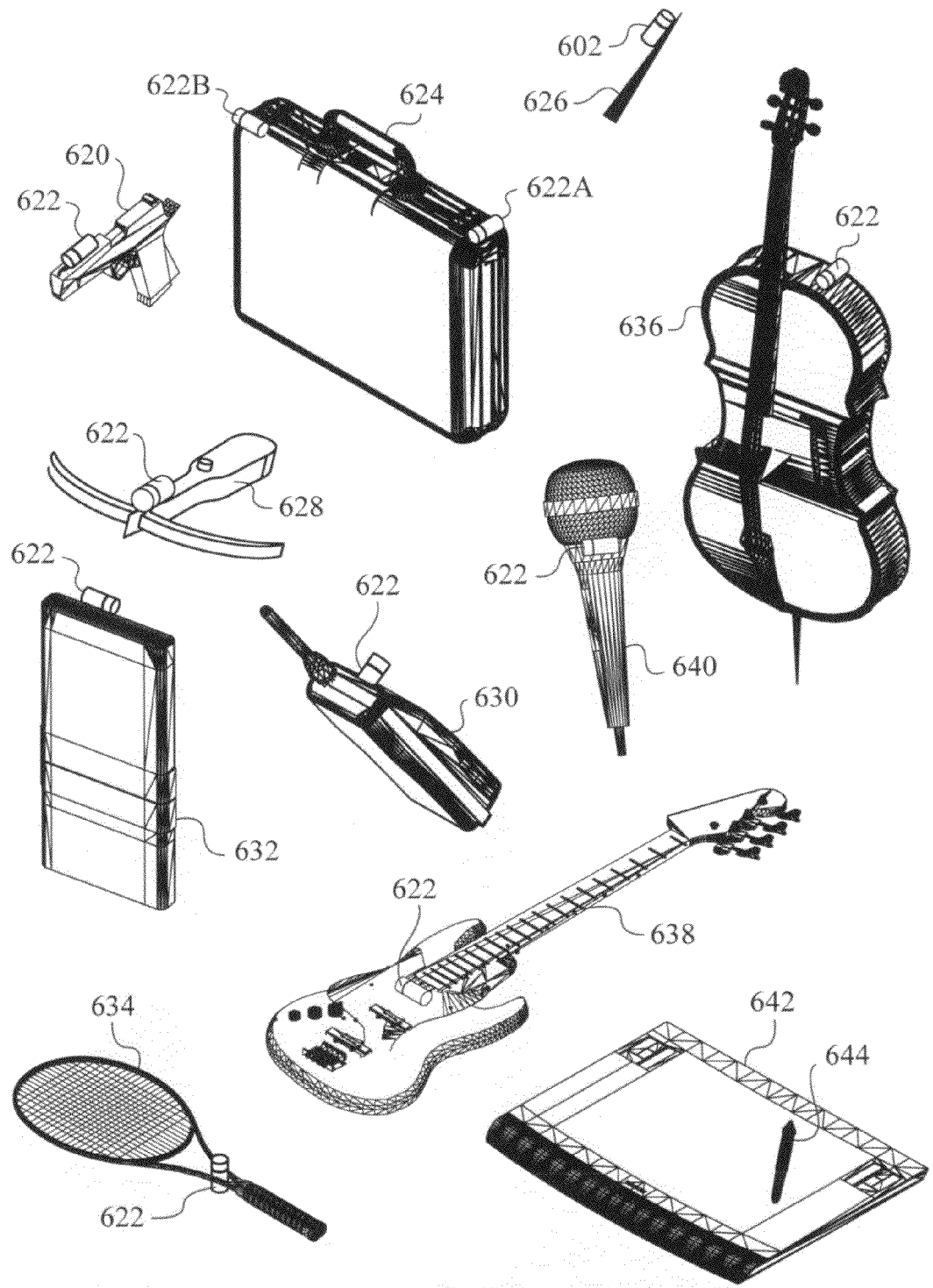

FIG. 36 illustrates a number of exemplary manipulated items.

Figure 37:
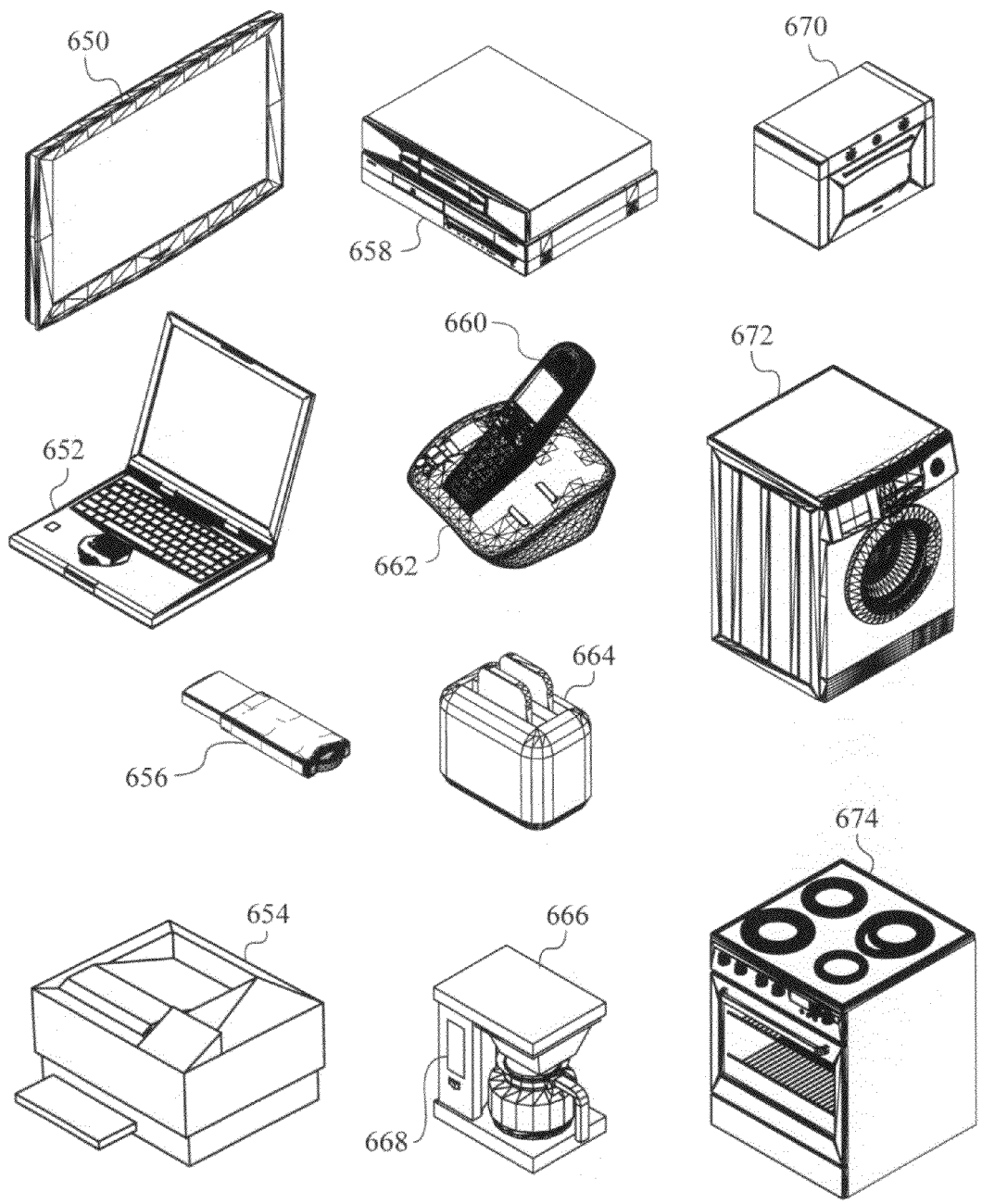

FIG. 37 illustrates a number of suitable stationary objects.

Figure 38:
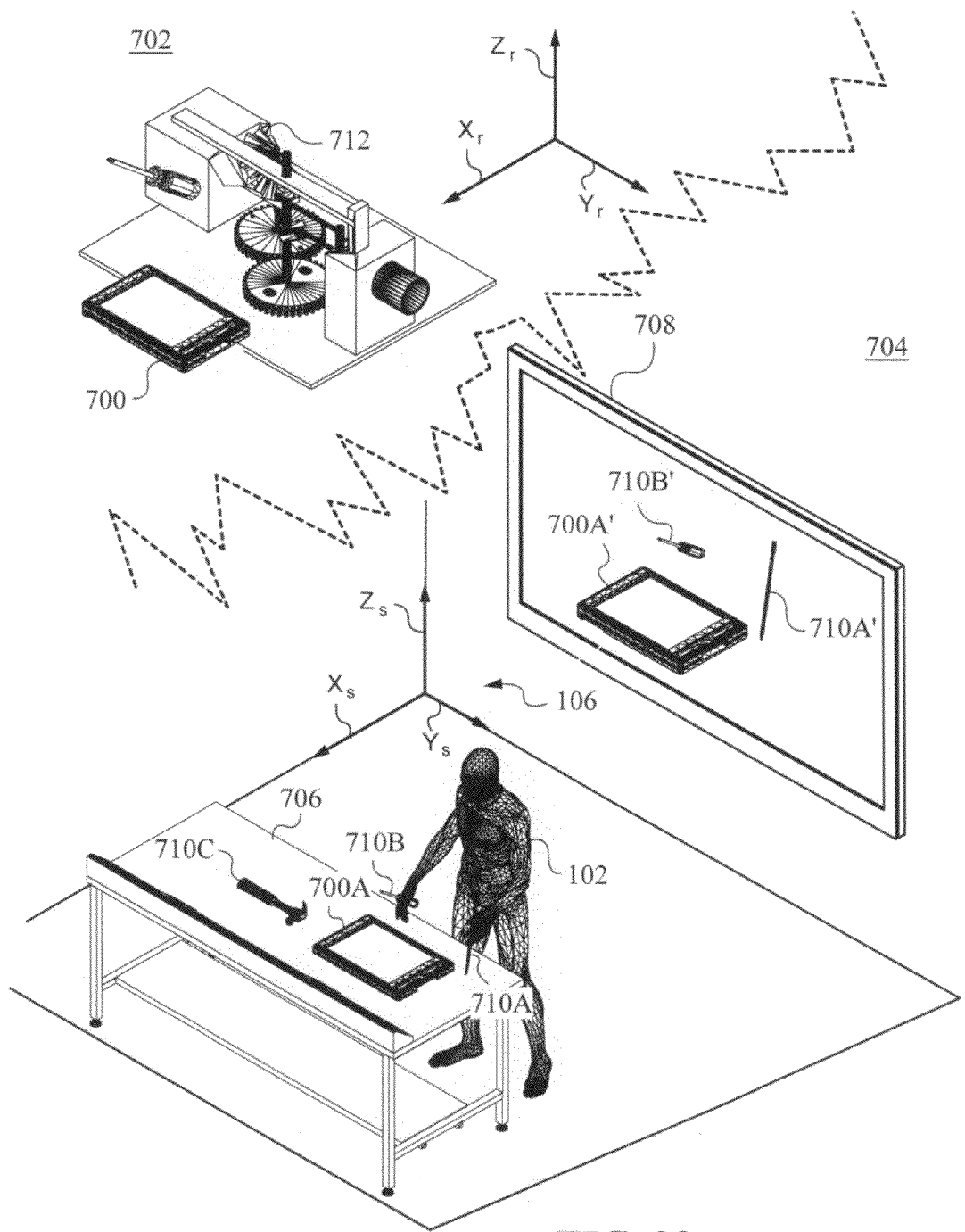

FIG. 38 shows an embodiment in which the method of invention is employed to control a controlled object residing in another environment.

Figure 39:
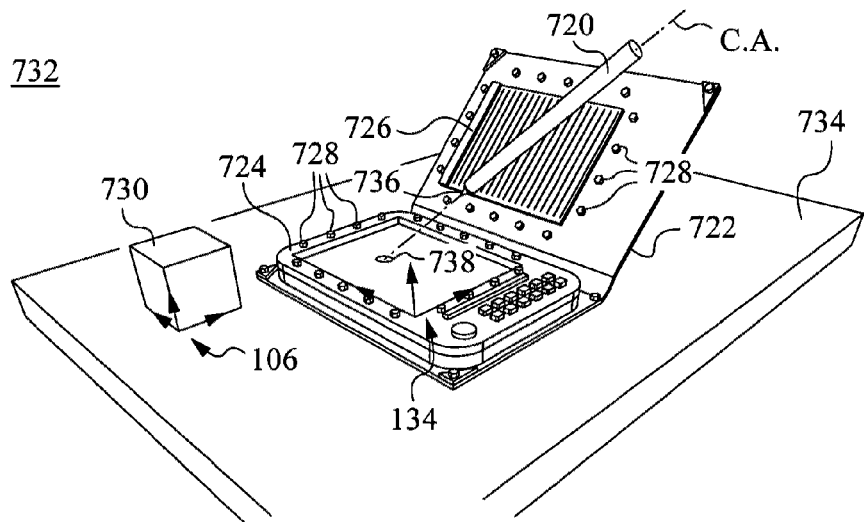

FIG. 39 shows the application of the method of invention to a stylus cooperating with a tablet computer and a notepad.

Figure 40:
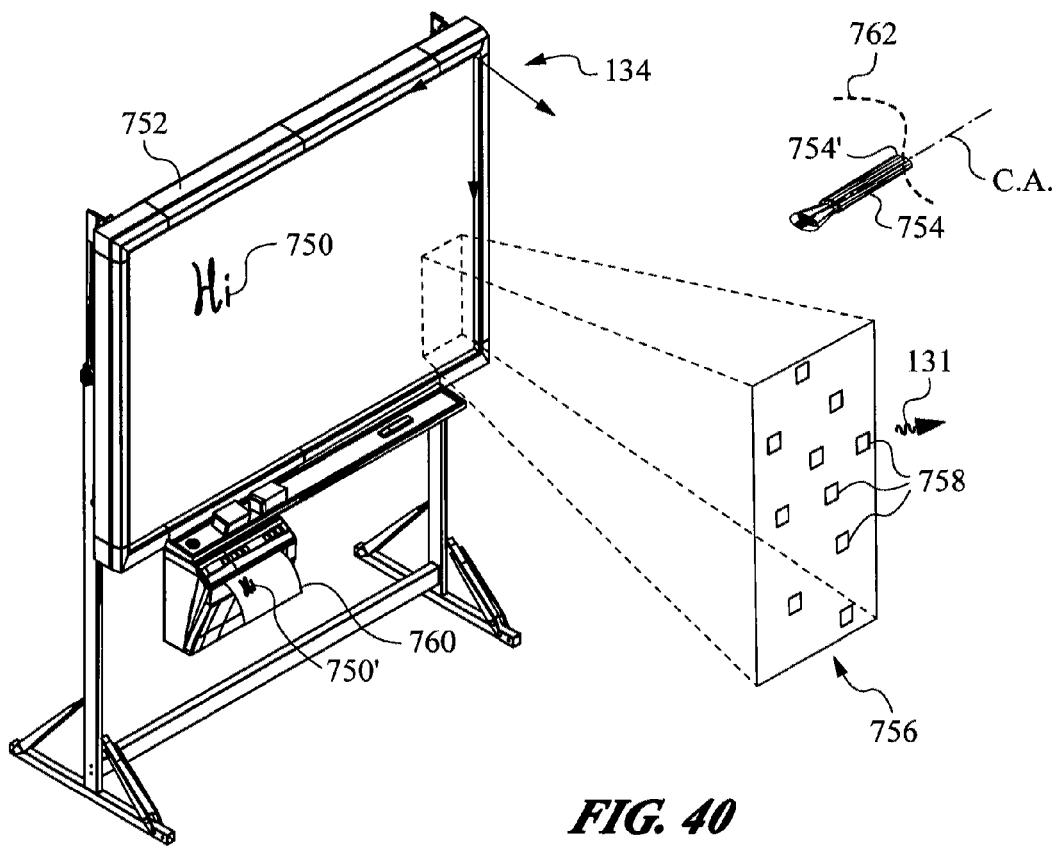

FIG. 40 shows the application of the method of invention to capturing digital ink from a whiteboard.

Figure 41:
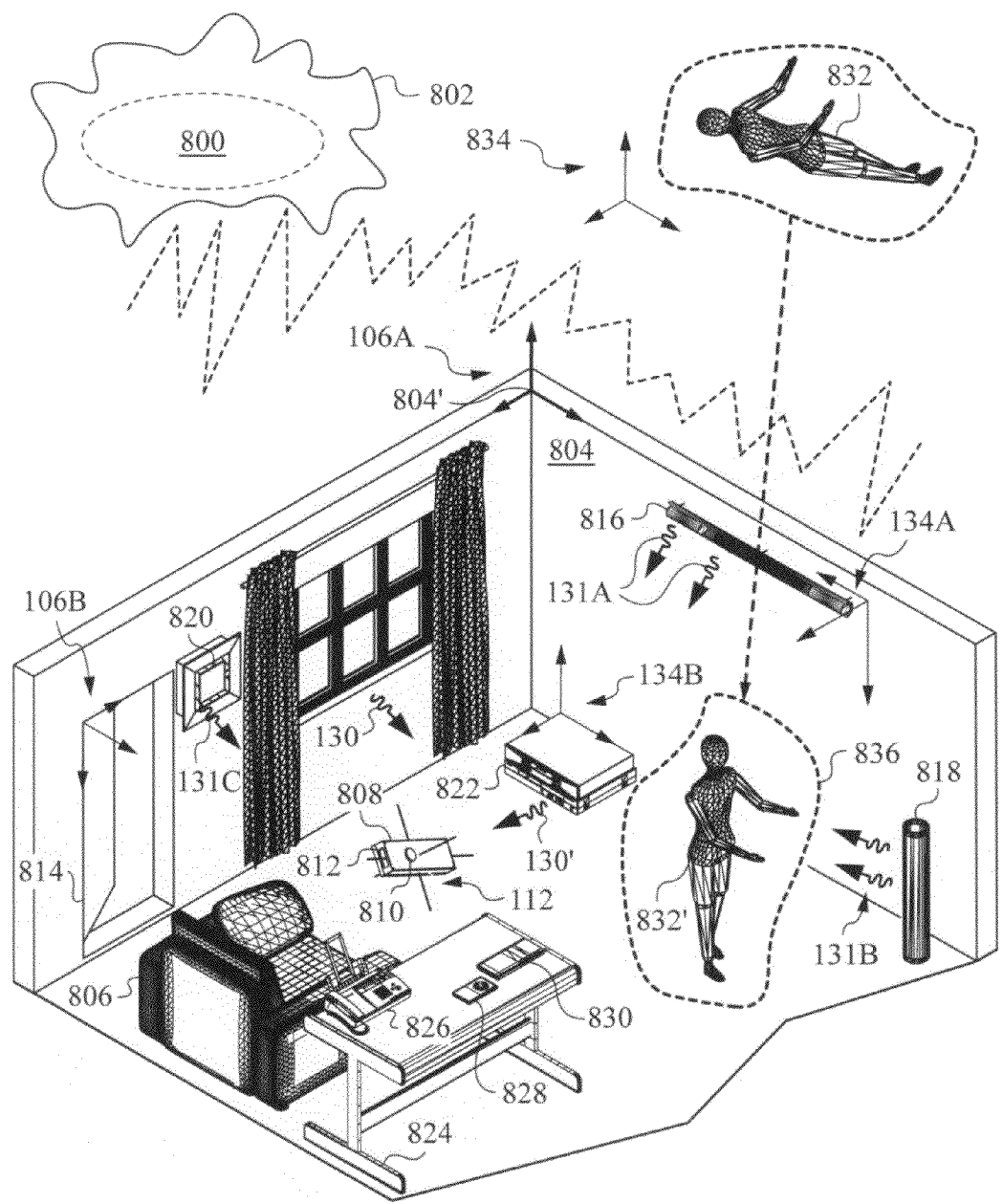

FIG. 41 illustrates the employment of interfaces and methods of the invention in augmented and mixed reality applications.

Figure 42:
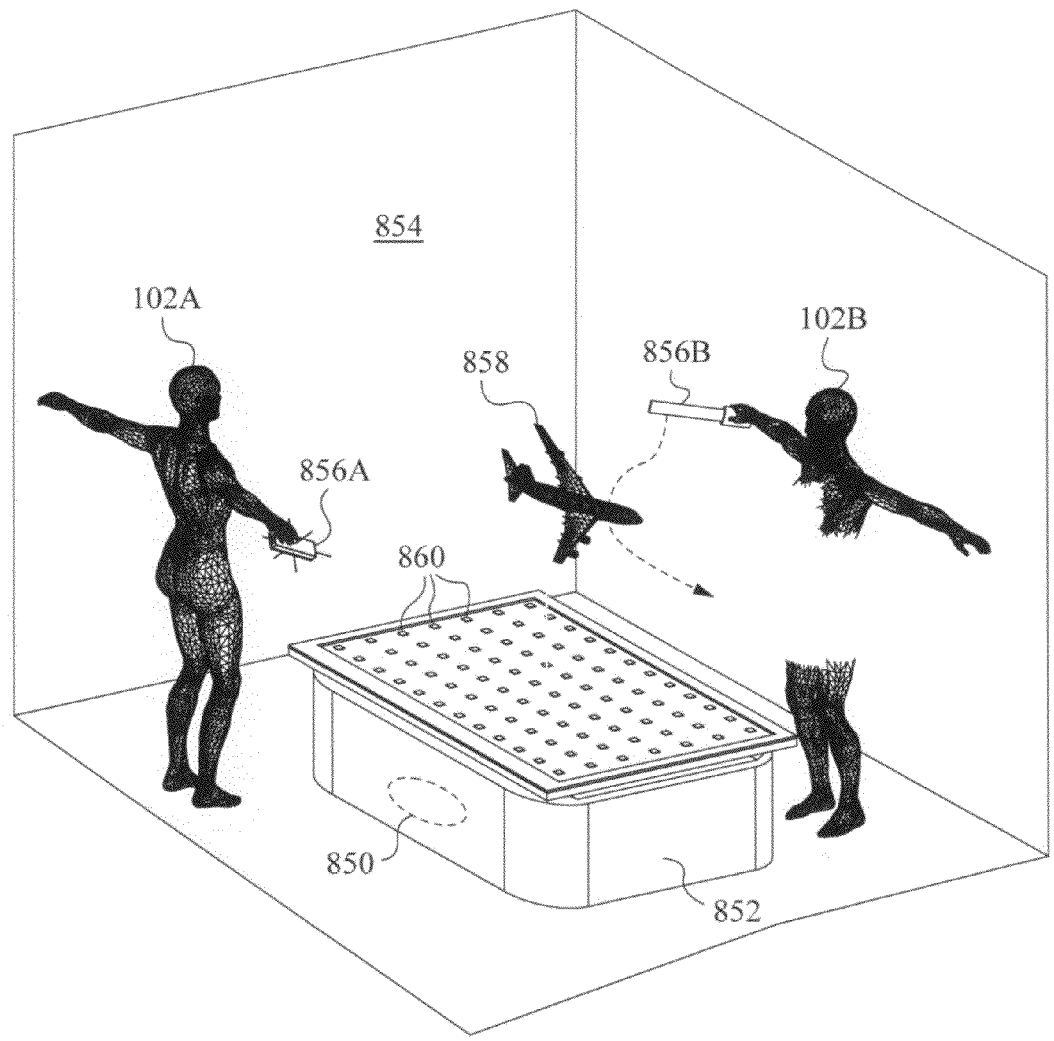

FIG. 42 shows the application of the methods and interfaces of the invention in conjunction with a volumetric 3D display.

DETAILED DESCRIPTION

Figure 1A:
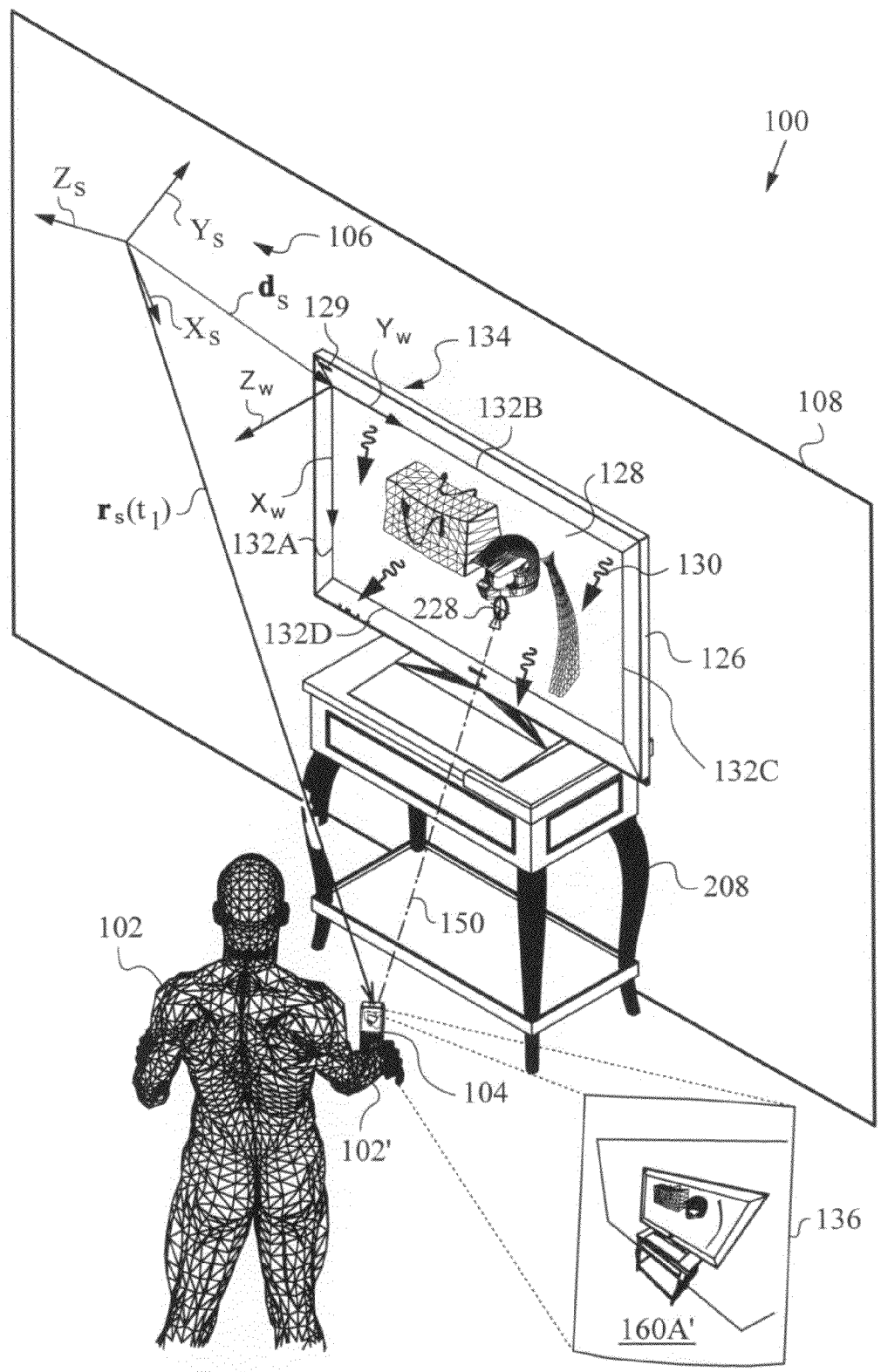
Figure 1B:
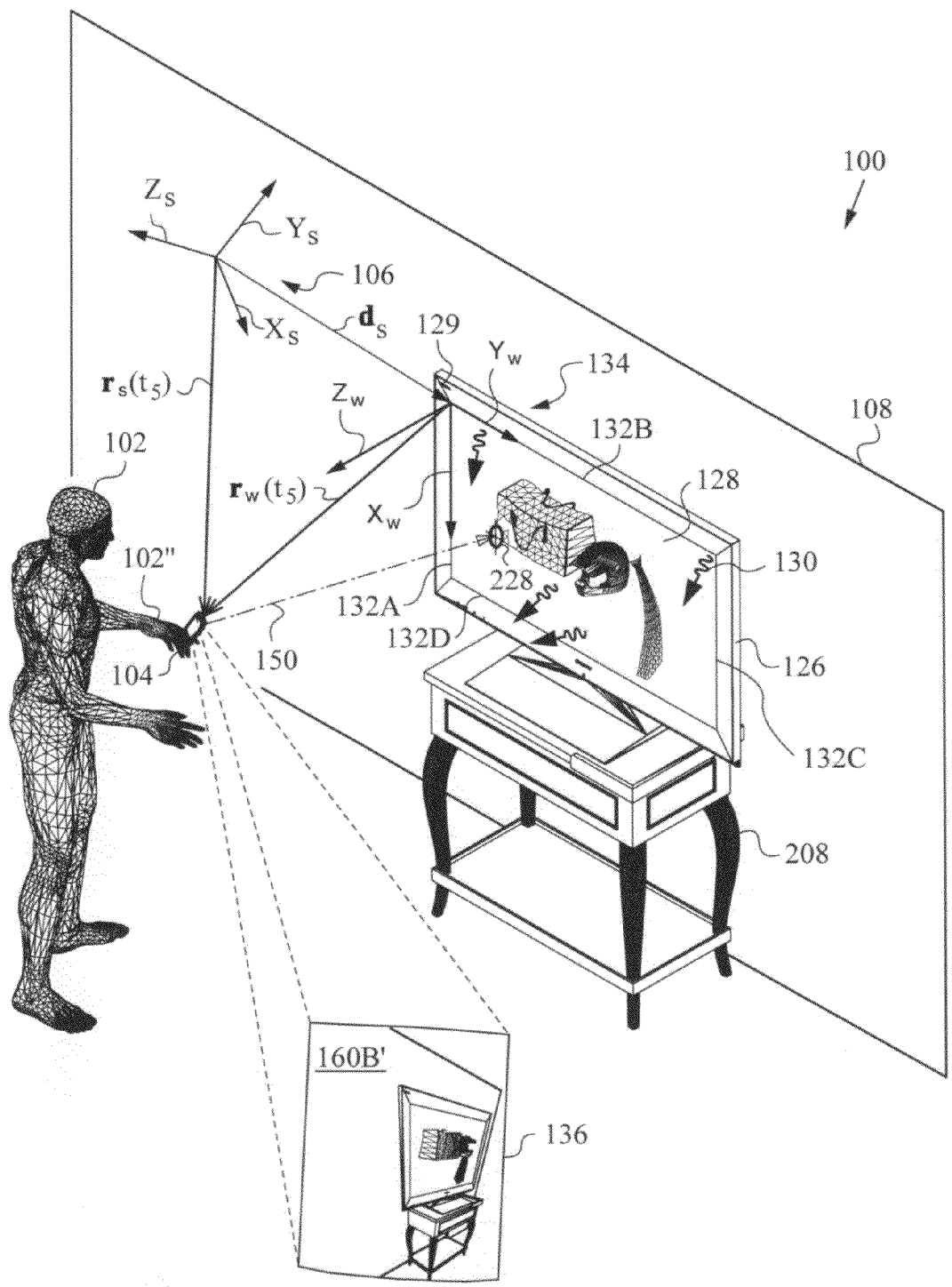

The various aspects of an interface according to the invention will be best understood by initially referring to two isometric views of a real three-dimensional environment 100 as illustrated in FIGS. 1A-B. A user 102 residing in environment 100, which may be an indoor or an outdoor environment, is holding in his/her right hand 102' an item 104 that also resides in environment 100. It is important that item 104 be physically associated with user 102 such that the user's 102 physical disposition and changes therein are reflected by item 104. In other words, the static positions, poses, actions, gestures and other movements of user 102 need to translate in some manner to corresponding absolute position(s) and orientation(s) of item 104 and/or changes to corresponding position(s) and orientations(s) of item 104. For example, in the present case item 104 is a cell phone that is held in right hand 102' by user 102 and manipulated.

Three-dimensional environment 100 has a spatial extent that may be described by orthogonal or non-orthogonal coordinate systems (e.g., linearly independent axes). Because of the efficiency of description, we will use orthogonal coordinates herein. Of course, it will be understood by those skilled in the art that linearly independent sets of basis vectors or other geometrical constructs can also be used. For example, surfaces and vectors bearing predetermined relationships to those surfaces (e.g., surface normal or tangent) can also be used to describe or parameterize three-dimensional environment 100.

Three-dimensional environment 100 is associated with a stable frame 106. For the sake of efficiency, stable frame 106 is parameterized by orthogonal coordinates. In particular, we chose a Cartesian coordinate system, referred to herein as stable coordinate system $(X_s, Y_s, Z_s)$.

When parameterizing the various frames (also sometimes referred to as reference frames) that we will encounter in the description, we will employ a certain convention. According to this convention, capital letters denote the axes of the coordinates that parameterize the frame and the subscripts on the axes refer to the frame (e.g., subscript "s" refers to stable frame 106). The degrees of freedom as parameterized in the coordinates of the frame, e.g., displacements along axes $X_s$, $Y_s$ and $Z_s$, will be denoted by lower case letters along with subscripts referring to that frame. Thus, in the stable coordinate system $(X_s, Y_s, Z_s)$ parameterizing real three-dimensional environment 100 the actual numerical values of the three translational degrees of freedom (length, width and height or x, y and z) will be denoted by $x_s$, $y_s$ and $z_s$. A similar convention will be employed for vectors, which will bear the subscript of the coordinate system in which they are expressed.

The orientation of the $X_s$-, $Y_s$-, and $Z_s$-axes and the location of the origin (the (0,0,0) point) of stable coordinates $(X_s, Y_s, Z_s)$ parameterizing stable frame 106 may be selected according to the interface designer's preferences. In the present example, the origin of stable coordinates $(X_s, Y_s, Z_s)$ is set near the upper left corner of a wall 108 in environment 100. The orthogonal or mutually perpendicular axes $X_s$, $Y_s$ and $Z_s$ make predetermined and known angles with respect to wall 108.

The absolute pose of item 104, in this case cell phone 104 in environment 100 includes its absolute position and its absolute orientation. The reason why the pose is referred to as absolute, is because it is expressed in stable frame 106 as parameterized by stable coordinates $(X_s, Y_s, Z_s)$ that were selected by the designer. In contrast, many of today's input devices report relative position and/or relative orientation in 3D space. In some cases, that is because the sensors on-board these devices can only make differential measurements. In other words, they provide measurements of changes in position and/or orientation without the ability to keep those measurements referenced to a stable external frame parameterized by a stable coordinate system without some additional calibration mechanisms. Inertial units such as accelerometers and gyros are good examples of such relative motion sensors.

Now, to gain a deeper understanding, the absolute position of item 104 and its absolute orientation will be introduced separately. These independent explanations will then be combined into one uniform description of absolute pose.

To define absolute position, a reference point whose ($x_s$, $y_s$, $z_s$) position will be tracked in stable coordinates ($X_s$, $Y_s$, $Z_s$) needs to be chosen on item 104. The choice of such reference point is arbitrary, but some conventions are more efficient than others. For example, in many cases it is convenient to choose the center of mass (C.O.M.) of item 104 as the reference point. In other cases, a protruding point or some other prominent or important aspect of item 104 may be selected. In still other cases, the point-of-view of an on-board optical sensing unit such as a directional photosensor, e.g., a digital camera or a lensed position-sensing device (PSD), may be selected as the reference point. The choice will depend on the type of item 104, the software application and the interface.

Figure 2:
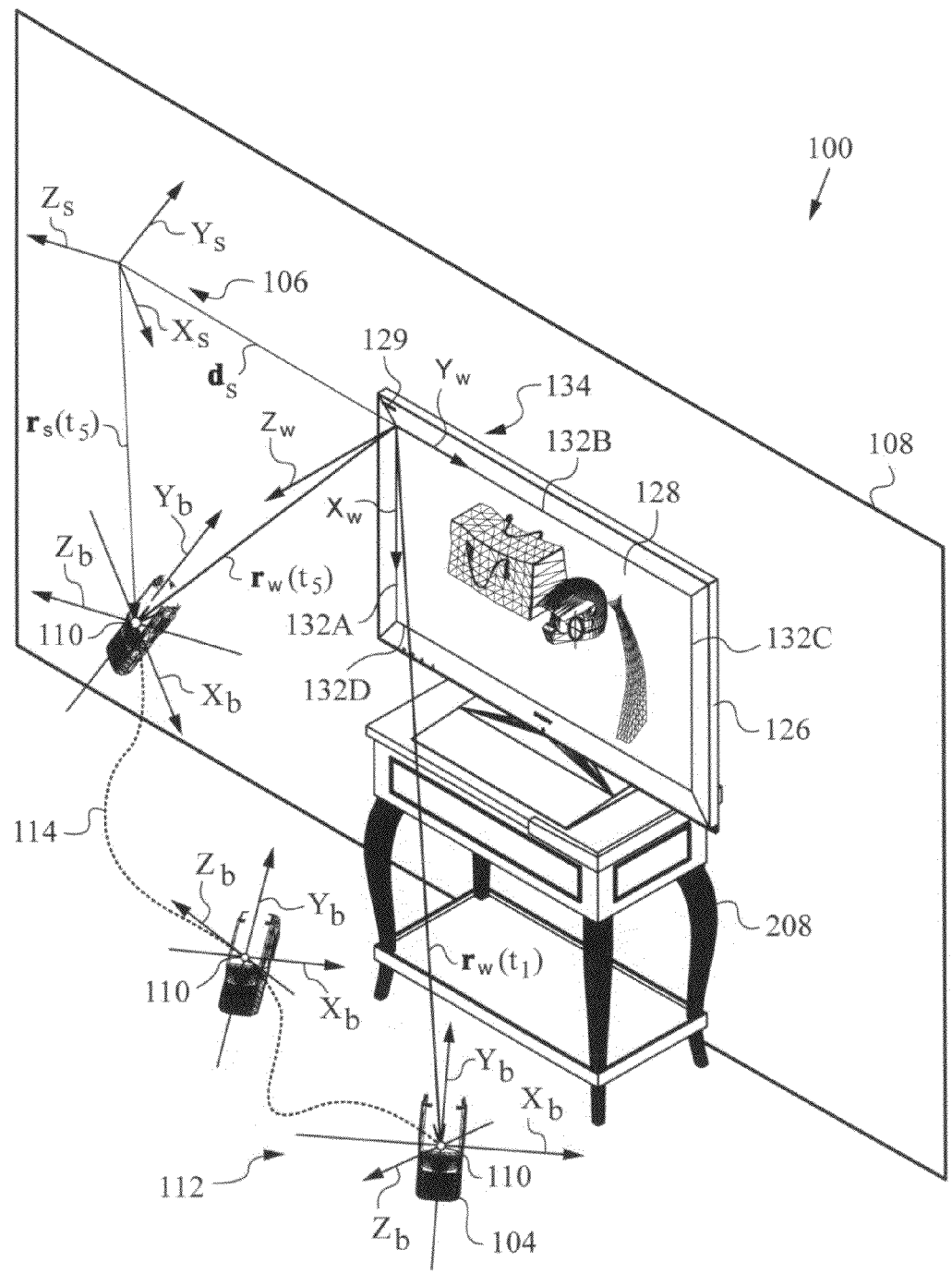

As shown in FIG. 2, in the present embodiment the center of mass (C.O.M.) of phone 104 is chosen as a reference point 110. Further, to simplify the description, Cartesian body coordinates ($X_b$, $Y_b$, $Z_b$) whose origin coincides with C.O.M. 110 are associated with a moving frame 112 of phone 104 itself. To distinguish body coordinates ($X_b$, $Y_b$, $Z_b$) from stable coordinates ($X_s$, $Y_s$, $Z_s$) that describe stable frame 106 of three-dimensional environment 100, we use the subscript letter "b" (b for body) throughout the present description and in the drawing figures.

A person skilled in the art will realize that body coordinates ($X_b$, $Y_b$, $Z_b$) are a useful tool for parameterizing moving frame 112. Indeed, body coordinates are a very well-known tool in classical mechanics for describing both the absolute position and the absolute orientation of bodies undergoing unconstrained motion in 3D space (or other spaces). Once again, such person will also realize that orthogonal and non-orthogonal conventions and systems may be employed in this description. The present description adheres to Cartesian coordinates merely for reasons of explanatory clarity and convenience without implying any limitations as to the types of descriptions and body coordinate choices that are available to the interface designer.

Body coordinates ($X_b$, $Y_b$, $Z_b$) centered on C.O.M. 110 of phone 104 allow us to define the absolute position of phone 104, or more precisely the absolute position of its C.O.M. 110 in environment 100. The absolute position of C.O.M. 110 can change along any of the three directions $X_s$, $Y_s$ and $Z_s$ defined by stable coordinates ($X_s$, $Y_s$, $Z_s$) that parameterize the three translational degrees of freedom in stable frame 106 established in environment 100. In fact, successive absolute positions of C.O.M. 110 in time or, equivalently, the sequence of such positions of the origin of body coordinates ($X_b$, $Y_b$, $Z_b$), define an absolute trajectory 114 of the phone's 104 C.O.M. 110 through environment 100.

To illustrate the above point, FIG. 1A shows user 102 holding cell phone 104 in his/her right hand 102' in a first absolute position in environment 100 at a time $t_1$. FIG. 1B shows same user 102 holding cell phone 104 in his/her left hand 102" in a second absolute position at a later point in time $t_5$. Trajectory 114 traversed by phone 104, and specifically its C.O.M. 110 in traveling between these two positions, including the change over from right hand 102' to left hand 102" is shown in FIG. 2. Note that in the present embodiment in moving along trajectory 114 the absolute position of phone 104 or its C.O.M. 110 changes in all three degrees of translational freedom as parameterized by directions $X_s$, $Y_s$ and $Z_s$. In other words, the absolute position of phone 104 exhibits three translational degrees of freedom whose numerical values in stable coordinates ($X_s$, $Y_s$, $Z_s$) are expressed by $x_s$, $y_s$, and $z_s$.

In order to simplify the description of trajectory 114 and express it directly in stable coordinates ($X_s$, $Y_s$, $Z_s$) we employ the concept of a vector $r_s$. To distinguish vectors from scalars, we will designate them in boldfaced letters. To remain consistent, vectors will also carry the subscript of the coordinate system in which they are expressed (i.e., "s" in the present case). Vector $r_s$ is represented by an ordered triple of numbers, namely the values $x_s$, $y_s$ and $z_s$ that represent the absolute position of C.O.M. 110. Differently put, these three numbers are the numerical values of displacements along $X_s$-, $Y_s$-, and $Z_s$-axes of stable coordinates ($X_s$, $Y_s$, $Z_s$) that need to be taken in order to arrive at C.O.M. 110 when starting out from the origin of stable coordinates ($X_s$, $Y_s$, $Z_s$). Thus, vector $r_s$ corresponds in this representation to ($x_s$, $y_s$, $z_s$). It should be noted for completeness, that other vector representations are also available.

For example, a vector may be represented by a magnitude and direction (e.g., in spherical coordinates) or a combination of the two (e.g., a magnitude and a direction in a 2D subspace together with a rectilinear coordinate in a third dimension).

Furthermore, in order to keep track of vector $r_s$ in time, we express vector $r_s$ as a function of time, i.e., $r_s = r_s(t)$. The two times indicated in FIGS. 1A-B & 2 are: time $t_1$ when user 102 held phone 104 in right hand 102' in the absolute pose shown in FIG. 1A and time $t_5$ when user 102 held phone 104 in left hand 102" in the absolute pose shown in FIG. 1B. In accordance with our convention, we thus designate the corresponding vectors $r_s(t_1)$ and $r_s(t_5)$.

Now, in addition to absolute position, the absolute pose also includes the absolute orientation of phone 104. As in the case of the absolute position, absolute orientation is expressed in stable coordinates ($X_s$, $Y_s$, $Z_s$) with the aid of body coordinates ($X_b$, $Y_b$, $Z_b$) centered on C.O.M. 110 of phone 104. For a rigid body such as phone 104, absolute orientation exhibits three rotational degrees of freedom (i.e., rotation around axes $X_b$, $Y_b$, $Z_b$ or other axes). Because rotations in 3D do not commute, in other words, the final orientation after several rotations in 3D depends on the order of the rotations, a careful and consistent description needs to be selected to describe absolute orientation of phone 104. A person skilled in the art will realize that many such descriptions exist and indeed any of them can be used herein without limitation.

FIGS. 3A-D illustrate a particular orthogonal rotation convention that takes the non-commutative nature of 3D rotations into account and is employed in the present embodiment. Specifically, this convention describes the absolute orientation of phone 104 in terms of three rotation angles $\alpha_b$, $\beta_b$ and $\gamma_b$. Here, the rotations are taken around the three body axes $X_b$, $Y_b$, $Z_b$, which are initially aligned with the axes of stable coordinates ($X_s$, $Y_s$, $Z_s$) that parameterize stable frame 106 in environment 100. We keep the subscript "b" on rotation angles $\alpha_b$, $\beta_b$ and $\gamma_b$ in order to remind ourselves that they are taken in body coordinates ($X_b$, $Y_b$, $Z_b$). However, since rotations do not require the definition of any new axes, they are expressed in lowercase letters. These letters will be also used to express the actual numerical values of the corresponding rotations to avoid the introduction of excessive notational rigor.

Our choice of rotation convention ensures that C.O.M. 110 of phone 104 does not move during any of the three rotations. It thus remains a reliable reference point for tracking trajectory 114 of C.O.M. 110 of phone 104 through environment 100. A person skilled in the art will recognize the importance of this feature of the 3D rotation convention chosen herein and that similar considerations are employed in navigating terrestrial vehicles, marine vehicles, aircraft, spaceships and other navigable vehicles, objects and craft. Indeed, such convention may also be used to describe free or unconstrained motion of arbitrary objects in 3D space.

Figure 3A:
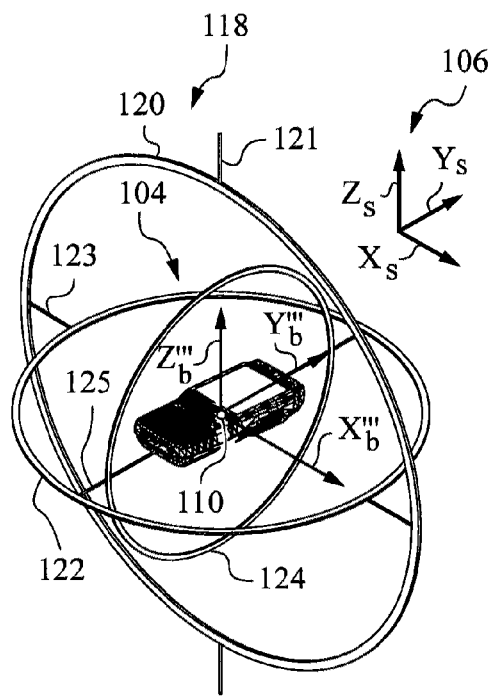

FIG. 3A shows phone 104 in an initial, pre-rotated condition centered in a gimbal mechanism 118 that will mechanically constrain the rotations defined by angles $\alpha_b$, $\beta_b$ and $\gamma_b$. Mechanism 118 has three progressively smaller concentric rings or hoops 120, 122, 124. Rotating joints 121, 123 and 125 permit hoops 120, 122, 124 to be respectively rotated in an independent manner. For purposes of visualization of the present 3D rotation convention, phone 104 is rigidly fixed to the inside of third hoop 124 either by an extension of joint 125 or by any other suitable mechanical means (not shown).

In the pre-rotated state, the axes of body coordinates $(X_b, Y_b, Z_b)$ parameterizing moving frame 112 of phone 104 are triple primed $(X_b''', Y_b''', Z_b''')$ to better keep track of body coordinate axes after each of the three rotations. In addition, the pre-rotated axes $(X_b''', Y_b''', Z_b''')$ of body coordinates $(X_b, Y_b, Z_b)$ are aligned with axes $X_s$, $Y_s$ and $Z_s$ of stable coordinates $(X_s, Y_s, Z_s)$ that parameterize stable frame 106 in environment 100. However, pre-rotated axes $(X_b''', Y_b''', Z_b''')$ are displaced from the origin of stable coordinates $(X_s, Y_s, Z_s)$ by vector $r_s$ introduced and explained above. C.O.M. 110 is at the origin of body coordinates $(X_b, Y_b, Z_b)$ and at the center of gimbal mechanism 118.

Figure 3B:
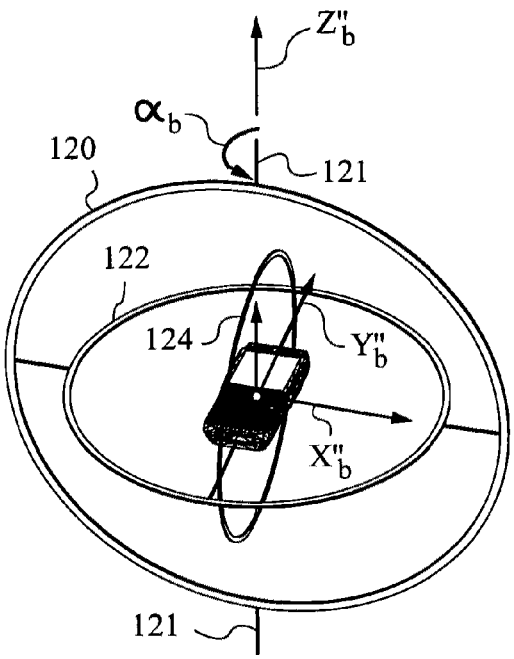

The first rotation by angle $\alpha_b$ is executed by rotating joint 121 and thus turning hoop 120, as shown in FIG. 3B. Note that since body axis $Z_b'''$ of phone 104 (see FIG. 3A) is co-axial with rotating joint 121 the physical turning of hoop 120 is equivalent to this first rotation in body coordinates $(X_b, Y_b, Z_b)$ of phone 104 around body $Z_b'''$ axis. In the present convention, all rotations are taken to be positive in the counter-clockwise direction as defined with the aid of the right hand rule (with the thumb pointed in the positive direction of the coordinate axis around which the rotation is being performed). Hence, angle $\alpha_b$ is positive and in this visualization it is equal to 30°.

After each of the three rotations is completed, body coordinates $(X_b, Y_b, Z_b)$ are progressively unprimed to denote how many rotations have already been executed. Thus, after this first rotation by angle $\alpha_b$, the axes of body coordinates $(X_b, Y_b, Z_b)$ are unprimed once and designated $(X_b'', Y_b'', Z_b'')$ as indicated in FIG. 3B.

Figure 3C:
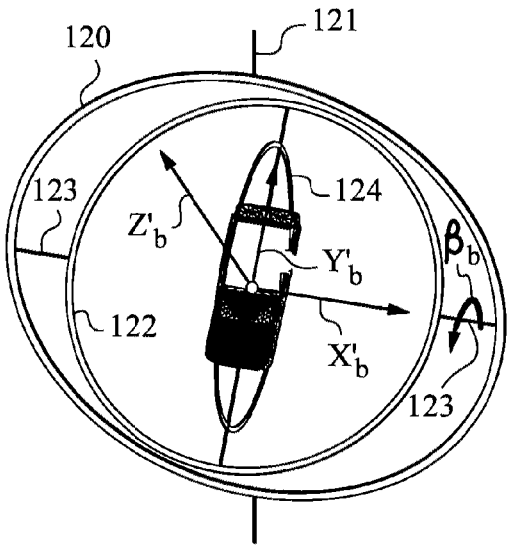

FIG. 3C depicts the second rotation by angle $\beta_b$. This rotation is performed by rotating joint 123 and thus turning hoop 122. Since joint 123 is co-axial with once rotated body axis $X_b''$ (see FIG. 3B) such rotation is equivalent to second rotation in body coordinates $(X_b, Y_b, Z_b)$ of phone 104 by angle $\beta_b$ around body axis $X_b''$. In the counter-clockwise rotation convention we have adopted angle $\beta_b$ is positive and equal to 45°. After completion of this second rotation, body coordinates $(X_1, Y_b, Z_b)$ are unprimed again to yield twice rotated body axes $(X_b', Y_b', Z_b')$.

Figure 3D:
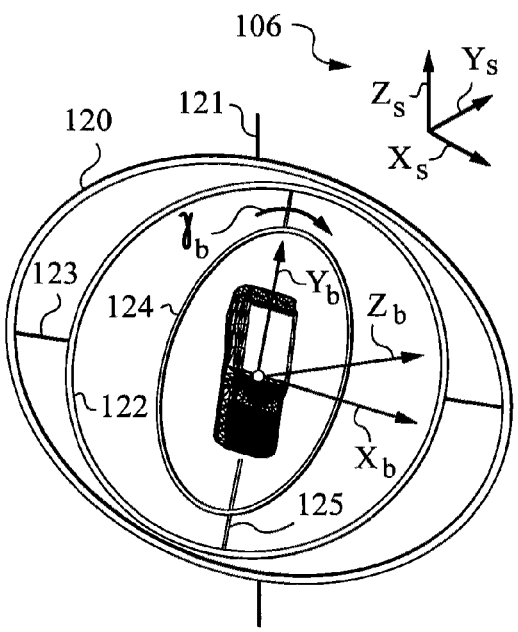

The result of the third and last rotation by angle $\gamma_b$ is shown in FIG. 3D. This rotation is performed by rotating joint 125, which turns innermost hoop 124 of gimbal mechanism 118. The construction of mechanism 118 used for this visualization has ensured that throughout the prior rotations, twice rotated body axis $Y_b'$ (see FIG. 3C) has remained co-axial with joint 125. Therefore, rotation by angle $\gamma_b$ is a rotation in body coordinates $(X_b, Y_b, Z_b)$ parameterizing moving frame 112 of phone 104 by angle $\gamma_b$ about body axis $Y_b'$.

This final rotation yields the fully rotated and now unprimed body coordinates $(X_b, Y_b, Z_b)$. In this example angle $\gamma_b$ is chosen to be 40°, representing a rotation by 40° in the counter-clockwise direction. Note that in order to return fully rotated body coordinates $(X_b, Y_b, Z_b)$ into initial alignment with stable coordinates $(X_s, Y_s, Z_s)$ the order of rotations by angles $\alpha_b$, $\alpha_b$ and $\gamma_b$ needs to be taken in exactly the reverse order (this is due to the order-dependence or non-commuting nature of rotations in 3D space mentioned above).

It should be understood that mechanism 118 was employed for illustrative purposes to show how any 3D orientation of phone 104 consists of three rotational degrees of freedom. These non-commuting rotations are described or parameterized by rotation angles $\alpha_b$, $\beta_b$ and $\gamma_b$ around body axes $Z_b'''$, $X_b''$, and finally $Y_b'$. What is important is that this 3D rotation convention employing angles $\alpha_b$, $\beta_b$, $\gamma_b$ is capable of describing any possible orientation that phone 104 may assume in environment 100.

The description of trajectory 114 of C.O.M. 110 of phone 104 in environment 100 has been shown to have three translational degrees of freedom; here described in terms of displacements along $X_s$-, $Y_s$- and $Z_s$-axes of stable coordinates $(X_s, Y_s, Z_s)$. A compact description of trajectory 114 in terms of vector $r_s = (x_s, y_s, z_s)$ has also been introduced. We have additionally shown that the rotation of phone 104 can be described by three rotational degrees of freedom; parameterized by rotations around body axes $Z_b'''$, $X_b''$, and $Y_b'$ by angles $\alpha_b$, $\beta_b$ and $\gamma_b$ in that order. The rotations are executed while C.O.M. 110 remains fixed in stable coordinates $(X_s, Y_s, Z_s)$. Thus, the rotations do not change the definition of trajectory 114 as they do not affect the value of vector $r_s$.

Since the descriptions of absolute position and absolute orientation of phone 104 using body coordinates $(X_b, Y_b, Z_b)$ and stable coordinates $(X_s, Y_s, Z_s)$ are mutually independent, they can be combined. Such combination of vector $r_s$ and rotation angles $(\alpha_b, \gamma_b, \gamma_b)$ provides a compact description of the six (6) degrees of freedom available to phone 104 in three-dimensional environment 100. Specifically, the description of the six (6) degrees of freedom that will be employed herein is a direct combination of vector $r_s$ with the rotation angles, namely: $(x_s, y_s, z_s, \alpha_b, \beta_b, \gamma_b)$. To avoid future confusion and indicate that body axes $X_b$, $Y_b$ and $Z_b$ were originally aligned with stable coordinate axes $X_s$, $Y_s$ and $Z_s$, we will add the subscript "s" on of the three angles, thus referring to them as: $(x_s, y_s, z_s, \alpha_{sb}, \beta_{sb}, \gamma_{sb})$.

The joint description of the absolute position and the absolute orientation of phone 104 in stable coordinates $(X_s, Y_s, Z_s)$ is a parameterization of the absolute pose of phone 104. Turning back to FIGS. 1A-B, we can thus specify how phone 104 is held in stable coordinates $(X_s, Y_s, Z_s)$ by user 102 in different absolute positions and in various absolute orientations at times $t_1$ and $t_5$ in terms of the phone's 104 absolute pose parameters $(x_s, y_s, z_s, \alpha_{sb}, \beta_{sb}, \gamma_{sb})$ that use C.O.M. 110 as the reference point. In the present description absolute pose is thus parameterized by A.P.=$(x_s, y_s, z_s, \alpha_{sb}, \beta_{sb}, \gamma_{sb})$ where A.P.=A.P.(t), meaning that the absolute pose is a function of time. Indeed, since phone 104 can be moved in arbitrary ways by user 102 (unconstrained 3D motion) all of the components of absolute pose A.P. are typically functions of time.

Of course, many descriptions including those utilizing other concepts and coordinates could have been employed to describe or parameterize the absolute pose of phone 104 in stable frame 106. As a result, we need to clearly distinguish the six degrees of freedom available to phone 104 as a rigid body, from the description chosen to parameterize these six degrees of freedom. It is worth stressing that the model or description of the degrees of freedom is not the same as the degrees of freedom themselves. The model is merely a way to describe and talk about the degrees of freedom with the aid of the chosen parameters.

In the present embodiment, absolute pose will be expressed by the combination of vector $r_s$ with the rotation angles as defined above, namely A.P.=$(x_s, y_s, z_s, \alpha_{sb}, \beta_{sb}, \gamma_{sb})$. Since in our model these are descriptors of the six degrees of freedom, we will refer to $(x_s, y_s, z_s, \alpha_{sb}, \beta_{sb}, \gamma_{sb})$ as absolute pose parameters dictated by our specific parameterization of the absolute pose of phone 104 in stable frame 106. In doing so, we also recognize the fact that other types of parameters can be deployed in other mathematical conventions and descriptions. However, a person skilled in the art, will recognize that at their core, all of these descriptions are mathematically equivalent, as they express the fundamental geometrical properties of rigid body motion in 3D space.

It should also be recognized that additional degrees of freedom are in general available to bodies in 3D space. In most conventional approaches, these are the roto-vibrational degrees of freedom. Although they may be important for some applications, e.g., when phone 104 consists of elements that move with respect to each other (such as in the case of a flip-phone), we will not explicitly keep track of these in the present embodiments. A person skilled in the art will understand how to parameterize these additional degrees of freedom and use them in a complete description of the absolute pose of phone 104 if and as necessary.

As seen in FIGS. 1A-B, the interface of the invention further requires at least one stationary object 126 that has at least one feature 128 that is detectable via an electromagnetic radiation 130. In this embodiment, stationary object is a television 126 sitting on a table 208 and the detectable feature is its display screen 128. In the present embodiment, object 126 is thus stationary in stable frame 106.

Electromagnetic radiation 130 by which screen 128 is detectable is predominantly emitted by display screen 128 during operation. In general, however, electromagnetic radiation 130 may include ambient radiation or any radiation purposely reflected from screen 128.

It is important that feature 128, in this case screen 128, present a sufficient number and type of non-collinear optical inputs to establish a stable frame 134 in three-dimensional environment 100. In general, stable frame 134 may not be the same as stable frame 106. In fact, the positions and orientations of non-collinear optical inputs of screen 128 may be stationary, moving or even unknown in stable frame 106. We will discuss all situations below.

In the present embodiment, screen 128 defines a plane in 3D space of environment 100 and any number of points or regions on it, whether during active display operation or not, can be selected as the non-collinear optical inputs. Conveniently, it is edges 132 of screen 128 that are chosen as the non-collinear optical inputs. Edges 132 are line-like inputs and are mutually non-collinear. The reason for this choice is that edges 132 are most likely to provide high optical contrast and thus be more easily detectable via electromagnetic radiation 130 than any other portions of screen 128. In addition, one other non-collinear optical input from television 126 is selected to break the intrinsic symmetry of the rectangle of screen 128. In the present case, that additional non-collinear optical input is obtained from a feature or marking 129 on the upper left corner of television 126. Alternatively, a feature displayed on screen 128 or any other feature associated with television 128 can be used for this purpose. Marking 129 is a point-like input, or, if its area is used, it is an area-like input.

Preferably, all four edges 132 of screen 128 and marking 129 are used for non-collinear optical inputs to establish stable frame 134. Frame 134 is parameterized by frame coordinates which we will refer to as workspace or world coordinates $(X_w, Y_w, Z_w)$ for the purposes of the application. The reasons for this choice will become apparent later.

In the present embodiment, the origin of world coordinates $(X_w, Y_w, Z_w)$ is chosen to be coincident with the upper left corner of screen 128. A person skilled in the art will recognize, however, that as few as four point-like, fixed non-collinear optical inputs, e.g., in the form of point sources or point-like inputs, are sufficient to establish stable frame 134 in terms of its parameterization by world coordinates $(X_w, Y_w, Z_w)$. Even fewer points may be sufficient when more information about these points is provided. It should be noted that non-collinear in the sense employed in the present invention, (since any two points will always be collinear according to Euclidean geometry) means that the points are not all mutually collinear and that they establish a convex hull, which will be defined below.

In all embodiments, world coordinates $(X_w, Y_w, Z_w)$ are central to the interface because they define the position and orientation of the stationary object or television 126 in stable frame 134. In other words, although absolute pose expressed with absolute pose parameters $(x_s, y_s, z_s, \alpha_{sb}, \beta_{sb}, \gamma_{sb})$ of phone 104 is completely defined in stable coordinates $(X_s, Y_s, Z_s)$ using C.O.M. 110 as the reference point, for the purposes of many interfaces and applications these absolute pose parameters $(x_s, t_s, z_s, \alpha_{sb}, \beta_{sb}, \gamma_{sb})$ have to be related to world coordinates $(X_w, Y_w, Z_w)$. In some cases, world coordinates $(X_w, Y_w, Z_w)$ are more important that stable coordinates $(X_s, Y_s, Z_s)$, as they may represent the coordinates of a workspace for human user 102. In fact, world coordinates should be understood to subsume coordinates for workspaces, gaming spaces, operation spaces and the like.

The relationship between stable frames 106 and 134 and between their descriptions by stable coordinates $(X_s, Y_s, Z_s)$ and world coordinates $(X_w, Y_w, Z_w)$ can be captured in many ways. For example, one can fix the absolute pose of stationary object or television 126 in stable frame 106 and measure its position and orientation in it. For this purpose we introduce a vector $d_s$ corresponding to the displacement of upper left corner of screen 128. Vector $d_s$ thus marks the displacement of the origin of world coordinates $(X_w, Y_w, Z_w)$ parameterizing stable frame 134 from the origin of stable coordinates $(X_s, Y_s, Z_s)$. It is helpful in this situation if stable coordinates $(X_s, Y_s, Z_s)$ are coincident and aligned with a corner in environment 100, e.g., the corner of a room. In such cases, vector $d_s$ can be measured while arranging television 126, and its absolute orientation in stable coordinates $(X_s, Y_s, Z_s)$ could be ensured by aligning screen 128 plane-parallel to wall 108.

Alternatively, when stationary object 126 is designed to stay in the same place in environment 100, which is usually true of television 126 but may not be true of other objects (e.g., mobile objects) in other embodiments, one can simply choose world coordinates $(X_w, Y_w, Z_w)$ of frame 134 to be the same as stable coordinates $(X_s, Y_s, Z_s)$ that parameterize frame 106 of environment 100. In this case, it is frame 134 and hence the position and orientation of television 126 in environment 100 that defines stable coordinates $(X_s, Y_s, Z_s)$ and concurrently world coordinates $(X_w, Y_w, Z_w)$.

In the embodiment depicted in FIGS. 1A-B and in FIG. 2 stable coordinates $(X_s, Y_s, Z_s)$ are not coincident and not collinear with world coordinates $(X_w, Y_w, Z_w)$. However, vector $d_s$ is known (e.g., by direct measurement with a measuring tape) and the relative orientation of axes $X_w, Y_w$ and $Z_w$ with respect to axes $X_s, Y_s$ and $Z_s$ is also known. For example, direction cosines or even the same rotation convention as described in FIGS. 3A-D can be used to describe the relative difference in orientation between stable coordinates ($X_s$, $Y_s$, $Z_s$) and world coordinates ($X_w$, $Y_w$, $Z_w$) with three rotation angles $\alpha_{sw}$, $\beta_{sw}$ and $\gamma_{sw}$.

In the present embodiment, a coordinate transformation between stable coordinates ($X_s$, $Y_s$, $Z_s$) and world coordinates ($X_w$, $Y_w$, $Z_w$) can be used to translate absolute pose parameters ($x_s$, $y_s$, $z_s$, $\alpha_{sb}$, $\beta_{sb}$, $\gamma_{sb}$) of phone 104 into its absolute pose parameters ($x_w$, $y_w$, $z_w$, $\alpha_{wb}$, $\beta_{wb}$, $\gamma_{wb}$) in world coordinates ($X_w$, $Y_w$, $Z_w$). In this transformation we introduce vector $r_w$ from the origin of world coordinates ($X_w$, $Y_w$, $Z_w$) to C.O.M. 110 of phone 104. In addition, the rotational angles $\alpha_{sb}$, $\beta_{sb}$ and $\gamma_{sb}$, have to be converted into the orientation of fully rotated body coordinates ($X_b$, $Y_b$, $Z_b$) with respect to world coordinates ($X_w$, $Y_w$, $Z_w$) rather than stable coordinates ($X_s$, $Y_s$, $Z_s$). Such conversion is performed with the aid of a rotation matrix $R_{sw}$ that keeps track of the rotations that are required to obtain alignment between the axes of stable coordinates ($X_s$, $Y_s$, $Z_s$) and the axes of world coordinates ($X_w$, $Y_w$, $Z_w$). Note that in representing matrices we extend our convention adopted for vectors and designate such rotation matrices by boldfaced letters. However, because a matrix is higher-order than a vector (vectors are $1^{st}$ order tensors, matrices are $2^{nd}$ order tensors, while scalar quantities can be thought of as $0^{th}$ order tensors) we use capital letters for denoting matrices.

The resulting absolute pose in world coordinates ($X_w$, $Y_w$, $Z_w$) expressing the six degrees of freedom of phone 104 is then parameterized by ($x_w$, $y_w$, $z_w$, $\alpha_{wb}$, $\beta_{wb}$, $\gamma_{wb}$). More precisely, $r_w = (x_w, y_w, z_w)$ is the new displacement vector of C.O.M. 110 and ($\alpha_{wb}$, $\beta_{wb}$, $\gamma_{wb}$) are the transformed angles expressing the orientation of phone 104. As remarked above, the angles are obtained by applying rotation matrix $R_{sw}$ containing rotation angles ($\alpha_{sw}$, $\beta_{sw}$, $\gamma_{sw}$) and thus adjusting for the misalignment of coordinate axes between stable coordinates ($X_s$, $Y_s$, $Z_s$) and world coordinates ($X_w$, $Y_w$, $Z_w$).

A person skilled in the art will recognize that coordinate transformations are routine operations. They are described by corresponding vector operations to account for displacements or offsets and rotation matrices to account for the rotations. It is important in doing such transformations to preserve the correct handedness of the coordinates chosen (right-handed or left-handed) in order to avoid improper solutions. The corresponding mathematics will not be discussed herein as it has been well known for several centuries. An excellent background on coordinate transformations in many different coordinate systems is found in G. B. Arfken and H. J. Weber, "Mathematical Methods for Physicists", Harcourt Academic Press, $5^{th}$ Edition.

Stable coordinates ($X_s$, $Y_s$, $Z_s$) typically parameterize a stable and stationary frame of reference 106 in which user 102 resides with phone 104 (e.g., on the surface of plant Earth). Also note that in some rare cases stable coordinates ($X_s$, $Y_s$, $Z_s$) may even parameterize an actual inertial frame, e.g., on a spaceship in outer space. Meanwhile, object or television 126 and world coordinates ($X_w$, $Y_w$, $Z_w$) defined with the aid of its non-collinear features may be moving in environment 100, i.e., its position in stable coordinates ($X_s$, $Y_s$, $Z_s$) that parameterize stable frame 106 in environment 100 may be changing. In this case, the coordinate transformation between stable coordinates ($X_s$, $Y_s$, $Z_s$) and world coordinates ($X_w$, $Y_w$, $Z_w$) is time-dependent may need to be updated on a frequent basis.

Embodiments in which stationary object 126 is actually at rest in stable coordinates ($X_s$, $Y_s$, $Z_s$) and is thus also stationary for the purposes of the interface and the application of the present invention are the simplest. In these embodiments, the coordinate transformation between stable coordinates ($X_s$, $Y_s$, $Z_s$) that parameterize frame 106 in environment 100 and world coordinates ($X_w$, $Y_w$, $Z_w$) that are used to parameterize frame 134 in environment 100 for the purposes of the interface and the application need only be computed once. Of course, both stable coordinates ($X_s$, $Y_s$, $Z_s$) and world coordinates ($X_w$, $Y_w$, $Z_w$) may also specify a common non-inertial frame in which user 102, item 104 and stationary object 126 all reside (e.g., when aboard a plane, train, car or other aircraft or terrestrial vehicle that undergoes accelerated or curvilinear motion). Those situations are more complex and will be discussed later (e.g., see FIGS. 16 & 17 and corresponding description).

Figure 4A:
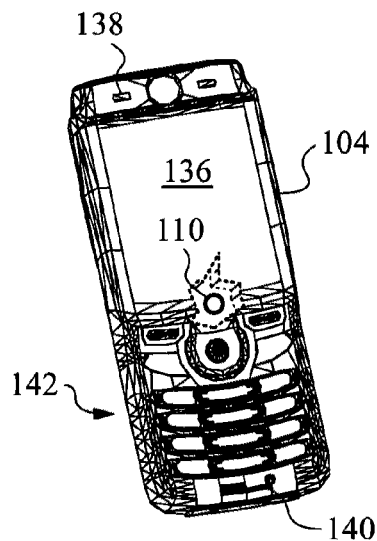
Figure 4B:
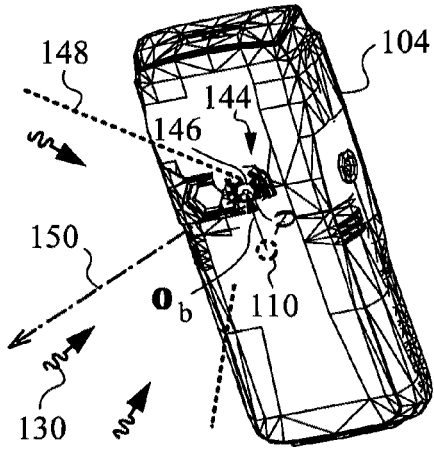

FIGS. 4A-B will now be referred to in order to develop a deeper understanding of phone 104 and its capabilities. FIG. 4A is a three-dimensional front view of phone 104 with a central cut-out section that exposes the reference point or C.O.M. 110. Phone 104 has on-board resources that include a display screen 136, speakers 138 adapted for a human ear, microphone 140 adapted for a human mouth and selection buttons 142. Buttons 142 include dial buttons as well as other selection buttons that allow user 102 to activate a unit 144 on-board the phone 104 for receiving electromagnetic radiation 130.

FIG. 4B shows the back of phone 104 where unit 144 resides. On-board unit 144 in this case is an on-board camera with an imaging lens 146. Lens 146 has a field of view 148 and an optical axis 150. Field of view 148 is sufficiently large to permit phone 104 to image a significant portion of environment 100, and especially of television 126 from the various absolute poses in which user 102 is expected to hold phone 104. Further, the letter $\mathcal{P}$ designates a point-of-view (P.O.V.) of camera 144. In this embodiment, phone 104 is also configured to display a view of environment 100 as imaged by camera 144 from point of view $\mathcal{P}$ on its display screen 136 (although this is an optional feature from the point of view of the interface of present invention).

Note that point-of-view $\mathcal{P}$ of camera 144 does not coincide with C.O.M. 110 of phone 104 in this embodiment. Indeed, few if any phones are built in a way to ensure that C.O.M. 110 coincides with the point(s)-of-view of their on-board camera(s). Thus, there is usually an offset vector $o_b$ (expressed in body coordinates ($X_b$, $Y_b$, $Z_b$) as defined below; also see FIG. 5) between C.O.M. 110 of phone 104 and point-of-view $\mathcal{P}$ of camera 144.

Offset vector $o_b$ is used to recover and properly report absolute pose of phone 104 in terms of absolute position parameters A.P. This is necessary because the determination of absolute pose of phone 104 is based on radiation 130 that is captured and imaged by camera 144 from point-of-view $\mathcal{P}$ rather than from the "point-of-view" of C.O.M. 110. Transformation of spatial information from point-of-view $\mathcal{P}$ to C.O.M. 110 is once again accomplished by a coordinate transformation. In fact, since C.O.M. 110 and point-of-view $\mathcal{P}$ are fixed with respect to each other, the transformation simply involves adjustment of absolute pose by vector $o_b$ without any rotations given proper choice of camera coordinates (e.g., alignment of camera image plane $X_i$-$Y_i$ with the $X_b$-$Y_b$ plane of body coordinates). In the event of lack of alignment, an additional rotation matrix will need to be applied. The details of coordinate transformations required are well known and, as pointed out above, are discussed in detail in G. B. Arfken and H. J. Weber, "Mathematical Methods for Physicists", Harcourt Academic Press, $5^{th}$ Edition.

Figure 5:
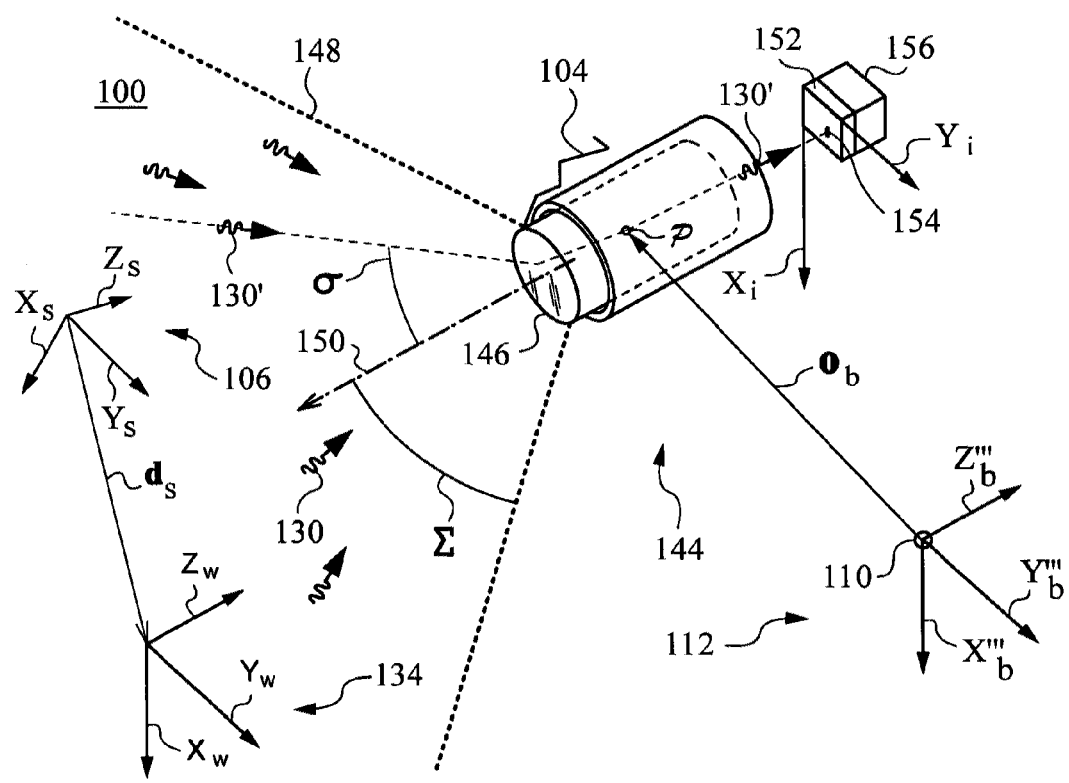

FIG. 5 is a schematic view showing the relevant parts of on-board camera 144 required to support an interface of the present invention. Here, field of view 148 of lens 146 is parameterized in terms of a cone angle $\Sigma$ measured from optical axis 150. Radiation 130 arriving from field of view 148 within cone angle $\Sigma$ is imaged by lens 146 onto a photosensor 152. Photosensor 152 has an image plane parameterized by image coordinates $(X_i, Y_i)$ that have an origin in the upper left corner of photosensor 152. For purposes of simple coordinate transformation, image plane $X_i$-$Y_i$ is preferably plane-parallel with the $X_b$-$Y_b$ plane of body coordinates 112 $(X_b, Y_b, Z_b)$ of phone 104. Photosensor 152 is a photodetector such as a pixellated array of photodiodes, a CMOS camera, a position sensing device (PSD), a CCD camera or any other suitable photosensitive element capable of detecting radiation 130.

The propagation of a particular photon bundle 130' belonging to radiation 130 is shown explicitly in FIG. 5. Photon bundle 130' undergoes refraction at the surface of lens 146, passes through point-of-view $\mathcal{P}$ and is imaged onto photosensor 152 at an image point 154. Note that the location of image point 154 in image plane $X_i$-$Y_i$ is largely determined by an angle $\sigma$ of propagation of photon bundle 130' with respect to optical axis 150 (also sometimes referred to as field angle), as well as the location in environment 100 from which photon bundle 130' has arrived and its wavelength $\lambda$. In the approximation of ideal pinhole behavior of lens 146, the imaging of radiation 130 emitted and/or reflected from different locations in environment 100 into cone angle $\Sigma$ yields a perspective projection of the imaged portion of environment 100 on the surface of photosensor 152. Photosensor 152, in turn, is connected to image processing electronics 156 which include requisite firmware and software for processing radiation 130 imaged on photosensor 152.

Due to the generally non-ideal nature of lens 146, some common distortions and aberrations are inherited in the imaged portion of environment 100. The removal of such distortions and aberrations (including barrel distortion, pincushion distortion, coma, astigmatism, dispersion, etc.) is well understood by persons skilled in the art. Preferably, image processing electronics 156 are capable of removing such distortions and aberrations prior to image processing for better interface performance.

It is also understood that although lens 146 is visualized as a single part, it may be a refractive lens, a reflective element, a compound lens, a catadioptric lens (refractive and reflective), a graded index lens (GRIN lens), a Fresnel element or any other optical element capable of gathering radiation 130 from field of view 148 and delivering it to photosensor 152 to produce a perspective projection of environment 100.

The perspective projection of environment 100 needs to include at least one stationary object, here television 126 along with its non-collinear optical inputs, here edges 132A-D of screen 128 and marking 129. Images 132A'-D', 129' of these non-collinear optical inputs are used to establish stable frame 134, parameterized by world coordinates $(X_w, Y_w, Z_w)$ with their origin in the upper left corner of screen 128. This requirement will dictate in many cases the minimum cone angle $\Sigma$ required for operating the interface of invention over a range of absolute poses of phone 104 acceptable to user 102.

Figure 6A:
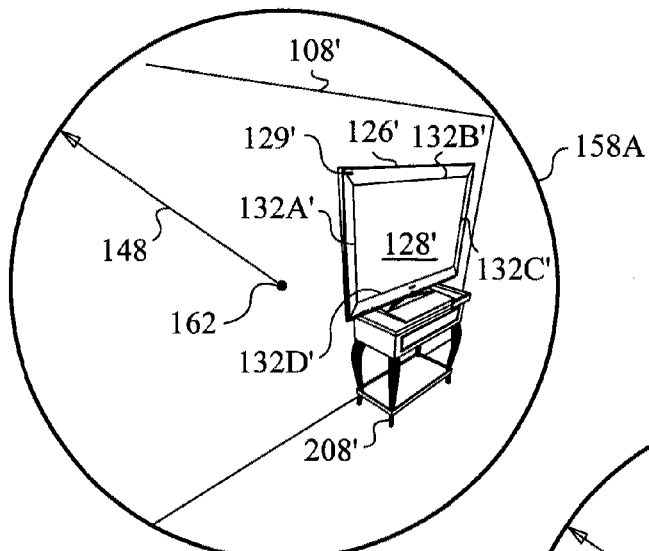
Figure 6B:
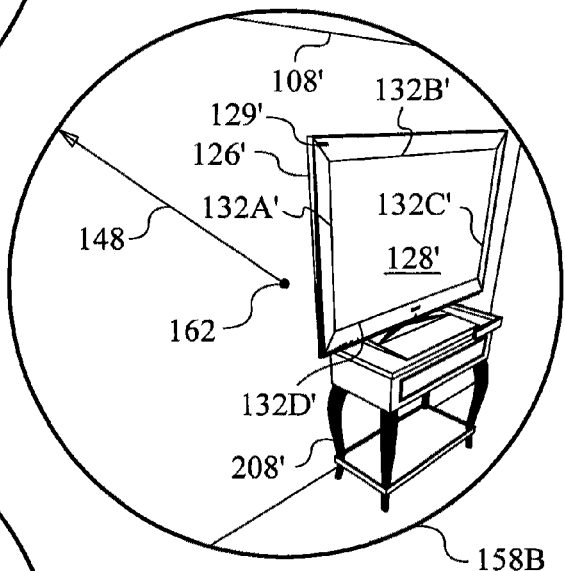
Figure 6C:
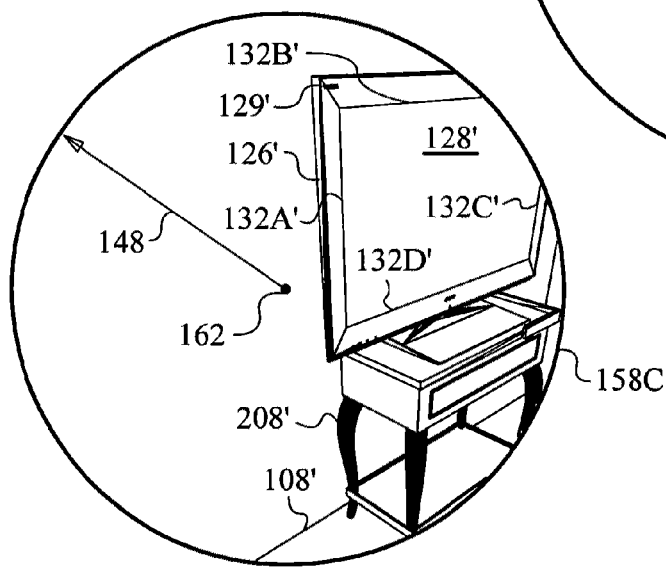

FIGS. 6A-C illustrate three images 158A-C of environment 100 produced by refraction of radiation 130 as it passes through lens 146 and impinges on photosensor 156. Images 158A-C are acquired using three different types of lens 146 from the same absolute pose of phone 104; namely about 6 feet ($\approx$2 m) away from television 126. All images 158A-C are centered on the same point on wall 108 to the left of television 126. As a result, image center 162 for all images 158A-C is the same.

Image 158A is obtained when lens 146 has a wide angular field of view 148. In other words, cone angle $\Sigma$ is large and may be on the order of 50° to 60° or more. Image 158 is obtained with a type of lens 146 that has an intermediate angular field of view 148 with a cone angle $\Sigma$ of between 30° and 50°. Finally, image 158C is produced when a type of lens 146 that has a narrow angular field of view 148 with a cone angle $\Sigma$ of less than 30°, such as about 20° or even less. All images contain imaged objects, including wall image 108' of wall 108, table image 208' of table 208 and television image 126' of television 126. Note that all images 158A-C are circular, since the angular field of view of lens 146 is usually circular.

In image 158A, image 126' of the stationary object for defining stable frame 134—in our case television 126 parameterized by world coordinates $(X_w, Y_w, Z_w)$ with an origin in the upper left corner of screen 128—is rather small. In other words, image 126' of television 126, and in particular screen image 128' does not subtend a significant angular extent of field of view 148. This is indicated in the drawing figure by a radius from the field's center. On the other hand, image 158A includes an image 108' of a significant portion of wall 108.

Lens 146 with such large angular field of view 148 is advantageous in situations where phone 104 will assume many different absolute poses within three-dimensional environment 100. That is because image 126' of television 126 and image 128' of screen 128 along with images 132A'-D' of its edges 132A-D and image 129' of marking 129 will remain in field of view 148 even when phone 104 is held at very oblique angles or close to screen 128.

On the other hand, lens 146 with a large angular field of view 148 is not advantageous when phone 104 will be operated far from screen 128 of television 126. That is because image 128' of screen 128 and images 132A'-D', 129' of its non-collinear optical inputs or edges 132A-D and marking 129 will subtend only a small field angle. In other words, screen image 128' will represent a small portion of total image 158A. Therefore, a convex hull or convex envelope of the set of all points along edges 132A-D delimiting screen 128 and points on marking 129 i.e., the area defined by edge images 132A'-D' and by image 129' of marking 129 is small. Working with a small convex hull will limit the resolution of the interface. Differently put, it will negatively impact the accuracy in the recovery of absolute pose of phone 104 from the non-collinear optical inputs and thus restrict the performance of the interface of the invention.

Image 158C shown in FIG. 6C is obtained with a lens 146 that has a small angular field of view 148. Here, television image 126' as seen by phone 104 from the same distance as image 158A, subtends a large portion of field of view 148. Indeed, a portion of television 126, namely its upper right corner, is not even imaged because it falls outside field of view 148.

Lens 146 with such a small field of view 148 is advantageous as it provides a large convex hull from images 132A'-D', 129' of edges 132A-D of screen 128 and its marking 129. Thus, the accuracy in absolute pose recovery of phone 104 from these non-collinear optical inputs can be very good. Further, it is advantageous to use such type of lens 146 when phone 104 is operated far from screen 128 and is not expected to assume absolute poses at large angles to screen 128. This ensures that a large portion of or preferably entire image 128' of screen 128 and image 129' of marking 129 will always be in field of view 148.

FIG. 6B shows image 158B obtained with lens 146 that has an intermediate field of view 148. As seen by camera 144 of phone 104 from the same distance as images 158A and 158C, entire image 128' of screen 128 and images 132A-D', 129' of its edges 132A-D and marking 129 are in field of view 148. This type of lens 146 is preferred for most interfaces according to the invention because it strikes a good balance between range of operation of phone 104 and accuracy of absolute pose recovery. In particular, it can capture images 128', 129' of screen 128 and marking 129 from many absolute poses of phone 104, both far and close to television 126, e.g., between roughly about 15 feet (≈5 m) and roughly about 3 feet (≈1 m). This is true even when camera 144 is held at an oblique angle to screen 128, e.g., 45° inclination with respect to the plane of screen 128 or the $X_w$-$Y_w$ plane defined in world coordinates $(X_w, Y_w, Z_w)$. At the same time, intermediate field of view 148 ensures that a sizeable convex hull or envelope of non-collinear optical inputs defined by images 132A-D', 129' of edges 132A-D and marking 129 will be present in image 158B. This fact enables high accuracy absolute pose recovery and hence good interface performance.

For high performance, additional optical requirements on lens 146 and camera 144 should be enforced. These requirements derive from the specific design of the interface and the use cases. It should be noted that in general it is impossible to specify a set of optimal optical requirements to fit all embodiments. Therefore, the below guidelines are provided so that a person skilled in the art will be able to choose best type of lens 146 and camera 144 based on a balance between operating conditions, performance and cost.

First and foremost, lens 146 needs to capture a sufficient level or intensity of electromagnetic radiation 130. That is because image 158B must provide a computable-quality image 128' of screen 128 with its non-collinear optical inputs or edges 132A-D and of image 129' of marking 129. Specifically, the quality of image 128' must permit extraction of the imaged non-collinear optical inputs to enable absolute pose recovery of phone 104. For this reason it is advantageous to choose a small F-number lens 146, e.g., between about 1.2 and about 2.8, to ensure that even in low-light conditions lens 146 captures the requisite number of photons of radiation 130.

Second, lens 146 should preferably have a large depth-of-field. In other words, lens 146 should preferably be a quasi-pinhole lens so that objects near and far within angular field of view 148 remain in focus. The main reason is that it is hard to extract features if the image is too defocused. In addition, pinhole behavior is desirable because algorithms for absolute pose recovery of phone 104 are based on image 158B presenting a perspective projection of environment 100. In other words, pose recovery algorithms assume that the images can be treated as if they had been taken with a pinhole camera.

Depending on the difference in wavelengths or spectrum of radiation 130 employed, chromatic dispersion could be a problem. A way to address chromatic dispersion, which alters the focal distance with wavelength $\lambda$, is to ensure that lens 146 is effectively corrected for chromatic aberration. Alternatively, radiation 130 of a single and well-known wavelength $\lambda$ can be used to avoid chromatic dispersion issues.

Third, lens 146 and camera 144 should capture images 158B of three-dimensional environment 100 at an appropriate frame rate and exposure time $t_e$. The frame rate will depend on the rate of change in absolute pose of phone 104. The faster phone 104 is being translated and rotated by user 102 during operation, the higher the frame rate or corresponding shutter speed of camera 144 should be set for capturing image 158B. Additionally, the exposure time $t_e$ during the frame should be sufficiently long to capture enough radiation 130 to generate the best possible image 158B, but not so long as to incur motion blur. Under operating conditions where rapid changes in absolute pose are expected a short exposure time is a must to avoid motion blur. In fact, there are certain parameters of absolute pose $(x_w, y_w, z_w, \alpha_{wb}, \beta_{wb}, \gamma_{wb})$ e.g., orientation parameters such as angles $\alpha_{wb}$ and $\gamma_{wb}$, that can produce massive motion blur even at relatively modest rates of change (e.g., on the order of several degrees per second). Meanwhile, pure translations of phone 104 (e.g., along the three translational degrees of freedom) tend to produce much lower levels of motion blur. (The reader will realize that this is due to the large linear velocity associated with even a small angular velocity at a large distance away from the center of rotation.)

Fourth, lens 146 should produce minimal levels of optical aberrations and distortions in image 158B. Optical distortions are deviations from perfect perspective projection of environment 100 to image 158B on photosensor 152 of camera 144. As already noted above, such distortions typically include barrel distortion or pincushion distortion. Parallax is a distortion inherent in most wide-angle (fisheye) lenses. It occurs when the chief rays of all object points do not all intersect optical axis 150 of lens 146 at a single point, i.e., at point-of-view $\mathcal{P}$. This can be avoided by using reflective imaging optics incorporating a conic section of revolution as a reflective surface. For details on such optics the reader is referred to U.S. Pat. Nos. 7,038,846 and 7,268,956 as well as the references cited therein.

Another kind of lens imperfection is aberration including spherical aberration, coma, astigmatism etc. These aberrations limit the ability of lens 146 to image rays of radiation 130 from a point object in environment 100 to a perfect point in image 158B. Although some of these distortions and aberrations can be effectively removed by image processing electronics 156, it is advantageous that lens 146 be relatively aberration- and distortion-free to reduce the amount of processing dedicated to remediation of these detrimental effects in the image.

Fifth, lens 146 should be small and easy to implement in phone 104. It should preferably be moldable from typical optical materials, e.g., acrylic or other plastic, and it should be manufacturable in large quantities. That means that it should not involve difficult to mold surfaces, such as highly curved surfaces or surfaces having unusual lens prescriptions.

Figure 13:
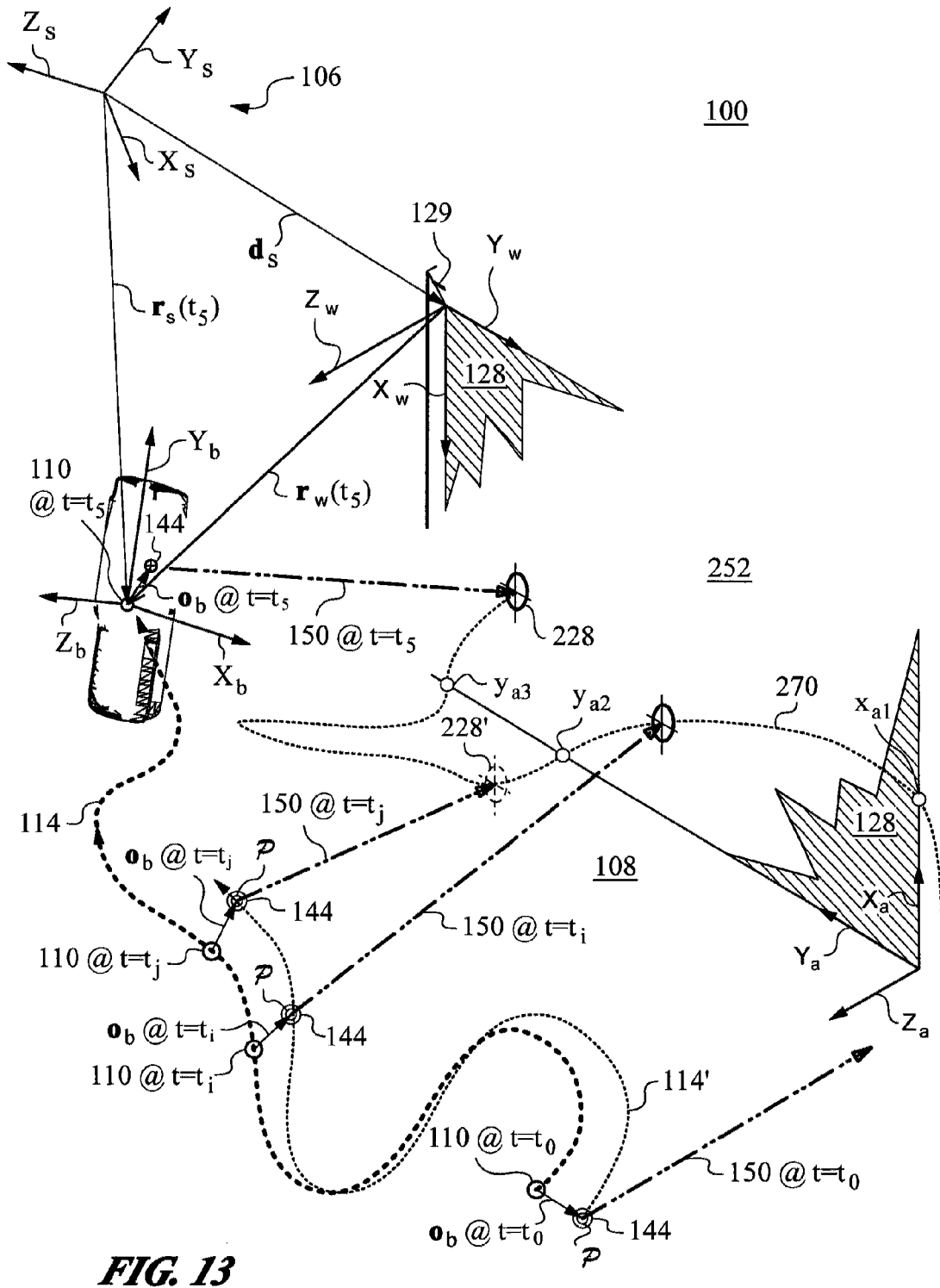
FIG. 13 is a three-dimensional diagram showing in more detail how the input signal generated by the interface and being related to all six absolute pose parameters of the item manipulated by the user is received and employed in the application.

After selecting appropriate lens 146 based on the above guidelines and any further requirements specific to the application and interface, it is important to address any residual imaging problems. FIG. 7A illustrates image 160A' (corresponding to full circular image 158B) of three-dimensional environment 100 obtained with lens 146 having an intermediate angular field of view 148 as displayed on display screen 136 of phone 104. Image 160A' is captured at time $t_1$ when phone 104 is held in the first absolute pose by user 102 in his/her right hand 102' as shown in FIG. 1A. Meanwhile, FIG. 7B illustrates image 160B' of three-dimensional environment 100 also obtained with lens 146 having an intermediate angular field of view 148, but taken at time $t_5$ when phone 104 is held in the second absolute pose by user 102 in his/her left hand 102" as shown in FIG. 13.

Images 160A' and 160B' as seen on screen 136 are rectangular rather than circular. This is unlike images 158A-C shown in FIGS. 6A-C that capture the entire angular field of view 148 of lens 146. The reason is that in practice the entire image circle may not always be captured by camera 144. Most photosensors such as pixellated photosensor 152 of camera 144 are rectangular or square. Thus, one option is for the image circle of image 160A' to be inscribed within the rectangular pixel array and underfill photosensor 152 to ensure capture of the entire angular field of view 148 afforded by lens 146. In this case, many peripheral pixels that lie in the corners of photosensor 152 are never used (no radiation 130 will be delivered to them through lens 146). Alternatively, the image circle of images 160A' can circumscribe or overfill by extending beyond the rectangular array of pixels of photosensor 152. Thus a portion of images 160A', 160B' near the periphery of the angular field of view 148 will "fall off" photosensor 152 and not be registered by camera 144. In the present embodiment, images 160A', 160B' underfill photosensor 152. The entire image circle afforded by lens 146 is thus captured by photosensor 152 and digitized.

Referring now to FIG. 7A, we examine the perspective projection of three-dimensional environment 100 in two-dimensional image 160A'. It is well known that perspective projections obey certain fundamental geometrical theorems on vanishing points, horizon lines, single and multiple-point perspectives, surface normals and the famous Desargues' theorem of projective geometry. In the present case, lines corresponding to extensions of the edges of wall image 108' converge to two vanishing points 164, 166. More precisely, the perspective projection in image 160A' exhibits two vanishing points 164, 166 both lying on a horizon line 168 and yielding a two-point perspective view of environment 100. Extensions of edge images 132A'-D' (since television 126 was oriented to be plane-parallel with wall 108 and its edges 132A-D are thus parallel to the edges of wall 108) also converge to the same vanishing points 164, 166 residing on horizon line 168 drawn in a dashed and dotted line.

Of course, vanishing points and horizon lines are mathematical constructs and not tangible parts of image 160A'. Furthermore, for most absolute poses assumed by phone 104 in the hands of user 102 vanishing points 164, 166 will fall well outside image 160A' projected on photosensor 152 and displayed on screen 136. Indeed, this is the case here as well, with only a small section of horizon line 168 actually intersecting image 160A'.

In order for the interface of the invention to recover the absolute pose of phone 104 accurately it is crucial that the perspective projection of environment 100 in image 160A' be very accurate. Indeed, it is well known in the fields of computer vision, robotic vision and navigation that very good imaging quality must be achieved if algorithms for camera pose recovery are to accurately report absolute pose parameters, such as $(x_w, y_w, z_w, \alpha_{wb}, \beta_{wb}, \gamma_{wb})$ or any other typical absolute pose parameters employed to parameterize the six degrees of freedom available to phone 104. In view of the above, image deviations have to be cured to the extent possible.

Referring now to FIG. 7B, we see image 160B' also yields a perspective projection of environment 100. This time, image 160B' corresponds to environment 100 as witnessed by camera 144 from point-of-view $\mathcal{P}$ (see FIG. 5) in the second absolute pose of phone 104, when held by user 102 in left hand 102" at time $t_5$ as shown in FIG. 1B. Here, extensions of the lines corresponding to edges of wall image 108' and extensions of images of edges 132A'-D' of television screen image 128' converge to vanishing points 180, 182 on a horizon line 184 on the other side of screen 136.

Now, in an enlarged section 186 of image 160B' we see that a portion of image 108' of wall 108, namely image 108A' of the edge of wall 108, shows a significant deviation 108A" from a straight line. For purposes of better visualization, deviation 108A" is greatly exaggerated in FIG. 7B. Deviation 108A" increases as a function of distance from image center 162. In other words, deviation 108A" is a radial function and is just due to distortions caused by lens 146. A person skilled in the art should realize that imperfections in lens 146, overall misalignments between point of view $\mathcal{P}$ and center of photosensor 152, imperfect plane alignment between image plane $X_i$-$Y_i$ of lens 146 and the actual plane of photosensor's 152 surface, as well as various other mechanical tolerances may introduce significant distortions that can not be accounted for with a purely radial function associated with lens 146. Those imperfections may introduce significant errors, since parallel lines will not necessarily intersect in a unique vanishing point due to lens imperfections. As a result, we deviate from the assumption of a perfect perspective projection and introduce errors in the calculated pose. These issues are well understood in the art and will not be reiterated herein. The reader is referred to resources such as the textbook by Warren J. Smith, "Modern Optical Engineering", SPIE Press, The McGraw-Hill Companies (ISBN 978-0-07-147687-4).

When the only significant deviation 108A" is a radial function of lens 146, undistortion of image 160B' can be undertaken by a simple undistortion correction or re-mapping of all points of image 160B'. FIG. 8 illustrates a radial distortion curve 186 of lens 146 that is used for such undistortion. A "perfect" curve 188, depicted for comparison in FIG. 8, is a straight line according to which radiation 130 arriving at the refractive surface of lens 146 from environment 100 at different field angles σ is mapped at different image radii $r_i$ measured from image center 162. The actual value of radius $r_i$ is indicated in pixels.

Our radial distortion curve 186 (barrel distortion) however, is not a straight line and its divergence from perfect curve 188 increases with radius $r_i$. (The opposite distortion in which the divergence decreases with radius is called pincushion distortion.) In practice, distortion curve 186 may be approximated by a polynomial or a higher-order curve to directly assign field angle σ to image radius $r_i$ or even directly to the corresponding pixel 190 in image plane $X_i$-$Y_i$. This may be done to save processing time in certain embodiments with a corresponding look-up table, rather than performing the undistortion calculation each time. In fact, fisheye lenses manufactured for video cameras regularly come with "warping" software for correction of barrel or pincushion distortion.

Figure 9:
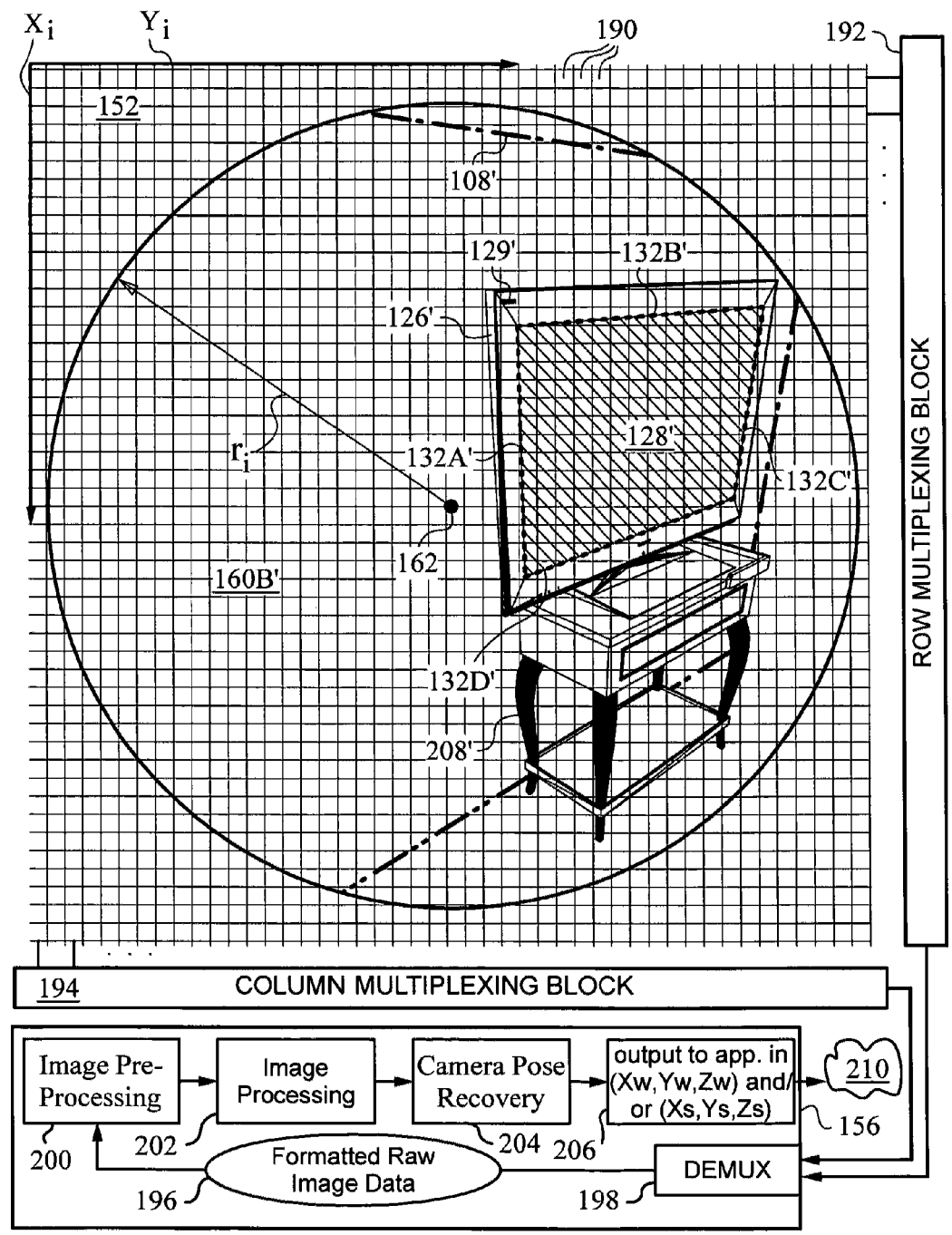
FIG. 9 is a plan diagram of the photosensor and processing elements employed by the item associated with the human user as shown in FIGS. 1A-B.

FIG. 9 is a diagram that shows the surface of photosensor 152 of camera 144 with image radius $r_i$ indicated from image center 162 to the circular periphery of image 160B'. Image radius $r_i$ corresponds to angular field of view 148 and underfills photosensor 152, as remarked above. Photosensor 152 is a pixellated CMOS sensor with pixels 190. Note that radius $r_i$ for curves 186, 188 graphed in FIG. 8 is quantified by number of pixels 190 from image center 162 rather than standard metric units. Meanwhile, the origin of the image coordinates $(X_i, Y_i)$ is indicated in the upper left corner of CMOS 152 (see also image parameterization found in FIG. 5).

Image 160B' is a perspective projection. It contains details such as images of non-collinear optical inputs or edges 132A'-D' and of marking 129' as well as edges 108' of wall 108 and table image 208'. These are indicated directly on pixels 190 of CMOS 152. Note that only a fraction of pixels 190 belonging to CMOS 152 is drawn in FIG. 9 for reasons of clarity. A normal array of pixels 190 in CMOS 152 will range from 1,000×1,000 to several thousands per side, and the pixel array need not be square. The radius $r_i$ in practical and ideal radial distortion curves 186, 188 of FIG. 8 is measured from center 162. Thus, for example, for a 2,000 by 2,000 array of pixels 190, image center 162 from which $r_i$ is measured will fall approximately on the $1,000^{th}$ pixel 190 along $X_i$-axis and on the $1,000^{th}$ pixel 190 along $Y_i$-axis. The reason that this relationship is approximate is due to the various mechanical misalignments, optical aberrations and distortions as well as other tolerances and errors. In fact, the exact location of image center 162 should preferably be ascertained and corrected for in well-known ways when high quality interface performance is desired.

The diagram of FIG. 9 unveils the main parts of camera 144 and elements of image processing electronics 156. Specifically, camera 144 has a row multiplexing block 192 for interacting with rows of pixels 190. It also has a column multiplexing block 194 for interacting with columns of pixels 190. Blocks 192, 194 are connected to a demultiplexer 198 for receiving raw image data 196 from pixels 190 ordered in accordance with any multiplexing scheme. Depending on the level of sophistication of camera 144, blocks 192, 194 may be capable of collecting raw image data 196 only from designated rows or columns of pixels 190. In an advanced camera 144, blocks 192, 194 may be able to designate regions of interest defined by groups of pixels 190 and only report raw image data 196 from such regions of interest. Note that in some cameras, blocks 192, 194 are replaced by a single block or still other multiplexing and pixel control electronics.

In the present embodiment, blocks 192, 194 simply report the image values of pixels 190 from an exposure taken during one frame (shutter frame). Thus, for the purposes of the interface of invention, raw image data 196 are preferably simple gray scale values expressed in binary as 8-bit integers ranging from 0 to 255. Demultiplexer 198 is configured to receive such 8-bit raw image data 196 from all pixels 190 and to format it for image pre-processing. Such formatting may include, but is not limited to, the removal of latency and time effects due to shuttering conventions (e.g., use of rolling shutter vs. global shutter), enforcement of pixel reporting order and other functions well known in the art of formatting raw image data 196.

Demultiplexer 198 is connected to image pre-processing unit 200, which receives formatted raw image data 196. Pre-processing unit 200 performs dewarping (a.k.a. un-warping), realignment, normalization and smoothing functions. Specifically, pre-processing unit 200 re-aligns image 160B' based on relative position (distance, offset, tilt, etc.) of photosensor 152 with respect to lens 146. Preferably, such relative position and its tolerances are determined prior to the use of camera 144 in the interface of the present invention.

Unit 200 also dewarps image 160B' based on known distortions of lens 146 including re-mapping of the values of pixels 190 in accordance with radial distortion curve 186 from FIG. 8. In addition, unit 200 may normalize the values of pixels 190, remove shot noise and dead pixels, apply smoothing functions and perform any other well known adjustments or image enhancements as necessary.

Unit 200 is connected to image processing unit 202. Unit 202 receives the corrected image from unit 200 and applies the processing steps necessary to recognize images of the non-collinear features or edges 132A'-D' belonging to screen 128 and of marking 129' of television 126. A person skilled in the art will recognize that numerous image segmentation, contrast enhancement, edge detection and noise reduction techniques are known for performing this task. Some of the best known include: the Sobel edge detector, the Canny edge detector and various versions of the Hough transform in combination with Gaussian filters. In fact, any known technique can be employed herein based on the type of environment 100, television 126, amount of radiation 130 and other standard optics and signal processing considerations known to those skilled in the art.

Typically, unit 202 first applies a differential filter to image 160B' to enhance edge contrast. In the present case, when television 126 is on and screen 128 is active, the edges of screen 128 present high contrast ratio non-collinear optical inputs (they are therefore relatively easy to find in image 160B'). Unit 202 segments image 160B' and applies the selected edge detection algorithm. Depending on the application and as discussed below, unit 202 may also be programmed to detect images of wall edges 108' in order to ascertain stable coordinates $(X_s, Y_s, Z_s)$ parameterizing stable frame 106 in environment 100. Edges or other features of wall 108 may be used as the corresponding non-collinear optical inputs.

The output of unit 202 is a complete image description of the rectangle formed by screen image 128' and either a point or area defined by marking image 129'. Such complete image description of edges 132A'-D' and marking 129' may include line approximations or equations, including line fits, such as a least squares fit. In addition, if required, unit 202 also outputs an image description of the rectangle formed by images of wall edges 108' and of table 208'.

A camera pose recovery unit 204 is connected to unit 202 for receiving its output. Unit 204 employs the geometrical description of the non-collinear optical inputs, namely the lines and points of screen image 128' and image of marking 129' to recover the absolute pose of camera 144 in accordance with well-understood principles widely employed in computer vision and robotics. Pose recovery is mathematically possible because vanishing points 180 and 182 as well as horizon line 184 and the size of screen image 128' fully determine the absolute pose of camera 144 based on its point-of-view $\mathcal{P}$. In practice, robust methods are used to deal with noise and imperfect modeling.

It should be noted that pose is also sometimes referred to as exterior orientation and translation in the fields of computer vision and robotics. In fact, in pose recovery algorithms as may be applied by unit 204 it is common to work with parameters that are different from absolute pose parameters $(x_w, y_w, z_w, \alpha_{wb}, \beta_{wb}, \gamma_{wb})$ used in mechanics to describe the rigid body motion of phone 104. Of course, any parameterization ultimately describes the six degrees of freedom available to phone 104 (or any rigid body bearing camera 144 whose pose is being recovered) and therefore a mathematical transformation can be used to move between the rigid body description predominantly used in mechanics (and physics) and the computer vision description.

In camera pose recovery unit 204 employing computer vision algorithms, absolute pose of phone 104 is described by means of a rotation and translation transformation that brings the object, in this case television 126 and more specifically its screen 128 and marking 129, from a reference pose to the observed pose. This rotation transformation can be represented in different ways, e.g., as a rotation matrix or a quaternion. The specific task of determining the pose of screen 128 in image 160B' (or stereo images or image sequence, as discussed further below) is referred to as pose estimation. The pose estimation problem can be solved in different ways depending on the image sensor configuration, and choice of methodology.

A class of pose estimation methodologies involves analytic or geometric methods. Once photosensor 152 is calibrated the mapping from 3D points in the scene or environment 100 and 2D points in image 160B' is known. Since the geometry and size of the object comprising the non-collinear optical inputs, i.e., screen 128, is known, this means that the projected screen image 128' is a well-known function of screen's 128 pose. Thus, it is possible to solve the pose transformation from a set of equations which relate the 3D coordinates of the points along edges 132A-D with their 2D image 132A'-D' coordinates.

Another class of methodologies involves learning based methods. These methods use an artificial learning-based system, which learns the mapping from 2D image features to pose transformation. In short, this means that a sufficiently large set of images 128', 129' of the non-collinear optical inputs produced by edges of screen 128 and marking 129 collected in different poses, i.e., viewed from different absolute poses of phone 104, must be presented to unit 204 during a learning phase. Once the learning phase is completed, unit 204 will be able to present an estimate of the absolute pose of camera 144 given images 128', 129' of screen 128 and marking 129.

Yet another class of methodologies involves solving the pose estimation and image calibration simultaneously. In such an approach unit 200 does not dewarp (or un-warp) image 160B' and instead an algorithm utilizes warped features. For example, an artificial learning-based system is presented with dewarped 2D image features for a large set of known poses. After the learning phase is completed the algorithm is then able to estimate pose from uncalibrated features.

In a vast majority of embodiments of the interface according to the present invention camera pose recovery unit 204 employs the first class of methods, i.e., analytic or geometric methods. That is because they are the most efficient, while keeping the computational burden within the limited computational range of image processing electronics 156. Specifically, on-board units, in this case camera 144, that are capable of receiving radiation 130 and processing images do not have sufficient computational resources and on-board power to implement processing-intensive algorithms for camera pose recovery. Thus, the algorithms being run by unit 204 should preferably consume just a small fraction of on-board processing resources.

To implement an efficient analytic or geometric method in unit 204, it is important to first calibrate camera 144. Calibration is performed prior to running the algorithm by presenting camera 144 with an image of screen 128' in a set of canonical positions and providing its physical measurements. Of course, in the present embodiment, television 126 may communicate with phone 104 wirelessly and provide the necessary information about its screen 128 to phone 104 and more specifically to unit 204 upon inquiry. For requisite teachings on camera calibration the reader is referred to the textbook entitled "Multiple View Geometry in Computer Vision" (Second Edition) by R. Hartley and Andrew Zisserman. Another useful reference is provided by Robert Haralick, "Using Perspective Transformations in Scene Analysis", Computer Graphics and Image Processing 13, pp. 191-221 (1980). For still further information the reader is referred to Carlo Tomasi and John Zhang, "How to Rotate a Camera", Computer Science Department Publication, Stanford University and Berthold K. P. Horn, "Tsai's Camera Calibration Method Revisited", which are herein incorporated by reference.

Now, as already remarked, camera pose recovery unit 204 receives output of unit 202 in the form of a complete image description of the rectangle formed by the non-collinear optical inputs in the form of edges 132A'-D' and marking 129'. In addition, unit 202 also provides a complete image description of additional non-collinear optical inputs, such as the rectangle formed by images of wall edges 108' and preferably of table 208'. With this additional data, camera 144 can be calibrated with respect to both stable coordinates $(X_s, Y_s, Z_s)$ parameterizing stable frame 106 of environment 100 as well as world coordinates $(X_w, Y_w, Z_w)$ defined by television 126.

In the most general case, unit 204 may use points from the complete description of images 132A'-D', 129' as well as 108', 208' for determining the absolute pose of camera 144 with an iterative closest point algorithm or any other suitable algorithm. Preferably, unit 204 estimates absolute pose of camera 144 in stable coordinates $(X_s, Y_s, Z_s)$ with respect to stable coordinate origin in the upper left area of environment 100, and in world coordinates $(X_w, Y_w, Z_w)$ with respect to world coordinate origin in the upper left corner of screen 128.

Since in the present embodiment most non-collinear optical inputs are line-like, unit 204 preferably implements much faster algorithms than iterative closest point. For example, it employs a type of algorithm generally referred to in the art as pose estimation through comparison. In this approach a database of screen images 128' obtained at different rotations and translations is compared to the complete image description provided by unit 202. For efficiency reasons, such comparison preferably employs a homography. A homography is an invertible transformation from the real projective plane on the surface of photosensor 152 to a projective plane in a canonical position of camera 144 that maps straight lines to straight lines. Because straight lines are preserved under this type of operation, the transformation is also frequently called a collineation, a projective transformation or even projectivity by those skilled in the art. The reader is again referred to the textbook entitled "Multiple View Geometry in Computer Vision" (Second Edition) by R. Hartley and Andrew Zisserman.

When working with images of rectangles 128' and 108' there exists symmetry between certain absolute poses of camera 144. Therefore, additional information from image 160B' is necessary to break this symmetry. Differently put, additional non-collinear optical input is required to unambiguously define up, down, left and right. In the present embodiment, optical information from any point of table image 208' can be used to break the symmetry for determining the absolute pose in stable coordinates $(X_s, Y_s, Z_s)$. Similarly, optical information from any point of marking image 129' can be used to break the symmetry for determining the absolute pose in world coordinates $(X_w, Y_w, Z_w)$ that parameterize absolute reference frame 134 for the purposes of the interface of the present invention.

Image processing electronics 156 have an output module 206 that is connected to camera pose recovery unit 204. Module 206 receives information about the absolute pose of phone 104 computed by the pose recovery algorithm deployed by unit 204. Specifically, it receives pose information in the format used by the camera pose recovery algorithm of computer vision. This description may contain descriptors such as angles with respect to surface normals—for example, the normal to the surface of screen 128 or the normal to the surface of wall 108. Such descriptions are intrinsically expressed in world coordinates $(X_w, Y_w, Z_w)$ that parameterize world frame 134 and in stable coordinates $(X_s, Y_s, Z_s)$ that parameterize stable frame 106 in environment 100. However, these descriptions may not be expressed in absolute pose parameters $(x_s, y_s, z_s, \alpha_{sb}, \beta_{wb}, \gamma_{wb})$ and $(x_w, y_w, z_w, \alpha_{wb}, \beta_{wb}, \gamma_{wb})$ that were previously used to parameterize the absolute pose of phone 104 in the language of mechanics of rigid body motion. Therefore, module 206 may need to translate the output of unit 204 to mechanical absolute pose parameters $(x_s, y_s, z_s, \alpha_{sb}, \beta_{sb}, \gamma_{sb})$ and $(x_w, y_w, z_w, \alpha_{wb}, \beta_{wb}, \gamma_{wb})$. Of course, some embodiments of the interface of invention may be designed to work directly with the computer vision description from the point-of-view $\mathcal{P}$ of camera 144 and no such translation is necessary.

Any computer vision algorithm deployed by camera pose recovery unit 204 will inherently determine the absolute pose of phone 104 from the point-of-view $\mathcal{P}$ of camera 144 (see FIG. 5). Since in the present embodiment absolute pose is reported with respect to center of mass C.O.M. 110 that coincides with the origin of body coordinates $(X_b, Y_b, Z_b)$ of phone 104, module 206 needs to translate the absolute pose output of unit 204 from the point-of-view $\mathcal{P}$ of camera 144 into body coordinates ($X_b$, $Y_b$, $Z_b$) of phone 104. This translation is accomplished by a coordinate transformation involving the addition of the fixed offset vector $o_b$ (see FIG. 5) to the absolute pose output of unit 204. Thus, output module 206 translates the output of unit 204 into mechanical absolute pose parameters ($x_w$, $y_w$, $z_w$, $\alpha_{wb}$, $\beta_{wb}$, $\gamma_{wb}$) and ($x_s$, $y_s$, $z_s$, $\alpha_{sb}$, $\beta_{sb}$, $\gamma_{sb}$). Further, module 206 generates a signal 210 related to one or more of the recovered absolute pose parameters of phone 104.

Signal 210 is related to one or more of the absolute pose parameters in any suitable manner. In the simplest case, signal 210 contains all absolute pose parameters expressed in both stable coordinates ($X_s$, $Y_s$, $Z_s$) and in world coordinates ($X_w$, $Y_w$, $Z_w$). In other embodiments, signal 210 contains a subset of the absolute pose parameters, e.g., just the absolute position or just the absolute orientation. Still other embodiments need signal 210 that only contains two absolute position parameters expressed in stable coordinates ($X_s$, $Y_s$, $Z_s$), such as ($x_s$, $y_s$), or in world coordinates ($X_w$, $Y_w$, $Z_w$), such as ($x_w$, $y_w$). Signal 210 may also be related to just one absolute pose parameter, e.g., the absolute distance from screen 128 along the z-direction expressed in stable coordinates ($X_s$, $Y_s$, $Z_s$) or in world coordinates ($X_w$, $Y_w$, $Z_w$). Still other applications may require signal 210 to provide one or more orientation angles, such as $\gamma_{sb}$ or $\gamma_{wb}$ in applications where the roll (twist) of phone 104 is important. Further, signal 210 may be related to the absolute pose parameter or parameters in linear and non-linear ways or in accordance with any function including scaling, transposition, subspace projection, reflection, rotation, quantization or other function applied to any one or to all of the absolute pose parameters contained in signal 210. For example, signal 210 may contain derivatives, including first- and higher-order derivatives, integrals or re-scaled values of any of the absolute pose parameters or any linear combination thereof. Additionally, signal 210 may be related to the absolute pose parameter or parameters either in its amplitude, its frequency or its phase.

Figure 10:
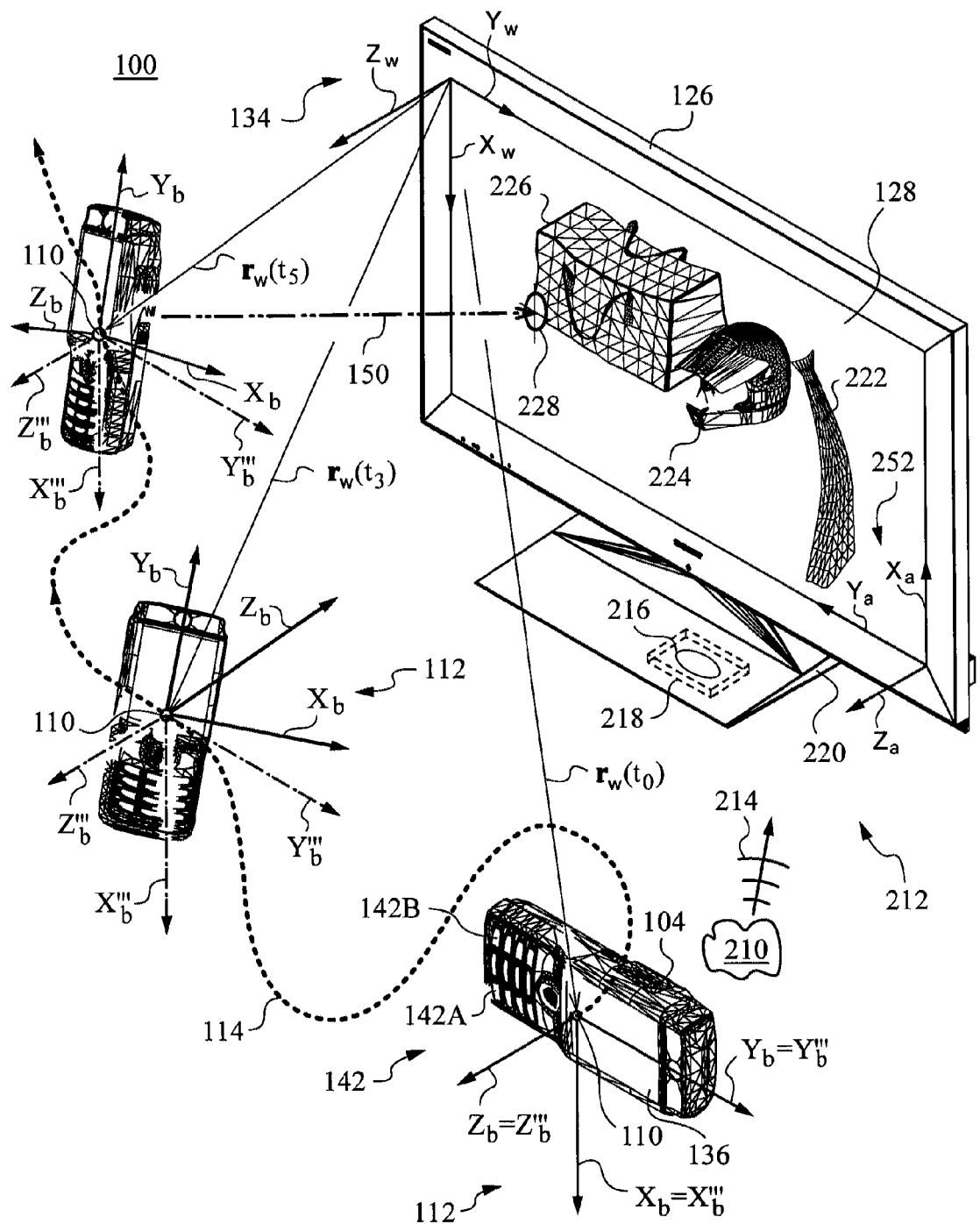
FIG. 10 is a three-dimensional view illustrating an interface in accordance with the invention deployed in the three-dimensional environment in which the absolute pose of an item associated with a human user as shown in FIGS. 1A-B is employed for generating input.

FIG. 10 illustrates in more detail the elements of an advantageous embodiment of an interface 212 according to the invention. Interface 212 is deployed in environment 100, where human user 102 manipulates phone 104 to assume various absolute poses as introduced in FIGS. 1A-B. We initially concentrate on a first absolute pose assumed by phone 104 along trajectory 114 at a time $t_0$ before time $t_1$ illustrated in FIG. 1A. In this absolute pose at time $t_0$ all three angles ($\alpha_{wb}$, $\beta_{wb}$, $\gamma_{wb}$) describing the absolute orientation of phone 104 in world coordinates ($X_w$, $Y_w$, $Z_w$) happen to be equal to zero. This means that fully rotated body coordinates ($X_b$, $Y_b$, $Z_b$) are aligned with the triple primed body coordinates ($X_b'''$, $Y_b'''$, $Z_b'''$) and with world coordinates ($X_w$, $Y_w$, $Z_w$) (see rotation convention in FIGS. 3A-D). Meanwhile, at time $t_0$ the absolute position of phone 104 as described in world coordinates ($X_w$, $Y_w$, $Z_w$) by vector $r_w(t_0)$ is not equal to zero. (Stable coordinates ($X_s$, $Y_s$, $Z_s$) and corresponding vector $r_s(t_0)$ from their origin to C.O.M. 110 are not shown in FIG. 10 for reasons of clarity—refer to FIG. 2 where vector $r_s$ is drawn explicitly.)

This absolute pose of phone 104 at time $t_0$ with no rotations as expressed in world coordinates ($X_w$, $Y_w$, $Z_w$) corresponds to absolute pose parameters as follows: A.P.=($x_w$, $y_w$, $z_w$, $\alpha_{wb}$, $\beta_{wb}$, $\gamma_{wb}$)=($x_w$, $y_w$, $z_w$, 0, 0, 0). Although phone 104 does not ever need to assume such absolute pose for enabling the operation of interface 212, it is nevertheless shown for pedagogical reasons. In this way, the reader can gain a more intuitive idea about when along trajectory 114 the phone's 104 pose does not involve any rotations.

At time $t_0$ camera 144 employs its image processing electronics 156 in the manner described above. As a result, phone 104 generates signal 210 related to at least one of its recovered absolute pose parameters ($x_w$, $y_w$, $z_w$, $\alpha_{wb}$, $\beta_{wb}$, $\gamma_{wb}$) expressed in world coordinates ($X_w$, $Y_w$, $Z_w$). As mentioned above, phone 104 can also determine and report recovered absolute pose parameters ($x_s$, $y_s$, $z_s$, $\alpha_{sb}$, $\beta_{sb}$, $\gamma_{sb}$) expressed in stable coordinates ($X_s$, $Y_s$, $Z_s$). In other words, absolute pose parameters ($x_w$, $y_w$, $z_w$, $\alpha_{wb}$, $\beta_{wb}$, $\gamma_{wb}$) and ($x_s$, $y_s$, $z_s$, $\alpha_{sb}$, $\beta_{sb}$, $\gamma_{sb}$) can be computed at time $t_0$ and used to construct related signal 210. In the present embodiment of interface 212, signal 210 is directly proportional to all six recovered absolute pose parameters ($x_w$, $y_w$, $z_w$, $\alpha_{wb}$, $\beta_{wb}$, $\gamma_{wb}$) in world coordinates ($X_w$, $Y_w$, $Z_w$). However, it is not related to, and more strictly does not contain any of the absolute pose parameters ($x_s$, $y_s$, $z_s$, $\alpha_{sb}$, $\beta_{sb}$, $\gamma_{sb}$) as reported in stable coordinates ($X_s$, $Y_s$, $Z_s$). Signal 210 is thus proportional to the values of absolute pose parameters ($x_w$, $y_w$, $z_w$, $\alpha_{wb}$, $\beta_{wb}$, $\gamma_{wb}$)=($x_w$, $y_w$, $z_w$, 0, 0, 0) expressed in units corresponding one-to-one to real 3D space of environment 100 in the absolute frame of reference 134 parameterized by world coordinates ($X_w$, $Y_w$, $Z_w$).

Interface 212 takes advantage of communication link 214 of phone 104 to communicate signal 210 to an application 216 running on a host unit 218. It is the objective of interface 212 to derive or produce input to application 216 based on the absolute pose of phone 104. More precisely, application 216 is designed to employ signal 210 as an input of interface 212. In the present embodiment, link 214 is the down-link of the phone's 104 Bluetooth wireless link. It will be appreciated by persons skilled in the art that any suitable link, wireless or wired, may be used to transmit signal 210 to application 216.

Host unit 218 belongs to television 126 and is incorporated into its base 220. Host unit 218 has a processor and other typical resources to implement application 216 and to drive screen 218. In fact, it should be noted, that if on-board image processing electronics 156 cannot properly handle the camera pose recovery, this task could be assigned to host unit 218, as it will typically have a stable power supply and considerable computing resources.

In the embodiment shown, application 216 is a home shopping application that displays to user 102 products 222, 224, 226 that can be purchased with the aid of interface 212. Of course, products 222, 224, 226 may include any merchandise available from any commercial source or database, e.g., a web-based database or a home shopping network that application 216 can access via the Internet. Here, product 222 is a necktie, product 224 is a motorcycle helmet and product 226 is a bag. Application 216 displays necktie 222, helmet 224 and bag 226 on screen 128 in a way that makes it easy for user 102 to make his or her selection.

In fact, in the present embodiment of interface 212, signal 210 constitutes the complete input from user 102 to application 216. The absolute pose of phone 104 supplied to application 216 is used to move a cursor 228 on screen 128 and to thus allow user 102 to select among products 222, 224, 226. A person skilled in the art will recognize this functionality as absolute 3D pointing capability and/or as an absolute 3D mouse. In fact, cursor 228 can be employed in conjunction with depressing an agreed upon button (see below), to endow it with other capabilities such as scrolling or otherwise bringing up a larger selection of products.

Figure 11:
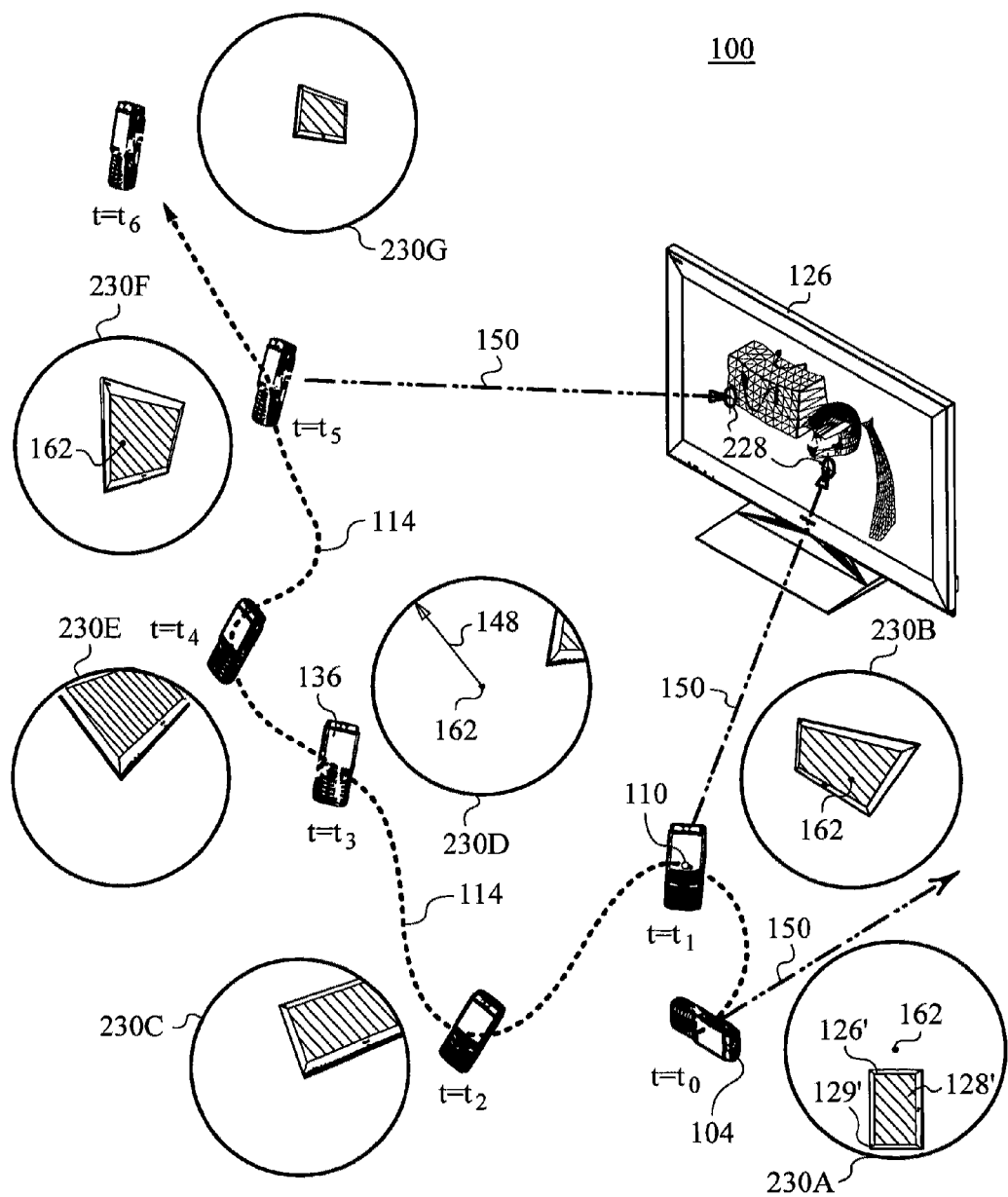
FIG. 11 is a three-dimensional isometric view showing a detailed trajectory of the item associated with the human user in the three-dimensional environment of FIGS. 1A-B during operation of the interface.

We now examine the operation of interface 212 by referring to FIG. 10 and to a more detailed view of trajectory 114 of phone 104 and corresponding images 230A-G of screen 128 captured by camera 144 during operation, as shown in FIG. 11. We will also refer to the flow diagram of FIG. 12 that illustrates the steps executed by application 216 and image processing electronics 156 on-board phone 104 during the operation of interface 212.

Interface 212 is initialized when user 102 presses a predetermined button 142 or performs any suitable initialization action or sequence of actions. In the example shown in FIG. 10, interface 212 is initialized at time $t_0$ by depressing a button 142A on phone 104. Of course, it is understood that phone 104 does not need to be initialized in interface 212 while its orientation angles are zero.

FIG. 11 depicts image 230A projected onto photosensor 152 of camera 144 at the time of initialization, $t_0$, of interface 212. Additionally, time $t_0$ coincides with the start of trajectory 114 of phone 104.

Figure 12:
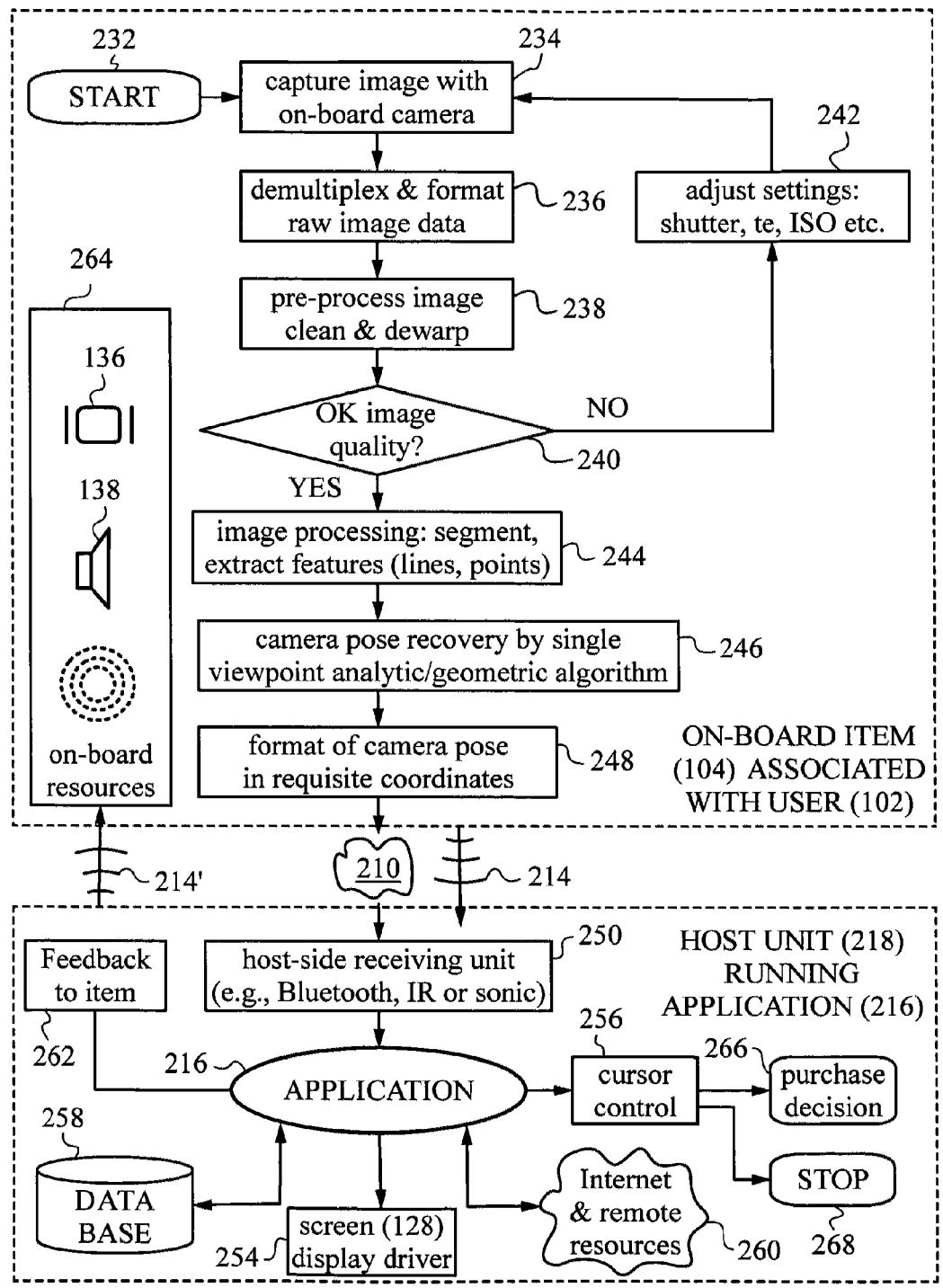
FIG. 12 is a flow diagram illustrating the main steps executed by the interface according to the invention.

The steps performed by interface 212 at initialization are found in the flow diagram of FIG. 12. Initialization signal is used in step 232 to start interface 212 by activating camera 144 and image processing electronics 156. In subsequent step 234, camera 144 is instructed to capture image 230A of environment 100. Image 230A may optionally be displayed to user 102 on screen 136 of phone 104.

It is important in step 234 that image 230A be captured at a sufficiently short exposure time, $t_e$, to ensure that it contains no appreciable motion blur. For example, exposure time $t_e$ in situations where user 102 is expected to move phone 104 relatively slowly may be set on the order of 100 ms to 25 ms (1/10 to 1/40 sec). On the other hand, exposure time $t_e$ should be significantly shorter, e.g., 10 ms or even less (1/100 sec and faster) in situations where person 102 is expected to move phone 104 relatively quickly. In the event a rolling shutter is employed, the exposure time $t_e$ should be adjusted accordingly to ensure no significant time delay between the capture time of radiation 130 by first and last pixels 190.

A person skilled in the art will recognize that the F/# of lens 146 must be sufficiently low and the ISO sensitivity of photosensor 152 must be set sufficiently high to enable camera 144 to capture image 230A under the ambient illumination conditions and given the amount of radiation 130 emitted by screen 128. Specifically, image 230A has to be of sufficient quality to permit recognition of images 132A'-D', 129' of edges 132A-D and of marking 129 that are chosen as non-collinear optical inputs to image processing unit 204 and camera pose recovery module 206.

In next step 236, raw image data 196 is demultiplexed and formatted. It is then forwarded in step 238 for pre-processing of image 230A by image pre-processing unit 200. After step 238, if possible, a determination should be made at step 240 whether image 230A is of sufficient quality to warrant further processing, or if another image should be captured. For example, if image 230A is of insufficient quality to support image processing and feature extraction, i.e., line detection to find images of edges 132A'-D' and image of marking 129' that represent the non-collinear optical inputs, then another image should be captured at an adjusted exposure time $t_e$ and ISO setting. The corresponding adjustments are made in step 242 in accordance with well-known principles of optics. In fact, if it is possible to make the image quality determination sooner, e.g., at step 236, then an instruction to proceed to step 242 should be issued by interface 212 after that step.

A sufficiently high quality image 230A is forwarded to step 244, in which dewarped or corrected image 230A is processed by image processing unit 202. Step 244 involves filtering, image segmentation, contrast enhancement and extraction of images of non-collinear optical inputs in this embodiment the images of edges 132A'-D' and image of marking 129'. As indicated above, the requisite techniques are well-known in the art of robotic and computer vision. In general, feature extraction reduces the complexity of pose estimation by using a reduced representation of environment 100 instead of the raw image as input to a pose recovery algorithm. Edges, corners, blobs, ridges, intensity gradients, optical flow, etc. are all well-known image features familiar to a skilled artisan. Alternatively, more sophisticated features include Scale-Invariant Feature Transform (SIFT) by David Lowe or Speeded Up Robust Features (SURF) by Herbert Bay et al.

There is a significant amount of additional literature about the extraction of the invariant and non-collinear optical inputs from the images (a.k.a. feature extraction). Extraction of such features will require the application of suitable image segmentation modules, contrast thresholds, line detection algorithms (e.g., Hough transformations) and many others. For more information on edge detection in images and edge detection algorithms the reader is referred to U.S. Pat. Nos. 6,023,291 and 6,408,109 and to Simon Baker and Shree K. Nayar, "Global Measures of Coherence for Edge Detector Evaluation", Conference on Computer Vision and Pattern Recognition, June 1999, Vol. 2, pp. 373-379 and J. Canny, "A Computational Approach to Edge Detection", IEEE Transactions on Pattern Analysis and Machine Intelligence, Vol. 8, No. 6, November 1986 for basic edge detection all of which are herein incorporated by reference. Additional useful teachings can be found in U.S. Pat. No. 7,203,384 to Carl and U.S. Pat. No. 7,023,536 to Zhang et al. A person skilled in the art will find all the required modules in standard image processing libraries such as OpenCV (Open Source Computer Vision), a library of programming functions for real time computer vision. For more information on OpenCV the reader is referred to G. R. Bradski and A. Kaehler, "Learning OpenCV: Computer Vision with the OpenCV Library", O'Reilly, 2008.

Extracted non-collinear optical inputs 132A'-D', 129' are supplied to camera pose recovery unit 204 in step 246. Unit 204 applies the rules of perspective geometry in an analytic or geometric algorithm to solve the inverse problem of finding the collineation that maps the extracted non-collinear optical inputs, i.e., 132A'-D' and 129', to what a reference or canonical position will produce (reference inputs 132A'-D', 129' as seen from the reference or canonical pose). Due to the effects of noise, feature mismatch, imperfect calibration and/or incomplete modeling of environment 100, the set of extracted features or inputs can never be mapped exactly into the reference set. In preferred embodiments, a robust method finds the collineation that minimizes the sum of algebraic errors between the set of extracted features and the reference set. The reader is invited to review K. Kanatani, "Geometric Computation for Machine Vision", pp. 153-155 for more details. For a simpler but less robust approach the reader is referred to Robert M. Haralick, "Determining Camera Parameters from the Perspective Projection of a Rectangle", Journal of Pattern Recognition, Vol. 22, Issue 3, 1989.

In step 248 the output of camera pose recovery unit 204 is provided to output module 206. In one embodiment, the output of pose recovery unit 204 is the collineation computed in step 246. This collineation is converted to absolute pose parameters either by unit 204 or by output module 206. Absolute pose parameters can be expressed in many different formats. In the present embodiment, they are expressed as a translation vector $r_w$ and rotations $(\alpha_{wb}, \beta_{wb}, \gamma_{wb})$ in world coordinates $(X_w, Y_w, Z_w)$ that parameterize frame 134. In another embodiment, they are expressed as a reference vector r, and a surface normal n in body coordinates $(X_b, Y_b, Z_b)$. In yet another embodiment, the orientation, regardless of reference, is expressed using a quaternion representation. Output module 206 uses the output to generate signal 210 that is related to at least one of the absolute pose parameters irrespective of how they are expressed or parameterized (i.e., absolute pose parameters of mechanics, computer vision or still some other convention).

Now, unit 204 expresses the absolute pose of phone 104 in reference to the point-of-view $\mathcal{P}$ of camera 144 (as defined by lens 146) rather than center of mass C.O.M. 110 of phone 104. That is because the geometric algorithm in step 246 operates on image 230A as seen from point-of-view $\mathcal{P}$. Therefore, output module 206 must also convert the absolute pose of phone 104. Such conversion to body coordinates 112 centered on C.O.M. 110 of phone 104 is accomplished once again by a coordinate transformation that adds offset vector $o_b$. (In a more complicated case than that shown in FIG. 5, when image plane $X_i$-$Y_i$ is not plane parallel with respect to plane $X_b$-$Y_b$ of body coordinates 112, a rotation matrix will also have to be applied as a part of the coordinate transformation. Coordinate transformation methods are known to those skilled in the art and the diligent reader is again referred to G. B. Arfken, op. cit.)

In addition to the coordinate transformation, interface 212 requires that the at least one absolute pose parameter of phone 104 be expressed or reported by unit 206 in a stable frame. In the present embodiment two choices of such stable frames for reporting the one or more pose parameters of phone 104 are available.

The first stable frame is defined by stable coordinates $(X_s, Y_s, Z_s)$ that parameterize frame 106 in environment 100. Stable coordinates $(X_s, Y_s, Z_s)$ do not move as they are defined by wall 108 and other stationary objects that produce optically discoverable non-collinear optical inputs. Thus, frame 106 can be taken as the stable frame that defines environment 100 in the context of the surface of a very stable (and reliable) reference in the surroundings.

The second stable frame 134 is defined by world coordinates $(X_w, Y_w, Z_w)$ (or workspace coordinates) in the Cartesian convention with respect to the upper left corner of screen 128. In the present embodiment, frame 134 is usually stationary within first stable frame 106 because television 126 does not move. In other words, a coordinate transformation between stable coordinates $(X_s, Y_s, Z_s)$ and world coordinates $(X_w, Y_w, Z_w)$ is constant in time. This transformation is conveniently expressed by constant vector $d_s$ (see FIG. 2) and a constant rotation matrix $R_{sw}$ (not shown) if the axes of stable coordinates $(X_s, Y_s, Z_s)$ parameterizing frame 106 and the axes of world coordinates $(X_w, Y_w, Z_w)$ defining frame 134 are not aligned (they are not aligned in the present embodiment and hence a rotation matrix must be used).

Since in the present embodiment object 126 is a large television designed to stay in the same place in environment 100, interface 212 employs frame 134 parameterized by world coordinates $(X_w, Y_w, Z_w)$ as the stable frame. In other words, because television 126 is at rest in stable coordinates $(X_s, Y_s, Z_s)$ defining stable frame 106 on the surface of the Earth, stable frame 134 parameterized by world coordinates $(X_w, Y_w, Z_w)$ is also at rest as long as television 126 does not move. Therefore, unless application 216 needs to know and keep confirming where television 126 is located in stable frame 106, interface 212 may dispense with recovering the absolute pose of phone 104 in stable coordinates $(X_s, Y_s, Z_s)$ altogether. Thus, the non-collinear optical inputs of wall 108 (i.e., its edges and corners) and of table 208 do not need to be used for camera pose recovery with respect to these objects to track phone 104 in stable coordinates $(X_s, Y_w, Z_s)$. Note, however, that in embodiments where the object that user 102 is interacting with is not stationary in absolute reference frame 106, it may be necessary to keep track of the item's 104 absolute pose in both stable coordinates $(X_s, Y_s, Z_s)$ and in world coordinates $(X_w, Y_w, Z_w)$ to achieve proper operation of interface 212 according to the invention.

As remarked above, in the present embodiment signal 210 is related to all six absolute pose parameters $(x_w, y_w, z_w, \alpha_{wb}, \beta_{wb}, \gamma_{wb})$ by being directly proportional to them. In general, however, the relation between signal 210 and the one or more absolute pose parameters chosen to parameterize the six degrees of freedom of phone 104 is much more broadly defined. Signal 210 needs only be related to one absolute pose parameter of phone 104 as expressed in stable frame 134 (or stable frame 106). Furthermore, signal 210 may be encoded in frequency, amplitude or phase.

The one or more absolute pose parameters to which signal 210 is related, e.g., by being directly proportional to them as in this case, need not directly correspond to one of the six absolute pose parameters defined by $(x_w, y_w, z_w, \alpha_{wb}, \beta_{wb}, \gamma_{wb})$. Instead, the one or more absolute pose parameters to which signal 210 is related needs only in turn be related by a mapping to at least one of the six degrees of freedom of phone 104 that may be parameterized in any manner (e.g., by mechanics conventions, computer vision conventions or still other conventions). The present case is the simplest, since the mapping is a one-to-one mapping of all six absolute pose parameters $(x_w, y_w, z_w, \alpha_{wb}, \beta_{wb}, \gamma_{wb})$, to which signal 210 is directly proportional, to the six degrees of freedom parameterized with these same absolute pose parameters, namely $(x_w, y_w, z_w, \alpha_{wb}, \beta_{wb}, \gamma_{wb})$. More complex mappings that are not one-to-one and involve scaling as well will be examined in subsequent embodiments.

The one-to-one mapping of all absolute pose parameters $(x_w, y_w, z_w, \alpha_{wb}, \beta_{wb}, \gamma_{wb})$ of phone 104 in the same convention as that used to parameterize the six degrees of freedom of phone 104 in world coordinates $(X_w, Y_w, Z_w)$ makes interface 212 a special type of interface. Interfaces where the one or more absolute pose parameters to which signal 210 is related map to all the translational and rotational degrees of freedom are referred to herein as fully parameterized interfaces. Under this definition, interface 212 is fully parameterized, since signal 210 contains a full parameterization of the absolute pose of phone 104.

In the next step indicated in FIG. 12, on-board communication link 214 sends signal 210 to host unit 218 in the form of a Bluetooth formatted RF signal. In step 250, signal 210 is received by a host-side receiving unit and forwarded as input to application 216. It is noted that although Bluetooth is used in this embodiment, any other RF protocol, as well as IR or sonic (e.g., ultrasonic) link or other point-to-point connection (including a wired connection) may be used by interface 212 to transmit signal 210 in the corresponding format and code from phone 104 to host 218.

Depending on the rate of motion of phone 104 and type of trajectory 114 that interface 212 is expected to support, it is important that the overall time duration between the capture of image 230A and transmission of signal 210 to host unit 218 be kept relatively short. For example, the time required for completing steps 234 through 248 in flow diagram of FIG. 12 should be kept at 10-20 msec. The time delay required for transmission to host 218 and reception as input to application 216 should also be kept as short as possible, and ideally at less than 10 msec. The reason for such rapid processing and transmission in interface 212 has to do with the human perception of delay. According to accepted standards and IEEE specifications human user interfaces should ideally produce a delay of less than 30 msec in order to be perceived as real-time by user 102.

Application 216 receives signal 210 with full parameterization of phone 104 as an input of interface 212. Specifically, the values contained in signal 210 are employed as input of user 102 by application 216.

To interpret the absolute pose of phone 104 application 216 uses a set of application coordinates $(X_a, Y_a, Z_a)$ to parameterize its digital three-dimensional environment 252. These application coordinates $(X_a, Y_a, Z_a)$ with their origin in the lower right corner of screen 128 are shown in FIG. 10. Of course, the choice of origin and orientation of coordinates $(X_a, Y_a, Z_a)$ is merely exemplary and can be selected by the interface designer as convenient or as dictated by application 216. In the present embodiment, television 126 supports 3D viewing and thus having a three-dimensional coordinate system $(X_a, Y_a, Z_a)$ makes sense. In 2D televisions the $Z_a$-axis may not be necessary.

Application 216 uses absolute pose parameters $(x_w, y_w, z_w, \alpha_{wb}, \beta_{wb}, \gamma_{wb})$ of phone 104 delivered by signal 210 as input of user 102. In the present embodiment, it translates these pose parameters into application coordinates $(X_a, Y_a, Z_a)$ to define the pose of phone 104 in digital three-dimensional environment 252. Environment 252 is thus a cyberspace or a virtual space that is like real space.

At this stage, application 216 is capable of using its driver 254 of display screen 128 to display to user 102 a virtual phone 104' in an absolute pose that mirrors the absolute pose of phone 104 in world coordinates $(X_w, Y_w, Z_w)$. Such virtual phone 104' can be displayed in digital three-dimensional environment 252 parameterized by application coordinates $(X_a, Y_a, Z_a)$ and can be particularly advantageous when using a three-dimensional type of television 126. Note that when environment 252 of application 216 is a cyberspace, a virtual space or a portion of a mixed space where the standard rules of 3D geometry apply, the ability to obtain full absolute pose of phone 104 is crucial to life-like interactions.

In the present simple home shopping application 216, however, interface 212 is designed to only assists in computing the intersection of optical axis 150 of lens 146 with display 128. Application 216 then instructs cursor control 256 to draw a place-holder entity, in this case a feedback cursor 228 at that intersection to provide visual feedback to user 102.

At time $t_0$, we see from FIGS. 10 and 11 that optical axis 150 does not intersect with display 128. This is further evidenced by the fact that in image 230A taken at time $t_0$ image center 162, which always lies along optical axis 150 of lens 146, is not on image 128' of screen 128. Therefore, cursor control 256 does not draw feedback cursor 228 on screen 128.

Instead, application 216 instructs screen driver 254 to keep products 222, 224, 226 displayed on screen 128. Meanwhile, while user 102 is not pointing at screen 128, application 216 may perform support, cross-check and other functions. For example, application 216 may cross-check with a database 258 of merchandise that products 222, 224, 226 are properly displayed. Application 216 may additionally verify with remote resources 260 that may include the Internet as well as proprietary resources and links that products 222, 224, 226 are still in stock and available for sale to user 102. In performing these functions, application 216 may take advantage of data in signal 210. For example, it may terminate them when cursor 228 is getting close to screen 128.

Application 216 has a feedback module 262 that can send feedback to phone 104 for the benefit of user 102. Application 216 can provide feedback to user 102 in any form supported by on-board resources 264 of phone 104. Advantageously, the feedback is sent by an up-link 214' of the Bluetooth wireless link employed to transmit signal 210 to host 218.

For example, in the present embodiment feedback is in the form of audio information that is communicated to user 102 via on-board resources 264 that include speakers 138 (see FIG. 4A). Specifically, application 216 uses speakers 138 to send the following audio information to user 102 at time $t_0$ in response to the recovered absolute pose of phone 104: "You are pointing off-screen. Please indicate the product you want to find out about by pointing at it".

At time $t_1$, interface 212 once again repeats steps 234 through 248 (see flow diagram of FIG. 12) to recover the absolute pose of phone 104 in world coordinates $(X_w, Y_w, Z_w)$ and send it to application 216. The time elapsed between time $t_0$ and $t_1$, also sometimes expressed in terms of frame rate by those skilled in the art, may either be dynamically controlled by application 216 or it may be pre-set.

When user 102 moves phone 104 rapidly and interface 212 requires accurate absolute pose information so that application 216 runs properly, the time between time $t_0$ and $t_1$ should be kept short. Put another way, a high frame rate is required to accurately capture absolute pose of phone 104 when user 102 is moving phone 104 quickly. In fact, images of screen 128' may need to be captured and processed without significant latency at frame rates approaching 100 Hz or even 200 Hz in such situations. Note that a correspondingly short exposure time $t_e$ needs to be chosen at such high frame rates to permit sufficient time between capturing radiation 130 for each frame.

On the other hand, much slower frame rates, e.g., on the order of 10 Hz, may be sufficient when user 102 is not moving phone 104 quickly. To optimize the on-board resources of phone 104 and to not overload its processors, it is thus preferable to dynamically adjust the frame rate according to the motion of phone 104. When phone 104 moves slowly, a frame rate of near 10 Hz is selected, while at extremely fast speeds a frame rate in excess of 100 Hz is chosen.

In the present case, frame rate is initially set to 10 Hz at time $t_0$. Therefore, the time elapsed between $t_0$ and $t_1$ is $1/10^{th}$ of a second. At time $t_1$ the absolute pose of phone 104 is significantly different than it was at time $t_0$. Indeed, the absolute pose at time $t_1$ corresponds to user 102 holding phone 104 in his/her right hand 102' as shown in FIG. 1A. It is clear from comparing image 230B obtained by on-board camera 144 at time $t_1$ to image 230A obtained at time $t_0$, that optical axis 150 now does intersect the surface of screen 128, as center of image 162 is within edges 132A-D of screen 128. As a result, application 216 instructs cursor control 256 to draw feedback cursor 228 at the intersection of optical axis 150 and the surface of screen 128, so that user 102 can see where he/she is pointing phone 104.

In addition, application 216 instructs feedback module 262 at time $t_1$ to generate and send additional feedback to user 102. This time the feedback is in the form of tactile or haptic information communicated to on-board resources 264 of phone 104 by communication link 214'. The haptic information is a fast vibration of phone 104 achieved by deploying its on-board vibrator resource (not shown).

In the manner described above, camera 144 of interface 212 captures successive images 230C-G at times $t_2$, $t_3$, $t_4$, $t_5$ and $t_6$. Note that at time $t_5$ user 102 is holding phone 104 in left hand 102" as previously shown in FIG. 1B. At times $t_3$ and $t_4$ optical axis 150 once again does not intersect screen 128. Hence, application 216 again uses speakers 138 to send the following audio information to user 102 at times $t_3$ and $t_4$ in response to the absolute pose of phone 104: "You are pointing off-screen. Please indicate the product you want to find out about by pointing at it".

At time $t_5$ user 102 has manipulated phone 104 into an absolute pose in which optical axis 150 intersect screen 128 at the location of product 226. In response, application 216 instructs cursor control 256 to draw feedback cursor 228 on top of displayed product 226. In addition, application 216 generates visual feedback via feedback module 262 and sends it to on-board resources 264 of phone 104. The visual feedback is displayed on screen 136 of phone 104 and communicates the attributes of product 226 to user 102. For example, the attributes include information such as: price, size, material, make, satisfaction, quality report, special features, number of facebook friends who have purchased same product, most recent tweet about product, etc. Of course, the feedback may be supplied in audio format and use speakers 138 to communicate the same information to user 102.

User 102 may depress a corresponding selection button 142B at time $t_5$, while pointing at product 226 as shown in FIG. 10, to communicate to application 216 that he/she wishes to purchase product 226. Application 216 generates the corresponding signal indicating user's 102 purchase decision 266 and submits it for processing in any manner known to those skilled in the art of on-line sales. Preferably, purchase decision 266 is made by a single depression of selection button 142B, thus making it a "one-click" transaction. In fact, any compatible "one-click" shopping technique can be applied in interface 212 of present invention. Feedback including visual and/or audio information congratulating user 102 on his/her purchase may be issued by application 216 via feedback module 262.

At time $t_6$, user 102, having purchased product 226, moves far away from screen 128. This is apparent from image 230G in FIG. 11, where the size of screen image 128' subtends only a small fraction of field-of-view 148. At this time, user 102 presses still another selection button 142 (not specifically indicated herein) to instruct interface 212 to issue a stop command 268 to application 216. Stop command 268 terminates application 216, turns off camera 144 and places interface 212 on stand-by or turns it off completely.

At this point, we understand a basic embodiment of interface 212 according to the invention and its method of operation. However, in the implementation described so far, interface 212 did not take full advantage of the six degrees of freedom of phone 104. Those are the absolute pose parameters $(x_w, y_w, z_w, \alpha_{wb}, \beta_{wb}, \gamma_{wb})$ in Cartesian world coordinates $(X_w, Y_w, Z_w)$ that were set up to parameterize frame 134 of environment 100. Moreover, all data pertaining to absolute pose of phone 104 in stable coordinates $(X_s, Y_s, Z_s)$, i.e., absolute pose parameters $(x_s, y_s, z_s, \alpha_{sb}, \beta_{sb}, \gamma_{sb})$ were even discarded.

To take advantage of the full set of absolute pose parameters that interface 212 can recover at successive times, it is necessary to gain a still deeper appreciation of trajectory 114 of phone 104 and conventions used to describe it. FIG. 13 illustrates in more detail phone 104 and trajectory 114 traversed between time $t_0$ and $t_5$ by its center of mass C.O.M. 110. In the convention used herein, the motion of the rigid body of interest, namely of phone 104, consists of translations and rotations.

In particular, the position and orientation of phone 104, i.e., its absolute pose A.P. at any time $t > t_0$ is completely characterized by the position of its C.O.M. 110 and by the rotation matrix $R \in SO(3)$ (special orthogonal matrix in 3D) that describes the rotational state of any point in its body coordinates $(X_b, Y_b, Z_b)$ in the stable frame of our choice. As already noted above, we have two frame choices, namely frame 106 described by stable coordinates $X_s, Y_s, Z_s$ and frame 134 described by world coordinates $(X_w, Y_w, Z_w)$. The corresponding equations in frames 106 and 134 respectively are:

$$A.P._s(t) = R_s(t) o_b + r_s(t) \tag{1A}$$

$$A.P._w(t) = R_w(t) o_b + r_w(t) \tag{1B}$$

In these equations, we are using the notation conventions introduced above and in which A.P.(t) denotes time-dependent absolute pose of phone 104. Uppercase bold letters denote matrices, lowercase boldface letters denote vectors and subscripts refer to the reference frames in which the quantities are expressed. We have chosen to demonstrate the effect of the rotation matrix R on vector $o_b$ expressing the offset from C.O.M. 110 to point-of-view $\mathcal{P}$ of camera 144 residing on-board phone 104. The reason for this choice is because point-of-view $\mathcal{P}$ is a point of special interest on phone 104 as it is the vantage point from which the pose recovery algorithms recover camera pose.

The operation of a matrix on a vector produces another vector. We use two subscripts to denote the result. Thus, in Eq. 1A the result of applying rotation matrix $R_s(t)$ to vector $o_b$ is vector $o_{sb}$. We thus know that the resulting vector is expressed after rotation from the vantage point of stable coordinates $(X_s, Y_s, Z_s)$. Similar logic applies to Eq. 1B that yields $o_{wb}$.

In general, rotation matrix $R_s$ incorporates all three rotations $(\alpha_{sb}, \beta_{sb}, \gamma_{sb})$ previously introduced in FIGS. 3A-D. The individual rotations can be expressed by the components of rotation matrix $R_s$ around the body axes $Z_b, Y_b$ and $X_b$ starting with the body axes being aligned with the axes of the frame being used, in this case axes $X_s, Y_s$ and $Z_s$ of frame 106, as follows:

$$R_{zb}(\alpha_{sb}) = \begin{pmatrix} \cos\alpha_{sb} & -\sin\alpha_{sb} & 0 \\ \sin\alpha_{sb} & \cos\alpha_{sb} & 0 \\ 0 & 0 & 1 \end{pmatrix} \tag{Eq. 2A}$$

$$R_{xb}(\beta_{sb}) = \begin{pmatrix} 1 & 0 & 0 \\ 0 & \cos\beta_{sb} & -\sin\beta_{sb} \\ 0 & \sin\beta_{sb} & \cos\beta_{sb} \end{pmatrix} \tag{Eq. 2B}$$

$$R_{yb}(\gamma_{sb}) = \begin{pmatrix} \cos\gamma_{sb} & 0 & \sin\gamma_{sb} \\ 0 & 1 & 0 \\ -\sin\gamma_{sb} & 0 & \cos\gamma_{sb} \end{pmatrix} \tag{Eq. 2C}$$

The complete rotation matrix $R_s$ is obtained by simply multiplying the above individual rotation matrices in the order of the convention. In other words, $R_s = R_{yb}(\gamma_{sb}) R_{xb}(\beta_{sb}) R_{zb}(\alpha_{sb})$. It should be noted that rotation matrices are always square and have real-valued elements. Algebraically, a rotation matrix in 3-dimensions is a 3×3 special orthogonal matrix (SO(3)) whose determinant is 1 and whose transpose is equal to its inverse:

$$R^T = R^{-1}; \det(R) = 1, \tag{Eq. 3}$$

where superscript T indicates the transpose matrix and superscript −1 indicates the inverse matrix.

Having properly defined rotation matrix $R_s$ and its behavior, we return to FIG. 13. Note first that the same rotation convention may be used to define the relative orientation of world coordinates $(X_w, Y_w, Z_w)$ to stable coordinates $(X_s, Y_s, Z_s)$ by a rotation matrix. Also, we can define the rotation matrix $R_w$ that describes rotation angles $(\alpha_{wb}, \beta_{wb}, \gamma_{wb})$ from the point of view of world coordinates $(X_w, Y_w, Z_w)$ of frame 134. To recover trajectory 114 between any two absolute poses in stable coordinates $(X_s, Y_s, Z_s)$ we thus need to use Eq. 1A with rotation matrix $R_s$ as described above. To recover trajectory 114 between any two absolute poses in world coordinates ($X_w, Y_w, Z_w$) we use Eq. 1B with rotation matrix $R_w$.

In the present embodiment, trajectory 114 between $A.P._s(t_i)$ and $A.P._s(t_j)$ is recovered by having camera pose recovery algorithm in step 246 executed by unit 204 first account for rotations and then for translations. In other words, the algorithm first recovers the absolute orientation of phone 104 as expressed by matrix $R_s(t_i)$ in terms of the three rotation angles or the computer vision mathematical equivalent. The algorithm then computes the translation vector $r_s(t_i)$. The same approach is taken in computing $A.P._w(t_i)$ and $A.P._w(t_j)$ to describe trajectory 114 in world coordinates. Alternatively, vector $d_s$ and the rotation matrix between the two coordinate systems $R_{sw}$ is used to calculate $A.P._w(t_i)$ and $A.P._w(t_j)$ from $A.P._s(t_i)$ and $A.P._s(t_j)$.

It is important to note that other conventions are possible. These will also recover trajectory 114 in stable and world coordinates. However, the exact description will differ. Therefore, once a trajectory convention is selected for interface 212 it is best to enforce it throughout.

Unit 204 of interface 212 provides complete absolute pose descriptions $A.P._w(t_0), \ldots A.P._w(t_i), A.P._w(t_j), \ldots, A.P._w(t_5)$ at the corresponding times $t_0, \ldots, t_i, t_j, \ldots, t_5$ in signal 210, which is proportional to all of the six degrees of freedom described by the absolute poses. Thus, application 216 has sufficient information to recover trajectory 114 of C.O.M. 110 of phone 104 along with the orientation of phone 104 at those times. In the present embodiment, application 216 uses the pose information just to draw feedback cursor 228 at the location where optical axis 150 of optic 146 happens to intersect the plane of screen 128 at the time of pose measurement.

With the aid of offset vector $o_b$ between C.O.M. 110 and point-of-view $\mathcal{P}$ of camera 144, FIG. 13 illustrates trajectory 114 of C.O.M. 110 alongside trajectory 114' of point-of-view $\mathcal{P}$. During the time between $t_0$ and $t_5$ vector $o_b$ executes a complex motion about C.O.M. 110 due to changes in the absolute pose of phone 104. At time $t_0$ point-of-view $\mathcal{P}$ is to the right of C.O.M. 110 and optical axis 150 extending from point-of-view $\mathcal{P}$ does not even intersect screen 128. As phone 104 is moved by user 102, optical axis 150 finally intersects screen 128 at point $x_{a1}$ expressed in application coordinates ($X_a, Y_a, Z_a$).

Once optical axis 150 intersects screen 128, application 126 draws feedback cursor 228 at that intersection point. In addition, application 126 draws a trajectory 270 on screen 128 to indicate the 2D trace traversed by cursor 228. Trajectory 270 is 2D since it is a projection from 3D space of environment 100 into 2D space of screen 128. Since screen 128 is co-planar with plane $X_a$-$Y_a$ of application coordinates ($X_a, Y_a, Z_a$) that parameterize digital three-dimensional environment 252, trajectory 270 is expressed by coordinates ($x_a, y_a$) (or, more strictly ($x_a, y_a, 0$), since $z_a=0$ in plane $X_a$-$Y_a$).

Of course, trajectory 270 has to be interpolated between the times at which the sequence of absolute poses of phone 104 is recovered by unit 204. The higher the frame rate of camera 144 the more absolute poses can be recovered between time $t_0$ and $t_5$. Correspondingly, more intersection points between screen 128 and optical axis 150 can be computed to thus improve the interpolation of trajectory 270. As mentioned above, for rapid motion a frame rate in excess of 100 Hz is desirable.

At times when optical axis 150 is not intersecting screen 128, application 216 does not generate optical user feedback on screen 128. In other words, cursor 228 is absent at those times. This, however, does not mean that information derived from the absolute poses of phone 104 is not useful during those periods. For example, as seen in FIG. 13, between points $y_{a2}$ and $y_{a3}$ optical axis 150 is once again off screen 128. If application 216 could draw cursor 228, it would be a phantom cursor 228' located along trajectory 270 extending onto wall 108.

Of course, in the present configuration application 216 cannot draw outside its own screen 128 on wall 108. However, since application 216 still knows where phone 104 is being pointed (unit 204 keeps providing it with the full absolute pose information in signal 210), it may indicate to user 102 how to move phone 104 to bring cursor 228 back on screen 128. In some embodiments, the location of phantom cursor 228' could be displayed to user 102 with information that it is off-screen or its distance from screen 128 could be indicated by an audio feedback. Application 216 can in fact do much more with the absolute pose information of phone 104. That is because, in accordance with the invention, signal 210 is proportional to all six degrees of freedom parameterized by $A.P.(t)=(x_w, y_w, z_w, \alpha_{wb}, \beta_{wb}, \gamma_{wb})$ in this embodiment.

Figure 14:
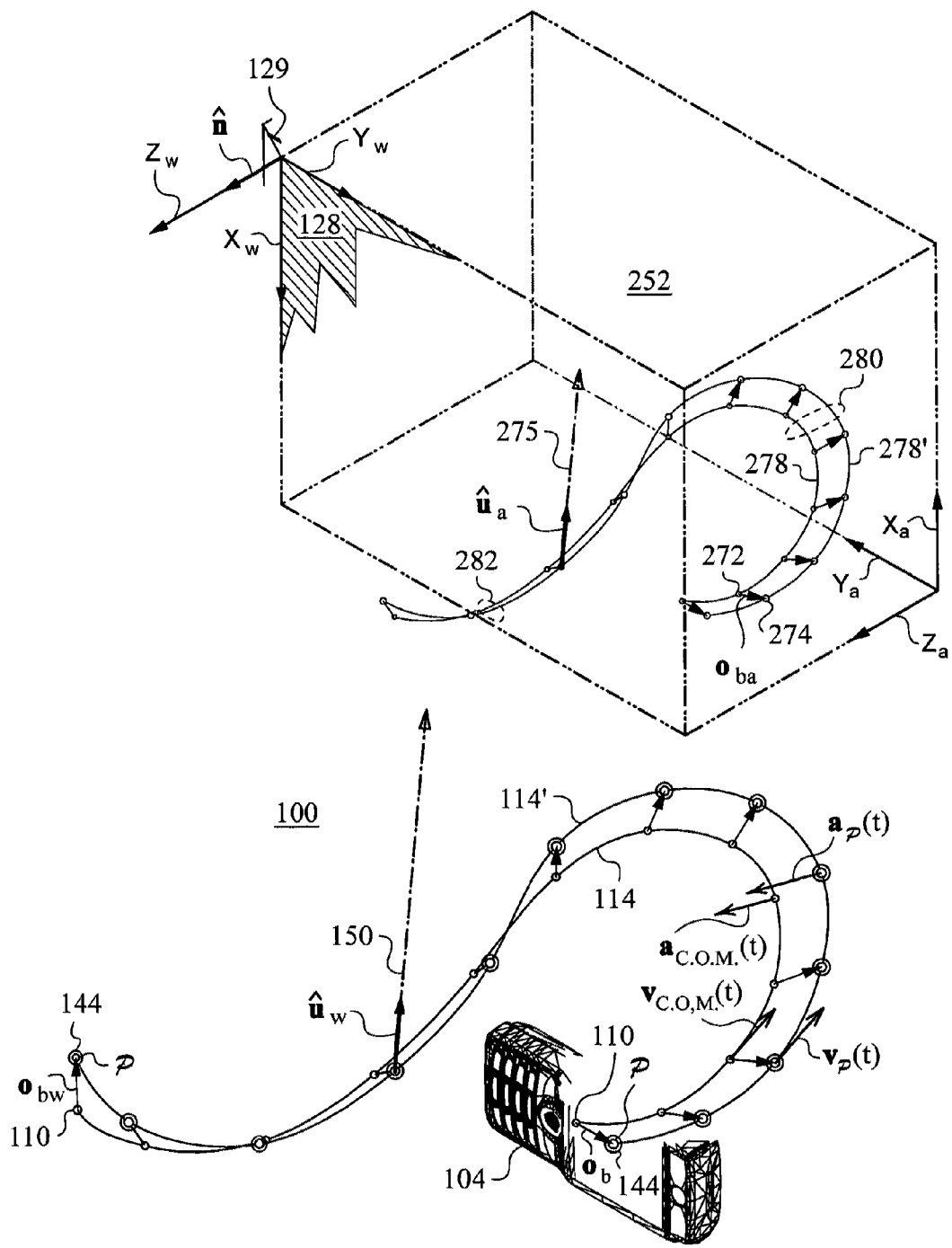
FIG. 14 is a three-dimensional diagram illustrating how the signal related to all six absolute pose parameters of the item is used to recover full trajectories of a point of interest (here point-of-view $P$) and additional information about the item in a three-dimensional digital environment of an application.

To understand the capability of fully parameterized interface 212, we refer now to FIG. 14. This isometric diagram illustrates how C.O.M. 110 trajectory 114 and point-of-view $\mathcal{P}$ trajectory 114' are represented internally by application 216 in its application coordinates ($X_a, Y_a, Z_a$). Note that in this case, application 216 sets the origin of its application coordinates ($X_a, Y_a, Z_a$) in the lower left back corner of the volume corresponding to digital three-dimensional environment 252. Of course, if screen 128 were a volumetric 3D display, application 216 could display trajectories 114, 114' to user 102 in a one-to-one or in a scaled format (e.g., 1:4). Indeed, even a non-3D display can be used to represent 3D information with appropriate calibration known to those skilled in video arts (e.g., illustrating trajectories 114, 114' in a perspective view). We will address embodiments with 3D displays in more detail later.

Application 216 receives a succession of absolute poses of phone 104 from signal 210. For the sake of simplicity, FIG. 14 only shows the successive positions of C.O.M. 110 and of point-of-view $\mathcal{P}$ along with offset vector $o_b$, rather than showing the entire phone 104 it its successive absolute poses. The absolute poses of phone 104 are measured at a constant frame rate. Therefore, the successive positions of C.O.M. 110 and point-of-view $\mathcal{P}$ are spaced equally in time. However, explicit reference to time has been dropped in this drawing figure for the sake of clarity. Furthermore, trajectories 114 and 114' drawn in real three-dimensional environment 100 correspond to those actually executed by phone 104 due to manipulation by user 102 (actual quantities rather than measured and interpolated data).

The values of pose parameters in signal 210 in the present embodiment are mapped one-to-one to all six degrees of freedom of phone 104. Thus, application 216 receives signal 210 containing data about the six degrees of freedom at equal time intervals set by the frame rate.

Since it is difficult to show the orientation portion of absolute pose, we will use a different way to help visualize this information. To do this, we show how the absolute pose A.P. information contained in signal 210 is used. To do this, we pick two points namely the positions of C.O.M. 110 and point-of-view $\mathcal{P}$ at equal time intervals in world coordinates. These two points define between them a vector $o_{bw}$, which is related to the original offset vector $o_b$ that is fixed in body frame 112. Vector $o_{bw}$ is obtained by transforming offset vector $o_b$ with the aid of vector $r_w$ and rotation angles $\alpha_{wb}$, $\beta_{wb}$, $\gamma_{wb}$. In other words, the absolute pose $A.P.(t)=(x_w, y_w, z_w, \alpha_{wb}, \alpha_{wb}, \gamma_{wb})$ recovered and supplied in signal 210 at the corresponding time is used to compute vector $o_{bw}$ from vector $o_b$.

In addition, to showing vector $o_{bw}$, we indicate the direction of optical axis 150. As shown, application 216 keeps track of it with a corresponding vector 275 extending from point 274 that represents point-of-view $\mathcal{P}$ in application coordinates $(X_a, Y_a, Z_a)$. For visualization purposes it is only the direction of optical axis 150 that we are interested in, rather than the magnitude of the vector representing optical axis 150 to the point at which it intersects screen 128. In this way we can simplify our example. To accomplish this, we introduce a unit vector $\hat{u}_w$ along optical axis 150.

A unit vector is defined to be a vector whose length is 1 (unit length) and is commonly denoted by a "hat". Differently put, a unit vector is a normalized vector that is particularly useful in defining a direction in space without carrying with it information about the magnitude along that direction. The method for extracting directional information from any vector v and converting it to a unit vector $\hat{v}$ is given by the following equation:

$$\hat{v} = \frac{v}{\|v\|}, \quad \text{Eq. 4}$$

where $\|v\|$ is the norm or length of the vector (usually computed by employing the Pythagorean Theorem). In fact, when working in any basis, such as our Cartesian stable, world, body and application coordinates, introduced thus far, we may use the unit vector representation of that basis to more efficiently indicate directions. In particular, the convention for defining a Cartesian coordinate system by unit vectors is usually as follows:

$$\hat{\imath} = \begin{bmatrix} 1 \\ 0 \\ 0 \end{bmatrix}; \hat{\jmath} = \begin{bmatrix} 0 \\ 1 \\ 0 \end{bmatrix}; \hat{k} = \begin{bmatrix} 0 \\ 0 \\ 1 \end{bmatrix}. \quad \text{Eq. 5}$$

The use of unit vectors is extensive in coordinate transformations, such as those explained in supporting literature.

The absolute pose information carried in signal 210 is thus visualized by how vector $o_b$ transforms into vector $o_{bw}$. All six degrees of freedom are employed in this transformation, which is therefore indicative of the complete absolute pose information recovered by interface 212 and contained in signal 210.

Application 216 shows vector $o_{bw}$ in its own application coordinates $(X_a, Y_a, Z_a)$, where this vector is mapped to vector $o_{ba}$. In the same vein, unit vector $\hat{u}_w$ is mapped to unit vector $\hat{u}_a$ in application coordinates along optical axis 275. The nature of the mapping employed is discussed below.

Note that in the present embodiment, application 216 keeps track of the absolute pose of phone 104 even outside of its three-dimensional digital environment 252. This is reminiscent of the previous case, when application 216 could use only the portion of plane $X_a$-$Y_a$ that corresponded to screen 128 as its two-dimensional digital environment 252. In that case, application 216 could only draw feedback cursor 218 at the intersection of optical axis 150 of phone 104 with its screen 128. Nevertheless, application 216 knew where optical axis 150 intersected plane $X_a$-$Y_a$ and could provide other kinds of feedback (e.g., audio, tactile/haptic, etc.) to user 102.

Similarly, in the present case, application 216 keeps track of the absolute pose of phone 104 even when that absolute pose is not within the volume of its three-dimensional digital environment 252. The limiting factor here is the ability of camera 144 to recover the absolute pose of phone 104. If camera 144 can no longer see a sufficient number of non-collinear optical inputs (here edges 132A-D and marking 129), then the absolute pose of phone 104 cannot be recovered unambiguously. This is usually because camera 144 is too far away or turned at too steep an angle for edges 132A-D and marking 129 to be within its field-of-view 148. In other cases, camera 144 might not see a sufficient number of non-collinear optical inputs to recover absolute unambiguously pose due to occlusions and other causes interfering with line-of-sight.

The above bring us to an important aspect of the present invention pertaining to the subject of mapping, which extends beyond the teachings of parent application Ser. No. 10/769,484, of which this application is a continuation-in-part. In particular, the parent discloses processing pose data that are derived from the absolute pose of an object as measured in world coordinates. The parent also teaches employing all or a subset of pose data that consist of measured values of the six degrees of freedom (expressed in a parameterization convention that implements Euler angles $(\phi, \theta, \psi)$ rather than rotation angles $(\alpha, \beta, \gamma)$). Further, prior application Ser. No. 10/769,484 also teaches that the absolute pose data or a subset thereof is transmitted to an application where it can be used as control data or input data.

What the present application addresses is how to map between the one or more pose parameters contained in signal 210 and the six degrees of freedom. In simple cases, including the present embodiment, the parameterization used to define the six degrees of freedom is the same as the convention in which the one or more, and in this case all six, pose parameters are parameterized and reported in signal 210. This shared parameterization makes it easier to explain the mapping and the associated issues.

It is important to stress, however, that the parameterizations of the six degrees of freedom and the description of the one or more pose parameters to which signal 210 is related do not need to be the same. For example, the rigid body motion of phone 104 could be parameterized with Cartesian coordinates (or even cylindrical or spherical coordinates) and Euler angles that employ body coordinates (also sometimes referred to as object coordinates), while the camera pose recovery could use robotic vision parameterization such as surface normal n to screen 128 (which is collinear with the world coordinate axis $Z_w$ in the present embodiment; see FIG. 14) and a quaternion to report the one or more pose parameters in signal 210. A person skilled in the art will realize that since all descriptions share the same geometrical basis of rigid body motion in 3D space, they are mathematically equivalent. Of course, a skilled artisan will also realize that the best choice of parameterization is made based on environment 100, application 216, interface 212 and other factors.

We return now to FIG. 14, to discuss the issues of mapping of absolute pose parameters $(x_w, y_w, z_w, \alpha_{wb}, \beta_{wb}, \gamma_{wb})$ contained in signal 210 to the six degrees of freedom of phone 104 parameterized in the same manner. As already noted, the absolute pose parameters to which signal 210 is directly proportional are reported at regular time intervals (set by the frame rate of camera 144). They are visualized with the aid of points 272, 274, or the transformation of offset vector $o_b$ to vector $o_{bw}$ and its mapping to vector $o_{ba}$, and the mapping of unit vector $\hat{u}_w$ to unit vector $\hat{u}_a$. Application 216 thus has available to it all the data required to plot points 272, 274 and unit vector $\hat{u}_a$ in its virtual or digital 3D environment 252 in a one-to-one relationship to real 3D environment 100.

In most cases, however, digital 3D environment 252 is either bigger or smaller than real 3D environment 100 in which phone 104 resides. In other words, the direct mapping of real 3D environment 100 to digital 3D environment 252 is rarely 1:1. Thus, re-plotting actual positions of points 272, 274 and unit vector $\hat{u}_a$ in a one-to-one mapping is usually not feasible. Therefore, it is convenient for the mapping to comprise a scaling in at least one among the three translational and the three rotational degrees of freedom.

In the case of interface 212, all three translational degrees of freedom are scaled 1:4 (note that FIG. 14 is not showing the actual 1:4 scaling exactly for reasons of clarity). In other words, the values of $(x_w, y_w, z_w)$ (or, equivalently, vector $r_w$) are scaled 1:4 in the mapping so that the corresponding application values $(x_a, y_a, z_a)$ expressed in application coordinates $(X_a, Y_a, Z_a)$ are just one fourth of the values of $(x_w, y_w, z_w)$. Also note that since the origins and orientations of world coordinates $(X_w, Y_w, Z_w)$ and application coordinates $(X_a, Y_a, Z_a)$ are not the same, a corresponding coordinate transformation has to be applied between them to correctly translate between $(x_w, y_w, z_w)$ and $(x_a, y_a, z_a)$.

Interface 212 does not use a mapping that scales or in some other way alters any of the three rotational degrees of freedom. That is because application 216 is designed to work with vector $o_{ba}$ (between points 272, 274) that corresponds to transformed and scaled but otherwise undistorted offset vector $o_{bw}$ between C.O.M. 110 and point-of-view $\mathcal{P}$. If offset vector $o_{ba}$ were distorted due to scaling in any of the rotational degrees of freedom, than the rotations executed by user 102 in real 3D space of environment 100 would not correspond to those recovered in application 216. For example, a full twist or rotation by 360° ($2\pi$) in angle $\alpha_{wb}$, $\beta_{wb}$ or $\gamma_{wb}$ would not correspond to a complete twist or rotation by the corresponding angle in application coordinates $(X_a, Y_a, Z_a)$ as interpreted in application 216. Of course, in some cases scaling of one or more of the three rotational degrees of freedom may be useful and we will discuss such situations in further embodiments.

Based on signal 210 periodically reporting the full absolute pose as visualized by vector $o_{bw}$ and unit vector $\hat{u}_w$, application 216 recovers corresponding vector $o_{ba}$ between points 272, 274 and unit vector $\hat{u}_a$ in its digital 3D environment 252. The result is a time series of vectors $o_{ba}$ that define points along recovered trajectories 278, 278' and a series of unit vectors $\hat{u}_a$. Trajectories 278, 278' correspond to actual trajectories 114, 114' to the extent that application 216 is able to interpolate between the successive values of vector $o_{bw}$ in world coordinates $(X_w, Y_w, Z_w)$. A person skilled in the art will recognize that simple interpolation between successive vectors $o_{bw}$ can be performed naively, i.e., by simple curve fitting. This may be practicable when the frame rate is high, e.g., on the order of 100 Hz or higher. However, at lower frame rates interpolation quality can be improved by additional analysis of the data from signal 210.

As already taught in the parent application Ser. No. 10/769, 484, a temporal series or a time sequence of pose data containing the six degrees of freedom can be further processed to derive other quantities. These quantities may include, for example, first and higher order time derivatives of the translational and rotational degrees of freedom. Therefore, given a sufficient number of vectors $o_{bw}$, application 216 can start computing reliable values of first and second order time derivatives of linear displacements (i.e., $$\frac{dx_w}{dt}, \frac{dy_w}{dt}, \frac{dz_w}{dt} \text{ and } \frac{d^2x_w}{dt^2}, \frac{d^2y_w}{dt^2}, \frac{d^2z_w}{dt^2}).$$

These quantities can be used to construct vectors that describe the linear velocities and accelerations of C.O.M. 110, denoted by $v_{C.O.M.}(t)$ and point-of-view $\mathcal{P}$, denoted by $v_{C.O.M.}(t)$, $a_{C.O.M.}(t)$ and $v_P(t)$, $a_P(t)$, respectively.

The same procedure can be applied to the rotational degrees of freedom to find angular velocities (commonly denoted by $\omega_q$ with subscript "q" indicating the axis around which the rotation is taking place) and angular accelerations $$\left(\frac{d\omega}{dt}\right).$$

A person skilled in the art will appreciate that when dealing with angular quantities, the axes around which the angular velocities and accelerations are computed need to be properly defined just as in the case of the rotation convention. For example, to keep matters simple the rotations can be defined along body coordinate axes $(X_b, Y_b, Z_b)$ of phone 104. With that choice, the angular quantities can be: $\omega_{zb}$, $\omega_{yb}$, $\omega_{xb}$ and $$\frac{d\omega_{zb}}{dt}, \frac{d\omega_{yb}}{dt}, \frac{d\omega_{xb}}{dt}.$$

It should, be understood that the rotations do not need to be defined in the same convention as the 3D rotation convention of phone 104 in body coordinates $(X_b, Y_b, Z_b)$.

Once the linear and angular velocities and accelerations are computed, application 216 can employ them in any useful manner. For example, as already taught in the parent application, the values of these derived quantities may be used as additional input in application 216 including gesture input, control input or just plain data input. Also, in some embodiments, application 216 can suggest the most appropriate frame rate for camera 144 based on linear velocities and accelerations as well as angular velocities and accelerations to avoid motion blur and/or to improve accuracy and performance of interface 212.

Even with scaling, portions of recovered trajectories 278, 278' are still outside digital 3D environment 252. Location 280 shows where trajectories 278, 278' enter into digital environment 252. Location 282 shows where trajectories 278, 278' again leave environment 252. Therefore, when environment 252 coincides with the volume in which visual display to user 102 can be generated, the portions of recovered trajectories 278, 278' outside digital environment 252 cannot be visualized to user 102. However, other feedback, including visual, audio, tactile/haptic, etc. may still be provided to user 102 as a function of trajectories 278, 278' lying outside digital environment 252. Another alternative in non-linear scaling (e.g., logarithmic) to effectively compress virtual trajectories to stay bounded with the physical dimensions of the display.

In the present embodiment, the three translational degrees of freedom available to phone 104 are conveniently parameterized by Cartesian coordinate axes $X_w$, $Y_w$ and $Z_w$. Of these, two translational degrees of freedom, namely those parameterized by $X_w$ and $Y_w$ axes define a plane in environment 100. This plane is plane-parallel, and indeed co-planar with display screen 128. The reason this is advantageous is that user motion in any plane that is plane-parallel with screen 128 is easily translated to motion in the plane of screen 128. Hence this motion can be used directly to drive corresponding user feedback, such as generating motion of cursor 228, producing a trace (e.g., digital ink) or drawing some other place-holder indicating the position of C.O.M. 110 of phone 104 in application coordinates ($X_a, Y_a, Z_a$).

Figure 15:
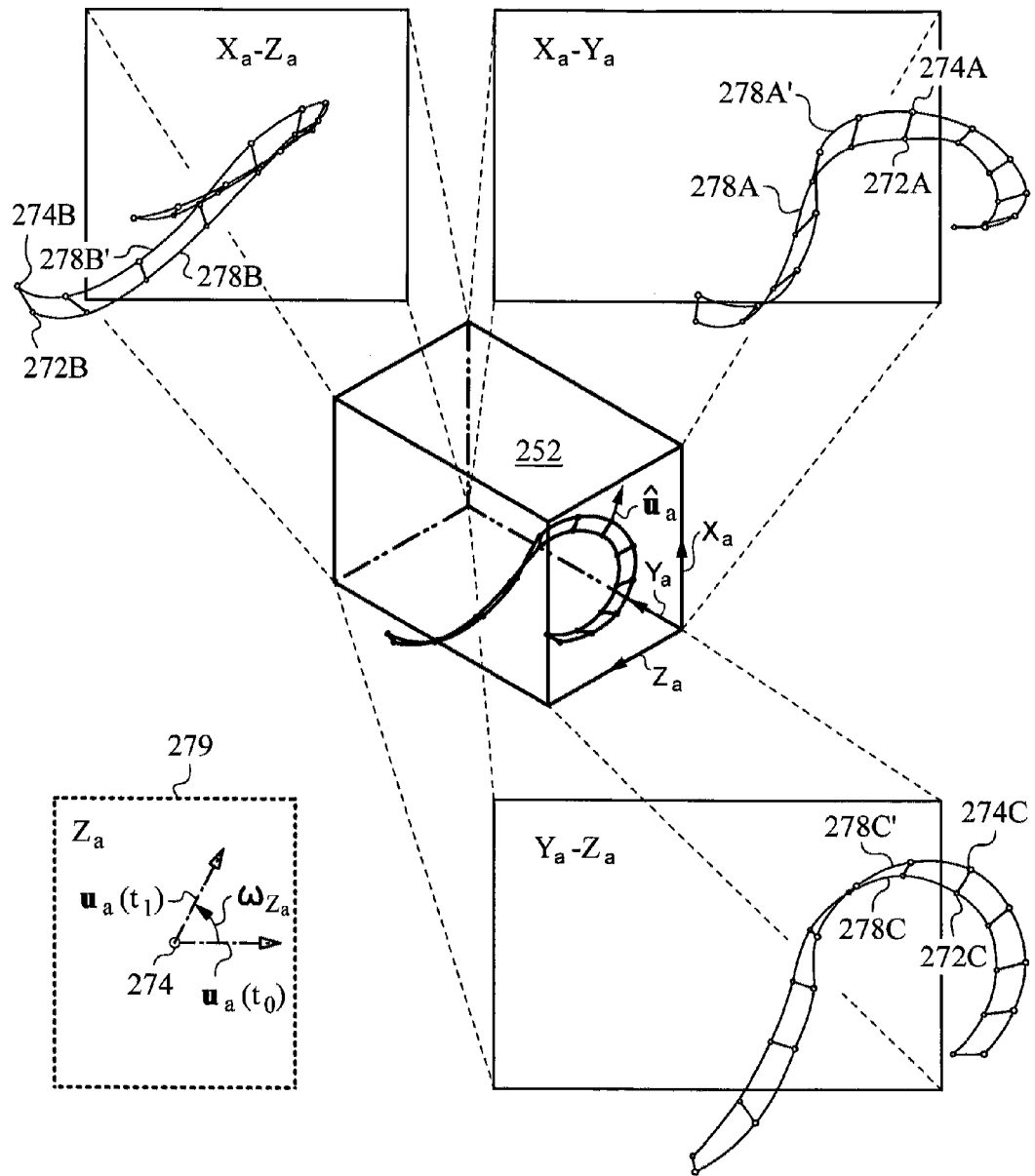
FIG. 15 is a three dimensional diagram illustrating the projections of full trajectories into 2D subspaces.

FIG. 15 illustrates the above point with a further mapping by projection from digital 3D environment 252 into 2D subspaces. In the case shown, the 2D subspace is a plane $X_a$-$Y_a$ defined in application coordinates ($X_a, Y_a, Z_a$). Plane $X_a$-$Y_a$ is plane parallel to plane $X_w$-$Y_w$ and thus to screen 128. In this projection, information about $Z_a$ recovered trajectories 278, 278' in the $Z_w$ axis (corresponding to $Z_a$ axis) is discarded. Incidentally, so it the $Z_w$ axis component of unit vector $\hat{u}_w$ (corresponding to $Z_a$-axis of unit vector $\hat{u}_a$). The projected 2D trajectories 278A, 278A' and the 2D points 272A, 274A corresponding to projections of 3D points 272, 274 are very useful in certain embodiments of application 216. Specifically, for actions in which only information in the plane of screen 128 is required as input, 2D trajectories 278A, 278A' and 2D points 272A, 274A offer all the required information to generate user input.

A similar approach can be taken to obtain user input information from projections of 3D trajectories into 2D planes $X_w$-$Z_w$, $Y_w$-$Z_w$ corresponding to planes $X_a$-$Z_a$, $Y_a$-$Z_a$ in application coordinates ($X_a, Y_a, Z_a$). It is instructive to note that the 2D projections still contain a lot of information about the absolute pose of phone 104. Indeed, even projections of certain degrees of freedom into 1D subspaces, i.e., their projections onto lines, may be sufficient to provide meaningful input data for application 216.

Now, in accordance with the present invention, a mapping exists between the one or more absolute pose parameters to which signal 210 is related and at least one of the six degrees of freedom of phone 104. Given the above examples of 3D to 2D projections we are ready to gain a better appreciation for the kinds of mappings that can be performed in principle, and those that may be particularly useful in a preferred implementation of the present invention.

A mapping is a rule or set of rules of correspondence or relation between sets, that associate(s) each element in a set (also called the domain) with a unique element in the same or another set (also called the range). Any type of mapping including many-to-one (e.g., projections into lower-dimensional subspaces) and one-to-many (e.g., duplication of some elements into higher-dimensional subspaces) can be used in the present invention. For the purposes of the present description, we define the first set to contain between one and six degrees of freedom available to phone 104 in 3D environment 100. We define the second set to contain the one or more absolute pose parameters to which signal 210 is related (e.g., by being directly proportional to them).

In the present embodiment, FIG. 14 shows a one-to-one and proportional mapping between these two sets. The parameterization is full, and thus all six degrees of freedom in the first set are mapped to the second set. In addition, of the six degrees of freedom in the first set, the three translational degrees of freedom are mapped with a concurrent 1:4 scaling factor to the corresponding three absolute pose parameters ($x_w, y_w, z_w$) corresponding to these translational degrees of freedom in signal 210. The rotational degrees of freedom in the first set are mapped one-to-one without scaling to the corresponding three absolute pose parameters ($\alpha_{bw}, \beta_{bw}, \gamma_{bw}$) corresponding to these rotational degrees of freedom in signal 210.

It is important to realize that the mapping can be applied anywhere in interface 212. In other words, although in the present embodiment the mapping is performed on-board phone 104 by image processing electronics 156 during step 248 (see FIG. 12), it could also be performed elsewhere. For example, the mapping of the data in signal 210 could be carried out in host 218 either by application 216 or by other processing resources. In fact, the mappings of absolute pose parameters defined in world coordinates by signal 210 through projection into planes $X_a$-$Y_a$, $X_a$-$Z_a$, $Y_a$-$Z_a$ in application 216 is also a mapping falling within the definition of the invention. Clearly, the concept of mapping is very powerful and useful in generating user input in interfaces according to the invention.

Referring back to FIG. 15, we examine a useful mapping for representing the rotational degrees of freedom of phone 104 in application coordinates ($X_a, Y_a, Z_a$). In particular, FIG. 15 shows unit vector $\hat{u}_w$ fully recovered as vector $\hat{u}_a$ in digital 3D environment 252 of application 216. Now, unit vector $\hat{u}_a$ is mapped by projection along the $Z_a$ axis only, as shown in the lower left block 279. Of course, such projection is generally not going to preserve the unit norm of a unit vector (unless the dot product of unit vector $\hat{u}_a$ with the basis vector $\hat{k}$ for the $Z_a$ axis as defined above is equal to one). Therefore, such projection of unit vector $\hat{u}_a$ is designated by $u_a$ without the "hat" to indicate that it may vary in magnitude. Furthermore, the projection of unit vector $\hat{u}_a$ is time-dependent, so that $u_a = u_a(t)$. Block 279 illustrates the projection of unit vector $\hat{u}_a$ at times $t_0$ and $t_1$, or $u_a(t_0)$ and $u_a(t_1)$. Clearly, the projection of the rotational state of phone 104 about world axis $Z_w$ and thus around axis $Z_a$ changes during that time period. We can ascertain this by looking back at FIG. 13 or FIG. 14. To keep track of the change in time, application 216 computes an angular velocity $\omega_{Za}$ of vector $u_a(t)$ about axis $Z_a$.

In fact, similar mappings can be applied to break down the rotational degrees of freedom around any one or more axes in world coordinates and application coordinates. In the art, such projections are given different names, including "pan angles", "attitude angles", "tilt angles" and still other names. Clearly, the mapping of the three rotational degrees of freedom can recover any such angle or combinations thereof for use as input to application 216. Furthermore, in order to adjust angular sensitivity, the mapping may include scaling of any of the three rotational degrees of freedom.

Figure 16:
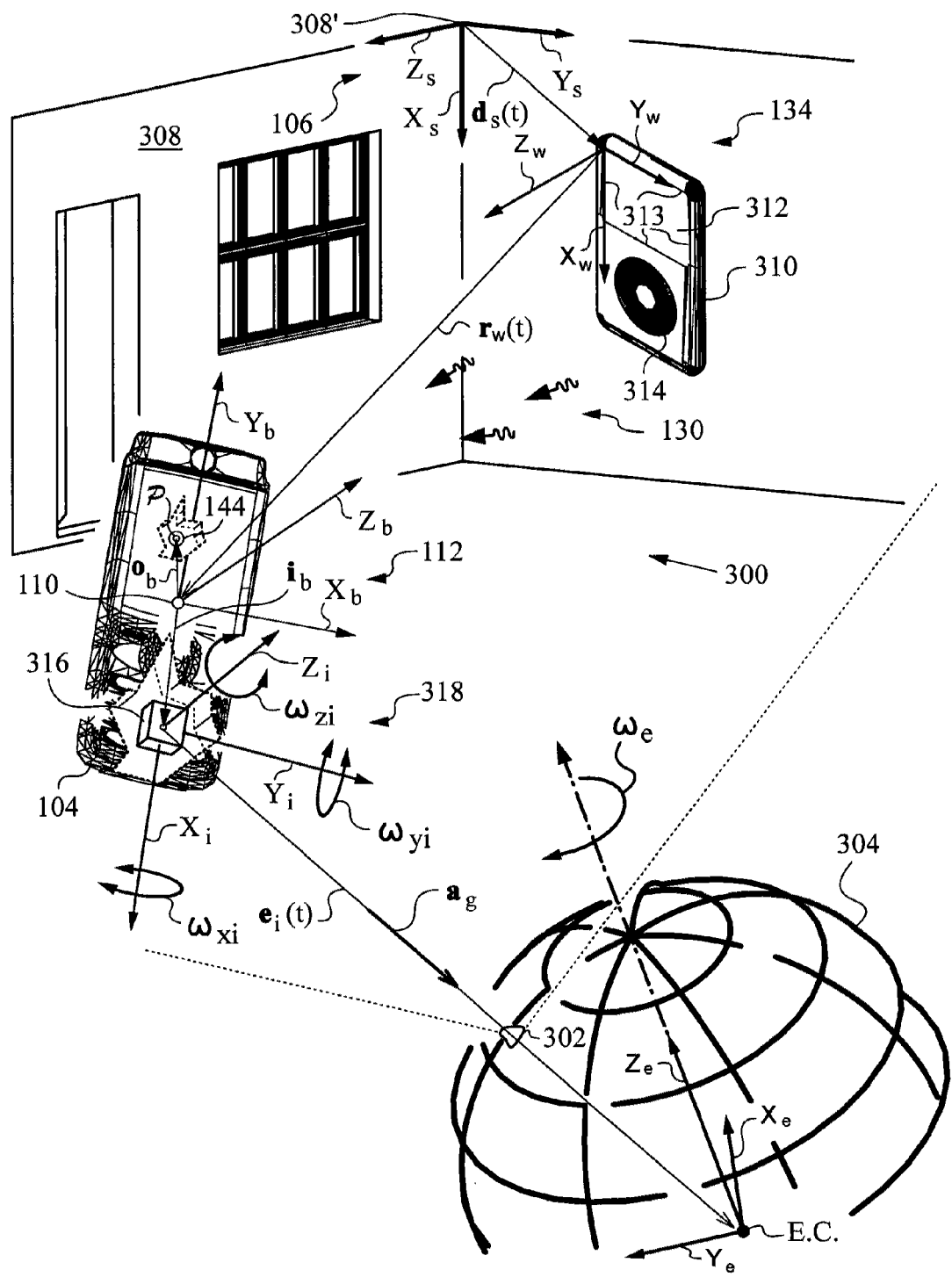
FIG. 16 is a three dimensional view of a preferred embodiment of the interface employing a relative motion sensor in addition to the photosensor.

The above embodiments have been disclosed first, in order to present the foundations necessary for understanding the preferred embodiment shown in FIG. 16. Corresponding parts in this preferred implementation of an interface 300 are labeled with the same reference numerals as in prior embodiments for clarity. It will be appreciated by a person skilled in the art, however, that analogous parts or steps can be modified to suit the particular embodiment.

FIG. 16 shows item 104, which is once again embodied by a phone, in a real three-dimensional environment 302 on the surface of planet Earth 304. Environment 302 lies in the northern hemisphere and is shown along an expanded view indicated by dotted lines above Earth 304. Earth 304 is parameterized by Earth coordinates ($X_e, Y_e, Z_e$) employing the Cartesian coordinate convention. The origin of Earth coordinates ($X_e, Y_e, Z_e$) is located at the center of mass of the planet and oriented such that rotation of Earth 304 described by angular velocity $\omega_e$ ($2\pi$/day or 15°/hour) is around axis $Z_e$.

Phone 104 has on-board camera 144 whose point-of-view $\mathcal{P}$ is offset by vector $o_b$ from its C.O.M. 110, just as in the previous embodiments. The same body coordinates ($X_b, Y_b, Z_b$) are employed in describing moving frame 112 of phone 104. In the present case, stable coordinates ($X_s, Y_s, Z_s$) of stable frame 106 within which the motion of phone 104 is measured are defined by a room 308, and their origin is located in upper corner 308'. It is important to note that as far as radiation 130 used by on-board camera 144 to recover the phone's 104 absolute pose is concerned, stable coordinates $(X_s, Y_s, Z_s)$ parameterizing stable frame 106 in environment 302 and Earth coordinates $(X_e, Y_e, Z_e)$ parameterizing Earth frame 304 are fixed with respect to each other (barring earthquakes or other natural disasters affecting room 308).

Interface 300 further includes a stationary object 310 having a screen 312 whose edges 313 embody a set of non-collinear optical inputs detectable via electromagnetic radiation 130. World coordinates $(X_w, Y_w, Z_w)$ parameterizing world frame 134, or more precisely a gaming space in the present embodiment, are located in the upper left corner of screen 312. Axes $X_w$ and $Y_w$ of gaming space 134 define plane $X_w$-$Y_w$ that is co-planar with screen 312.

In contrast to previous embodiments in which the stationary object, namely television 126, did not move in stable frame 106, in the present embodiment object 310 may move from time to time, or even frequently. That is because object 310 is a small game console. Thus, displacement vector $d_s$ from stable coordinates $(X_s, Y_s, Z_s)$ parameterizing frame 106 to world coordinates $(X_w, Y_w, Z_w)$ defined by game console 310 is shown with an explicit dependence on time; $d_s = d_s(t)$. Additionally, note that rotation matrix $R_{sw}$ for performing the 3D rotation that needs to be executed along with the addition of displacement vector $d_s(t)$ to complete the coordinate transformation between stable frame 106 and gaming frame 134 is also time dependent in this embodiment; $R_{sw} = R_{sw}(t)$.

Game console 310 has a selection unit or touch control 314 that is used for operating it. Touch control 314 is also used for as a feature for breaking the symmetry of screen 312 for unambiguous pose recovery. Console 310 may have additional controls as well as mechanisms (not shown) for placing it in an appropriate location in room 308.

In addition to camera 144, phone 104 is equipped with a relative motion sensor 316 offset from C.O.M, 110 by an offset vector $i_b$. Relative motion sensor 316 has the capability to produce data indicative of a change in at least one among the six degrees of freedom of phone 104. In fact, in the present case, sensor 316 is a compound inertial sensor including gyroscopes and accelerometers. These devices are well-known in the art. They can sense rotations about, and translations along, three orthogonal axes $X_i$, $Y_i$ and $Z_i$ that define inertial sensor coordinates $(X_i, Y_i, Z_i)$ in an inertial sensor frame 318 that is attached to phone 104. The rotations that are sensed by the gyroscopes of motion sensor 316 are explicitly indicated by angular velocities $\omega_{xi}$, $\omega_{yi}$ and $\omega_{zi}$.

Inertial devices such as MEMS accelerometers and solid state gyroscopes do not interact with real 3D environment 302 by detecting radiation 130. Instead, solid state gyroscopes are sensitive to rotational speeds and accelerometers are sensitive to acceleration and gravity effects.

More precisely, the accelerometers sense Earth 304 due to its gravity along a vector $e_i$ between the given accelerometer and the center of the Earth (E.C.). Since phone 104 moves, vector $e_i$ exhibits an explicit dependence on time; $e_i = e_i(t)$. In most practical applications, what one needs to consider is that the accelerometer senses the gravitational acceleration $a_g$ in stable frame 106 of environment 302. In addition, the accelerometers are sensitive to the actual acceleration of phone 104 in frame 106. Thus, since the accelerometers are sensitive to the actual acceleration and the influence of acceleration due to gravity, it is necessary to subtract the influence of gravity. To do this, the accelerometers need to obtain an estimate of the orientation of phone 104. It is mainly due to the problems associated with pose estimation and gravitational acceleration that accelerometers drift in stable reference frame 106 or gaming frame 134 and only provide indication of relative motion by double integration.

Meanwhile, gyroscopes measure changes in the rotation of phone 104 about the axes of inertial coordinates $(X_i, Y_i, Z_i)$ of frame 318 due to noise and imperfect initial conditions (angular bias). The output of the solid state gyroscope has to be integrated to estimate orientation. As a result, a constant bias error causes an angular error that grows linearly with time. In addition, the integrated noise introduces errors with standard deviation proportional to the square root of time.

During operation of interface 300 the recovery of absolute pose of phone 104 based on images obtained with the aid of radiation 130 is performed as already described in the previous embodiments. However, because console 310 is not always stationary in room 308, signal 210 preferably includes absolute pose parameters $(x_w, y_w, z_w, \alpha_{wb}, \beta_{wb}, \gamma_{wb})$ and $(x_s, y_s, z_s, \alpha_{sb}, \beta_{sb}, \gamma_{sb})$. In other words, absolute pose parameters in gaming coordinates $(X_w, Y_w, Z_w)$ of gaming frame 134 and in stable coordinates $(X_s, Y_s, Z_s)$ of stable frame 106 of environment 302 are computed and reported in signal 210. As a result, game application 216 can keep track not only of where phone 104 is with respect to console 130, but also where they both are in environment 302, i.e., in room 308. This information may not be required for all game applications 216. However, any application 216 that involves an augmented reality that overlaps with environment 302 will typically require this additional data.

In addition, interface 300 also receives signals related to changes in the pose of phone 104 from motion sensor 316. Unfortunately, such relative pose data from motion sensor 316 is not calibrated with respect to either frame 106 or frame 134. Thus, it cannot be used directly to corroborate, replace or augment absolute pose data obtained through camera pose recovery in frames 106 and 134. Consequently, unless a simple "mouse-mode" or "relative pointing mode" is required for user input by gaming application 216, the relative pose data from motion sensor 316 is not very helpful.

The main advantage of motion sensor 316 is its speed, which may be between 100 Hz and 200 Hz or even higher. Meanwhile, operating camera 144 at such frame rates is very resource intensive and may further be limited by the available level of radiation 130. Simply put, at frame rates of 100 Hz and above the images recovered by camera 144 may be too dim to extract the non-collinear optical inputs 313 and 314 for algorithms of step 246 (see FIG. 12) to yield good camera pose recovery. In addition, processing image data at such rates is computationally intensive and requires a lot of on-board power.

Fortunately, the drift experienced by accelerometers and gyroscopes of motion sensor 316 is typically not significant over short time periods. Specifically, because of single integration and accumulation of errors the gyroscopes can provide good readings of rotations executed by phone 104 over periods of 10 sec or more. Double integration and errors due to imperfect cancellation of gravity due to errors in orientation estimates render accelerometers less robust. Their readings of changes in motion are reliable over periods of a few seconds. The constant bias error causes a position error that grows quadratically with time. Further, the integrated noise introduces errors with standard deviation proportional to time raised to the power of 3/2. This is in addition to imperfect gravity cancellation.

The preferred embodiment takes advantage of the strengths of optical pose recovery with camera 144 and relative pose information from motion sensor 316. Specifically, absolute pose data from signal 210 is employed to periodically calibrate the gyroscopes and accelerometers of motion sensor 316. In performing the calibrations, the accelerometers should be calibrated, for example, once every 1-5 sec and the gyroscopes should be calibrated, for example, once every 10-20 sec.

With this strategy, interface 300 can leverage the strength of motion sensor 316 to offset the weakness of camera 144. By operating camera 144 at a frame rate of just a few Hz or even less than 1 Hz, interface 300 can employ high-quality absolute pose parameters recovered in frames 106 and 134 to keep the accelerometers and gyroscopes calibrated in these frames. For very high-performance, the accelerometers can be calibrated about once every second and the gyroscopes about once every two seconds. Then, while camera 144 is off and not taxing on-board resources of phone 104, motion sensor 316 can provide its relative pose information to supplement or even interpolate between absolute pose parameters reported by signal 210.

The relative pose data can be processed on-board phone 104 and submitted to host 310 along with signal 210. Alternatively, it can be processed separately and sent to host 310 on a dedicated channel for processing off-board. Furthermore, the relative pose data can be related to just one absolute pose parameter or more. In a fully parameterized interface 300, the relative pose data can be related to all six degrees of freedom. A person skilled in the art of sensor fusion will understand the various tradeoffs and optimizations involved in achieving the best performance with the least resource allocation and power consumption. Further information on this subject can is provided in Oliver J. Woodman, "An Introduction to Inertial Navigation", Technical Report Number 696, University of Cambridge, August 2007.

In addition to the above, it is preferable to use data from motion sensor 316 to also stabilize camera 144. This is important at times when camera 144 cannot support a sufficiently short exposure time $t_e$, either due to rolling shutter, insufficient level of radiation 130, excessive angular movement by user 102 or other reasons. At such times, the data from sensor 316 should be sent to image processing electronics 156 to help remove motion blur from the image. Alternatively, or in addition, if lens 146 is adjustable, the data from motion sensor 316 can also be used to actively adjust lens 146 to avoid motion blur. Active and passive motion blur removal is a subject known to those skilled in the art. The reader is referred to literature in the field of optical image stabilization for further information.

To further decrease the resources dedicated to camera 144 and its power consumption, it is preferable to implement sparse imaging. In fact, the preferred embodiment relates to changes in the typical operation of row and column multiplexing blocks 192, 194 (see FIG. 9). The approach is referred to as sparse-imaging or selective imaging and it is illustrated in FIG. 17.

Figure 17:
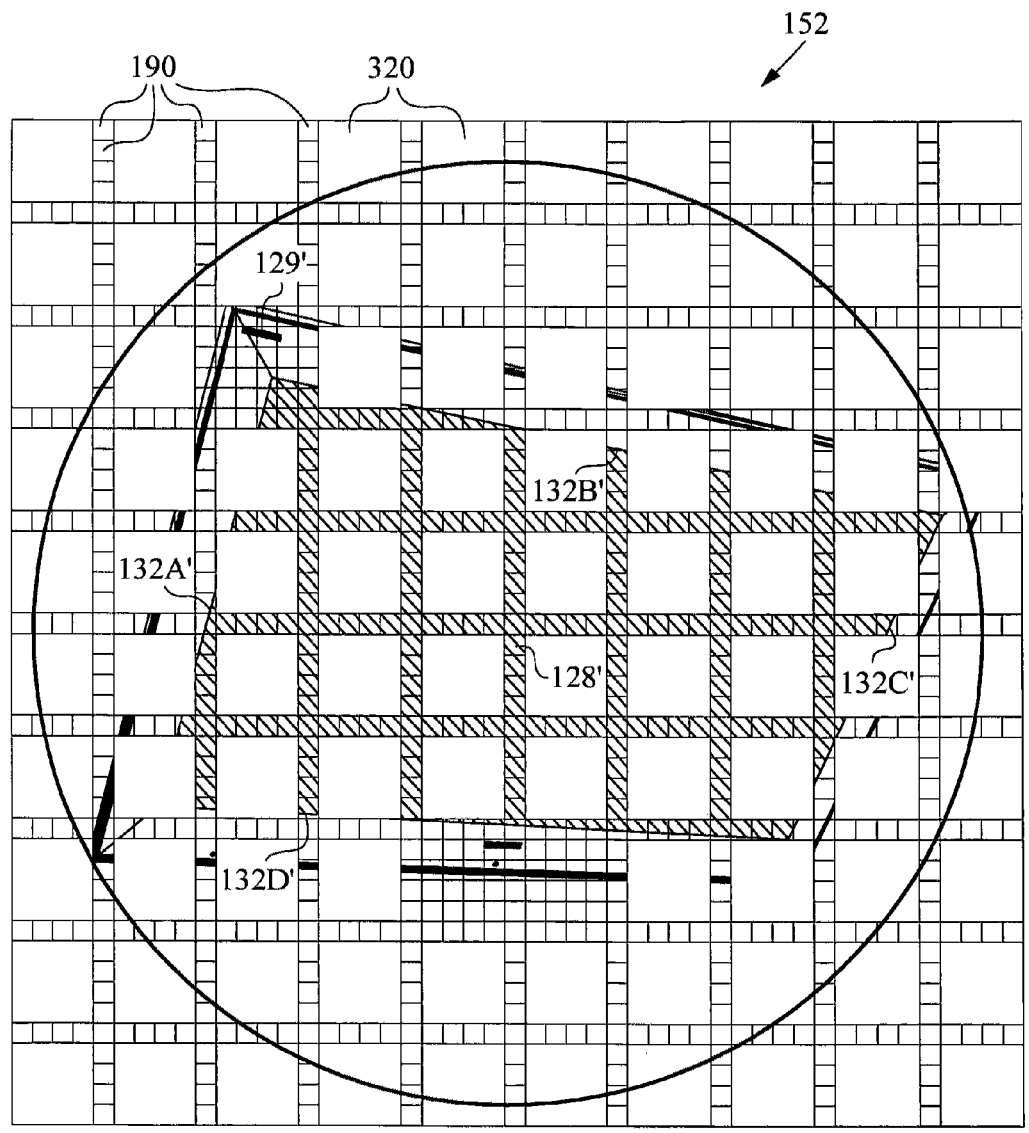
FIG. 17 is a plan view of a preferred way of operating the photosensor employed in optical absolute pose recovery.

The plan view of photosensor 152 in FIG. 17 shows a preferred method of allocating pixels 190 for sparse imaging. It is based on the previous embodiment where the stationary object is television 126 with screen 128. Regions 320 of pixels 190 are not used in this embodiment. Instead, only selected rows and columns are activated by camera 144 to collect image data from radiation 130.

For example, every $5^{th}$ or even every $10^{th}$ row, and every $5^{th}$ or even every $10^{th}$ column of pixels 190 belonging to photosensor 152 are active. In addition, regions of interest around image 129' of marking 129 or around images of other features of interest (e.g., those that can further improve the quality of camera pose recovery) can include active pixels 190, as shown. In the present embodiment every $10^{th}$ row and every $10^{th}$ column of pixels 190 are active, thus drastically reducing the number of pixels 190 that need to be processed by image processing electronics 156. (Note that FIG. 17 does not show all pixels 190 and is merely illustrative of the sparse sampling concept.)

Non-collinear optical inputs 132A-D, 129 and therefore their images 132A'-D', 129' are intrinsically high contrast. That is because edges 132A-D are the light-to-dark transitions between illuminated screen 128 and the mechanical frame of television 126. Marking 129 is usually a highly visible feature by manufacturing design, although its contrast may be lower. In an alternative embodiment, if marking 129 does not provide sufficient optical contrast, the non-collinear optical input for breaking the rectangle symmetry of screen 128 can be the power light typically embedded in the mechanical frame of television 126 or still some other high optical contrast feature attached to or integrated with television 126.

Sparse column and row imaging works well, because it is known that full images 132A'-D' are lines. Thus, to reconstruct them, it is sufficient to detect a few of their line segments in the sparse image obtained only from active pixels 190. The same goes for image 129' with the additional simplification that image 129' does not need to be as high-quality since it is may be used for symmetry braking only.

Smart camera technology methods can be applied concurrently or in addition to sparse imaging to further simplify the image capture process and reduce resource allocation on-board phone 104. For example, when camera 144 is a modern smart camera, it may employ 12-bit grayscale values in pixels 190 to support operation in lower light conditions or, alternatively, to shorten exposure time $t_e$ and/or support an increase in frame rate. Additionally, smart camera 144 may support frame averaging, multiple regions of interest (MROIs) as well as localized brightness adjustment and application of various filtering functions.

As a person skilled in the art will realize, it would be advantageous to apply such image processing functions in sensor 152 rather than having to apply them after demultiplexing in image processing electronics 156. Furthermore, camera 144 can benefit from any number of the other improvements as well. For example, once images 132A'-D' and 129' of edges 132A-D and marking 129 (representing the non-collinear features) are found in a first full frame image, camera 144 may set regions of interest around these images only. The margin around the images should be large enough to ensure that the corresponding images do not move outside the region of interest from frame to frame. In this way, the number of pixels 190 needed to track images of the non-collinear optical inputs from frame to frame can be reduced still further than with simple column and row imaging.

Figure 18:
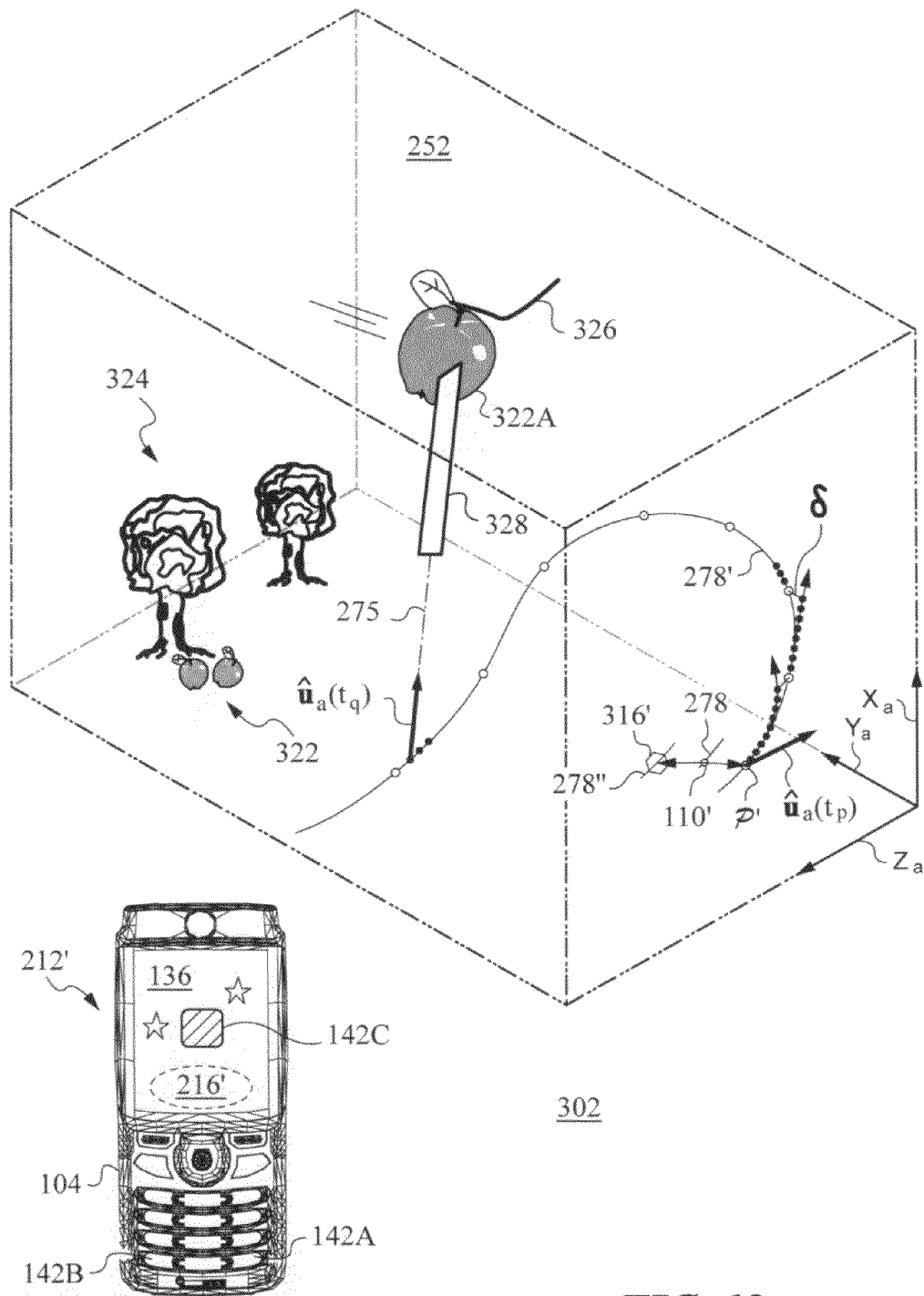
FIG. 18 is a three-dimensional diagram illustrating a gaming application employing the preferred embodiment of the interface operating the photosensor in the preferred way illustrated in FIG. 17 and using a relative motion sensor for interpolation.

The improved performance of interface 212 when phone 104 employs smart camera 144 and interpolates with motion sensor 316 can be leveraged for more involved applications. FIG. 18 illustrates in a three-dimensional diagram in which an embodiment of application 216' designed for gaming takes advantage of the preferred embodiment of interface 212 for a shooting game. Note that most of game application 216' in this embodiment runs on-board phone 104.

Specifically, game application 216' employs screen 136 of phone 104 not only for providing visual feedback to user 102, but also to enable additional interaction with user 102 via an interface 212'. Game application 216' of this variety is frequently referred to as a "mobile application" or simply an "app" by those skilled in the art. Such "apps" are typically written in JavaScript, C, C++ as well as many "app development" specific software languages. In the embodiment shown, interface 212' employs the touch-sensitive screen 136 to display a touch button 142C.

Game application 216' takes advantage of the volume parameterized by application coordinates $(X_a, Y_a, Z_a)$ to display digital 3D application environment or gaming environment 252 to user 102. Note that it is possible to use screen 136 to display gaming environment 252 to user 102. Normally, however, screen 136 is too small and screen 128 of television 126, or, in this case screen 312 of game console 310 is better suited for visualizing for showing user 102 gaming environment 252.

Nevertheless, certain important aspects of the game can be displayed to user 102 on screen 136. These aspects can involve information that normally interferes with gaming environment 252. For example, information about the user's 102 status, score and gaming parameters may be more conveniently communicated to user 102 by visual feedback presented on screen 136. In the present case, the stars on display 136 indicate to user 102 his/her score.

FIG. 18 shows recovered trajectory 278 of C.O.M. 110 in application coordinates $(X_a, Y_a, Z_a)$. Also shown are short portions of recovered trajectory 278' of point-of-view $\mathcal{P}$, as well as recovered trajectory 278" of motion sensor 316. The recovered locations of C.O.M. 110, point-of-view $\mathcal{P}$ and motion sensor 316 are indicated in application coordinates $(X_a, Y_a, Z_a)$ by corresponding primed references 110', $\mathcal{P}'$, 316' for more clarity.

Open points along recovered trajectory 278' indicate the recovered positions of point-of-view $\mathcal{P}'$ from camera pose recovery performed in accordance with any algorithm according to the present invention. As explained above, this data visualizes the full parameterization of the absolute pose A.P.(t) of phone 104 in application coordinates $(X_a, Y_a, Z_a)$ at the corresponding point in time (when the image was captured by camera 144). For example, A.P.$(t_p)$ is associated with the first point along recovered trajectory 278' at image capture time $t_p$ when unit vector was $\hat{u}_a(t_p)$.

Black points along recovered trajectory 278' indicate the recovered positions of point-of-view $\mathcal{P}'$ based on data from relative motion sensor 316, and more precisely from its gyroscopes and accelerometers. Therefore, motion sensor 316 enables interpolation of all six degrees of freedom of phone 104 with relative poses collected between the times when camera 144 enables recovery of the absolute pose. In a practical application, motion sensor 316 may operate at up to 200 Hz and camera 144 at just 1 Hz. Therefore, the ratio of black points to open points would be about 200:1 (much larger than shown for illustrative purposes in FIG. 18).

It is important to note that motion sensor 316 initially recovers the relative pose with respect to itself. In other words, its relative pose data about phone 104 inherently pertains to trajectory 278" of motion sensor 316 and a unit vector drawn from its center (not shown). Therefore, to interpolate trajectory 278 of C.O.M. 110 or, as in this case, to interpolate trajectory 278' of point-of-view $\mathcal{P}$ a coordinate transformation must be applied to the data provided by motion sensor 316.

This is easily accomplished since offset vector $i_{bw}$ in world coordinates of motion sensor 316 from C.O.M. 110 and its orientation can be determined from the optical pose recovery. In addition, offset vector $o_{bw}$ of point-of-view $\mathcal{P}$ from C.O.M. 110 and its orientation is also known. Thus, the coordinate transformation to be applied to relative pose data of motion sensor 316 to interpolate the pose at point-of-view $\mathcal{P}'$ between optical absolute pose recovery points involves adding the total offset due to both offset vectors $i_{bw}$ and $o_{bw}$ and the application of the rotation matrix. Once again, the reader is referred to G. B. Arfken (op. cit.) for the various intricacies involved in coordinate transformations.

Focusing now on recovered trajectory 278' we see the effect of drift in accelerometers and gyroscopes of motion sensor 316. The drift manifests itself in an accumulating departure δ from trajectory 278'. The orientation of unit vector $\hat{u}_a(t)$ also drifts with time by some solid angle (not shown). However, once camera 144 obtains the absolute pose from its algorithm, the departure δ from properly recovered trajectory 278' and the orientation of unit vector $\hat{u}_a(t)$ can both be compensated. At the same time, the gyroscopes and accelerometers of motion sensor 316 should be re-calibrated with the newest absolute pose. The designer of interface 300 may wish to smoothen the jumps in recovered trajectory 278' and in camera orientation by applying any suitable algorithm. Suitable reference on this subject is provided by Kenneth Gade, "Introduction to Inertial Navigation and Kalman Filtering", INS Tutorial, Norwegian Centre, FFI (Norwegian Defense Research Establishment).

The considerably better quality of recovered trajectory 278' and unit vector $\hat{u}_a(t)$ permit game application 216' to engage user 102 in a more challenging implementation of interface 300 than shopping (which only required good absolute pointing capabilities). Thus, building on the preferred implementation of interface 212, game application 216' involves cutting down apples 322 from trees 324 displayed on gaming console 310 in gaming environment 252. In a preferred embodiment, screen 312 of console 310 permits a very realistic display of this scene with proper depth perception for user 102 (along $Z_a$-axis of application coordinates $(X_a, Y_a, Z_a)$). In fact, a number of gaming consoles with high-definition 3D displays capable of realistic 3D scene rendering are now available.

At the present time, user 102 (in this case user 102 is a gamer) has already cut down two apples 322. A particular apple 322A is still hanging on branch 326 of a tree 324 that is being swayed by a gusty wind. The objective is to cut down apple 322A by its stem, without damaging it, so that it remains edible. Gamer 102 moves phone 104 in real 3D environment 302 to get optical axis 152 in gaming coordinates $(X_w, Y_w, Z_w)$ and recovered as axis 275 along unit vector $\hat{u}_a(t)$ in game or application coordinates $(X_a, Y_a, Z_a)$, to cut the stem of virtual apple 322A. Optical axis 150 of camera 144 thus extends along the correspondingly oriented virtual machete 328.

Game application 216' displays machete 328 in the form of a blade to facilitate the task. At time $t_q$, user 102 has machete 328 pointed directly at apple 322A but in the wrong position and orientation for cutting. It is indeed clear from the location and orientation of the blade that making a cut at this point by touching button 142C on screen 136 is not wise.

It should be noted that a number of choices are open to the designer of game application 216' regarding the cutting action. First, for a very realistic gaming experience, it may be desirable to overlap world or gaming coordinates $(X_w, Y_w, Z_w)$ with application coordinates $(X_a, Y_a, Z_a)$ such that the motion of phone 104 in environment 302 is one-to-one with its motion in gaming environment 252. This also means, that gaming environment 252 extends beyond what can be displayed on screen 312 into real 3D environment 302 in which user 102 resides.

Second, to make the game easier, the designer may choose to map the degrees of freedom of phone 104 with a downscaling of the angular degrees of freedom. This will make it easier for user 102 to target the stem of apple 322A.

Third, the distance along the $Z_w$ axis of gaming coordinates $(X_w, Y_w, Z_w)$ can also be scaled for further simplification. Of course, with such simplification gaming application 216' is no longer as life-like, since a complete one-to-one mapping is lost. Thus, the various scaling functions or even removal of some degrees of freedom in the mapping (e.g., removal of rotation of phone 104 about optical axis 150) should be weighed against the desired user experience. Indeed, if the application is to be completely life-like, the designer may dispense with internal application coordinates ($X_a$, $Y_a$, $Z_a$) altogether and work in gaming coordinates ($X_w$, $Y_w$, $Z_w$) only. This approach is viable for virtual reality games and life-like simulations.

Figure 19:
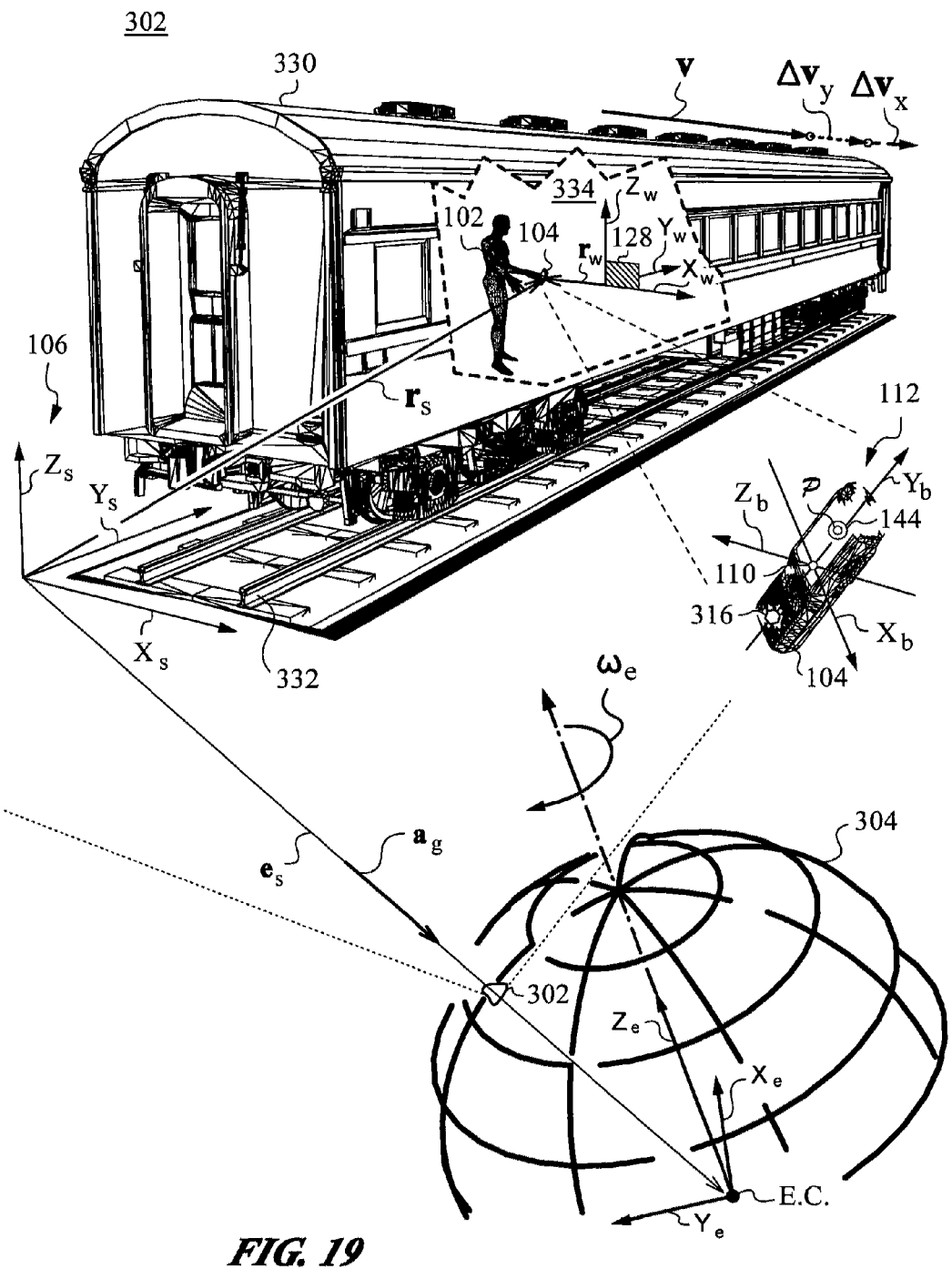
FIG. 19 is a three dimensional perspective diagram which shows an additional advantage of the preferred embodiment employing optical absolute pose recovery supplemented by relative motion interpolation in a commonly encountered non-inertial reference frame.

FIG. 19 illustrates still another advantage of the preferred embodiment of interface 300 employing phone 104 with sensor fusion attained by contemporaneously employing camera 144 and motion sensor 316. In this embodiment real three-dimensional environment 302 is once again located on the surface of planet Earth 304, and it is parameterized by Earth coordinates ($X_e$, $Y_e$, $Z_e$) as previously introduced in FIG. 16. Stable coordinates ($X_s$, $Y_s$, $Z_s$) that parameterize stable frame 106 have their origin on the ground (e.g., on a milepost) and are aligned with rails 332 of a train car 330 as shown in FIG. 19.

In contrast to previous embodiments, however, user 102 of phone 104 is not at rest in stable frame 106. Instead, he/she is on train car 330 that is moving in stable frame 106. User 102 perceives him/her to be in another stable frame 334 in environment 302 that is moving along with train car 330. To complicate matters, stable frame 334 perceived by user 102 is not moving in a uniform manner. That is because a velocity of train car 330, described by vector v in stable coordinates ($X_s$, $Y_s$, $Z_s$) attached to Earth 304, is changing. Train car 330 is accelerating along its direction of motion and also slowly turning right along rails 332. These changes in velocity vector v are described by quantities $\Delta v_y$ and $\Delta v_x$, respectively. (Strictly speaking, since quantities $\Delta v_y$ and $\Delta v_x$ indicate direction in stable coordinates ($X_s$, $Y_s$, $Z_s$) with the corresponding subscripts they are vector components, and therefore scalars. Thus, we do not need to consider them as vectors and it is technically not necessary to use boldface letters for them according to our convention.)

Accelerated frames, such as frame 334, are referred to in the art as non-inertial. Here, stable frame 334 of user 102 is actually such a non-inertial frame. If user 102 could not see out the window of train car 330, he/she would only be able to tell that his/her frame 334 is non-inertial by feeling the time rate of change in velocity v, or acceleration a=dv/dt. The ability of user 102 to feel acceleration in the same way as the force of gravity $F_g$, is due to the principle of equivalence discovered by Albert Einstein. A similar situation is encountered on airplanes, in terrestrial vehicles such as buses or cars, on ships and on amusement rides, to give just a few examples.

Because motion sensor 316 contains gyroscopes and accelerometers, which are inertial sensors, they are subject to the same experiences as user 102 in accordance with the principle of equivalence. Thus, they will not be able to distinguish between motion of phone 104 within frame 334, and specifically the changes in vector v, and the motion of frame 334 in stable frame 106 that is attached to the surface of planet Earth 304 and subject to acceleration $a_g$ produced by gravity. Indeed, one of the major problems with inertial sensors, is that their calibration in non-inertial frames becomes harder and their drift increases faster.

Of course, the reader will realize that Earth's frame 304 is non-inertial too. Indeed, it is a rotating frame subject to effects including pseudo-forces such as the Coriolis effect and centripetal forces. However, effects due to angular velocity $\omega_e$ and acceleration $a_g$ of Earth 304 are known and typically small (Earth's effects are negligible for large Rossby numbers). Thus, its effects can be compensated for in applications where user 102 is stationary in stable frame 106. Unfortunately, train car 330 and its associated frame 334 parameterized by world coordinates ($X_w$, $Y_w$, $Z_w$) are in motion that is not known in advance and cannot be accounted for as easily. Hence, the limitations of motion sensor 316 are exacerbated in frame 334 producing much more rapid drift.

Fortunately, in the preferred embodiment of interface 300, phone 104 is equipped with camera 144 which uses screen 128 to recover its absolute pose as defined world coordinates ($X_w$, $Y_w$, $Z_w$). The latter are attached to screen 128 at its bottom left corner (note that this is a different origin and orientation than in the first embodiment shown in FIGS. 1A-B). This means that as long as screen 128 does not move inside train car 330 world coordinates ($X_w$, $Y_w$, $Z_w$) will undergo the exact same motion within stable coordinates ($X_s$, $Y_s$, $Z_s$) of stable frame 106 on Earth's surface as does train car 330. Therefore, world coordinates ($X_w$, $Y_w$, $Z_w$) are stationary from the vantage point of user 102 and interface 300.

This means that absolute pose of phone 104 recovered optically in world coordinates ($X_w$, $Y_w$, $Z_w$) by camera 144 is automatically stationary in frame 334. Therefore, the optically recovered absolute pose can be used to remove the errors due to pseudo-forces and drift that the motion sensor 316 experiences due to the changing velocity v of train car 330. In practice, this also means that re-calibration of motion sensor 316 needs to be performed more frequently than in the embodiment described in FIG. 16.

Figure 20:
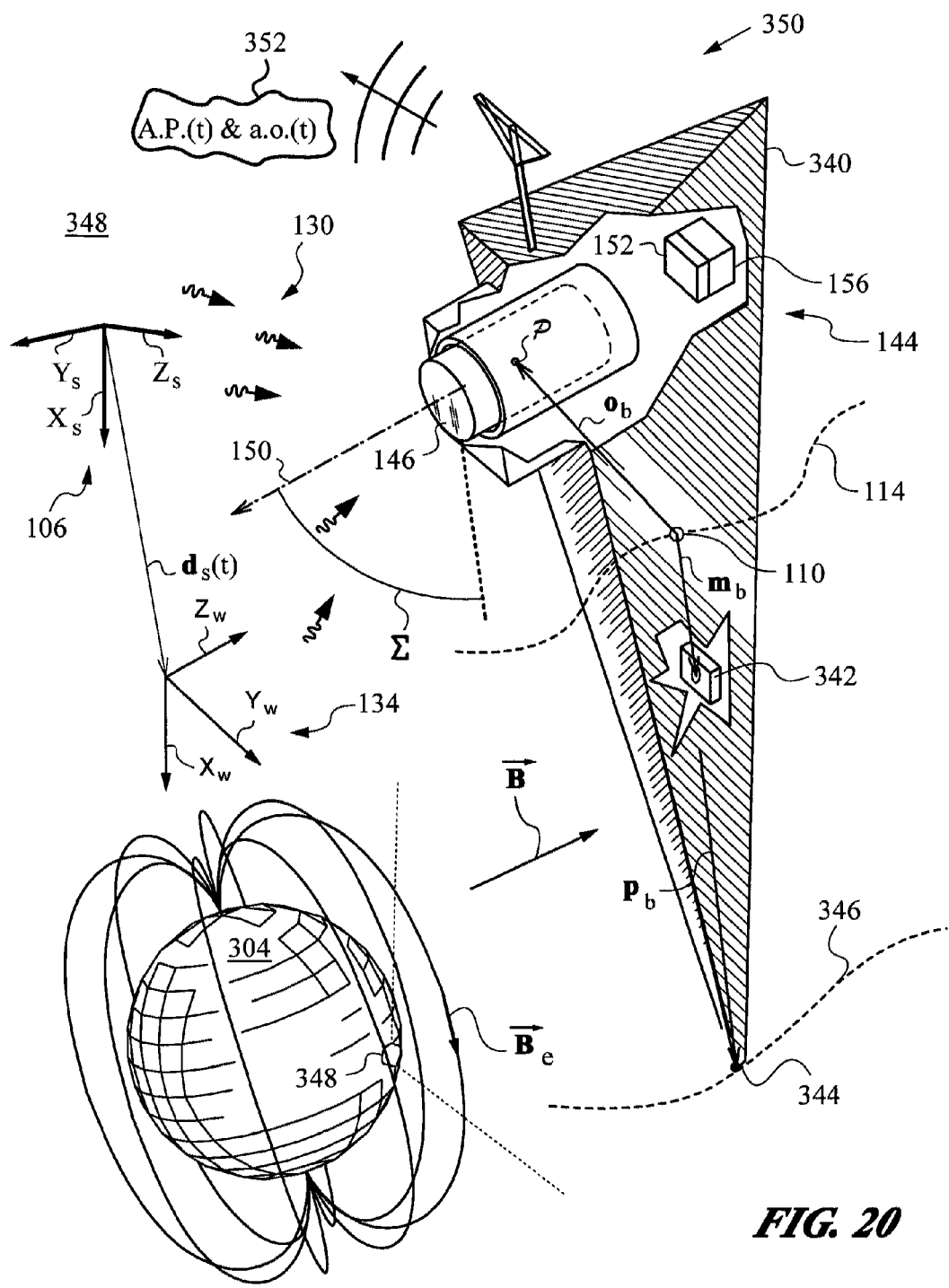
FIG. 20 is a three dimensional view of an embodiment of the interface employing a magnetometer as the relative motion sensor.

FIG. 20 illustrates another embodiment of the invention in which an item 340 associated with user 102 is provided with camera 144 for optical absolute pose recovery, and a motion sensor 342 in the form of a magnetometer for relative pose recovery. Item 340 is an elongate object of a generally pyramidal shape with center of mass 110 in the upper portion of its body.

As in the prior embodiments, the motion of C.O.M. 110 through 3D space is described by trajectory 114. Item 340 narrows to a point 344 at its distal end. Point 344 is a point of special interest and its motion through 3D space is designated by trajectory 346. Offset vectors $o_b$, $m_b$ and $p_b$ denote the respective offsets from C.O.M. 110 of point-of-view $\mathcal{P}$, magnetometer 342 and point of interest 344 in body coordinates ($X_b$, $Y_b$, $Z_b$). The respective orientations of camera 144, magnetometer 342 and point of interest 344 are accounted for by rotation matrices, as explained above. Note that body coordinates are not indicated in present figure for reasons of clarity. The reader may refer to prior embodiments for their definition, e.g., FIG. 2 and corresponding description. Also, the orientation of point of interest 344 may not be relevant if that feature is small and effectively point-like in the mathematical sense. Thus, the corresponding rotation matrix may be disregarded.

The arrangement of frames 106, 134 and corresponding parameterizing coordinates ($X_s$, $Y_s$, $Z_s$), ($X_w$, $Y_w$, $Z_w$) is analogous to that described in any of the prior embodiments. The offset between coordinates ($X_s$, $Y_s$, $Z_s$) and ($X_w$, $Y_w$, $Z_w$) is described by a time-dependent displacement vector $d_s(t)$ and a time dependent rotation matrix $R_{sw}(t)$ (not shown). Any relative motion between these two coordinate systems including translations and rotations is permitted. However, as in the previous embodiment, stable coordinates ($X_s$, $Y_s$, $Z_s$) are associated with frame 106 that is attached to a certain real three-dimensional environment 348 on the surface of Earth 304.

The operation of camera 144 relies, as before, on capturing images of environment 348 with the aid of radiation 130 originating therefrom. Based on extraction of non-collinear features from the images, image processing electronics 156 recover the absolute pose of item 340. The absolute pose is expressed in world or operational coordinates ($X_w$, $Y_w$, $Z_w$) that parameterize frame 134 in environment 348.

Preferably, lens 146 of camera 144 has a sufficiently large field angle $\Sigma$ to permit recovery of the absolute pose of item 340 in stable coordinates ($X_s$, $Y_s$, $Z_s$) that parameterize stable frame 106 in environment 348. In other words, camera 144 also tracks non-collinear features to generate non-collinear optical inputs that are attached to stable frame 106. To accomplish this, lens 146 may be a fisheye lens or a 360° lens. Lens 146 could even consist of several individual lenses that image separate portions of the full solid angle (one 180° lens can be "forward-facing" and one 180° lens can be "back-facing"). Several photosensors 152 can be used in such embodiments. A person skilled in the art will know how to apply appropriate image stitching to derive a complete image from such distributed photosensor arrangement.

Based on a 360° field of view, the optical absolute pose recovery of an interface 350 relying on item 340 is very robust. It has a low susceptibility to typical optical problems such as occlusions and loss of line-of-sight. In particular, interface 350 can generate a signal 352 at any time t related to at least one parameter of its absolute pose A.P.(t) to be used as input for an application. Interface 350 is thus fully parameterized in both world coordinates ($X_w$, $Y_w$, $Z_w$) and stable coordinates ($X_s$, $Y_s$, $Z_s$) by virtue of its optical capabilities alone.

Magnetometer 342 on-board item 340 is sensitive to magnetic fields. In particular, in the simplest version, magnetometer 342 detects the direction of magnetic field $B_e$ produced by Earth 304. The field lines of Earth's magnetic field $B_e$ run from the north pole to the south pole, as indicated in FIG. 20. This naturally produced magnetic field $B_e$ is rather weak, ranging from about 0.2 Gauss at the equator to about 0.8 Gauss near the poles (1 Gauss is equal to $10^{-4}$ Tesla). For comparison, a typical magnet may produce fields of up to about 1 Tesla.

Earth's magnetic field $B_e$ varies both temporally and spatially due to inhomogeneities of rocks and interactions between charged particles. Thus, measuring its strength is not very useful in civilian navigation. Higher-quality magnetometers that provide accurate direction resolution and a reliable measure of the strength of magnetic fields are used predominantly in the military. Meanwhile, in most civilian applications on-board magnetometer 342 is simply used to detect the direction of magnetic field $B_e$ for general orientation and functions as a compass. Some smart phones now have on-board magnetometer for compass apps that show direction. It should be noted that the presence of magnetic materials in the vicinity of magnetometer 342 will typically induce an error in its directional reading.

In the present embodiment, magnetometer 342, rather than acting a simple compass, is preferably a commercial unit that measures orientation of a magnetic field B that is generated by its own coils located in a base unit (not shown). The base unit is stationary in frame 106. Such modern magnetometer 342 is thus not affected by the static magnetic field $B_e$ of Earth 304. Its own time-varying field B also renders them more robust to interference by metallic objects.

Thus, the additional data from magnetometer 342 provides partial information about the absolute orientation of item 340 in the Earth frame 304. Clearly, this orientation information is not sufficient to recover the full absolute pose A.P.(t) of item 340, unlike the information provided by motion sensor 316 with gyroscopes and accelerometers. For this reason, we designate the absolute orientation information from magnetometer 342 with lowercase letters: a.o.(t).

Nonetheless, the additional absolute orientation a.o.(t) from magnetometer 342 is useful. In fact, signal 352 of interface 350 in the present embodiment includes both absolute pose A.P.(t) of item 340 and its absolute orientation a.o.(t). Furthermore, absolute orientation a.o.(t) can be used through appropriate sensor fusion techniques to improve the absolute pose A.P.(t) recovered optically by camera 144 or to aid in limited relative interpolation between absolute pose recovery times by camera 144.

Present embodiment of interface 350 is well-suited for tracking trajectory 346 of point of interest 344, especially when item 340 is mostly held upright by user 102. Under those circumstances, magnetometer 342 is very helpful in providing a component of absolute orientation a.o.(t), just like a compass, between recoveries of absolute pose of item 340.

The above embodiments show the basic types of hardware that an interface of the invention can use to recover absolute pose of the item associated with the user. They also offer numerous examples of suitable objects endowed with non-collinear features that can be relied upon for optical recovery of absolute pose unambiguously in an absolute frame. Furthermore, some basic mappings between the at least one absolute pose parameter recovered and communicated in a corresponding signal to an application and the six degrees of freedom available to the item have been explained and visualized.

The next set of embodiments will describe several applications that an interface according to the invention can support. Many of the hardware parts will not be described in detail. It will be appreciated by a skilled artisan, however, that any of the above-described hardware arrangements can be employed, depending on the specific application, interface requirements and user experience factors. The same reference numbers will be used to refer to analogous or similar parts in the below teachings whenever practical, in order to avoid excessive and confusing proliferation of such numerals.

Figure 21:
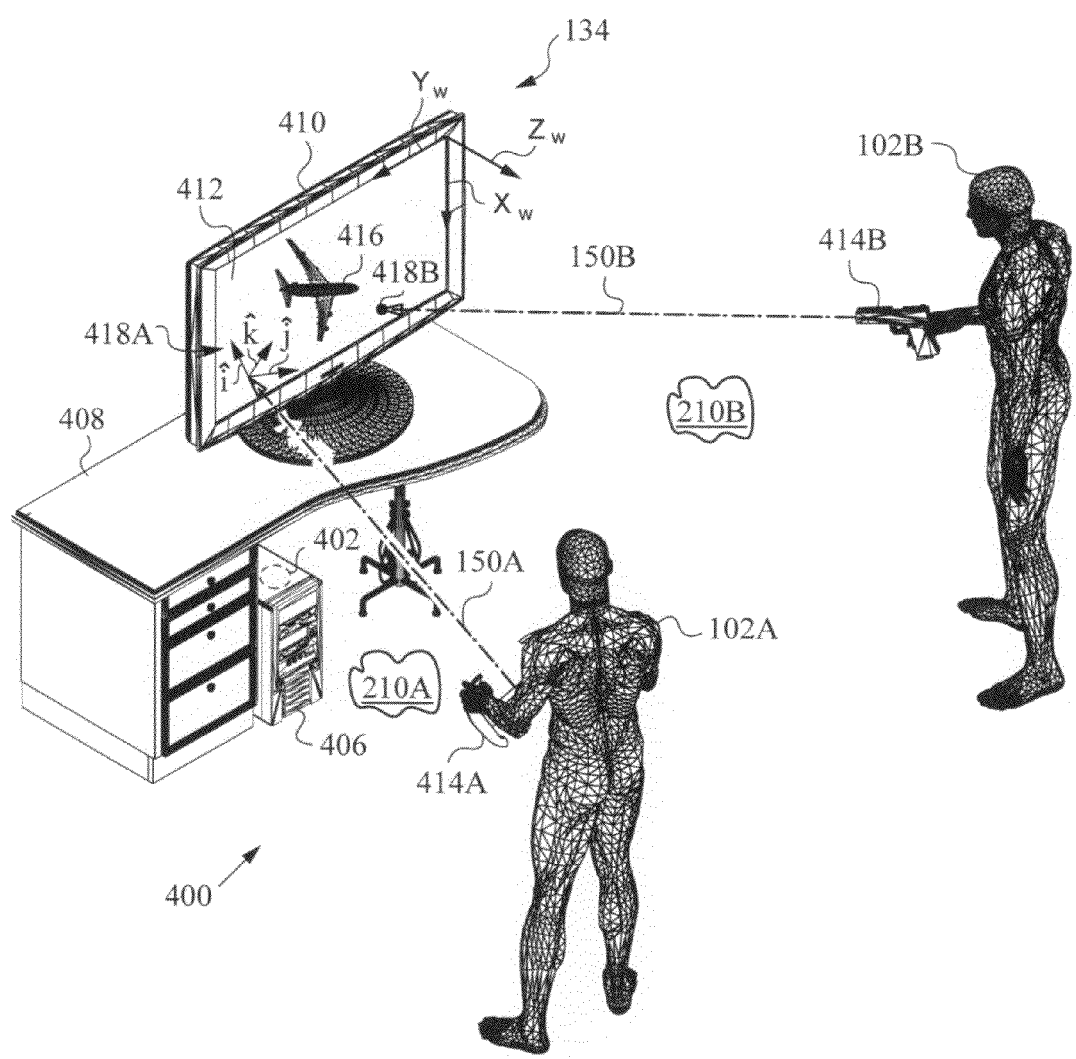
FIG. 21 is a three dimensional isometric view illustrating how the interface of invention is employed in a two-user application.

FIG. 21 is a three dimensional isometric view illustrating how another embodiment of an interface 400 according to the invention is deployed in an application 402 for two users 102A, 102B. Users 102A, 102B reside in a real three-dimensional environment 404. Two-user application 402 is installed on a computer 406 sitting under a table 408 in environment 404. Computer 406 drives a monitor 410 sitting on table 408. Monitor 410 has a screen 412, whose edges are used as the non-collinear features for generating non-collinear inputs for absolute pose recovery. Additional non-collinear features are used as required.

Environment 404 is stable and may be parameterized in any suitable manner, e.g., with Cartesian coordinates describing stable frame 106 attached to the surface of planet Earth 304, as previously taught. In the present embodiment, however, only world coordinates ($X_w$, $Y_w$, $Z_w$) will be used to parameterize frame 134 in real three-dimensional environment 404. It is not necessary to parameterize environment 404 with stable coordinates, since screen 412 is unlikely to be moved while application 402 is running. Moreover, information about the location of monitor 410 in stable frame 106 is not required for running application 402.

Frame 134 is parameterized by world coordinates ($X_w$, $Y_w$, $Z_w$) indexed to screen 128 and any other non-collinear features used for optical input to recover the absolute camera pose in world coordinates ($X_w$, $Y_w$, $Z_w$). In the present embodiment, the origin of world coordinates is in the upper right corner of screen 412.

User 102A is holding his/her associated item 414A in both hands. Item 414A is an airplane yoke or control stick. User 102B is holding his/her associated item 414B in his/her right hand. Item 414B is an aircraft gun. Both airplane yoke 414A and aircraft gun 414B are equipped with on-board units for receiving electromagnetic radiation and generating signals proportional to at least one absolute pose parameter as expressed in world coordinates $(X_w, Y_w, Z_w)$, which parameterize frame 134. Although the on-board units are not shown explicitly, their optical axes 150A and 150B as defined by their optics are indicated in the drawing figure. Note that optical axis 150B is aligned with a mechanical axis or the barrel of gun 414B.

Yoke 414A reports all six absolute pose parameters of yoke 414A in the same parameterization as used to describe its six degrees of freedom. Signal 210A is directly related to the values of these absolute pose parameters, namely A.P.(t)=$(x_w, y_w, z_w, \alpha_{bw}, \beta_{bw}, \gamma_{bw})$, and frequency encodes them in accordance with any suitable RF protocol for delivery as input to application 402 running on computer 406.

Gun 414B reports five absolute pose parameters, leaving out the parameter corresponding to the roll of gun 414B about its mechanical axis 150B, which coincides with optical axis 150B of the on-board unit. For simplicity, it is preferable that the body coordinates of gun 414B are chosen such that the roll of gun 414B about optical axis 150B corresponds directly to one of the rotation angles $\alpha_{bw}$, $\beta_{bw}$ or $\gamma_{bw}$. In the present embodiment, the barrel of gun 414B is aligned with the $Z_b$ axis of its body coordinates. Thus, roll is described by rotation angle $\alpha_{bw}$. Hence, the five absolute pose parameters reported in signal 210B are $(x_w, y_w, z_w, \beta_{bw}, \gamma_{bw})$. Again, signal 210B is directly related to the values of its five absolute pose parameters $(x_w, y_w, z_w, \beta_{bw}, \gamma_{bw})$, and is frequency encoded for robust transmission as input to application 402 running on computer 406.

Application 402 is a gaming application that involves the steering and shooting down of an airplane 416 displayed on screen 412. User 102A is a gamer charged with navigating airplane 416 out of harm's way. In contrast, user 102B is a gamer charged with shooting down airplane 416 by attempting to hit one of its fuel tanks. Clearly, gamer 102A should attempt to navigate airplane 216 with the aid of yoke 414A such that the exposure of fuel tanks to a direct hit by gun 414B is minimal.

Application 402 employs signal 210A as input for steering airplane 416. To aid gamer 102A in his/her task, application 402 uses visual feedback in the form of place-holder entity 418A corresponding to airplane flight orientation coordinates $(\hat{i}, \hat{j}, \hat{k})$ displayed for gamer 414A on screen 412. The size of entity 418A indicates the location of plane 416 along the $Z_w$-axis.

In the present embodiment application 402 does not employ separate application coordinates. Instead, it extends world coordinates $(X_w, Y_w, Z_w)$ backwards, or behind monitor 410, to serve as the gaming coordinates in which plane 416 resides. Specifically, negative values $z_w$ along axis $Z_w$ are taken to be behind monitor 410. The further away from the plane of screen 412 plane 416 is flying, the larger the negative $z_w$ value. Plane 416 is scaled correspondingly, according to the rules of projective geometry.

For real-world type experience, plane 416 is subject to the usual rules of aerodynamics within application 402. Thus, gamer 102A cannot simply move yoke 414A along axis $Z_w$ in world coordinates $(X_w, Y_w, Z_w)$ to get plane 416 to "jump" back. Instead, gamer 102A has to operate yoke 414A to get airplane 416 to fly to the intended location in accordance with the laws of physics and aerodynamics. The latter preclude many operations and will cause plane 416 to stall under improper guidance.

In addition to the above, world coordinates $(X_w, Y_w, Z_w)$ behind monitor 410, i.e., within the game environment, may be scaled with respect to world coordinate $(X_w, Y_w, Z_w)$ in front of monitor 410. Thus, for example, a distance of 3 feet in real three-dimensional environment 404 inhabited by gamers 102A, 102B may correspond to a mile in the gaming environment.

Application 402 also uses visual feedback to help gamer 102B shoot down airplane 416. This visual feedback is presented as a place-holder entity 418B on monitor 410 as a dot corresponding to the location where optical axis 150B intersects screen 412. In order not to make it too easy on gamer 102B, further extension of optical axis 150B into gaming environment at negative values along $Z_w$-axis is not shown. Indeed, this is analogous to real-life situations, where the exact location of a shot and whether it is or is not on target cannot be ascertained in advance. Thus, gamer 102B has to infer the extension of optical axis 150B into the gaming environment and whether it happens to be on target, i.e., on a fuel tank of airplane 416. To make the challenge still more life-like, gamer 102B may be limited to just a few shots or even a single shot.

Figure 22A:
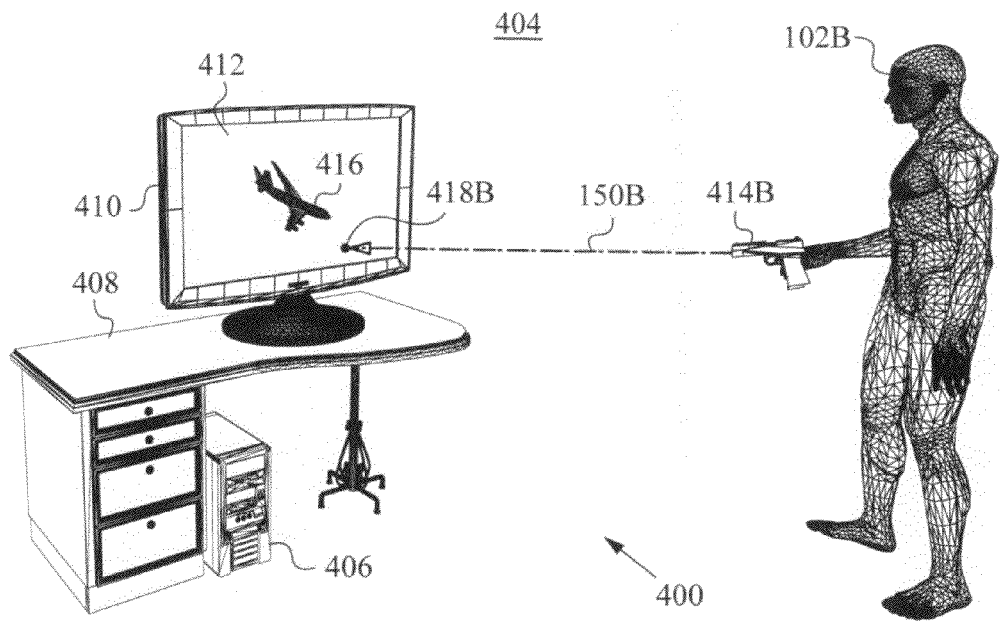
FIG. 22A is a three dimensional perspective view of the environment as seen from the vantage point of the first user in the two-user application of FIG. 21.

To gain a better appreciation why interface 400 requires knowledge of absolute pose parameters $(x_w, y_w, z_w, \beta_{bw}, \gamma_{bw})$ corresponding to just 5 degrees of freedom of gun 414B rather than all 6 degrees of freedom, we turn to FIG. 22A. This drawing affords a three dimensional perspective view of real environment 404 as seen from the vantage point of gamer 102A. More precisely, this view is taken from the vantage point of on-board unit of yoke 414A held by gamer 102A. Note that place-holder or point 418B at the intersection of optical axis 150B with screen 412 is rotationally symmetric. Therefore, it does not change as gun 414B is rolled by gamer 102B around optical axis 150B, which is co-extensive in this embodiment with the axis of the gun barrel. It is for this reason, that roll of gun 414B can be safely discarded.

Indeed, in some embodiments the number of degrees of freedom, or more precisely the number of absolute pose parameters describing these degrees of freedom can be further reduced. For example, even in the present embodiment the remaining two rotational angles $\beta_{bw}, \gamma_{bw}$ could be mapped to a single "pan angle" in the $X_w$-$Y_w$ plane. The resulting signal 210B reporting only 4 degrees of freedom (4 D.O.F. interface) is still sufficient to provide a challenging game for gamer 102B.

Figure 22B:
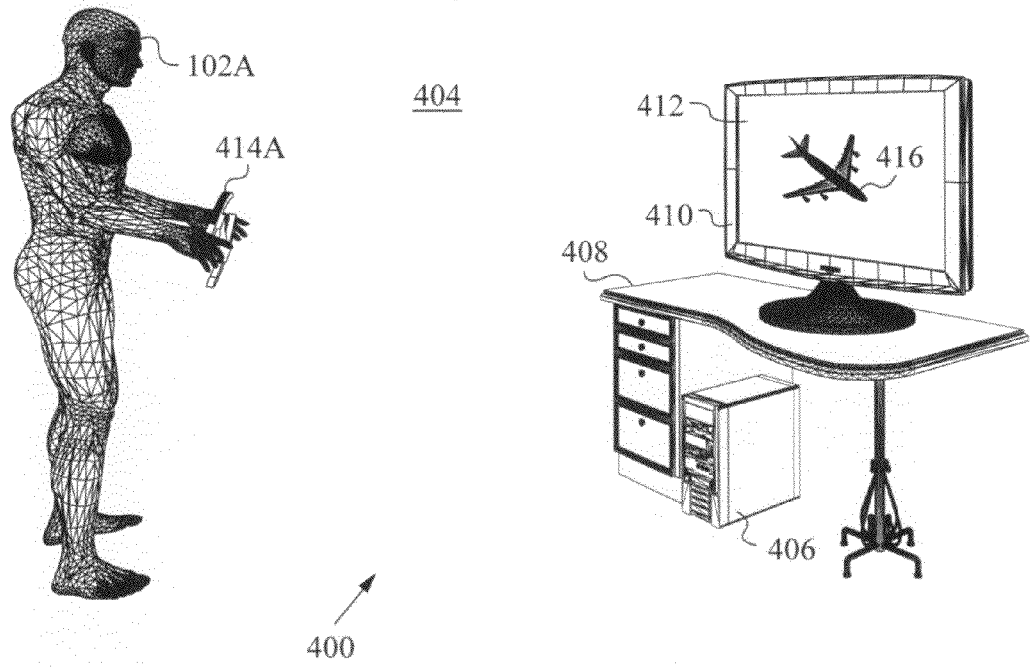
FIG. 22B is a three dimensional perspective view of the environment as seen from the vantage point of the second user in the two-user application of FIG. 21.

FIG. 22B shows the situation from the vantage point of gamer 102B, and more precisely from the vantage point on-board gun 414B. Notice that the view of plane 416 is different than in FIG. 22A. That is because of the change in vantage point. Of course, most flat-screen monitors 410 do not have sufficient technology to emulate a volumetric 3D display, and this real-life effect may be less pronounced. However, it is clear that for the most realistic gaming experience a high-definition 3D monitor 410 is preferable.

Another advantage of interface 400 in multi-user or multi-player situations, is that the absolute pose parameters are obtained individually by each item from its on-board unit. Thus, in principle, interface 400 supports a large number of users or players. Their number is only limited by optics, line-of-sight and occlusion of non-collinear features used as non-collinear optical inputs in camera pose recovery algorithms.

Additionally, the availability of two vantage points on environment 404 allows the extraction of additional information that may be useful in application 402. For example, the location of gamer 102A with respect to gamer 102B may be inferred by application 402 from the absolute poses of items 414A and 414B. Such information may be used to provide additional visual, audio or haptic feedback to gamers 102A, 102B. For example, items 414A and 414B may be instructed to vibrate when gamers 102A, 102B get too close to each other in the real 3D space of environment 404.

Figure 23:
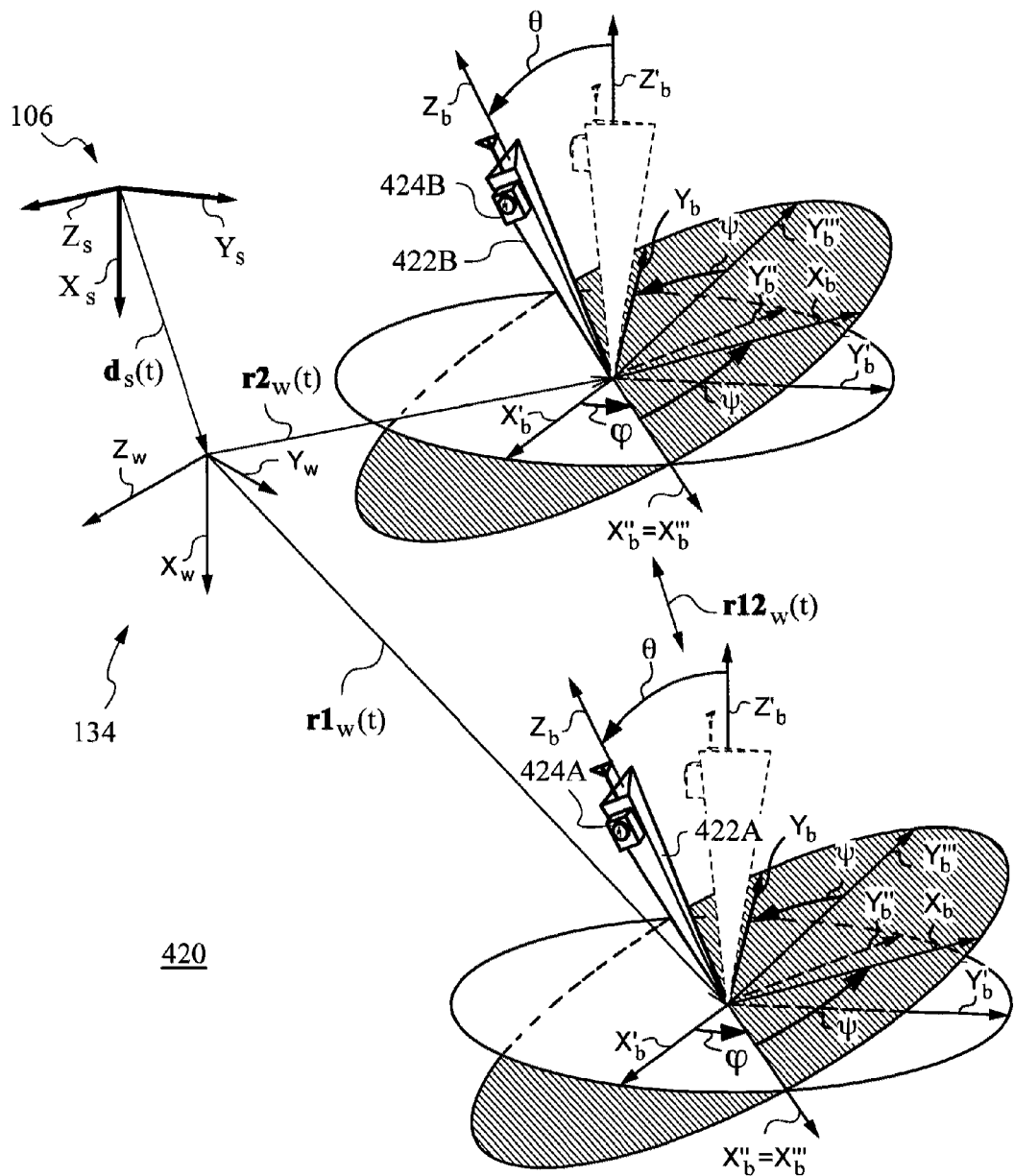
FIG. 23 is a three dimensional view of two items parameterized in world coordinates according to the Euler rotation convention.

FIG. 23 extends the parameterization of a real three-dimensional environment 420 in world coordinates $(X_w, Y_w, Z_w)$ based on the presence of two items 422A, 422B associated with their users (not shown in this drawing). Items 422A and 422B are identical to each other. Each has an on-board CMOS camera 424A, 424B for optically recovering absolute pose. Also, each is in the form of an elongate object that narrows down to a tip at its base.

Because it is the trajectory of the tips at the bases of items 422A, 422B that are of special interest, a different body coordinate parameterization in chosen here. Rather than being centered on a center of mass, body coordinates $(X_b, Y_b, Z_b)$ of each item are centered on the tips. This is analogous to the parameterization chosen in parent U.S. application Ser. No. 10/769,484 for its present continuation-in-part application (see FIGS. 2A-C and FIG. 4 as well as corresponding description in parent application).

Specifically, FIG. 23 illustrates rotations by three rotation angles $\phi$, $\theta$, $\psi$ applied to items 422A, 422B, where the tips are chosen as the stationary points to remain unaffected by rotations in body coordinates $(X_b, Y_b, Z_b)$. The priming of body coordinates to indicate the number of rotations taken (from triple primed prior to the rotations and unprimed after all rotations are executed) is analogous to the convention introduced in the parent as well as in FIGS. 4A-D of the present specification.

In contrast to the prior convention based on gimbal mechanism 118 that mechanically constrains the rotations defined by angles $\alpha_b$, $\beta_b$ and $\gamma_b$, here we employ Euler angles $\phi$, $\theta$ and $\psi$. The "b" subscripts on the Euler angles are dropped in the figures for clarity, but are understood to be present in order to preserve the self-consistency introduced in the notation of the present specification. The main difference in the Euler rotation convention is that the rotations are not taken along all three body axes $X_b$, $Y_b$ and $Z_b$. Instead, the rotation by first Euler rotation angle $\phi$ is taken around the $Z'''_b$ axis. The rotation by second Euler rotation angle $\theta$ is then taken around the once rotated $X''_b$ axis. The final rotation by third Euler angle V is taken around the twice rotated $Z'_b$ axis. As in the prior rotation convention, all rotation angles are taken to be positive in the counter-clockwise direction.

Although Euler angles $\phi$, $\theta$ and $\psi$ are not as convenient as some other conventions (e.g., optical pose recovery typically works with other conventions that include orientation definitions with the aid of surface normals—see FIG. 14) they are very useful in describing the trajectories and orientations of rigid bodies subject to typical motions in real three-dimensional environment 420. This is especially true when such rigid bodies, e.g. items 422A, 422B are expected to undergo motion that exhibits a certain amount of periodicity. Examples of such motion include one or more of the following: orbital-type motion, precession, nutation and spin around a mechanical axis (e.g., a major or a minor mechanical axis). A person skilled in the art will recognize when it is more convenient to choose the first rotation convention versus the Euler rotation convention, or still some other rotation convention. For more information on this subject the reader is referred to the textbook by H. Goldstein et al., *Classical Mechanics*, Addison Wesley Publishing, $3^{rd}$ Edition, 2000 (ISBN 0-201-65702-3).

Once the absolute poses of items 422A, 422B are recovered in the same coordinats, in this case in world coordinates $(X_w, Y_w, Z_w)$, it is possible to derive additional useful information. For instance, first displacement vector $r1_w(t)$ of the tip of first item 422A from the origin of world coordinates $(X_w, Y_w, Z_w)$, and second displacement vector $r2_w(t)$ of second item 422B from the origin of the same coordinates can be subtracted from each. The resulting vector $r12_w(t)$ describes the separation between the tips of items 422A and 422B. Thus, interactions between items 422A, 422B such as contact between their tips, can be recovered and used as input data by an interface according to the invention. Of course, their orientations with respect to each other can be recovered from the orientation portion of the absolute poses and also deployed in an interface according to the invention. A person skilled in the art will further recognize that items 422A and 422B could deploy their respective on-board CMOS cameras 424A, 424B to look for each other and define their relative poses in that way. Of course, that means that each of them would have to present a sufficient number of optically detectable non-collinear features to enable such pose recovery.

Figure 24:
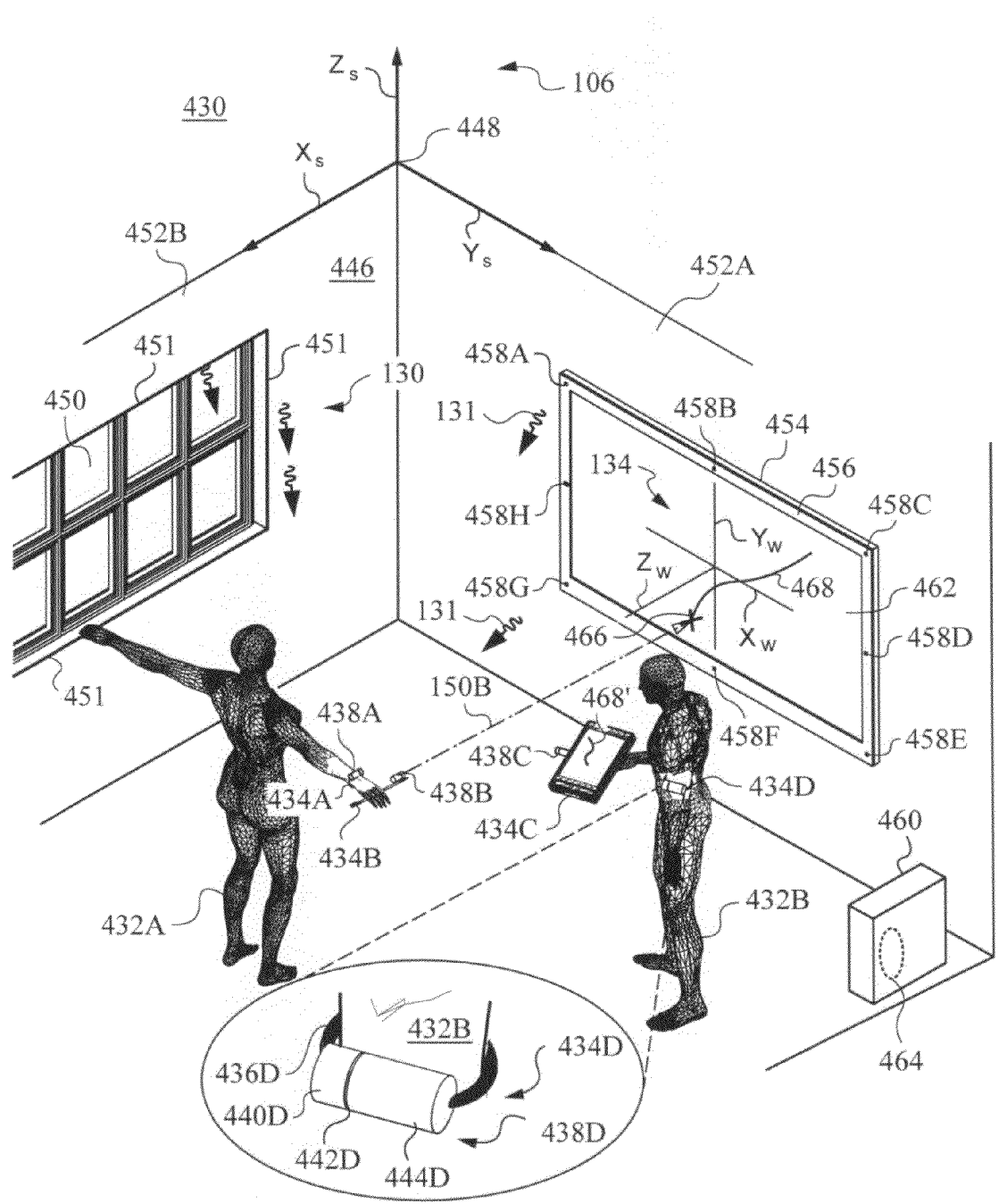
FIG. 24 is a three dimensional view of a real three dimensional environment with users having associated items that can be manipulated or worn.

In accordance with the invention, the item or items can be associated with the user or users in many different ways. FIG. 24 illustrates a real three dimensional environment 430 in which two users 432A, 432B have various items 434A, 434B, 434C, 434D designed for optical absolute pose recovery by following any of the above-described methods. User 432A has item 434A that is associated with him/her by being worn in a well-defined place on their body. In this case, item 434A is a bracelet worn around the wrist of user 432A. User 432A also has hand-held item 434B that is a remote pointer. User 432B has item 434C that can be held and manipulated, in this case a tablet computer, as well as an item 434D that is also a bracelet, but is worn around the arm.

All items 434A-D have similar structure with corresponding reference numerals, as better visualized in the enlarged view of arm bracelet 434D. Specifically, bracelet 434D has its utilitarian part 436D that fits around the arm of user 432D. In addition, bracelet 434D has an on-board unit 438D equipped with a lens 440D and a photosensor 442D, and processing electronics 444D. An additional power source, such as a battery (not shown), and a communication link (not shown) are also available on-board bracelet 434D for powering photosensor 442D and processing electronics 444D.

Three dimensional environment 430 is described in a stable frame 106 that is parameterized by stable coordinates $(X_s, Y_s, Z_s)$ with an origin in an upper left corner 448 of a room 446. Room 446 has a number of additional features, besides corner 448, such as a window 450 and walls 452A, 452B that can be used for deriving non-collinear optical inputs for absolute pose recovery in stable coordinates $(X_s, Y_s, Z_s)$. For example, the four edges 451 of window 450 can be used as non-collinear optical inputs. This is especially useful in daytime, when a large amount of ambient radiation 130 enters room 446 through window 450 and endows edges 451 with a high optical contrast.

Three dimensional environment 430 also has an object 454 mounted on wall 452A with a feature 456 that presents non-collinear optical inputs 458A-H. In particular, object 454 is a smart television with a smart control box 460. Feature 456 is the border around a screen 462 of television 454. However, unlike previous embodiments, the edges of screen 462 are not being used for non-collinear optical inputs.

Instead, non-collinear optical inputs 458A-H are emitters of electromagnetic radiation 131 located at known locations along border 456. More precisely still, emitters 458A-H are point-like emitters of electromagnetic radiation 131. Preferably, point emitters 458-H are light emitting diodes (LEDs), and more preferably still, they are LEDs emitting radiation 131 in the IR range of the electromagnetic spectrum. Such devices are frequently called IR LEDs and their typical emission spectra exhibit a 30-50 nm bandwidth with a central emission anywhere from 850 to 950 nm. Of course, other emission characteristics can be used without limitation.

Non-collinear optical inputs from IR LEDs 458A-H serve to establish working or world frame 134, which is stable and stationary. It is parameterized by world coordinates ($X_w, Y_w, Z_w$) whose origin is chosen in the middle of screen 462. It should be noted that IR LEDs 458A-H could be on at all times. Their radiation 131 would then be detected by photosensors 442A-D of the corresponding items 434A-D and used in corresponding camera pose recovery algorithms. In that case, IR LEDs 458A-H should also be distributed in such a way that they can be matched unambiguously with sensor readings to uniquely recover absolute poses in world coordinates ($X_w, Y_w, Z_w$).

As it happens, it is more preferable to modulate IR LEDs 458A-H in a time sequence such that only one is on at a given time. In addition, the modulation time sequence is communicated to processing electronics 444A-D. Thus, each item 434A-D knows which of the IR LEDs 458A-H is on at any point in time and the feature matching/correspondence problem becomes easy to solve. Hence, each item 434A-D can now unambiguously recover its absolute pose in world frame 134 parameterized by world coordinates ($X_w, Y_w, Z_w$).

In a practical application, when absolute pose needs to be recovered frequently (e.g., when no interpolation from inertial sensors is available due to size or power limitations on-board items 434A-D) the modulation rate may need to be high. For example, to reliably recover a rapid sequence of absolute poses in world coordinates ($X_w, Y_w, Z_w$) at a camera equivalent frame rate of about 100 Hz, IR LEDs 458A-H may need to be modulated at 3-4 kHz or higher. Needless to say, operating on-board photosensors 442A-D at that rate would be a challenge for any CMOS sensor or other typical pixellated camera-type sensor.

Therefore, any of the items 434A-D that have to recover their absolute pose in world coordinates ($X_w, Y_w, Z_w$) based on non-collinear optical inputs from temporally sequenced IR LEDs 458A-H should preferably employ as their photosensor 442A-D a fast and low-power device. Such photosensors are well-known in the art of optics under the name Position Sensing Devices (PSDs). PSDs comprise a single analog pixel which is able to measure the centroid of the optical input at rates approaching 10 kHz and even higher while consuming power in the range of 1-10 µW. (Of course, it is also possible to make a camera behave like a PSD by appropriate binning of its rows and columns. A skilled artisan will recognize that a camera can be used to simulate a PSD through software.)

In order to take advantage of PSDs as photosensors 442A-D, it is necessary to filter out ambient radiation 130 to the extent possible. Such operation can be performed with an optical notch filter whose center frequency is matched to the central emission wavelength $\lambda_c$ of IR LEDs 458A-H. Notch filters are well known in the art. A person skilled in the art will be able to determine how to properly integrate them with the optics to achieve good performance. For further reference, the reader is referred to H. A. Macleod, "Thin Film Optical. Filters", Frances & Taylor, 3$^{rd}$ Edition.

Filtering will ensure that the PSD only detects radiation 131 from whichever one of IR LEDs 458A-H is on at the given time. PSD will then report the corresponding centroid to the processing electronics and wait for the next one. After accumulating a sufficient number of centroids (at least 4 distinct centroids corresponding to different IR LEDs are need to recover frame 134 from on-board the item), the processing electronics will be able to construct a frame and recover the absolute pose.

It should be noted that for more robust absolute pose recovery in non-ideal environments significantly more than 4 centroids should be used per frame. For example, 8 centroids and additional intermittent dark readings (all IR LEDs 458A-H off for optical background subtraction to further reduce noise) should be collected for centimeter-level accuracy in three-dimensional environment 430 at distances up to 3-4 meters from screen 462. For sub-centimeter level spatial resolution, at least 16 centroids should be measured per frame with at least 4 dark frames for optical background noise subtraction. For further teachings on how to best employ PSD based photosensors in absolute pose recovery of various manipulated objects, including, among many other, elongate objects such as pointers, game controls and television remotes the reader is referred to U.S. Pat. Nos. 7,729,515; 7,862,641; 7,961,909. These references are incorporated herein by reference for all permitted purposes.

In the embodiment of FIG. 24, two items associated with user 432A, namely bracelet 434A and pointer 434B have photosensors 442A, 442B that are PSDs and have lenses 440A, 440B with corresponding IR notch filters that cut out ambient radiation 130. Thus, wrist bracelet 434A and pointer 434B are blind to radiation 130 and are not capable of recovering their absolute poses in stable frame 106 parameterized by stable coordinates ($X_s, Y_s, Z_s$). Instead, they report their absolute poses in world coordinates ($X_w, Y_w, Z_w$) of smart television 454.

In contrast, two items associated with user 432B, namely tablet computer 434C and arm bracelet 434D have CMOS photosensors 442C, 442D that see ambient radiation 130 and not IR radiation 131 from IR LEDs 458A-H. Thus, tablet computer 434C and arm bracelet 434D recover and report their absolute poses only in stable coordinates ($X_s, Y_s, Z_s$) that parameterize stable frame 106.

Now, smart television 454 is mounted on wall 452A in a known location and orientation in stable frame 106. Thus, the absolute poses of wrist bracelet 434A and of remote pointer 434B in stable frame 106 can be computed from their absolute poses in world frame 134. As already taught above, this is done by a coordinate transformation employing the displacement vector $d_s$ (see, e.g., FIG. 2) between the origins of coordinate systems ($X_s, Y_s, Z_s$) and ($X_w, Y_w, Z_w$) and the corresponding rotation matrix $R_{sw}$. Similarly, the absolute poses of tablet computer 434C and arm bracelet 434D can be computed in world frame 134 from their absolute poses in stable frame 106. This is accomplished by applying the same coordinate transformation in reverse.

Smart control box 460 runs an application 464 that receives fully parameterized signals from all items 434A-D. Thus, the present interface between items 434A-D and application 464 is fully parameterized (6 D.O.F. interface). In fact, the absolute pose parameters as reported to application 464 are mapped one-to-one to all six degrees of freedom available to each item 434A-D and they are expressed in the same convention as the absolute pose parameters.

By employing the coordinate transformations between stable frame 106 and world frame 134, application 464 determines the absolute poses of all items 434A-D in room 446. From these poses, application 464 determines which item endowed with a pointing function is pointed at screen 462. In the present case, pointer 434B is indeed pointing at screen 456, as can be seen by following its optical axis 150B. Note that optical axis 150B as defined by optic 440B of pointer 434B is aligned with the pointer's mechanical axis. This choice is made to ensure that the pointing has a natural feel to user 434A.

In response to the pointing action, application 464 draws a place-holder entity 466 at the intersection of optical axis 150B and screen 456. Entity 466 is a control icon, and more precisely a cross-hair. Cross-hair 466 not only indicates position on screen 462, but also a state of rotation of pointer 434B.

Since application 464 also knows the absolute pose of wrist bracelet 434A employed by user 432A, it determines that pointer 434B is being held by user 432A in the hand that is equipped with wrist bracelet 434A. This information is used by application 464 to display to user 432B on the screen of tablet computer 434C what user 432A is doing. In particular, when captured in a time series, tablet computer 434C can receive information about a trace 468 and the rotational state of cross-hair 466 produced by user 432A on screen 462 of smart television 454. In other words, application 464 can push a copy 468' of trace 468 generated by user 432A on television screen 462 to the screen of tablet computer 434C along with the rotational parameters that indicate proper hand posture and/or pointer 434B orientation. In this case, user 432A is in fact an artist trying to teach user 432B proper strokes for producing Chinese characters.

Similarly, to monitor the attention of student 432B, application 464 can push information about what user 432B is doing with his/her tablet computer 434C in room 450 to television screen 462. For example, if student 432B were to put tablet computer 434C away, the fact that it would be far away from arm bracelet 434D would be registered by application 464. Application could then issue a gentle audio reminder to student 432B to pick up his/her tablet computer 434C and follow along. A more serious infraction could be reported by visual feedback on screen 462 to teacher 432A.

A diligent reader will have realized from the most recent embodiments, that there is an inherent advantage to having two or more vantage points on the same three-dimensional environment. In fact, a very special advantage of multiple vantage points is realized when the relative position and orientation between them is known. In the art of computer vision and robotics, this condition is referred to as stereo vision. Most animals have evolved stereo vision to rely on two separate eyes to enable them to gather optical information about their three dimensional environments more effectively. The interfaces of the present invention can do the same.

FIG. 25 illustrates a three dimensional environment 470 with an object 472 that has many line-like features 474. Line-like features 474 are the edges of object 472, which is a piece of furniture for holding books and other living-room accoutrements. Features 474 are excellent candidates for use as non-collinear optical inputs for camera pose recovery algorithms. In fact, object 472 also serves to define world frame 134 parameterized by world coordinates ($X_w, Y_w, Z_w$). Their origin is on the lower left side of furniture piece 472 and the orientation of the axes is along the edges of its lowest shelf, as shown. No additional frames will be used in this embodiment, and frame 134 will be considered as stable and suitable for defining the absolute pose on an item 476.

Item 476 has a body 478 that is rigid and has a known length. On-board units 480A, 480B are rigidly affixed at the two ends of body 478. As in the immediately preceding embodiment, units 480A, 480B each have a corresponding lens 482A, 482B, a corresponding photosensor 484A, 484B and corresponding image processing electronics 486A, 486B. As can be seen from the drawing, on-board units 480A, 480B are oriented directly at furniture piece 472, such that both units can image it in the pose that body 478 has assumed in environment 470.

The additional resources required to operate the embodiment have been previously addressed and are not explicitly shown. These include on-board power (e.g., batteries) as well as a communication link (e.g., an RF link or an IR link) to a host (e.g., a computer or gaming console) that is running an application that requires knowledge of the absolute pose of item 476 delivered by the present interface. It is, of course, understood that the application could also be running on board item 476 if it does not require a display.

When on-board units 480A, 480B are on and capture images of furniture piece 472, their constant spatial offset permits the interface designer to employ stereo vision pose recovery algorithms. That is because images of furniture piece 472 exhibit an effect called parallax. Parallax can be described as a displacement in the apparent position of furniture piece 472 in overlapping images. This displacement is due to the fact that furniture piece 472 is viewed along two different lines of sight (corresponding to the optical axes set by lenses 482A, 482B, respectively). The closer furniture piece 472 is to item 476, the bigger the parallax, and thus the more useful the application of computer stereo vision algorithms. Note, however, that the fields of view of on-board units 480A, 480B have to overlap sufficiently to ensure that images obtained by both contain furniture piece 472 (stereopsis).

To gain an appreciation of the image information obtained through parallax in overlapping images captured by on-board photosensors 484A, 484B we refer now to FIGS. 26A-D. These drawings afford perspective views illustrating the differences in perspective distortions between the images 472' of furniture piece 472. The right images correspond to those seen by photosensor 484B, and the left images correspond to those seen by photosensor 484A.

At first, item 476 is located 2 meters in front of furniture piece 472. Item 476 is level and exhibits no yaw. Right on-board unit 480B is exactly centered on furniture piece 472. Left on-board unit 480A is off to the left of the center by exactly the width of body 478. In the present example, the length of the body is taken in the same range as the distance between human eyes in an adult male, namely about 70 mm.

Figure 26A:
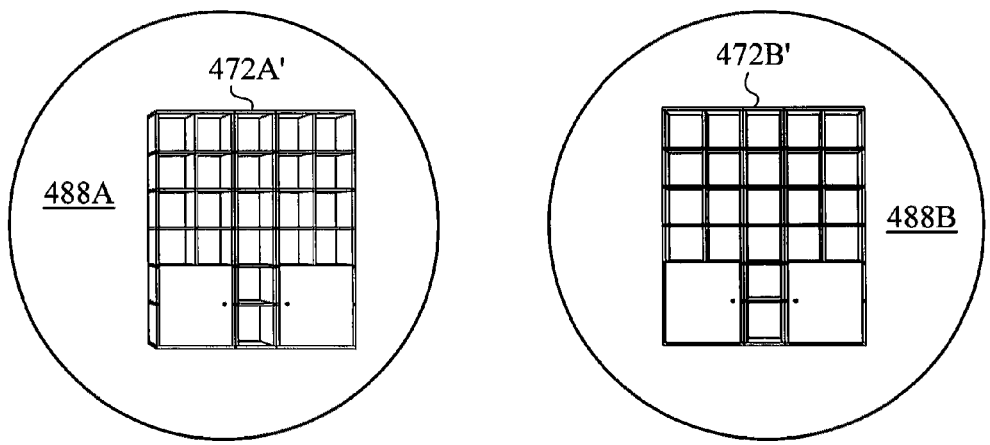

On the left side of FIG. 26A we see a full-field image 488A containing image 472A' of furniture piece 472 as captured on photosensor 484A. Based on the geometry of item 476, image 472A' on photosensor 484A is taken from 70 mm away to the left of center of piece 472. This image 472A' clearly shows the left side of furniture piece 472.

On the right side of FIG. 26A is a full field image 488B that contains image 472B' of piece 472. Image 472B' is found on photosensor 484B, which is trained dead-center on piece 472 in real three dimensional environment 470. Note that unlike in image 472A', the exterior sides of the shelves are not visible from the point of view imposed by lens 482B on photosensor 484B. In fact, image 472B' makes one think that piece 472 is much more flat.

Figure 26B:
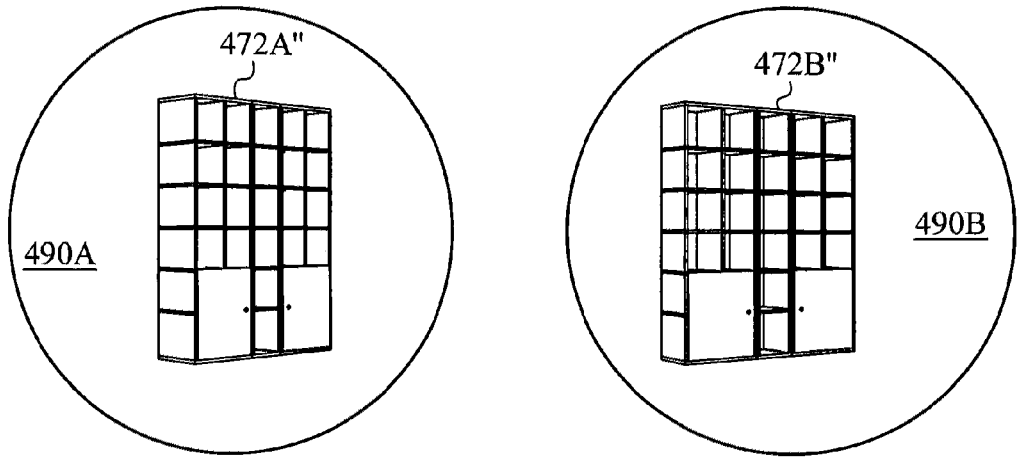

FIG. 26B illustrates full field images 490A, 490B containing images 472A", 472B" of furniture piece 472. These images were captured on photosensors 484A, 484B, respectively, after changing the prior pose of item 476 by translating it 0.5 meters to the left along the $X_w$-axis and performing a 35° rotation about its center in the clockwise direction (as seen from the top, or in accordance with the right hand rule) or around $Y_{wb}$-axis in the body coordinate convention introduced above (see FIGS. 3A-3D and corresponding description).

Figure 26C:
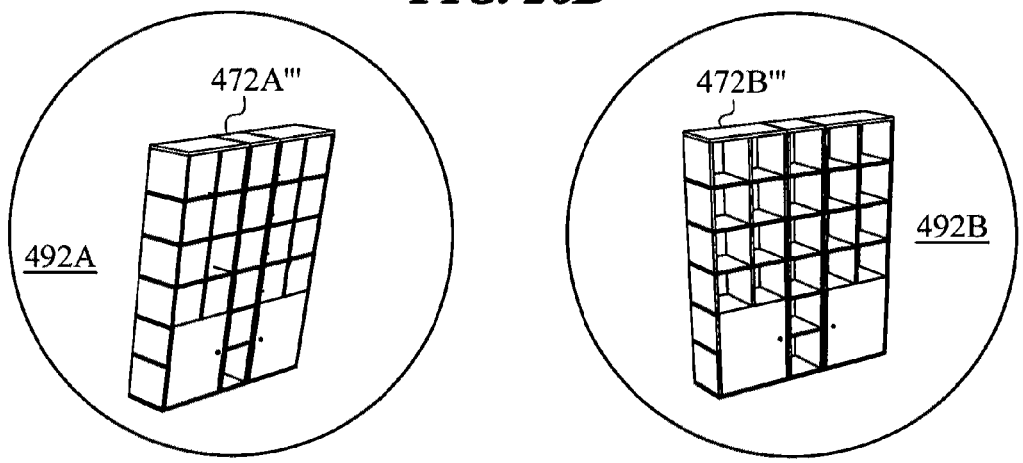

FIG. 26C shows full field images 492A, 492B containing images 472A''' and 472B''' of piece 472. The pose of item 476 was changed again from the prior pose by moving it up along the $Y_w$-axis by 0.75 meters and performing a second rotation by 25° in body coordinates along body axis $Z_{wb}$ clockwise (in accordance with the right hand rule).

Figure 26D:
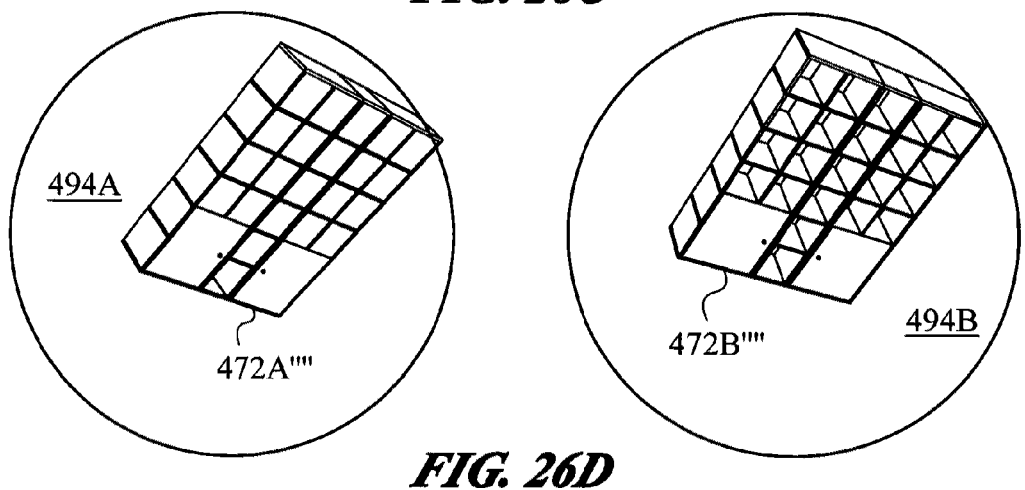

Finally, full field images 494A, 494B with images 472A''' and 472B''', as shown in FIG. 26D, were obtained after performing another rotation from the previous pose, around item's 476 by 35° in the counter-clockwise direction around its body axis $X_{wb}$.

Clearly, these orientational images (which are scaled for teaching purposes herein) are very different, and that difference provides tremendous amounts of additional information that a computer stereo vision algorithm can use to extract depth (ranging) as well as make the pose recovery more robust.

The use of two or more points of view to obtain pose information in a real three dimensional environment does not have to involve just passive capture of radiation from two or more points of view. To make this point clear, an active implementation of two vantage points will be shown based on a slightly modified item 476. This modified item 476' is shown in the isometric view of FIG. 27, with corresponding parts retaining the same reference numerals.

In the embodiment of FIG. 27, item 476' has retained body 478, that is rigid and of known length. It also still has on-board unit 480A with lens 482A, photosensor 484A and corresponding image processing electronics 486A. However, on the left end of body 478, item 476' has an emitter 500 of a pattern 502 of radiation 130". In other words, rather than being able to capture ambient radiation 130 to thus observe a real three-dimensional environment 504 from the corresponding point-of-view, item 476' sends out pattern 502 of radiation 130" from that point-of-view.

To produce pattern 502 of radiation 130", emitter 500 has a source 506 and a corresponding optic 508. Optic 508 may be a diffraction element, a holographic element or any other suitable optical device that is capable of imparting pattern 502 onto radiation 130" provided by source 506. A person skilled in the art will be familiar with such optical devices from the field sometimes referred to as projection of structured light.

Environment 504 admits of stable frame 106 parameterized by stable coordinates $(X_s, Y_s, Z_s)$. A particular feature 510 in environment 504, namely a flat wall, has a known location in environment 504 and is in fact co-planar with the $X_s$-$Z_s$ plane of stable coordinates $(X_s, Y_s, Z_s)$. It is wall 510 that will be employed as a reflector of pattern 502 of radiation 130" emitted by emitter 500 from on-board item 476'.

FIG. 27 makes it easier to visualize the structure of pattern 502 by showing item 476' oriented in a canonical pose, namely with body 478 exactly parallel with axis X, and no roll about this axis. In this canonical pose, pattern 502 produces a regular rectangular grid pattern 502' on wall 510. In fact, it is this regular rectangular grid pattern 502 that is imparted on radiation 130" from source 506 by optic 508. Since item 476' is in the canonical pose, however, and wall 510 is flat, pattern 502' projected on wall 510 matches the geometry of pattern 502 originally imparted on radiation 130" by optic 508.

As radiation 130" impinges on wall 510 in pattern 502', wall 510 reflects a large portion 130B" of radiation 130" in that exact pattern 502'. It is reflected portion 130B" of radiation 130" carrying pattern 502' that is captured by lens 482A and imaged onto photosensor 484A of on-board unit 480A. Preferably, in order to achieve a good signal-to-noise ratio (i.e., to capture a large proportion of reflected radiation 130B" rather than radiation 130) radiation 130 is filtered by optic 482A. This can be accomplished by selecting an IR wavelength for radiation 130" and using an IR notch filter in optic 482A to only pass the selected IR wavelength. (Also see prior embodiment employing IR wavelengths as illustrated in FIG. 24.)

Of course, radiation 130 can be used contemporaneously with the present dual viewpoint approach for absolute pose recovery. That is because radiation 130 carries non-collinear optical inputs from features that are stationary in frame 106, such as a window 512. In these embodiments radiation 130 should not be filtered out. Moreover, any of the prior methods for absolute pose recovery using a single point-of-view can be applied for pose recovery of item 476' based on radiation 130 only. It should be noted, however, that image processing to implement two or more camera pose recovery methods at the same time will be burdened by high resource requirements as well as less high quality and more difficult to process optical data.

In the canonical pose of item 476', pattern 502' is not distorted in comparison to pattern 502. However, its scale is indicative of distance to wall 510 along $Y_s$ axis of stable coordinates $(X_s, Y_s, Z_s)$. That is because item's 476' image processing electronics 486A are informed of pattern 502, as originally emitted from optic 508. Thus, they can use the scale factor and distortion of pattern 502' in comparison to pattern 502 for pose recovery of item 476'. In other words, the pose recovery algorithm in the present embodiment relies on parallax and comparison of pattern 502, which scales and distorts to pattern 502' on wall 510 as a function of the pose of item 476'.

FIG. 28 visualizes pattern 502' as imaged by lens 482A from the second point-of-view in the canonical pose of item 476'. Image 502" of pattern 502' is double primed to remind us that it is obtained from reflected radiation 130B" captured on photosensor 484A. Note that pattern image 502" also includes an image 502A" of a point-like feature 502A", that is projected as part 502A of pattern 502 for breaking the rectangular symmetry inherent in pattern 502. The radius $r_i$ of full field image 514 afforded by lens 482A on photosensor 484A indicates a center 516 of camera 480A. It is offset from the optical axis of emitter 500, whose intersection with wall 510 (e.g., emission center) is indicated by point 518. A separation 520 of center 516 and point 518 thus defines the amount of parallax in the present embodiment.

To appreciate the pose recovery method employed to recover the pose of item 476' in stable frame 106, we now turn to a series of drawings in FIGS. 29A-E and FIGS. 30A-E showing how deformation of pattern 502 into pattern 502' reflected from wall 510 relates to the absolute pose of item 476'. To simplify the drawings, a smaller rectangular grid pattern 502 is employed in these drawing figures than that introduced in FIG. 27.

FIG. 29A shows in an isometric view item 476' in the canonical pose, emitting pattern 502 of radiation 130" into environment 504. Because item 476' is in the canonical pose, pattern 502' projected on wall 510 and reflected from it retains the rectangular grid symmetry of originally emitted pattern 502. FIG. 30A shows the corresponding full field image 514A captured on photosensor 484A.

In FIG. 29B item 476' is still in the canonical orientation, but is moved closer to wall 510 along axis $Y_s$ (in the positive direction). Thus, the size of pattern 502' on wall 510 is reduced in proportion to the change in distance to wall 510. The corresponding full field image 514B shows a smaller pattern image 502" that remains undistorted with respect to pattern 502.

Image processing electronics, equipped with the knowledge of the scaling factor of pattern 502' as a function of distance to wall 510, can thus recover distance along axis $Y_s$ from pattern image 502". The fact that pattern image 502" is not distorted informs the image processing electronics that the orientation of item 476' is canonical.

Figure 29C:
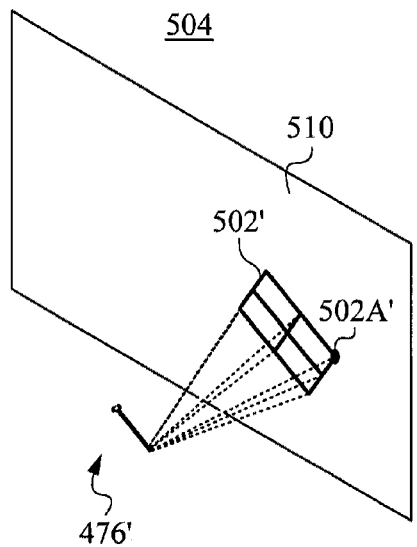
Figure 30C:
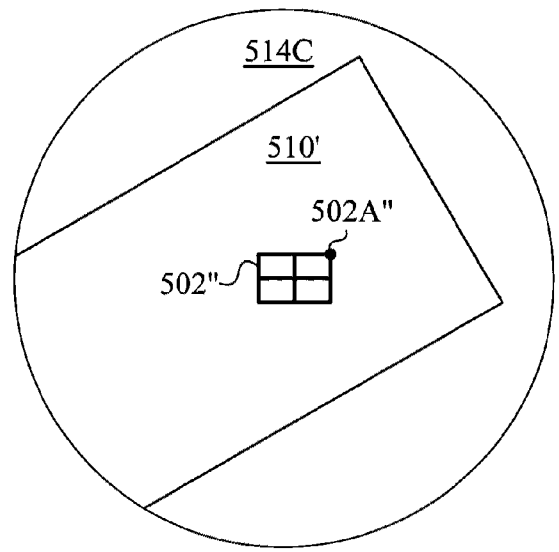

In FIG. 29C item 476' was rotated around its center and around its body-axis $Z_b$ (not shown, but see rotation convention defined in FIGS. 3A-D) by first rotation angle α. This rotation did not result is a change of scale or in a deformation of pattern 502' on wall 510. Image 514C in FIG. 30C confirms this state of affairs.

Indeed, we now see why pattern 502 alone is insufficient to recover the full absolute pose of item 476'. Additional information is necessary to recover the change in orientation of item 476' due to rotation by first rotation angle α. This additional information can be obtained either by implementing a previous algorithm and tracking the rotation of image 510' of wall 510 with the aid of radiation 130, of from another suitable on-board sensor. Alternatively, other information that provides the "up" direction, or projects a pattern onto objects not as simple as a wall can be used.

Figure 29D:
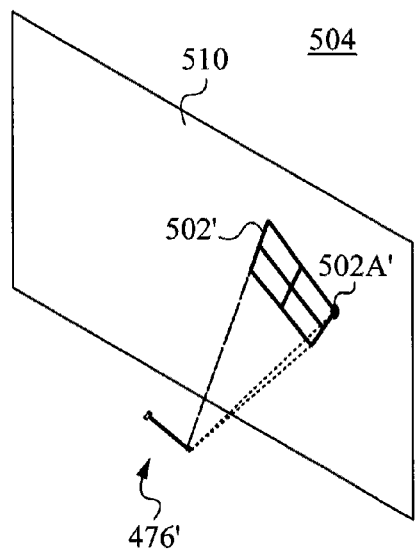
Figure 30D:
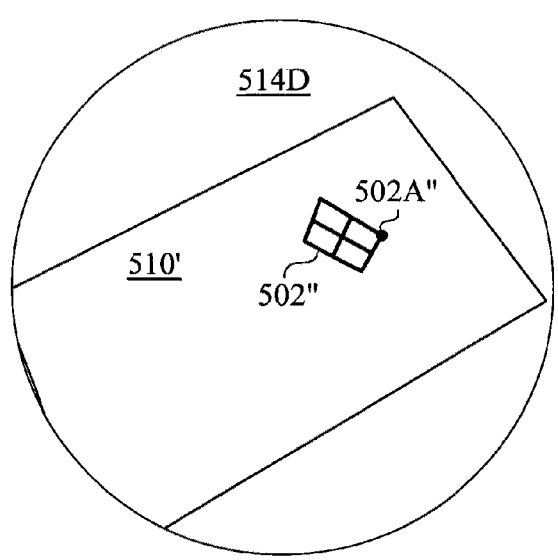

In FIG. 29D item 476' was rotated from its pose in FIG. 29C around its center and around its body axis $X_b$ (not shown) by second rotation angle β. This rotation does result in a deformation of pattern 502' on wall 510. Image 514D in FIG. 30D shows pattern image 502" that inherits the corresponding deformation.

Figure 29E:
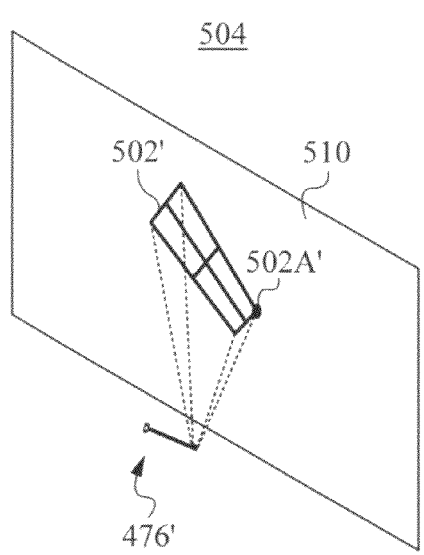
Figure 30E:
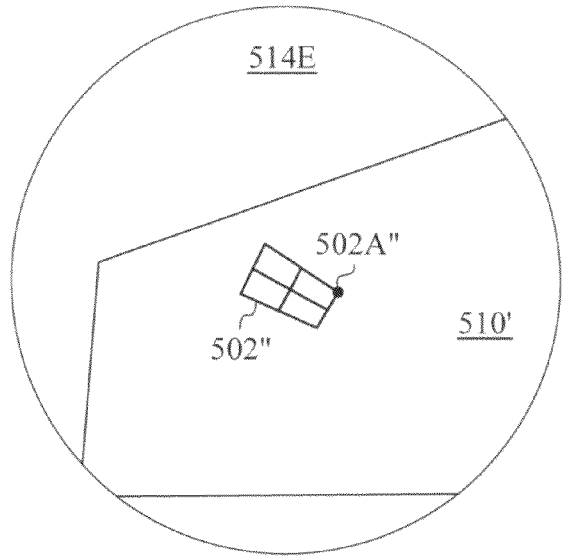

Finally, in FIG. 29E item 476' is rotated from its pose in FIG. 29D around its center and around its body axis $Y_b$ (not shown) by third rotation angle γ. Once again, this rotation does result in additional deformation of pattern 502' on wall 510. Image 514E in FIG. 30E illustrates the attendant deformation in pattern image 502".

The above review of scaling and deformation of pattern 502 projected from on-board item 476' does show that a lot of information about the pose of item 476' can be recovered by this method when projecting onto an object as simple as a flat wall. Thus, the method needs to be supplemented by another method to recover the full absolute pose of item 476'. Otherwise, projection onto a more complicated object can be deployed to recover the additional pose parameters.

Nonetheless, such projection of structured light from on-board even on objects as simple as a wall can be useful in recovering an important quantity used in computer vision in pose recovery algorithms. This quantity is the surface normal n, a previously discussed vector. Knowledge of the surface normal is very useful to pose recovery algorithms of computer vision.

Additional information about stereo vision in conjunction with the projection of structured light or pattern of radiation from on-board of an item or elongate object whose pose needs to be determined is found in U.S. Pat. No. 7,023,536 to Zhang et al. Going still further, U.S. Pat. No. 7,088,440 to Buermann et al. describes how such structured light solutions can be implemented with the aid of scanning mechanisms to gain additional temporal information about the projected pattern. Further applications of such scanning mechanisms for ranging are described in U.S. Pat. Nos. 7,110,100; 7,161,664 and 7,113,270 to Buermann et al.

Taking a number of lessons from the above embodiment, FIG. 31 illustrates another active illumination method. This method overcomes many limitations of structured illumination projected from on-board an item. In this embodiment, a pattern 520 of radiation 130" is projected from a corresponding emitter 522 that is stationary in stable frame 106. If the absolute pose of emitter 522 in stable frame 106 is known, then, despite projection on a simple flat wall, the absolute poses of corresponding items 524A, 524B, 524C associated with user 526 can be fully recovered.

User 526 resides in real three dimensional environment 528 within a room 530 (e.g., a dance studio). A wall 532 of dance studio 530 is used as the feature at which pattern 520 of radiation 130" is directed. Pattern 520 produces a projected pattern 520' on wall 532. Radiation 130B" is reflected from projected pattern 520' by wall 532. Emitter 522 is oriented such that it is in a canonical position with respect to wall 532 (see canonical pose defined in FIG. 29A). Thus, emitter 522 projects an undistorted pattern 520' onto wall 532.

Upon reflection, radiation 130" is captured by items 524A, 524B and 524C by their in-board units. The details of the on-board units, e.g., whether they be cameras, PSDs or other suitable photosensors for receiving reflected radiation 130B" communicating pattern 520' to them will not be described in detail. These devices, as well as their lenses and image processing electronics have already been described above. It should be remarked, however, that in order not to disturb user 526, radiation 130" should be chosen to be in the IR range of the electromagnetic spectrum.

Because pattern 520' is not distorted and will be stationary through the application, the designer can use it to establish a stable frame 134 parameterized in world coordinates ($X_w, Y_w, Z_w$). The orientation of world coordinates ($X_w, Y_w, Z_w$) with respect to stable coordinates guaranteed when patter 520' on wall 532 is not distorted. To match the relative scaling along the linear dimensions, it will be necessary to apply the scaling of pattern 520' as a function of distance from emitter 522. Once the scaling is applied, the interface and application may use world coordinates ($X_w, Y_w, Z_w$) of stable frame 134 that are calibrated one-to-one with respect to stable coordinates ($X_s, Y_s, Z_s$), and thus permit proper one-to-one motion capture of the dance moves of user 526. (Of course, a displacement vector $d_s$ (introduced and explained above) still needs to be applied to perform a proper coordinate transformation between frames 106 and 134.)

A dance application 534 implementing the one-to-one motion capture interface of the present exemplary embodiment runs on a suitable host. The host may be integrated in the structure supporting emitter 522. In the present embodiment, application 534 runs on resources integrated with a television 536. Television has a display screen 538 for displaying the output of application 534 to user 526.

To capture their dance moves, user 526 mounts items 524A-C on their body. Item 524A is mounted on the head, item 524B is mounted on the shoulder, and item 524C is mounted on the wrist. All items are mounted in such a way that their on-board units can capture pattern images 520" obtained from reflected radiation 130B" on their respective photosensors. Alternatively, items 524A-C are provided with 360° field-of-view optics.

It is important that user 526 informs application 534 where each item 524A-C is mounted on their body so that motion capture can proceed correctly. To help with this task, the interface may present user 526 with "clickable" buttons or other options (preferably graphical user interface (GUI) options, since pose information is easiest to represent and understand in the visual format) to input positioning and orientation data. In the present embodiment, application 534 displays movable place-holders representing items 524A-C on screen 538 and allows user to position and orient those on respective parts of a model user body 526' displayed on screen 538 in correspondence to where and how user 526 placed items 524A-C on their own body.

Now application 534 is ready to run in the motion capture mode. User 526 assumes their position in dance studio 530 and executes the movements to be digitized with their right arm. Application 534 digitizes the movements one-to-one and displays them to user 526 on screen 536. The display can be contemporaneous, e.g., for active feedback on performance. Alternatively, it can be presented to user 526 later for review. Note that since many parts of the body of user 526 are not equipped with items 524A-C, only the motion of right arm and head can be captured in this case. Therefore, application 534 only displays the corresponding portion of model user body 526'. Also note that application 534 does not display place-holders representing items 524A-C in order not to distract user 526.

It should be noted that to conserve power pattern 520 could be scanned on wall 532 at a sufficiently high rate by a single, low-power source. The temporal information inherent in a scanned pattern (e.g., a Lissajous figure, as discussed in detail in U.S. Pat. No. 7,088,440 to Buermann et al. referred to above) could be useful to make the interface more robust in this case. Note that even speckle is used in projected IR patterns in many devices (e.g., the Kinect by Microsoft) to imbue patterned IR light with additional helpful information.

Alternatively, pattern 520 can be strobed or flashed at a frame rate to which items 524A-C are synchronized. Of course, a person of average skill in the art will be able to add various resource-reducing and power-saving measures to this embodiment in order to avoid having to run emitter 522 at a constant power level in the range of 10s of Watts.

FIG. 32 is an isometric view of another embodiment of an interface 550 employing cell phone 104 as the item associated with a user to obtain 3D input for an application 552. This embodiment takes advantage of an emitter 554 located in a known location and orientation to project a pattern 556 of radiation 130" onto a known surface 558. Surface 558 is the surface of a desk, which resides in a real three dimensional environment 560.

Pattern 556 is projected onto desk surface 558 to produce a projected pattern 556'. As mentioned above, emitter 554 should be oriented canonically with respect to desk surface 558 in order to avoid distortion in projected pattern 556'. Of course, as we have learned above, the distortion in pattern 556' due to non-canonical orientation is indicative of the surface normal. This surface normal can, of course, be computed in accordance with the above teaching. Therefore, the effects of pitch and roll of emitter 554 with respect to desk surface 558 can be compensated. However, this represents an additional complication and should preferably be avoided by ensuring canonical orientation.

Preferably, if pattern 556 is strobed or scanned, surface 558 is reasonably flat, although some objects, e.g., planar objects such as sheets of paper shown in FIG. 32, will not significantly affect performance. What is more important, is that surface 558 and any planar objects on it reflect radiation 130" well. This ensures that a significant amount of reflected radiation 130B" is available to obtain a pattern image 556" of projected pattern 556' by on-board camera 144 of phone 104. Alternatively, if pattern 556 is not scanned, then it is preferably projected onto an object that is more complex than surface 558.

Preferably, the wavelength of radiation 130" is in the IR range of the electromagnetic spectrum. Thus, reflected radiation 130B" can be easily filtered out from ambient radiation 130 for a good signal-to-noise ratio of pattern image 556". Any filtering mechanism discussed above and known from literature may be employed to achieve good filtering. It should be noted that if camera 144 has an IR filter integrated in its lens 146, then this filter needs to be removed prior to implementing this embodiment.

As in the previous embodiment, the scaling of projected pattern 556' on surface 558 may not be known unless the distance between emitter 554 and surface 558 is known. Of course, the exact scaling can be later adjusted by the user, and in capturing certain types of 3D input exact scaling may not matter. However, if the mapping requirements between the reported absolute pose parameters of phone 104 in environment 560 and the degrees of freedom of phone 104 are strict, it may be advantageous to ascertain the scaling prior to operating this embodiment.

During operation, application 552 employs projected pattern 556' as the feature whose non-collinear optical inputs, namely the line-like inputs and point-like inputs (shown in previous embodiments for symmetry breaking purposes, but not visible in FIG. 32) are used for absolute pose recovery of phone 104. To that end, projected pattern 556' is used to set world coordinates $(X_w, Y_w, Z_w)$ defining stable frame 134. It is the absolute pose of phone 104 in stable frame 134 that is recovered by camera pose recovery algorithms in this embodiment and reported to application 552 as input.

The present embodiment is excellent for capturing 3D gestures of phone 104 and using them as input to application 552 for control purposes. For example, when presenting to other persons, user 102 may stay far away from his computer, yet still control the display of data (e.g., turning of pages in a slide presentation) remotely with gestures executed by phone 104.

User 102 may also employ phone 104 as a quasi-absolute pointer/mouse. The reason that this input is quasi absolute, is that the exact relative pose between computer screen and projected pattern 556' may not be known. If it is known to application 552, than the relative pose can be taken into account to imbue phone 104 with the capabilities and attributes of an absolute 3D pointer/mouse.

It should also be remarked that if another item, such as item 562, in this case a stylus, were equipped with on-board camera 144, then stylus 562 could be used to produce absolute trace for application 552. Such trace could either be confined to a 2D subspace of environment 560 (i.e., by writing on a sheet of paper confined to the plane of desk surface 558) or it could be a 3D trace collected while stylus is being manipulated by user 102 in an unconstrained fashion in environment 560.

Another advantageous aspect of the invention, is that the item(s) that recover their absolute poses in stable coordinates in 3D environments with optical hardware and methods do so in a manner that is intuitive to humans. In some ways, interfaces according to the present invention connect with aspects of the evolution of the human sense of vision and its implementation in human proprioception. Thus, applying the interface with specific adaptations to situations where human activity is to be monitored is very advantageous.

FIG. 33A shows an interface in which two items 570A, 570B associated with user 102 are a part of a wearable item. Specifically, items 570A, 570B are affixed to a piece of headgear or helmet 572 to be worn on the head of user 102. Items 570A, 570B possess requisite hardware and software in accordance with any suitable embodiment described above to recover their absolute pose in a stable frame. The respective points-of-view of items 570A, 570E are $\mathcal{P}1$ and $\mathcal{P}2$. Also, the poses of items 570A, 570B in body coordinates of helmet 572 are known.

Because the body coordinates of helmet 572 are stable, and it is generally known how helmet 572 is worn by user 102, it is possible to define any point of interest on user 102 in body coordinates of helmet 572. For example, it is frequently useful to know where user 102 is looking. Thus, defining a point of interest 574 that is between user's 102 eyes and tracking its absolute pose in stable frame 106 or 134, depending on application, enables the interface designer to know where user 102 is looking.

FIG. 33B shows user 102 running with helmet 572 on. By employing any of the optical pose recovery techniques taught above, with or without additional motion sensor(s), the interface can recover where user 102 is looking while running. For example, if frame 134 defined by coordinates $(X_w, Y_w, Z_w)$ is a sporting space and user 102 is training for a sporting event where his/her actions need to be coordinated with where he/she is looking, the interface can provide a useful training simulation. In embodiments that provide for feedback to user 102 (e.g., visual, audio, haptic or other types of feedback), the user 102 can be advised in real time how to alter his actions. The feedback may employ any suitable hardware, including glasses with internal displays for providing personalized visual feedback or speakers with audio feedback.

FIG. 34A is a diagram of a particularly interesting application of the present interface. Here, user 102 (only arms shown) is a golfer and the item is a hand-held club, and more precisely a golf club 580. Club 580 is equipped with an on-board optical pose recovery unit 582A. On-board unit 582A has the requisite photosensor, optic, and image processing electronics, as described above and no longer shown in this figure. In particular, on-board unit 582A is configured to use as non-collinear optical inputs point-like IR sources, in this case IR LEDs 584A-H. Given that these point-like sources can be modulated, it is most advantageous if its photosensor is a PSD. It is also important that IR LEDs 584A-H emit over a wide solid angle, such that radiation 131 from all or most of them can be seen by unit 582A in all absolute poses assumed by club 580 during a swing. For additional information on PSD systems working with IR LEDs and their implementation parameters, the reader is referred to U.S. Pat. No. 7,729,515 to Mandella et al.

A golf swing is a rather rapid movement. Thus, it may benefit from interpolation of absolute poses recovered optically by on-board unit 582A. For this reason, it is preferably to also provide club 580 with a motion sensor 586. Sensor 586 is a relative motion sensor, and preferably an inertial sensor. In this case, motion sensor 586 has gyroscopes and accelerometers for reporting in all six axes of its inertial sensor coordinates $(X_i, Y_i, Z_i)$ defining motion frame 318, as previously described in the preferred embodiment (see FIG. 16 and FIG. 18 as well as the corresponding description).

The locations and orientations of on-board optical unit 582A and motion sensor 586 are known and parameterized with the aid of body coordinates. The requisite mathematical foundations have already been explained above and will not be revisited here. One notable point, however, is that center of mass C.O.M. 110 of club 580 is not usually on club 580. Although, this physical fact is of great significance to the golfer's 102 experience of the swing, it is of no significance to the pose recovery computations.

User 102 is working on improving his/her golf swing in a controlled real three dimensional environment 588. Because of the nature of a golf swing involving a rather swift rotational movement of club 580 around a moving pivot point 590, it is convenient to establish a first stable frame 134A that is centered on pivot point 590. This is done with the aid of a calibration run using the fact that point-like non-collinear optical inputs from features 584A-H are arriving from known locations in environment 588.

Because a swing is also a rotational movement about a second pivot point 592, which is generally coincident with user's 102 arm joint, it is further convenient to parameterize a second stable frame 134B. Second stable frame 134B is centered on pivot point 592. In fact, the reader will realize that generally speaking, a golf swing is a somewhat complicated mechanical system of two coupled pendula with moving fulcra or pivot points 590, 592. Of course, in order to collect absolute pose data (including roll, which corresponds to the twisting of the head and face of club 580) in second stable frame 134B it is important to measure the absolute poses of the pendulum involving the arms of user 102. This is done by an additional optical pose recovery unit 582B on the arms of user 102. In all general respects, unit 582B is analogous to unit 582A. Optionally, a motion sensor can also be provided on the arms of user 102. However, since the arms move slower than club 580, the additional help of such relative motion sensor may not be required.

Because of the spherical symmetry of the double pendulum system, it is convenient to parameterize both frames 134A, 134B in spherical world coordinates $(r_w, \theta_w, \phi_w)$, rather than Cartesian coordinates. This parameterization is shown in FIG. 34B, which illustrates the dynamics of the swing of club 580 from a perspective view on the ground next to golf ball 594. Frame 134A corresponds to a sphere of radius rc, which is the length of club 580 from pivot point 590 to its head. Frame 134B corresponds to a sphere of radius ra. Radius ra is the length of the arm of user 102 from its joint socket at pivot point 592 to pivot point 590, or to the center of his/her grip on club 580. Note that radii rc and ra indicated in FIGS. 34A-B are not vector quantities. Instead, they are scalars merely representing a magnitude (length). Vectors properly parameterized in frames 134A, 134B in spherical coordinates will be presented shortly in boldface letters, in accordance with our notation convention.

Spherical coordinates $(r, \theta, \phi)$ are well-known in the art and can be easily transformed into Cartesian coordinates by a coordinate transformation. Note that the angles specified in spherical world coordinates $(r_w, \theta_w, \phi_w)$ are in some aspects related to but not the same as the Euler rotational angles introduced previously. Spherical coordinates are employed in an alternative representation of vectors $rc_w$ and $rc_w$. Vectors $rc_w$ and $rc_w$ extend from origins of first and second frames 134A, 134B to units 582A, 582B on-board club 580 on arms of user 102, respectively. Vectors $rc_w$ and $rc_w$ in this representation are expressed as: $rc_w = (rc_w, \theta c_w, \phi c_w) = rc_w(t)$ and $ra_w = (ra_w, \theta a_w, \phi a_w) = ra_w(t)$. The orientation portion of the absolute pose of units 582A, 582B is still described with the aid of Euler angles, Tait-Bryan angles, quaternions or other rotation angles (e.g., angles $\alpha, \beta, \gamma$).

Finally, when defining the positions of the origins 590, 592 of frames 134A, 134B the location of golfer 102 in the larger stable frame 106 should be calibrated and tracked as well. The need for working with stable frame 106 fixed in the Earth frame is due to the fact that fulcra 590, 592 corresponding to the origins actually move during the golf swing. This is apparent from examining the golf swing broken down into trajectories 594A, 594B of fulcrum 590 and the face of the golf head, as shown FIG. 34B. The motion of fulcrum 592 is not shown explicitly in FIG. 34B for reasons of clarity. However, this motion is due to the dynamic movement of golfer's 102 arms and body during the swing. Thus, if the motions of fulcra 590, 592 are also recovered, then the complete golf swing including the impact on golf ball 596 can be reconstructed.

Calibrations can be accomplished by letting golfer 102 stand in a specified location, e.g., on top of foot markers, or in any other way known to those skilled in the art. While standing in that location, golfer 102 should grip club 580 as he/she would normally during the swing. Also, the length of golfer's 102 arms can be measured to help in the calibration process. A person skilled in the art of motion capture will known all the requisite techniques for calibrating a body prior to its motion for performing the most effective motion capture.

In the present embodiment, one portion of the golf swing is reconstructed from a time sequence of absolute poses of the arms of user 102 and the club 580 in their respective frames 134A, 134B. The other motion of the golf swing is reconstructed from the motion of fulcra 590, 592 in frame 106. The combination of these two portions constitutes the complete golf swing. In most cases, the signal of the interface will be fully parameterized to report all of this information. Further, the mapping will normally be one-to-one, since golfer 102 will be using the information to work on their golf swing. Of course, mappings involving scaling (linear or non-linear), projection into subspaces, extraction of pan angles to review certain aspects of the golf swing may also be useful.

At this point we should note that recovering absolute poses of items in three-dimensional environments depends on the context. Wise choices of parameterizations and coordinate systems should be deployed based on whether one is dealing with manipulated items or wearable items. The symmetry of the motions that will be executed, are also important. For example, in some applications cylindrical coordinates may be the best choice for parameterizing the requisite reference frame(s). This is clearly the case when dealing with activities such as the hammer throw.

A large variety of wearable items can be endowed with on-board units for absolute pose recovery. FIG. 35 illustrates a non-exhaustive collection to give a reader some idea of the universality of the present interface. The first wearable is a piece of headgear, namely a hat or a cap 600 that has two on-board units 602A, 602B affixed to it. These two units 602A, 602B provide it with stereo vision capabilities for absolute pose recovery. A ring, a watch, a bracelet, an arm band or piece of jewelry 604 is endowed with a single on-board unit 602 for mono- or single viewpoint optical absolute pose recovery. A pair of glasses or sunglasses 606 are also endowed with a single on-board unit 602 for general head-tracking tasks. An article of clothing, here represented by a shirt 608 is provided with one on-board unit 602 on the shoulder for tracking the absolute pose thereof. Obviously, more on-board units could be provided for complete motion capture and article of clothing 608 could be a full-body suit. Further accessories and accoutrements that can be equipped with on-board units include gloves 610A, 610B. First glove 610A has a single on-board unit 602A for general hand tracking. Second glove 610B has units 602B, 602C, 602D, 602E and 602F (not visible in this figure) for tracking the motion of each individual finger.

Similarly, a large variety of manipulated items can be endowed with on-board units for absolute pose recovery. FIG. 36 shows a non-exhaustive collection of such items. The first manipulated item is a gaming item represented by a gun 620 with an on-board unit 622. Second item is a hand-held brief-case 624 with two on-board units 622A, 622B. Note that units 622A, 662B are not designed for stereo vision, but rather to ensure that they can see the three dimensional environment no matter how briefcase 624 is being held. A remote control, a hand-held digitizer (stylus), a pointer, a remote touch device, a remote TV control or in general any wand or "magic wand" 626 can also be equipped with an on-board unit 622 for optical absolute pose recovery. A medical implement or general tool 628 is provided with on-board unit 622. A portable phone 630 has its on-board unit 622 mounted to that it can see the room while user 102 is talking.

On-board unit 622 can also be affixed to various types of portable electronic devices, such as a portable MP3 player or radio device 632. Device 632 may or may not have a display screen for communicating visual feedback to user 102. FIG. 36 further shows on-board unit 622 affixed to hand-held clubs and rackets, such as tennis racket 634. Additional gaming controls or actual instruments, such as viola 636 and guitar 638 can also be equipped with on-board unit 622 as shown. Even a microphone 640 can be equipped with on-board unit 622 for determining its absolute pose in a performance environment. Finally, hand-held tools, including digital inking devices such as tablet 642 with stylus 644 can be equipped for absolute pose recovery and digitization from on-board stylus/digitizer 644 (unit 622 not shown in the drawing, as it is integrated into the body of stylus or digitizer 644).

Concerning optical absolute pose recovery, we have already seen that various stationary objects have features that can be used to supply the non-collinear optical inputs required to establish the stable frame in which the absolute pose is parameterized and expressed. The features can either represent sources of radiation 131, 130' or they can reflect ambient radiation 130. FIG. 37 supplements the object already presented with a non-exhaustive collection of such stationary objects. It should be remarked, that in the present context stationary simply means that they can be relied not to move (or not to move much), in the context of the interface and application.

A television 650 is an excellent stationary object, whose actively emitting and passively reflecting features are good candidates for non-collinear optical inputs. Similarly, a computer 652 is a good stationary object, as is its printer 654. In addition, a small computer-associated object such as a dongle 656 can be used as a stationary object. Dongle 656 is especially effective when equipped with point-like or line-like emitters of radiation. For a larger convex hull, dongle 656 can be used to provide just a portion of the non-collinear optical inputs to establish the stable frame, and the screen of an associated computer can supply the remainder of the required non-collinear optical inputs. An RF transmitter unit, a set-top box, a base station, a stereo or game console 658 is also a good candidate as the stationary object.

In fact, the reader will realize that some of the items introduced in FIGS. 35-36, in particular the portable user devices with displays, are also good candidates for stationary objects. Thus, for example, a phone 660 and especially one with a base station 662, is a good stationary object, as is tablet 642 (see FIG. 36) or an electronic picture frame, which is similar to an active display tablet oriented upright.

Another group of suitable group of devices includes non-portable user devices with and without displays, as well as typical home appliances. Such object include, by way of example and without limitation, a toaster 664, a smart coffee maker 666 with display 668, an oven 670, a dryer or a washing machine 672 and a kitchen stove 674. Of course, corresponding appliances or large objects including industrial equipment and machinery can be used in industrial environments for optically establishing the necessary stable frames.

As is apparent from the above enumerations, the methods and interfaces according to the invention can be implemented in many different three-dimensional environments. The methods and interfaces can also take advantage of many well-known objects for establishing stable frames and any suitable parameterizing conventions. Further, any method for tracking rotations in three-dimensions is permitted. These include: Euler angles and, their equivalents, quaternions and their equivalents, direction cosines and their equivalents as well as any other mathematical conventions that reflect the non-commuting nature of rotations in three-dimensional space.

FIG. 38 illustrates a further extension of the invention to a method for controlling a controlled object 700. In this embodiment, object 700 is a device residing in a remote environment 702 parameterized by remote coordinates ($X_r$, $Y_r$, $Z_r$) Remote environment 702 may be a real environment, a cyberspace or some other virtual space. Although the space is shown to have three linear dimensions, this is not to be construed as a limitation on the possible dimensionality of remote environment 702.

User 102 resides in real three-dimensional environment 704 that is stationary in stable frame 106 parameterized in stable coordinates ($X_s$, $Y_s$, $Z_s$). Environment 704 is a laboratory equipped with a lab bench 706 and a display unit 708. Unit 708 is configured to display the operations performed by user 102 on bench 706. This may be done with any camera system and video-sharing equipment well-known to those skilled in the art. The visual information displayed by unit 708 may be shared across many remote screens and other social, community or network resources.

User 102 is operating on a model 700A of device 700 on his/her lab bench 706. Lab bench 706 is endowed with many features that provide non-collinear optical inputs (not shown). Preferably, these features include emitters of radiation to provide high contrast non-collinear optical inputs for pose recovery purposes. Point-like, line-like, area-like and volume-like optical inputs generated by corresponding point sources (e.g., LEDs), line sources (elongate light sources), illuminated surface areas or displays (e.g., illuminated backgrounds such as lightpads), and volumetric light sources.

User 102 employs hand-held tools 710A-C as the items whose absolute poses are tracked in time. All tools 710A-C are endowed with on-board units operating in the fully parameterized mode to yield their absolute poses parameterized in stable coordinates 106 with the aid of the non-collinear optical inputs. On-board units are not shown here, as they are integrated in the bodies of tools 706A-C. All on-board units report their signals carrying the full parameterization to unit 708 for display and any other processing or information sharing purposes. In the present embodiment, unit 708 displays images 710A'-B' of tools 710A-B that are presently being manipulated by user 102. An image of tool 710C is not shown, since it is presently idle.

As user 102 operates on model 700A, the fully parameterized signals from tools 710B and 710A are supplied to unit 708. Using these signals in a corresponding application (not shown), unit 708 re-creates the motions and actions of tools 710A-B on model 700A. Then, unit 708 demonstrates these actions on image 700A' of object 700.

In accordance with the invention, fully parameterized signals from tools 710A-B are also communicated to a control 712 of object 700. For example, with the aid of remote resources, in this case exact replicas of tools 710A-C, control 712 can act out the same actions as performed on model 700A by user 102. To ensure life-like interaction, haptic or other types of feedback can be provided to user 102, depending on the situation in remote environment 702.

The present embodiment could be employed for remote training purposes, where user 102 is a skilled operator showing his work to geographically remote pupils. Of course, user 102 could also be operating on a "live" object rather than a model and the model could be located in remote environment 702. The principles taught by this embodiment can be used for performing remote surgery on actual patients based on movements performed by a surgeon on a "dummy". These principles can also be employed to enable user 102 to perform actions on real objects located in hazardous remote environments, such as bio-contaminated environments or radioactive environments.

FIG. 39 is a perspective view elucidating how the present invention is employed when the item is a stylus 720 cooperating with a folder 722. Folder 722 has a tablet computer 724 on its left flap and a notepad 726 on its right flap. Folder 722 also has a number of features 728 embodied by point-sources of radiation, such as IR LEDs mounted at known locations around tablet computer 724 and around notepad 726. The IR LEDs 728 represent the non-collinear optical inputs for optical pose recovery.

Stylus 720 has a built-in unit on-board for optically recovering its absolute pose in stable frame 134 parameterized with Cartesian coordinates defined by IR LEDs 728. The on-board unit is not shown, but any of the previously discussed hardware compatible with IR LEDs 728 may be employed by it. For still further information, the reader is referred to U.S. Pat. Nos. 7,729,515; 7,862,641; 7,961,909. For suitable lenses to employ in the optics the reader is referred to U.S. Pat. Nos. 7,038,846 and 7,268,956 to Mandella.

An optional stationary object 730 is provided in real three-dimensional environment 732 on top of a table 734 for recovery of absolute pose in stable frame 106 in its Cartesian coordinates, if desired. Object 730 may be a volumetric source of IR radiation (i.e., it is a cube with glowing edges and/or other known portions).

Stylus 720 has a central mechanical axis C.A. that is aligned with the optical axis of its internal optics. Mechanical axis C.A. also passes through a pointing/writing tip 736 of stylus 720. In the parameterization of this embodiment, one or the rotational degrees of freedom is expressed as roll about mechanical axis C.A. In addition, one of the absolute pose parameters reported in the interface signal maps to rotation about mechanical axis C.A. The mapping is not one-to-one. Instead, it is scaled exponentially such that progressively more rotation about C.A. translates to an exponentially larger signal corresponding to roll.

The roll is used to adjust volume, brightness and other operation settings of tablet computer 724. These quantities have to be increased exponentially for human user 102 to perceive their increase to be linear. In fact, many human senses are configured that way, including vision (10 times more photons are perceived as a mere doubling of light intensity by the human eye).

In addition, the application running on tablet computer 724 and interfacing with stylus 720 causes a place-holder 738 to be drawn at the intersection of mechanical axis C.A. and the display screen. Place-holder 738 is an insertion cursor, a feedback cursor, a control icon, a display icon, or a visual feedback entity, depending on the application and use modality of stylus 720.

In applications where stylus 720 is used for producing written or drawn input, place-holder 738 is an insertion cursor. When not inputting data, place-holder 738 is merely a visual feedback entity, as in the present case. Such visual feedback entity merely indicates where user 102 is pointing stylus 720. When using roll to control an operation setting, place-holder 738 is a corresponding control icon; e.g., when adjusting volume it represents a speaker. In some applications, place-holder 738 is a display icon, such as an icon that reminds user 102 which application is currently running on tablet computer 724.

Folder 722 permits user 102 to also use stylus 720 in a paper writing modality. For that reason, notepad 726 is attached in a well-known position between IR LEDs 728 on the right flap. When on-board unit determines from its optical pose recovery algorithm that center axis C.A. is on notepad 726, it turns on a writing and drawing application. This application captures whatever the user writes or draws on notepad 726 in the form of digital ink. The digital ink may be displayed on the screen of tablet computer, if desired.

In addition, because the mapping employed in the present invention can be adjusted on-the-fly by user 102, he/she can select certain aspects of the mapping to be different when operating on notepad 726 as compared to the display screen of tablet computer 724. For example, when writing on paper the mapping may include an in-plane scaling, such that what is drawn corresponds to a 2:1 scaled digital ink as communicated to table computer 724. In this way, user 102 can take advantage of the inherently higher resolution of tip 736 on paper, where fine motor movement is easier supported than on a slippery screen.

To make it easier to unambiguously transition from operating on tablet computer to writing on paper, the application may turn off IR LEDs 728 around tablet computer 724 when it senses that user 102 is holding stylus 720 over notepad 726. Similarly, when not writing, IR LEDs 728 around notepad 726 can be turned off. Alternatively, different modulation, encoding or wavelength can be used in IR LEDs 728 around tablet computer 724 and around notepad 726.

FIG. 40 shows still another embodiment involving the capture of digital ink 750' form a whiteboard 752. Whiteboard 752 is designed to cooperate with a marker 754 that creates a regular ink trace 750 on the surface of whiteboard 752.

Marker 752 has an on-board unit, which is mounted in a manner similar to that in the stylus (i.e., within the body and invisible from the outside). To provide the requisite non-collinear optical inputs, whiteboard 752 has a grid 756 of IR LEDs 758 embedded in it. As shown in the enlarged portion, grid 756 is not regular. In fact, the asymmetries in it are provided on purpose for symmetry breaking. In other words, the known and asymmetric pattern of grid 756 ensures that absolute pose of marker 754 can be recovered unambiguously or uniquely for all expected absolute poses of marker 754 in frame 134 of whiteboard 752.

Marker 754 captures ink trace 750 by recovering its absolute poses in reference frame 134 based on IR LEDs 758 at a frame rate of 100 Hz or higher (e.g., 133 Hz). Specifically, image processing electronics initially recover the full parameterization of marker's 754 absolute pose with all six degrees of freedom. In processing the signal, the full parameterization is mapped such that only the trace of the tip of marker 754 on the surface of whiteboard 752 is retained. In other words, the mapping according to the invention, involves all six degrees of freedom from 3D space into a 2D subspace of the plane defined by whiteboard 752. Also, only the trajectory of a single point of interest, namely the tip (or writing nib) is mapped into this 2D subspace. The result of such mapping is digital ink 750'.

In the present embodiment, whiteboard 752 is a smart whiteboard with processing resources. Among these, is a printer 760 that prints out digital ink 750'.

In addition to the 3D to 2D subspace trace mapping, a second mapping of the fully parameterized six degrees of freedom is performed. The second mapping involves a 3D-to-3D mapping of a 3D trace executed 762 by the non-writing end 754' of marker 754. In this mapping only one degree of freedom is projected to the null space (i.e., removed), namely the roll of marker 754 about its own mechanical center axis C.A. The reason is that user 102, having firmly grasped marker 754, will typically not be able to and/or not wish to rotate it about C.A. while writing or gesturing with marker 754.

The output of the 3D-to-3D mapping is thus a five degree of freedom (5 D.O.F.) parameterization derived from the time sequence of absolute poses of marker 754 expressed in frame 134. Another way to see it, is to realize that five degrees of freedom are expressed by vector $o_b$ without unit vector $\hat{u}_a$ (which describes roll about the rotation axis defined by vector $o_b$) in the embodiment described in FIG. 14.

The information from this type of mapping corresponds to the way user 102 holds and manipulates marker 754. In other words, it corresponds to dynamic biometric information about how user 102 holds and moves marker 754 both during writing and also when not writing (e.g., when gesticulating with marker 754 in hand). A sufficient spatial resolution of the time sequence of absolute poses will also reveal the typical low-frequency biometric hand-tremor uniquely associated with user 102.

FIG. 41 illustrates the use of the interfaces and methods of invention in augmented reality and mixed reality applications. The exemplary application 800 runs on resources that are not shown. These resources can include remote computers, cloud resources, mainframes, on-line distributed resources, multi-user networks and the like. Because of the extremely wide range of resources that can support application 800, a cloud 802 is chosen to designate them in the present figure.

User 102 (not shown in this drawing) resides in a real three-dimensional environment 804, in this case a standard living room of a house. For simplicity of explanation, user 102 is sitting in armchair 806 while application 800 is running on resources 802.

Item 808 is a magic wand with actuation button 810 and haptic feedback mechanisms 812 for delivering pressure and thermal feedback to the hand of user 102. Item 808 is equipped with an on-board unit for optics-based absolute pose recovery of item 808 in any suitable stable frame or frames. Any of the above-taught hardware can be employed for recovering the absolute pose of item 808. Auxiliary non-optical sensors mounted on-board item 808 may be deployed for interpolation of absolute pose data with relative pose data. A moving frame 112 defined by Cartesian coordinates is employed to aid with the description of item's 808 absolute pose in accordance with any of the above-taught translation and rotation conventions.

Room 804 offers a number of frames within which the absolute pose can be recovered and reported. These include stable frames 106A, 106B defined by stationary features of living room 804. Frame 106A is defined by an upper corner 804' of room 804, and frame 106B is defined by the upper left corner of a doorframe 814.

As already taught above, any feature or features offering suitable high-contrast optical and non-collinear inputs (edges, corners, areas, volumes) can be employed in establishing stable frames. Also, the information from several stationary features can be combined. For example, each feature, e.g., corner 804' and doorframe 814, may provide sufficient number of non-collinear optical inputs to define the three linearly independent axes in room 804, as is necessary to span and parameterize the 3D space. Rather than recovering and reporting the absolute pose in one or the other frame 106A, 106B, the two parameterizations can be combined to define a single stable frame 106 (not shown here) in which the absolute pose is recovered. Of course, it is important that whatever choice is made, the on-board unit of magic wand 808 can always obtain a sufficient number of non-collinear optical inputs to ascertain the stable reference frame from its image of room 804.

Additionally, stable frames 134A, 134B and 134C defined with the aid of stationary objects in room 804 are also available. It is important to note here, that more than one stationary object can be used to define the same frame. Of course, it is important that when several stationary objects are employed in defining the same stable frame, they are not moved with respect to each other while application 800 is running. (Note, however, that if on-the-fly re-calibration of coordinate systems is available because sufficient image processing resources are available, then this may not be a limitation that has to be strictly observed.)

Frame 134A is defined by stationary objects that are embodied by lamps 816 and 818. Lamp 816 has an elongate emitting rod and thus affords a line-like optical input of emitted radiation 131A. Lamp 818 is a glowing cylinder and thus provides a volume-like optical input of emitted radiation 131B. A third lamp 820 mounted on the wall next to doorframe 814 can also be used in defining frame 134A. Lamp 820 affords and area-like optical input (in the general shape of a letter "C") of emitted radiation 131C. All lamps 816, 818, 820 emit radiation 131A-C that spans mainly the visual portion of the spectrum of electromagnetic radiation so as to provide useful light to user 102.

In contrast to frame 134A, frame 134B is established with the aid of non-emitting stationary object 822, in this case a piece of electronics equipment such as a stereo, a DVD player, a set-top box for a television or a base station for other entertainment services. The features that are used for non-collinear optical inputs from object 822 are its edges and corners.

Unlike lamps 816, 818, 820 (or screens and IR LEDs discussed previously), the edges and corners of object 822 do not generate any radiation of their own. Instead, the edges and corners produce reflected radiation 130' from incident ambient radiation 130. It is reflected radiation 130' that is used by on-board unit (e.g., camera) in magic wand 808 to optically recover absolute pose in corresponding frame 134B. A person skilled in the art will realize that reflection efficiency can be improved by the use of reflectors or reflective elements on object 822. Indeed, it is advantageous to employ such reflectors when practicable for better reflection and hence a higher optical contrast (better signal-to-noise ratio).

Note also that other non-collinear inputs, e.g., those for establishing frames 106A, 106B also depend on reflected radiation 130' derived from ambient radiation 130. Of course, when the door is open, doorframe 814 will normally provide very good optical contrast along its edges without the need to improve reflection efficiency. The same may not be true of corner 804'. In fact, a small reflecting mirror (not shown) may be used in corner 804' to enhance its reflection of ambient radiation 130 for better optical contrast.

Furthermore, when lamps 816, 818 and 820 are on, a portion of reflected radiation 130' actually originates from them in the form of radiation 131A-C. Reflected radiation 130' derived specifically from lamps 816, 818, 820 is not independently referenced herein or in the drawing. This optics aspect will nonetheless be clear to those skilled in the art.

Several additional exemplary non-emitting stationary objects 824, 826, 828 and 830 with well-defined corners, edges and surfaces may be used to supplement the non-collinear optical inputs obtained from object 822. These additional inputs will make the recovery of frame 134B more robust. Of course, in order to be useful, objects 824, 826, 828 and 830, and more precisely the features from which their non-collinear optical inputs originate, must be unobstructed and in the field-of-view of magic wand's 808 on-board unit.

During operation, application 800 receives a fully parameterized signal from magic wand 808 describing all six degrees of freedom of wand 808 in one or more of frames 106A, 106B, 134A, 134B. Any redundant information can be used by application 800 to improve the quality of recovered poses or to cross-check the recovered poses.

In the present embodiment, application 800 employs frame 134B as a preferred frame. This frame is employed by application 800 as the basis for interacting with user 102. Specifically, application 800 creates cyber entities, in this example one such entity 832 is shown. Cyber entity 832 is a human model originally represented in a virtual application frame 834 in its initial pose.

Resources are provided to user 102, e.g., head-up display glasses, which permit application 800 to superimpose entity 832 as a corresponding projected entity 832' on environment 804 within a zone 836 seen by user 102. The pose and attributes of projected entity 832' presented to user 102 are varied by application 800 as a function of the absolute pose of magic wand 808. Input generated from absolute pose(s) of magic wand 808 is used to control behaviors and manifestations of projected entity 832', such as its movements and position. In fact, since projected entity 832' it is appropriate to render entity 832' from the point-of-view of the on-board unit mounted in wand 808. This information is available in the fully parameterized signal that application 800 obtains from magic wand 808. It is worth noting that, if user 102 were wearing headgear 572 as shown in FIG. 33A, and the signal carried absolute pose information about headgear 572, then entity 832' could be rendered by application 800 from the point-of-view of user 102 himself/herself.

Button 810 can be used to provide input to further control behaviors and manifestations of projected entity 832' or to interact with it. For example, depressing button 810 may invoke a different projected entity, turn application 800 off, or instruct application 800 to change an aspect of entity 832' that magic wand 808 is being directed at. For example, depressing button 810 while pointing magic wand 808 at the hand of projected entity 832' in virtual zone 836 can represent an instruction to projected entity 832' to lift that hand.

User input not only affects projected entity 832', but also provokes additional feedback. Specifically, magic wand 808 provides haptic feedback via haptic feedback mechanism 812 to the hand of user 102. For example, providing an input that instructs projected entity 832' to lift its hand within zone 836 in a way that would collide with objects in room 804 overlapping with zone 836 may provoke application 800 to provide thermal feedback to user's 102 hand. Alternatively, the feedback could be in the form of pressure, indicating a direction along with entity 832' would be capable of moving its hand without running into object.

In a different embodiment, such as a virtual reality, a projector or a 3D volumetric display may present entity 832 to user 102 in a virtual environment, rather than superposed on real environment 804. In mixed reality applications, certain aspects of entity 832 can be presented by being superposed on environment 804 and others may be purely virtual. A skilled designer of augmented, virtual and mixed spaces will be able to adapt the invention as required for the corresponding application type.

FIG. 42 illustrates still another application 850 running in conjunction with a three-dimensional volumetric display 852. Two users 102A, 102B occupying real three-dimensional environment 854 have available to them two items 856A-B. Items 856A-B are embodied by hand-held tools, in particular a positioning aid 856A and a slicing tool 856B. Users 102A, 102B manipulate items 856A-B and use them to control and interact with virtual entity 858, here a model of an airplane, presented by volumetric display 852.

Volumetric display 852 may be a holographic display unit or any other suitable volumetric display. In addition to presenting virtual entity 858 to users 102A, 102B, display 852 also presents a number of features 860, which are volume-like. Specifically, features 860 are illuminated voxels or 3D pixels. On-board units of items 856A-B take advantage of voxels 860 as the non-collinear optical inputs for optical pose recovery. Based on these inputs, items 856A-B establish stable frame 134 and report their absolute poses in it to application 850.

In application 850, the volume defined in environment 854 where item 856B can operate on airplane model 858 corresponds to the virtual display volume of display 852. In other words, operation on model 858 is not supported outside the virtual display volume that overlaps with three-dimensional environment 854.

Positioning tool 856A is employed by user 102A to position and orient model plane 858. Preferably, model airplane 858 is rendered from the point-of-view of tool 856A to make this operation intuitive to user 102A. In addition, a rotational degree of freedom of positioning tool 856A is mapped to a scaling function, which increases or decreases the size of model airplane 858.

Slicing tool 856B is used by user 102B to make sections through model airplane 858, as shown. In this manner, user 102A and 102B can together operate together model airplane 858 to review its construction. This same techniques can be deployed in actually constructing model 858 using other tools in accordance with the principles of computer aided design (3D CAD).

Having thus described numerous exemplary embodiments of interfaces and methods using all six degrees of freedom (6 D.O.F.), it should be clear that many other embodiments are supported by the present invention. For example, the items could be tools used by doctors in an operating environment. Also, the items being used could themselves reside in a virtual space that is three-dimensional. Moving such items could lead to actions of controlled objects in a real three-dimensional space.

The mappings can also involve interchange of the degrees of freedom. For example, a translation can be mapped to a rotation or vice versa in the signal sent by the interface to the application. The scaling in such mapping does not need to be linear (e.g., it can be logarithmic). This may be particularly useful when performing high precision activities, as may be encountered in 3D CAD applications.

When using advanced display technologies such as 3D, the application may use glasses to provide individualized visual feedback to the user. This feedback can be rendered from the point-of-view of the on-board unit that recovers the item's absolute pose.

Furthermore, the applications extend to the field of measurement and testing. For example, moving an item from one place to another can be deployed to measure off distances in 3D space. This can be done to help in construction or working environments. For example, with a stylus-shaped item, one can mark objects that are to be machined (e.g. slabs of rock that are to be cut).

The interfaces of invention are useful in ubiquitous computing environments as well as virtual digital environments, such as second life to support life-like interactions between users.

It will be evident to a person skilled in the art that the present invention admits of various other embodiments. Therefore, its scope should be judged by the claims and their legal equivalents.

The invention claimed is:

1. An interface for producing an input from an absolute pose of an item associated with a user in a three-dimensional environment, said interface comprising:
   a) a unit on-board said item, said unit configured to receive non-collinear optical inputs presented by at least one stationary object in said three-dimensional environment, said at least one stationary object having at least one feature detectable via an electromagnetic radiation, said at least one feature presenting a sufficient number of said non-collinear optical inputs for establishing a stable frame in said three-dimensional environment;
   b) processing electronics employing a computer vision algorithm using a homography to recover said absolute pose of said item from a geometrical description of said non-collinear optical inputs in terms of absolute pose parameters in said stable frame and to generate a signal related to at least one of said absolute pose parameters;
   c) an application employing said signal as said input, wherein said absolute pose of said item comprises at least three translational degrees of freedom and at least three rotational degrees of freedom, said at least one absolute pose parameter is related to at least one among said at least three translational degrees of freedom and said at least three rotational degrees of freedom by a mapping and at least one aspect of said application varies with said absolute pose of said item.

2. The interface of claim 1, wherein said mapping comprises a one-to-one mapping.

3. The interface of claim 1, wherein said mapping comprises a scaling in at least one among said at least three translational degrees of freedom and said at least three rotational degrees of freedom.

4. The interface of claim 1, wherein said at least one among said at least three translational degrees of freedom and said at least three rotational degrees of freedom comprises two translational degrees of freedom defining a plane in said three-dimensional environment.

5. The interface of claim 4, further comprising a display and wherein said plane is plane-parallel with said display.

6. The interface of claim 5, wherein said display is integrated in one stationary object from among said at least one stationary object, and said one stationary object is selected from the group consisting of televisions, computers, electronic picture frames, game consoles, electronic devices, tools and appliances.

7. The interface of claim 1, wherein said at least one among said at least three translational degrees of freedom and said at least three rotational degrees of freedom comprises three translational degrees of freedom defining a volume in said three-dimensional environment.

8. The interface of claim 7, further comprising a three-dimensional display and wherein said volume corresponds to a virtual display volume of said three-dimensional display.

9. The interface of claim 1, wherein said at least one among said at least three translational degrees of freedom and said at least three rotational degrees of freedom comprises a rotational degree of freedom defining an axis in said three-dimensional environment and said absolute pose parameter maps to rotation around said axis.

10. The interface of claim 9, wherein said axis corresponds to a mechanical axis of said item.

11. The interface of claim 1, wherein said at least three translational degrees of freedom and said at least three rotational degrees of freedom comprise three mutually orthogonal translational degrees of freedom and three mutually orthogonal rotational degrees of freedom.

12. The interface of claim 11, wherein said three mutually orthogonal translational degrees of freedom comprise three orthogonal Cartesian axes.

13. The interface of claim 12, wherein said three orthogonal Cartesian axes are used as world coordinates for describing said stable reference frame and a predetermined point on said item is expressed in said world coordinates and defines a position of said item in said world coordinates.

14. The interface of claim 11, wherein said three mutually orthogonal rotational degrees of freedom are described in said application by a mathematical equivalent belonging to the group consisting of (i) three Euler angles, (ii) pitch, yaw, and roll angles, (iii) Brian-Tait angles, (iv) quaternions, and (v) direction cosines.

15. The interface of claim 1, wherein said at least one absolute pose parameter in said signal maps to three of said at least three translational degrees of freedom and three of said at least three rotational degrees of freedom thereby comprising a full parameterization of said absolute pose of said item, and wherein said application employs said full parameterization in said input for said application.

16. The interface of claim 15, further comprising a feedback unit for providing feedback to said user in response to at least one portion of said full parameterization.

17. The interface of claim 16, wherein said feedback unit comprises a display associated with said application, and said feedback comprises visual information.

18. The interface of claim 17, wherein said visual information comprises at least an image rendered from a point of view of said item, said point of view being derived from said at least one portion of said full parameterization.

19. The interface of claim 18, wherein said feedback unit comprises a haptic feedback unit associated with said application, and said feedback comprises haptic information.

20. The interface of claim 19, wherein said haptic information comprises feedback to at least one body part of said user, said haptic feedback being derived from at least one portion of said full parameterization.

21. The interface of claim 15, wherein said at least one stationary object comprises a display and said full parameterization of said item is employed by said application to compute an intersection of a mechanical axis of said item with said display.

22. The interface of claim 21, wherein said unit comprises an optic defining an optical axis, and said optical axis is chosen as said mechanical axis of said item.

23. The interface of claim 21, wherein said application comprises a place-holder entity placed at said intersection of said mechanical axis of said item with said display.

24. The interface of claim 23, wherein said place-holder entity is selected from the group consisting of an insertion cursor, a feedback cursor, a control icon, a display icon, a visual feedback entity.

25. The interface of claim 1, further comprising a relative motion sensor on-board said item for producing data indicative of a change in at least one among said at least three translational degrees of freedom and said at least three rotational degrees of freedom.

26. The interface of claim 1, wherein said at least one stationary object comprises a device selected from the group consisting of a game console, a television, a stereo, an electronic picture frame, a computer, a tablet, an RF transmitter unit, a set-top box, a base station, a portable user device having a display, a non-portable user device having a display and an appliance.

27. The interface of claim 1, wherein said non-collinear optical inputs are selected from the group consisting of point-like inputs, line-like inputs, area-like inputs and volume-like inputs.

28. The interface of claim 27, wherein said at least one feature comprises an emitter of said electromagnetic radiation and said non-collinear optical inputs comprise emissions from said emitter.

29. The interface of claim 27, wherein said at least one feature comprises a reflector of said electromagnetic radiation and said non-collinear optical inputs comprise reflected electromagnetic radiation from said reflector.

30. The interface of claim 29, wherein said item further comprises an emitter for emitting said electromagnetic radiation into said three-dimensional environment.

31. The interface of claim 29, further comprising an emitter of a pattern of radiation for emitting said electromagnetic radiation into said three-dimensional environment.

32. The interface of claim 1, wherein said three-dimensional environment is selected from the group of environments consisting of real space, a cyberspace, a virtual space, an augmented reality space and a mixed space.

33. The interface of claim 1, wherein said item comprises a manipulated item.

34. The interface of claim 33, wherein said manipulated item is selected from the group consisting of wands, remote controls, portable phones, portable electronic devices, medical implements, digitizers, hand-held tools, hand-held clubs, gaming controls, gaming items, digital inking devices, pointers, remote touch devices, TV remotes and magic wands.

35. The interface of claim 34, wherein said manipulated item is a portable phone and said input is used to control a user device selected from the group consisting of a game console, a television, a stereo, an electronic picture frame, a computer, a tablet, an RF transmitter unit, a set-top box, a base station, a portable user device having a display, a non-portable user device having a display and an appliance.

36. The interface of claim 1, wherein said item comprises a wearable item.

37. The interface of claim 36, wherein said wearable item is selected from the group consisting of items affixed on headgear, on glasses, on gloves, on rings, on watches, on articles of clothing, on accessories, on jewelry and on accoutrements.

38. The interface of claim 37, wherein said input is used to control a user device selected from the group consisting of a game console, a game object, a television, a stereo, an electronic picture frame, a computer, a tablet, an RF transmitter unit, a set-top box, a base station, a portable user device having a display, a non-portable user device having a display and an appliance.

39. A method for producing an input from an absolute pose of an item associated with a user in a three-dimensional environment, said method comprising:
   a) determining a placement of at least one stationary object having at least one feature in said three-dimensional environment, said feature presenting a sufficient number of non-collinear optical inputs detectable via an electromagnetic radiation to establish a stable frame in said three-dimensional environment;
   b) receiving by a unit on-board said item said non-collinear optical inputs;
   c) using with processing electronics employing a computer vision algorithm that uses a homography to recover said absolute pose of said item from a geometrical description of said non-collinear optical inputs in terms of absolute pose parameters in said stable frame;

d) generating a signal related to at least one of said absolute pose parameters;

e) communicating said signal via a link to an application for use in generating said input, wherein said absolute pose comprises at least three translational degrees of freedom and at least three rotational degrees of freedom, said at least one absolute pose parameter is related to at least one among said at least three translational degrees of freedom and said at least three rotational degrees of freedom by a mapping and at least one aspect of said application varies with said absolute pose of said item.

40. The method of claim 39, wherein said mapping comprises a one-to-one mapping.

41. The method of claim 39, wherein said mapping comprises a scaling in at least one among said at least three translational degrees of freedom and said at least three rotational degrees of freedom.

42. The method of claim 39, further comprising:
a) constructing a subspace of said at least three translational degrees of freedom and said at least three rotational degrees of freedom;
b) projecting said at least one absolute pose parameter into said subspace to obtain a projected portion of said absolute pose parameter; and
c) communicating said projected portion to said application for use in said input.

43. The method of claim 42, wherein said subspace is selected from the group consisting of points, axes, planes and volumes.

44. The method of claim 39, wherein said three-dimensional environment is selected from the group of environments consisting of real space, a cyberspace, a virtual space, an augmented reality space and a mixed space.

45. The method of claim 39, further comprising processing said signal to compute a position of said item in said application.

46. The method of claim 45, further comprising providing a feedback to said user depending on said position.

47. The method of claim 39, further comprising processing said signal to compute an orientation of said item in said application.

48. The method of claim 47, further comprising providing a feedback to said user depending on said orientation.

49. The method of claim 39, further comprising providing a relative motion sensor on-board said object for producing data indicative of a change in at least one among said at least three translational degrees of freedom and said at least three rotational degrees of freedom.

50. The method of claim 39, wherein said electromagnetic radiation is emitted from on-board said item.

51. The method of claim 39, wherein said electromagnetic radiation is emitted from an emitter located at a predetermined location in said three-dimensional environment.

52. The method of claim 51, wherein said electromagnetic radiation is emitted in a pattern.

53. The method of claim 39, wherein said feature emits said electromagnetic radiation.

54. The method of claim 53, wherein said electromagnetic radiation is further reflected from known objects in said three-dimensional environment in a pattern before being received by said on-board unit.

55. A method for controlling a controlled object based on an absolute pose of an item associated with a user in a three-dimensional environment, said method comprising:
a) placing in said three-dimensional environment at least one stationary object having at least one feature, said at least one feature presenting a sufficient number of non-collinear optical inputs detectable via an electromagnetic radiation to establish a stable frame in said three-dimensional environment;
b) receiving by a unit on-board said item said non-collinear optical inputs;
c) recovering with processing electronics employing a computer vision algorithm that uses a nomography said absolute pose of said item from a geometrical description of said non-collinear optical inputs in terms of absolute pose parameters in said stable frame;
d) generating a signal related to at least one of said absolute pose parameters;
e) communicating said signal to a control of said controlled object, wherein said absolute pose comprises at least three translational degrees of freedom and at least three rotational degrees of freedom, said at least one absolute pose parameter is related to at least one among said at least three translational degrees of freedom and said at least three rotational degrees of freedom by a mapping and at least one aspect of said application varies with said absolute pose of said item.

56. The method of claim 55, wherein said mapping comprises a one-to-one mapping.

57. The method of claim 55, wherein said mapping comprises a scaling of said at least one absolute pose parameter to a corresponding at least one among said at least three translational degrees of freedom and said at least three rotational degrees of freedom.

58. The method of claim 55, further comprising:
a) constructing a subspace of said at least three translational degrees of freedom and said at least three rotational degrees of freedom;
b) projecting said absolute pose parameter into said subspace to obtain a projected portion of said absolute pose parameter; and
c) communicating said projected portion to said control for controlling said controlled object.

59. The method of claim 58, wherein said subspace is selected from the group consisting of points, axes, planes and volumes.

60. The method of claim 55, wherein said three-dimensional environment is selected from the group of environments consisting of real space, a cyberspace, a virtual space, an augmented reality space and a mixed space.

61. The method of claim 60, wherein said controlled object resides in one of said group of environments consisting of real space, a cyberspace, a virtual space, an augmented reality space and a mixed space.

62. The method of claim 55, further comprising providing a feedback to said control depending on said at least one absolute pose parameter.

* * * * *